(12) United States Patent
Wargo et al.

(10) Patent No.: US 12,551,515 B2
(45) Date of Patent: Feb. 17, 2026

(54) METHODS AND COMPOSITIONS FOR TREATING CANCER

(71) Applicants: Board of Regents, The University of Texas System, Austin, TX (US); Institut Gustave Roussy, Villejuif (FR)

(72) Inventors: Jennifer A. Wargo, Houston, TX (US); Vancheswaran Gopalakrishnan, Houston, TX (US); Miles C. Andrews, Victoria (AU); Laurence Zitvogel, Villejuif (FR); Valerio Iebba, Villejuif (FR)

(73) Assignees: Board of Regents of the University of Texas System, Austin, TX (US); Institut Gustave Roussy, Villejuif (FR)

( * ) Notice: Subject to any disclaimer, the term of this patent is extended or adjusted under 35 U.S.C. 154(b) by 1232 days.

(21) Appl. No.: 17/296,072

(22) PCT Filed: Nov. 21, 2019

(86) PCT No.: PCT/US2019/062659
§ 371 (c)(1),
(2) Date: May 21, 2021

(87) PCT Pub. No.: WO2020/106983
PCT Pub. Date: May 28, 2020

(65) Prior Publication Data
US 2022/0016188 A1   Jan. 20, 2022

Related U.S. Application Data

(60) Provisional application No. 62/770,603, filed on Nov. 21, 2018, provisional application No. 62/826,631, filed on Mar. 29, 2019.

(51) Int. Cl.
| | | |
|---|---|---|
| *A61K 35/747* | (2015.01) | |
| *A61K 35/741* | (2015.01) | |
| *A61K 39/00* | (2006.01) | |
| *A61K 39/395* | (2006.01) | |
| *A61P 35/00* | (2006.01) | |
| *C07K 16/28* | (2006.01) | |
| *C12Q 1/689* | (2018.01) | |

(52) U.S. Cl.
CPC .......... *A61K 35/747* (2013.01); *A61K 35/741* (2013.01); *A61K 39/3955* (2013.01); *A61P 35/00* (2018.01); *C12Q 1/689* (2013.01); *A61K 2039/505* (2013.01); *C07K 16/2818* (2013.01); *C07K 16/2827* (2013.01); *C12Q 2600/106* (2013.01)

(58) Field of Classification Search
None
See application file for complete search history.

(56) References Cited

U.S. PATENT DOCUMENTS

| | | |
|---|---|---|
| 2016/0193257 A1 | 7/2016 | Honda et al. |
| 2018/0243351 A1 | 8/2018 | Hlavka |
| 2018/0273940 A1* | 9/2018 | Sommer ................ A61P 31/04 |
| 2018/0303934 A1 | 10/2018 | Clube et al. |
| 2020/0129569 A1 | 4/2020 | Wargo et al. |

FOREIGN PATENT DOCUMENTS

| | | |
|---|---|---|
| CA | 2987129 | 6/2015 |
| CN | 105296590 | 2/2016 |
| CN | 108884159 | 11/2018 |
| EP | 3411052 | 7/2020 |
| WO | WO 1995/001994 | 1/1995 |
| WO | WO 1996/015660 | 5/1996 |
| WO | WO 1998/042752 | 10/1998 |
| WO | WO 2000/037504 | 6/2000 |
| WO | WO 2001/014424 | 3/2001 |
| WO | WO 2005/003168 | 1/2005 |
| WO | WO 2005/009465 | 2/2005 |
| WO | WO 2006/000317 | 1/2006 |

(Continued)

OTHER PUBLICATIONS

Falony et al. 2016. Science. 352(6285):560-564 (Year: 2016).*
Pevsner-Fischer et al. Apr. 10, 2016. World J Clin Oncol. 7(2):200-213. (Year: 2016).*
Amaral et al. Expert Opin Pharmacother. 2017. 18(7): 689-699 (Year: 2017).*
Elkrief et al. OncoImmunology. 2019. 8(4):e1568812 (Year: 2019).*
Derosa. Ann Oncol. 2018. 29: 1437-1444 (Year: 2018).*

(Continued)

*Primary Examiner* — Anne M. Gussow
*Assistant Examiner* — Brianna K Swartwout
(74) *Attorney, Agent, or Firm* — Norton Rose Fulbright US LLP

(57) ABSTRACT

Described herein are methods and compositions for treating cancer and for predicting a subjects' response to combination checkpoint inhibitor therapy. Aspects of the disclosure relate to a method of treating cancer and/or reducing toxicity to a therapy in a subject comprising administering to the subject a composition comprising at least one isolated or purified population of bacteria belonging to one or more of the genera *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti,* and *Anaerotignum lactatifermentans* and wherein the method further comprises treating the subject with a combination of (i) a PD-1, PDL1, or PDL2 inhibitor and (ii) a CTLA-4, B7-1, CN or B7-2 inhibitor.

13 Claims, 57 Drawing Sheets

Specification includes a Sequence Listing.

(56) References Cited

FOREIGN PATENT DOCUMENTS

| WO | WO 2006/072625 | 7/2006 |
|---|---|---|
| WO | WO 2006/072626 | 7/2006 |
| WO | WO 2006/121168 | 11/2006 |
| WO | WO 2007/042573 | 4/2007 |
| WO | WO 2008/084106 | 7/2008 |
| WO | WO 2008/132601 | 11/2008 |
| WO | WO 2009/044273 | 4/2009 |
| WO | WO 2009/101611 | 8/2009 |
| WO | WO 2009/114335 | 9/2009 |
| WO | WO 2010/027827 | 3/2010 |
| WO | WO 2010/065939 | 6/2010 |
| WO | WO 2011/008369 | 1/2011 |
| WO | WO 2011/014438 | 2/2011 |
| WO | WO 2011/066342 | 6/2011 |
| WO | WO 2011094027 | 8/2011 |
| WO | WO 2012/071411 | 5/2012 |
| WO | WO 2012/160448 | 11/2012 |
| WO | WO 2013/006490 | 1/2013 |
| WO | WO 2013/025779 | 2/2013 |
| WO | WO 2013/067492 | 5/2013 |
| WO | WO 2014/022021 | 2/2014 |
| WO | WO 2015/016718 | 2/2015 |
| WO | WO 2015/066625 | 5/2015 |
| WO | WO 2015/075688 | 5/2015 |
| WO | WO 2015/095241 | 6/2015 |
| WO | WO 2015/153639 | 10/2015 |
| WO | WO 2016/063263 | 4/2016 |
| WO | WO 2016/196605 | 12/2016 |
| WO | WO 2017/172894 | 10/2017 |
| WO | 2018/026913 | 2/2018 |
| WO | 2018064165 | 4/2018 |
| WO | WO 2018/115519 | 6/2018 |
| WO | 2019/099482 | 5/2019 |
| WO | 2019/152667 | 8/2019 |
| WO | 2019/178494 | 9/2019 |
| WO | WO 2019/191390 | 10/2019 |

OTHER PUBLICATIONS

National Cancer Institute. Cancer Staging. Retrieved from the Internet on Nov. 19, 2024 at <URL:https://www.cancer.gov/about-cancer/diagnosis-staging/staging> (Year: 2024).*
Yun et al. Cancer Medicine. 2016. 5(7):1481-1491 (Year: 2016).*
Shahinas et al. 2012. mBio. 3(5): e00338-12 (Year: 2012).*
Zhang. 2018. Protein Cell. 9(5):462-473. (Year: 2018).*
Berger, et al. "Flavonifractor (Eubacterium) plautii bloodstream infection following acute cholecystitis", IDCases, 2018.
National Cancer Institute, Common Terminology Criteria for Adverse Events (CTCAE), 2017.
Office Action issued in corresponding Chinese Application No. 202080019540.8 dated Oct. 17, 2023.
Office Action issued in corresponding European Application No. 20740867 dated May 22, 2023.
Office Action issued in corresponding Japanese Application No. 2021529087, dated Nov. 20, 2023.
Prados et al., "Regression of established subcutaneous B16-F10 murine melanoma tumors after gef gene therapy associated with the mitochondrial apoptotic pathway", Experimental Dermatology, vol. 19, pp. 363-371, 2010.
Rudzki, J. "Management of adverse events related to checkpoint inhibition therapy", memo—Magazine of European Medical Oncology, 11, pp. 132-137, 2018.
Wang et al., "Fecal microbiota transplantation for refractory immune checkpoint inhibitor-associated colitis", Nature Medicine, 24(12), pp. 1804-1808, 2018.
Wen et al.., "Research progress of intestinal flora and ulcerative colitis", Hainan Medical Journal, vol. 29, No. 13, 2018.
Nordenberg, et al., "Growth Inhibitions of Murine Melanoma by Butyric Acid and Dimethysulfoxide", Experimental Cell Research, 162, 77-85, 1986.
Office Action and Search Report in corresponding Chinese Application No. 201780072679.7, dated Jan. 17, 2022 (English Translation).

Wang et al., "Current Treatment Status and Progress of Anti-PD-1 Antibody Therapy for Advanced Melanoma", Prac J Med & Pharm, 32(11), 992-994, 2015.
Office Action issued in corresponding European Application 20740867 dated May 22, 2023.
Eichele et al. "Dextran sodium sulfate colitis murine model: An indispensable tool for advancing our understanding of inflammatory bowel diseases pathogenesis", World Journal of Gastroenterology, vol. 23, 2017.
Final Office Action issued in corresponding U.S. Appl. No. 17/422,719, dated Mar. 8, 2024.
Lo et al. "Immune checkpoint inhibitor-induced colitis is mediated by polyfunctional lymphocytes and is dependent on an IL23/IFNy axis", Nature Communications, vol. 14, 2023.
Durnov L.A. et al., Pediatric Oncology. Moscow Meditsina, p. 139, 2002.
Extended Search Report issued in related European Patent Application No. 19886594.1, dated Oct. 24, 2022.
Office Action issued in related Russian Patent Application No. 2019108925, dated Jul. 4, 2022.
Brief Medical Encyclopedia, Renal Stone Disease—Substance Dependencies. Moscow "Meditsina", vol. 5, pp. 90-96, 1996.
Karimi, G. et al., "Single-species versus dual-species probiotic supplementation as an emerging therapeutic strategy for obesity", Nutrition, Metabolism & Cardiovascular Diseases, 27: pp. 910-918, 2017.
Kamiya, S., "Intestinal Disease, Liver Disease", Clinical and Microbiology, 42, pp. 703-709, 2015. (English Machine Translation Provided).
Office Action issued in corresponding Canadian Application No. 3038076, dated Jan. 16, 2024.
Office Action issued in corresponding Japanese Application No. 2019516669, dated Nov. 28, 2023. (English Translation Provided).
Ohno, K. et al., "Microbiome therapy (bacteria transplant, fecal microorganism transplant)", Clinical and Microbiology, 42, pp. 679-683, 2015. (English Machine Translation Provided).
Abu-Sbeih H et al., Importance of endoscopic and histological evaluation in the management of immune checkpoint inhibitor-induced colitis. Journal for Immuno Therapy of Cancer, 6:95; 2018.
Adler, B et al., Histopathological and immunophenotypic features of ipilimumab-associated colitis compared to ulcerative colitis. J Intern Med; 283:568-577; 2018.
Berman, D et al., Blockade of cytotoxic T-lymphocyte antigen-4 by ipilimumab results in dysregulation of gastrointestinal immunity in patients with advanced melanoma. Cancer Immunity; 10:11-20; 2010.
Choi K et al., Can Immune Checkpoint Inhibitors Induce Microscopic Colitis or a Brand New Entity? Inflamm Bowel Dis; doi: 10.1093/ibd/izy240; 2018.
Thomas A et al., Immune Checkpoint Inhibitor Enterocolitis vs Idiopathic Inflammatory Bowel Disease. Clinical Gastronenterology and Hepatology; https://doi.org/10.1016/j.cgh.2022.10.004.
Wang Y et al., Endoscopic and Histologic Features of Immune Checkpoint Inhibitor-Related Colitis. Inflamm Bowel Dis; doi: 10.1093/ibd/izy104; 2018.
Borody et al. "Fecal microbiota transplantation and emerging applications" Nat. Rev. Gastroenterol. & Hepatol. 2011, 9, 88-96.
Bultman, et al., "Microbial-Derived Butyrate: Oncometabolite or Tumor-Suppressive Metabolite?" Cell Host & Microbe, 16: 143-145, 2014.
Chaput et al., "Baseline gut micro biota predicts clinical response and colitis in metastatic melanoma patients treated with ipilimumab." Ann Oncol. 2017, 28(6), 1368-1379.
Chen et al., "Analysis of Immune Signatures in Longitudinal Tumor Samples Yields Insight into Biomarkers of Response and Mechanisms of Resistance to Immune Checkpoint Blockade." Cancer Discov 2016, 6, 827-837.
Dubin et al., "Intestinal microbiome analyses identify melanoma patients at risk for checkpoint-blockade-induced colitis." Nat Commun. 2016, 7:10391, 8 pages.
Extended European Search Report Issued in Corresponding European Patent Application No. 17857329.1, dated Aug. 7, 2020.

(56) References Cited

OTHER PUBLICATIONS

Frankel, et al., "Metagenomic Shotgun Sequencing and Unbiased Metabolomic Profiling Identify Specific Human Gut Microbiota and Metabolites Associated with Immune Checkpoint Therapy Efficacy in Melanoma Patients," *Neoplasia*, 19(10): 848-855, 2017.
Garrett, "Cancer and the Microbiota," *Science*, 348(6230): 80-86, 2015.
Gopalakrishnan et al., "Gut microbiome modulates response to anti-PD-1 immunotherapy in melanoma patients." *Science* 2018, 359, 97-103.
Gueimonde, et al., "Antibiotic Resistance in Probiotic Bacteria," Frontiers in Microbiology, 4(202): 1-6, 2013.
International Search Report and Written Opinion Issued in Corresponding PCT Patent Application No. PCT/US2017/053717, mailed Feb. 2, 2018.
International Search Report and Written Opinion Issued in Corresponding PCT Patent Application No. PCT/US2019/024519, dated Oct. 24, 2019.
International Search Report and Written Opinion Issued in Corresponding PCT Patent Application No. PCT/US2019/62659, mailed Mar. 30, 2020.
International Search Report and Written Opinion Issued in Corresponding PCT Patent Application No. PCT/US2020/013808, mailed Jun. 2, 2020.
Jenq et al., "Intestinal Blautia Is Associated with Reduced Death from Graft-versus-Host Disease" Biol. Blood Marrow Transplant. 2015, 21, 1373-1383.
Klieve, et al., "Ruminococcus Bromii, Identification and Isolation as a Dominant Community Member in the Rumen of Cattle Fed A Barley Diet," Journal of Applied Microbiology, 103: 2065-2073, 2007.
Litvak et al., "Dysbiotic Proteobacteria expansion: a microbial signature of epithelial dysfunction" J. Curr. Opin. Microbiol. 2017, 39, 1-6.
Maronpot et al., "Relevance of Animal Carcinogenesis Findings to Human Cancer Predictions and Prevention" *Toxicologic Pathology* 2004, 32(Suppl. 1) p. 40-48.
Matson et al., "The commensal microbiome is associated with anti-PD-1 efficacy in metastatic melanoma patients." *Science*, 359(6371):104-108, 2018.
Miquel et al., "Faecalibacterium prausnitzii and human intestinal health" *Current Opinion in Microbiology* 2013, 16, 255-261.
Moco, et al., "Metabolomics View on Gut Microbiome Modulation by Polyphenol-Rich Foods," *Journal of Proteome Research*, 11(10): 4781-4790, 2012.
Patyar et al., "Bacteria in cancer therapy: a novel experimental strategy" *Journal of Biomedical Science* 2010, 17(21), 1-9.
Pitt, et al., "Fine-Tuning Cancer Immunotherapy: Optimizing the Gut Microbiome," *Cancer Research*, 76(16): 4602-4607, 2016.
Pitt, et al., "Resistance Mechanisms to Immune-Checkpoint Blockade in Cancer: Tumor-Intrinsic and -Extrinsic Factors," Immunity, 44(6), 1255-1269, 2016.
Png et al., "Mucolytic Bacteria With Increased Prevalence in IBD Mucosa Augmentin VitroUtilization of Mucin by Other Bacteria" *Am. J. Gastroenterol.* 2010, 105, 2420-2428.
Poutahidis Theofilis, et al., "Gut Microbiota and the Paradox of Cancer Immunotherapy," *Frontiers in Immunology*, 5(Article 157): 1-5, 2014.
Roh et al., "Integrated molecular analysis of tumor biopsies on sequential CTLA-4 and PD-1 blockade reveals markers of response and resistance." *Sci Transl Med.* 2017, 9(379), 24 pages.
Routy et al., "Gut microbiome influences efficacy of PD-1-based immunotherapy against epithelial tumors." *Science*, 359(6371):91-97, 2018.
Segata et al., "Metagenomic biomarker discovery and explanation." *Genome Biol.* 2011, 12:R60, 18 pages.
Sivan, et al., "Commensal Bifidobacterium Promotes Antitumor Immunity and Facilitates Ant-PD-L1 Efficacy," *Science*, 350: 1084-1089, 2015.
Smelt, et al., "Probiotics Can Generate FoxP23 T-Cell Responses in the Small Intestine an Simultaneously CD4 and CD8 T Cell Activation in the Large Intestine," Plos One, 8(7):e68952, 1-12, 2013.
Taur, et al., "The Effects of Intestinal Tract Bacterial Diversity on Mortality Following Allogenic Hematopoietic Stem Cell Transplantation," *Blood*, 124: 1174-1182, 2014.
Tumeh, et al., "PD-1 Blockade Induces Responses by Inhibiting Adaptive Immune Resistance," *Nature*, 515: 568-571, 2014.
Vétizou et al., "Anticancer immunotherapy by CTLA-4 blockade relies on the gut microbiota." *Science* 2015, 350(6264), 1079-84.
Viaud, et al., "Gut Microbiome and Anticancer Immune Response: Really Hot Sh*t!" Cell Death and Differentiation, 22(2): 199-214, 2014.
Wang et al., "Bifidobacterium can mitigate intestinal immunopathology in the context of CTLA-4 blockade." *PNAS* 2018, 115(1), 157-161.
Wang et al., "P038 Fecal Microbiota Transplant (FMT) For Immunocheckpoint Inhibitor-Induced Colitis (ICI-C) In A 50 Year Old Female With Bladder Cancer" *Gastroenterology* 2018, 154(1S), S19-S20.
Wei et al., "Bacterial targeted tumour therapy-dawn of a new era" *Cancer Letters* 2008, 259, 16-27.
Extended European Search Report in corresponding EP Application No. 20740867.5, dated Aug. 11, 2022.

* cited by examiner

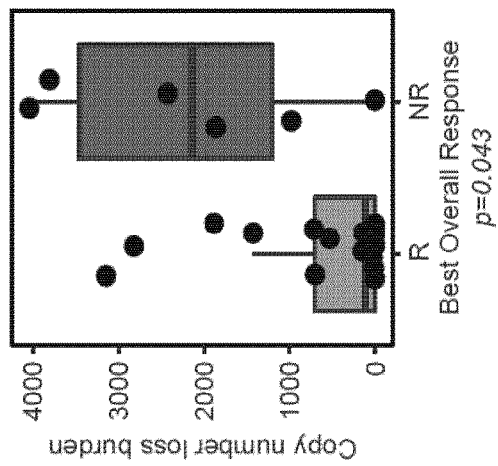
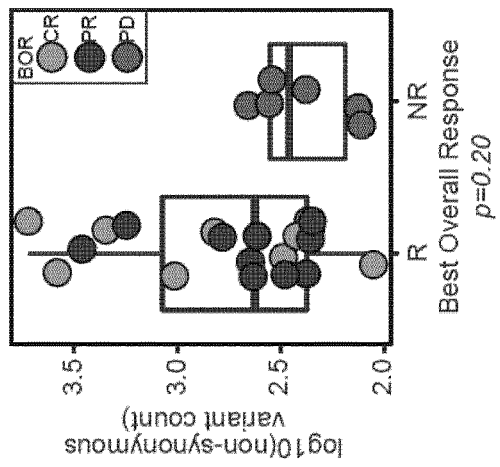
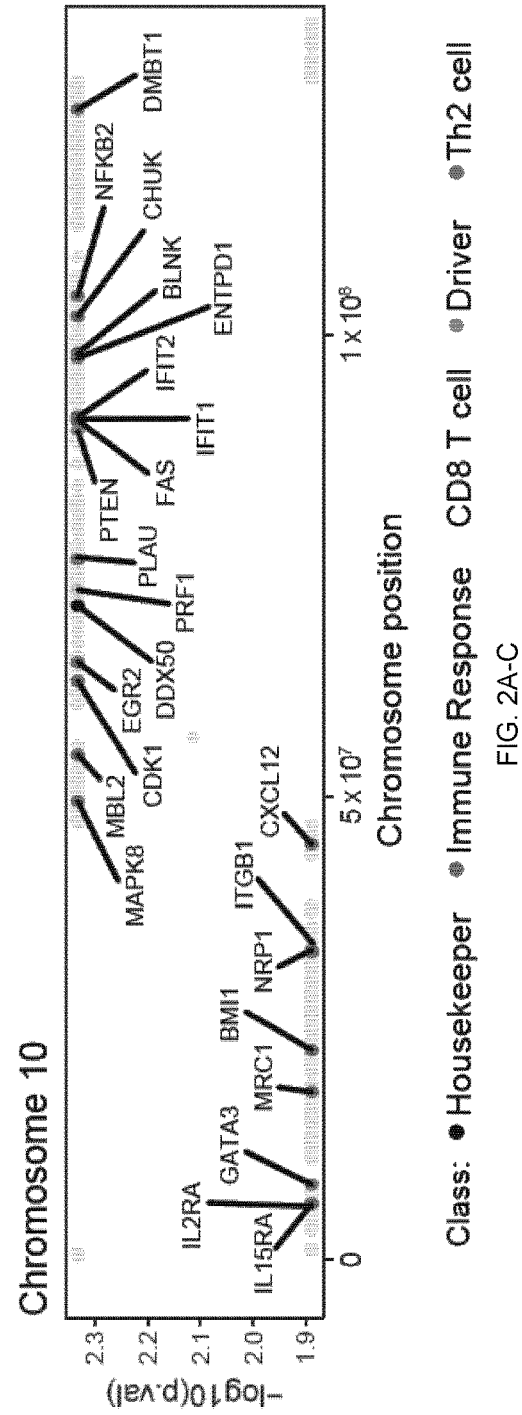
FIG. 2A-C

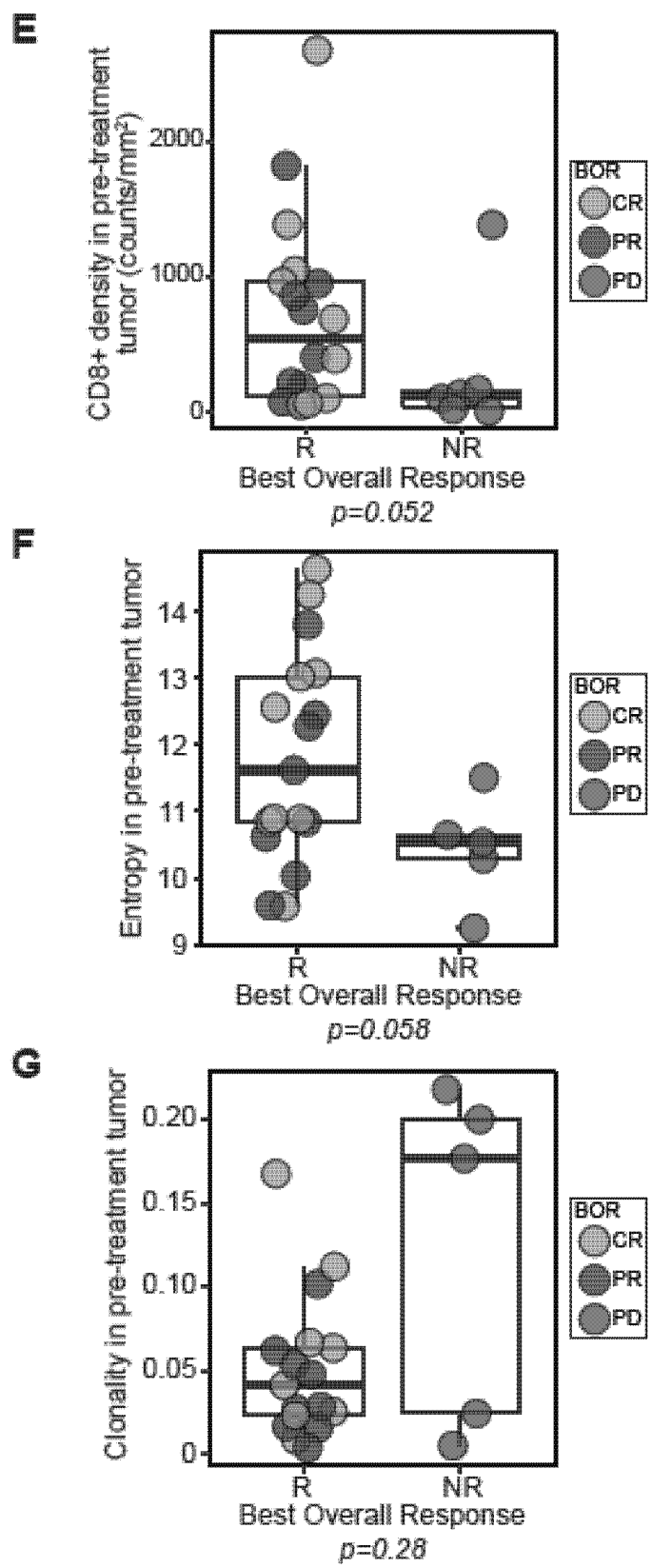
FIG. 2E-G

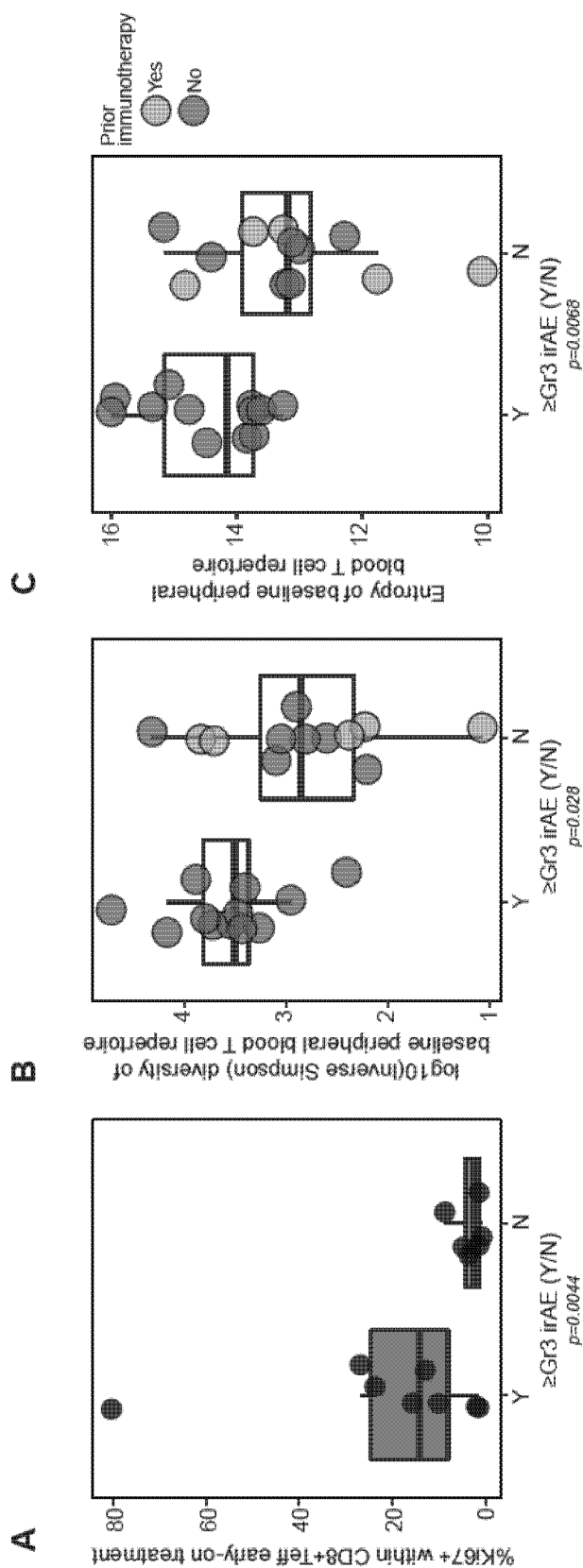
FIG. 3A-C

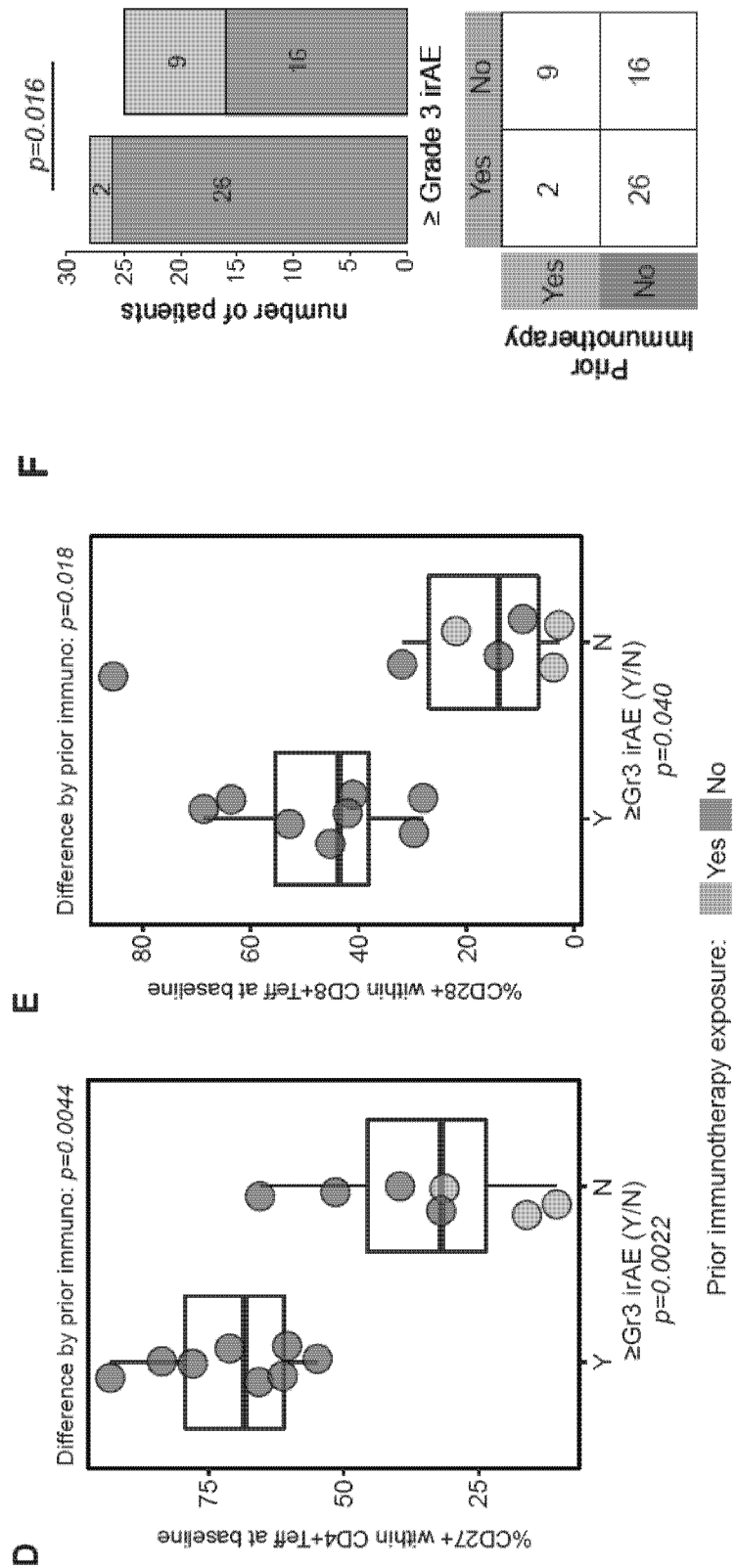
FIG. 3D-F

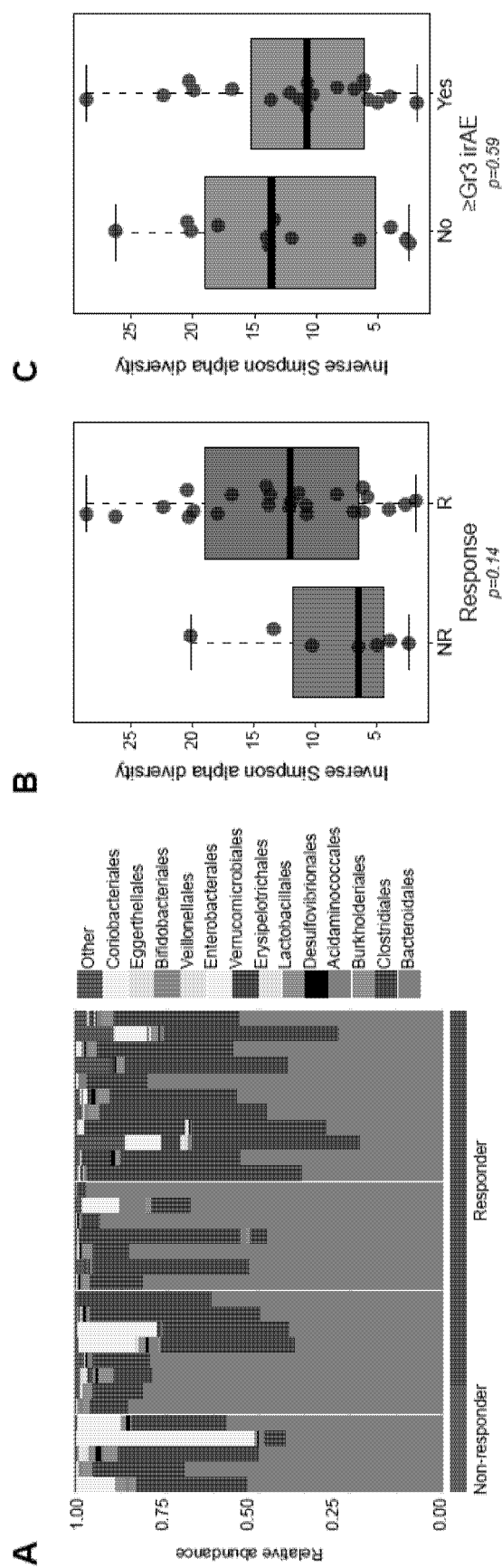
FIG. 4A-C

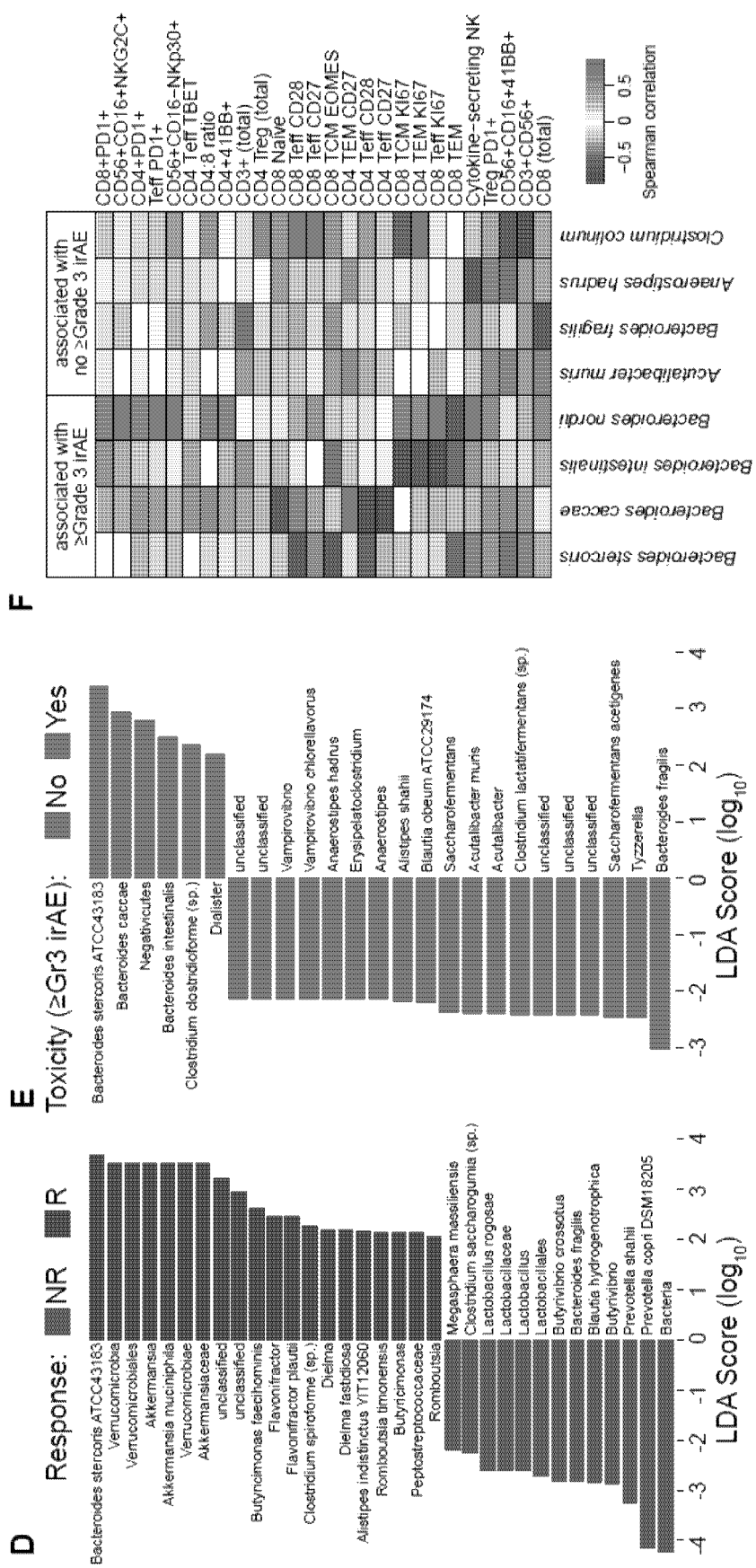
FIG. 4D-F

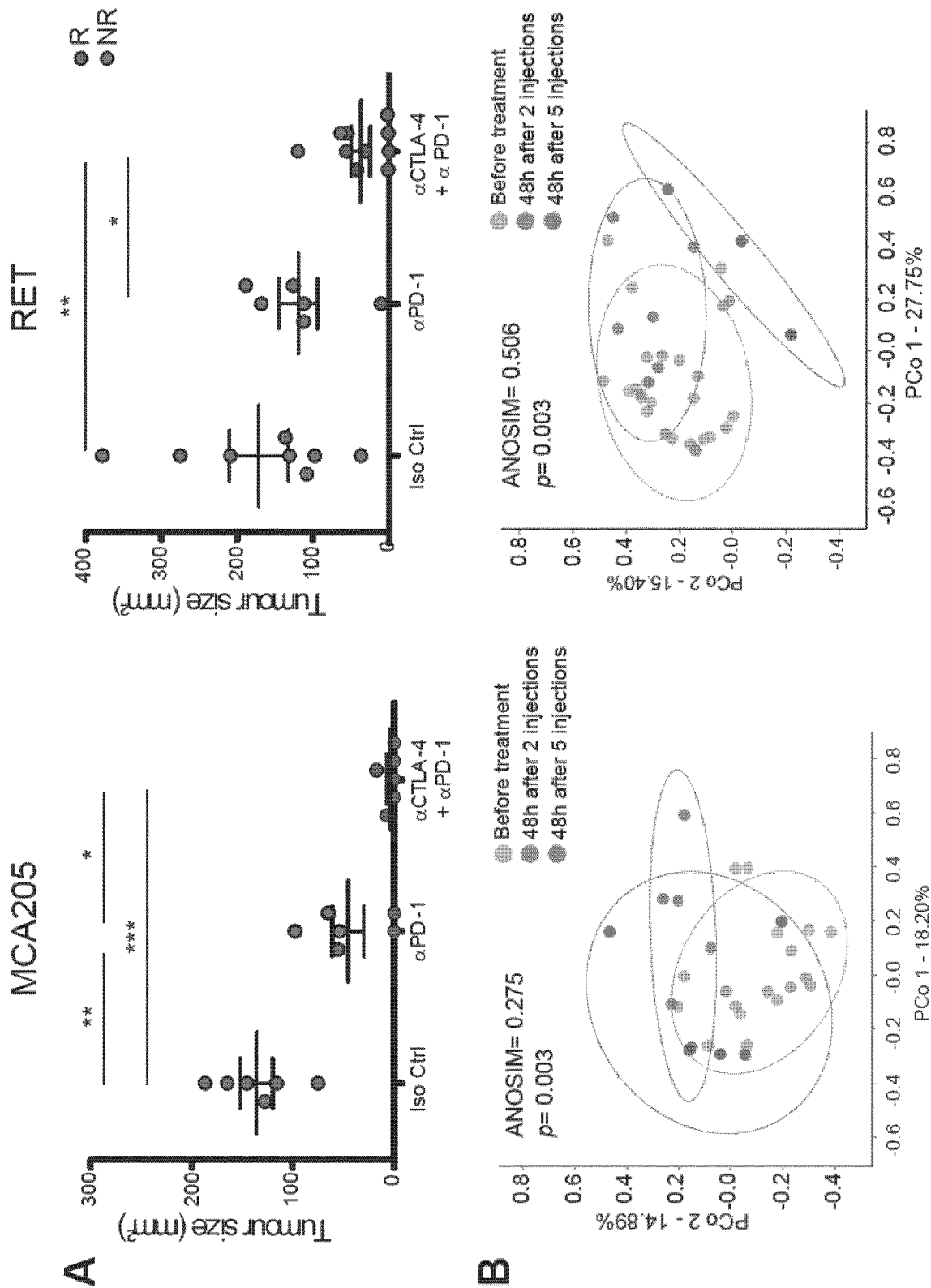
FIG. 5A-B

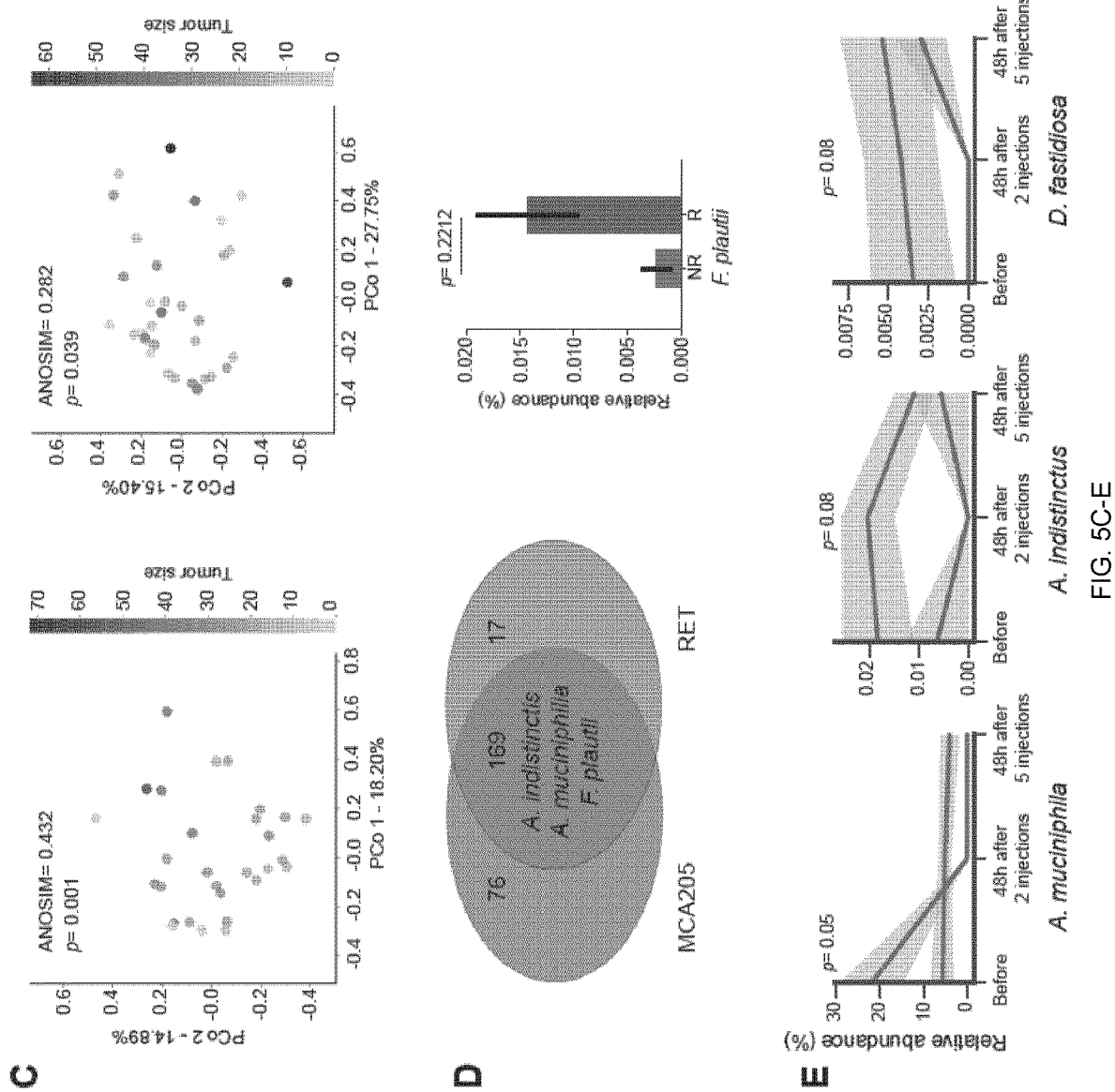
FIG. 5C-E

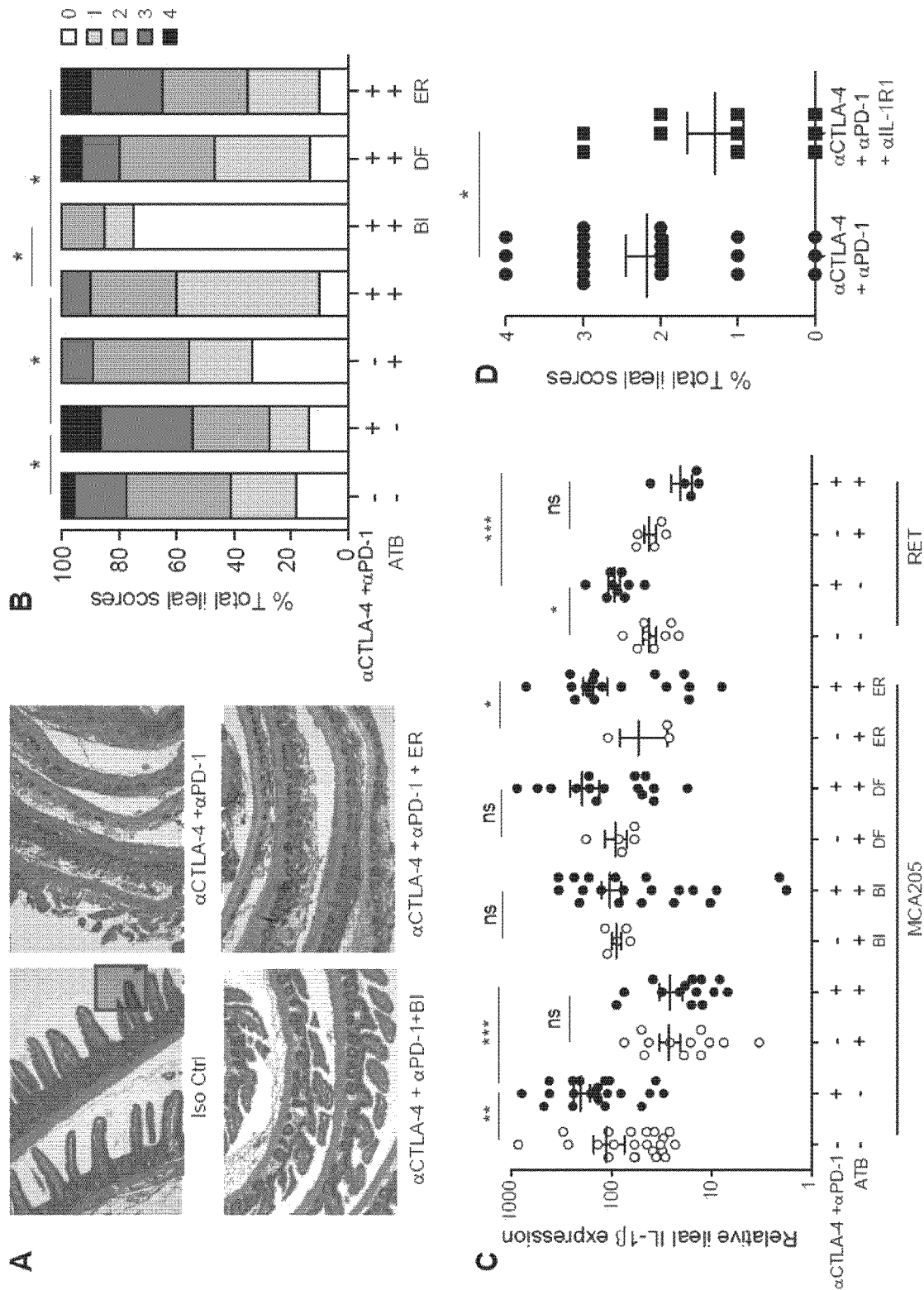
FIG. 6A-D

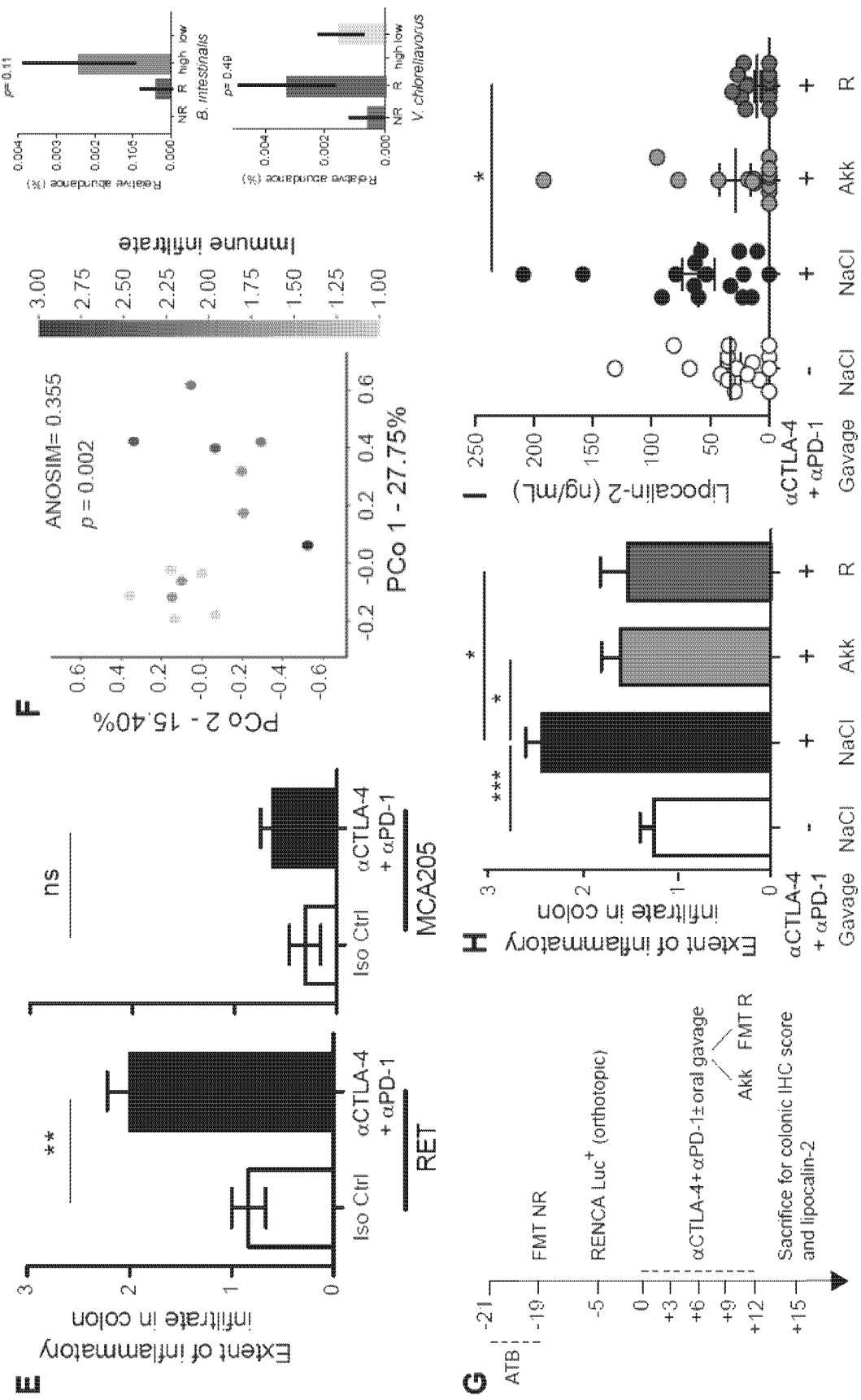
FIG. 6E-I

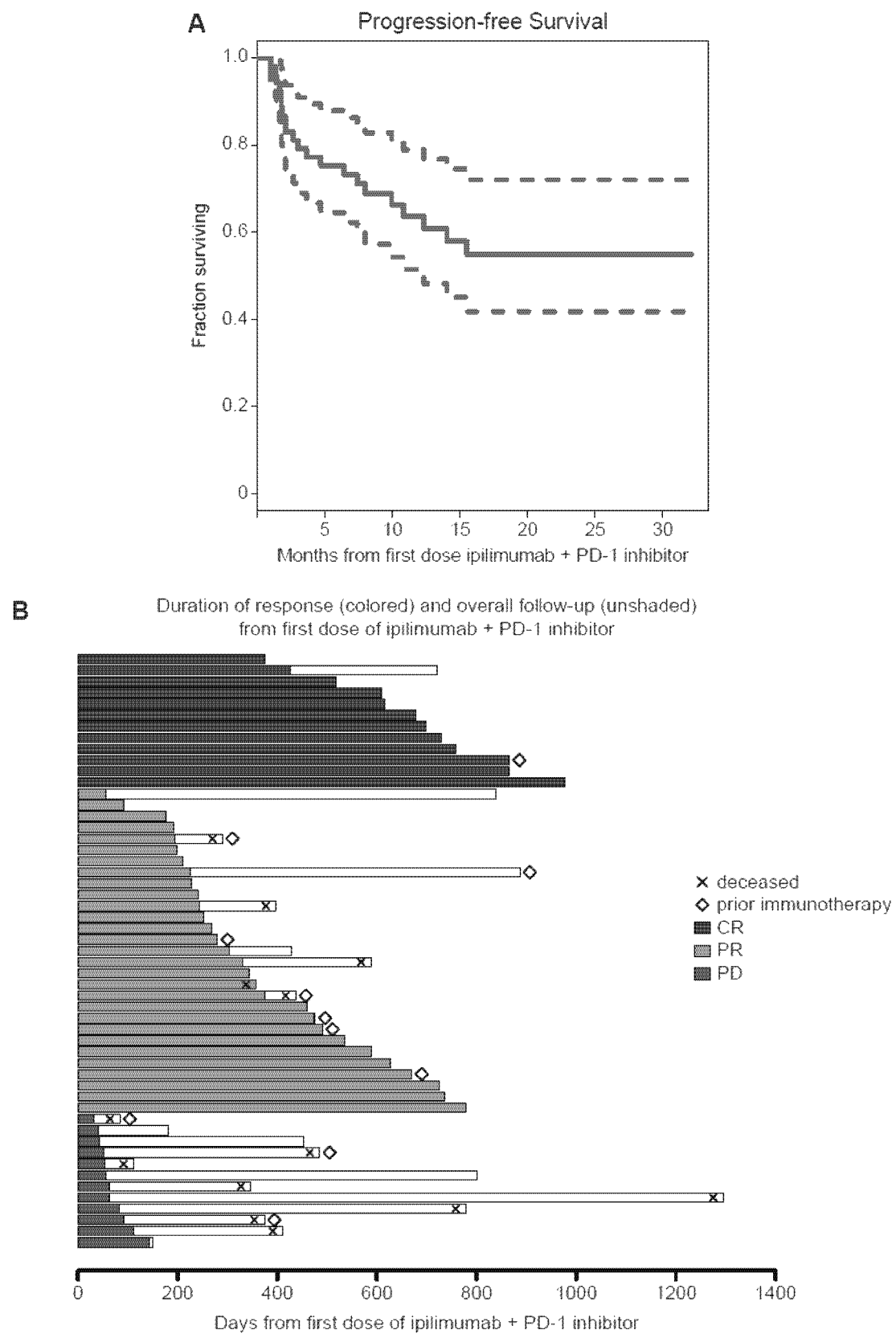
FIG. 7A-B

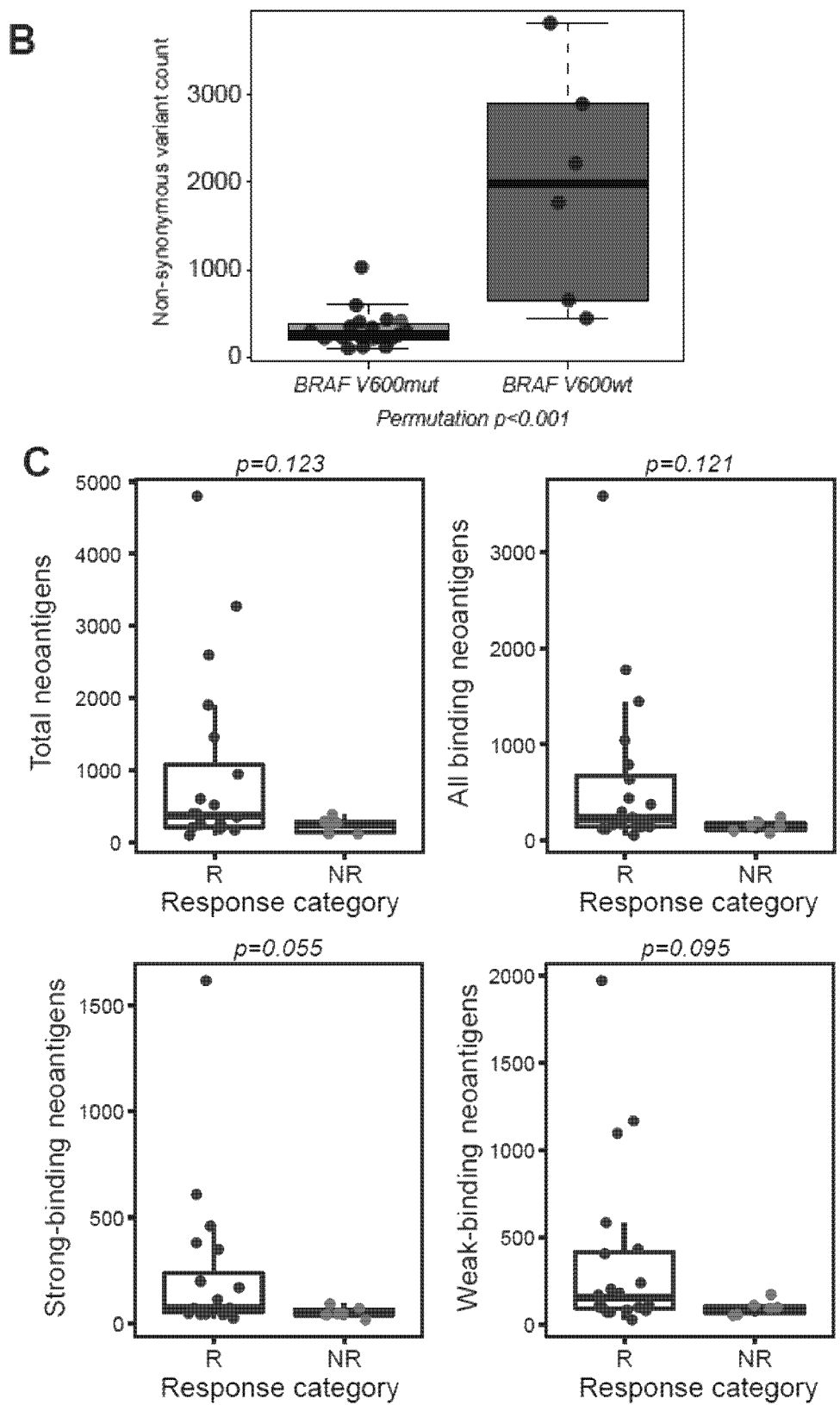
FIG. 8B-C

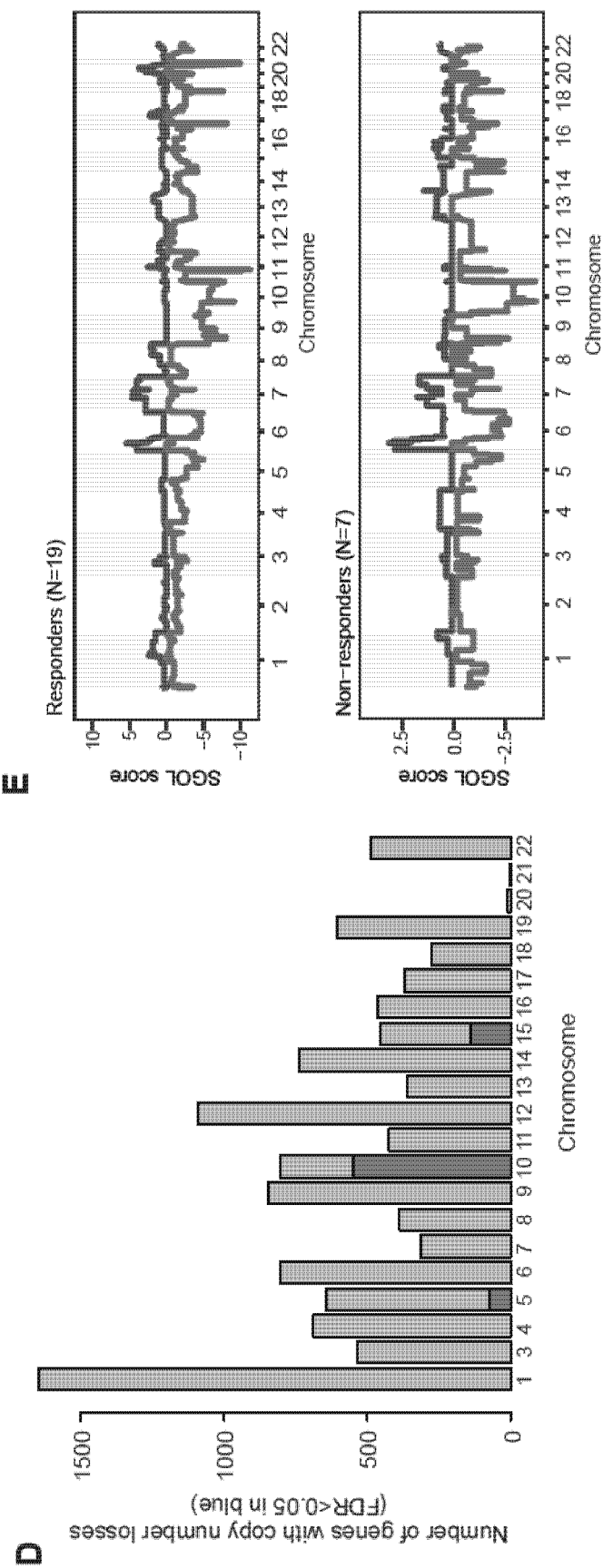
FIG. 8D-E

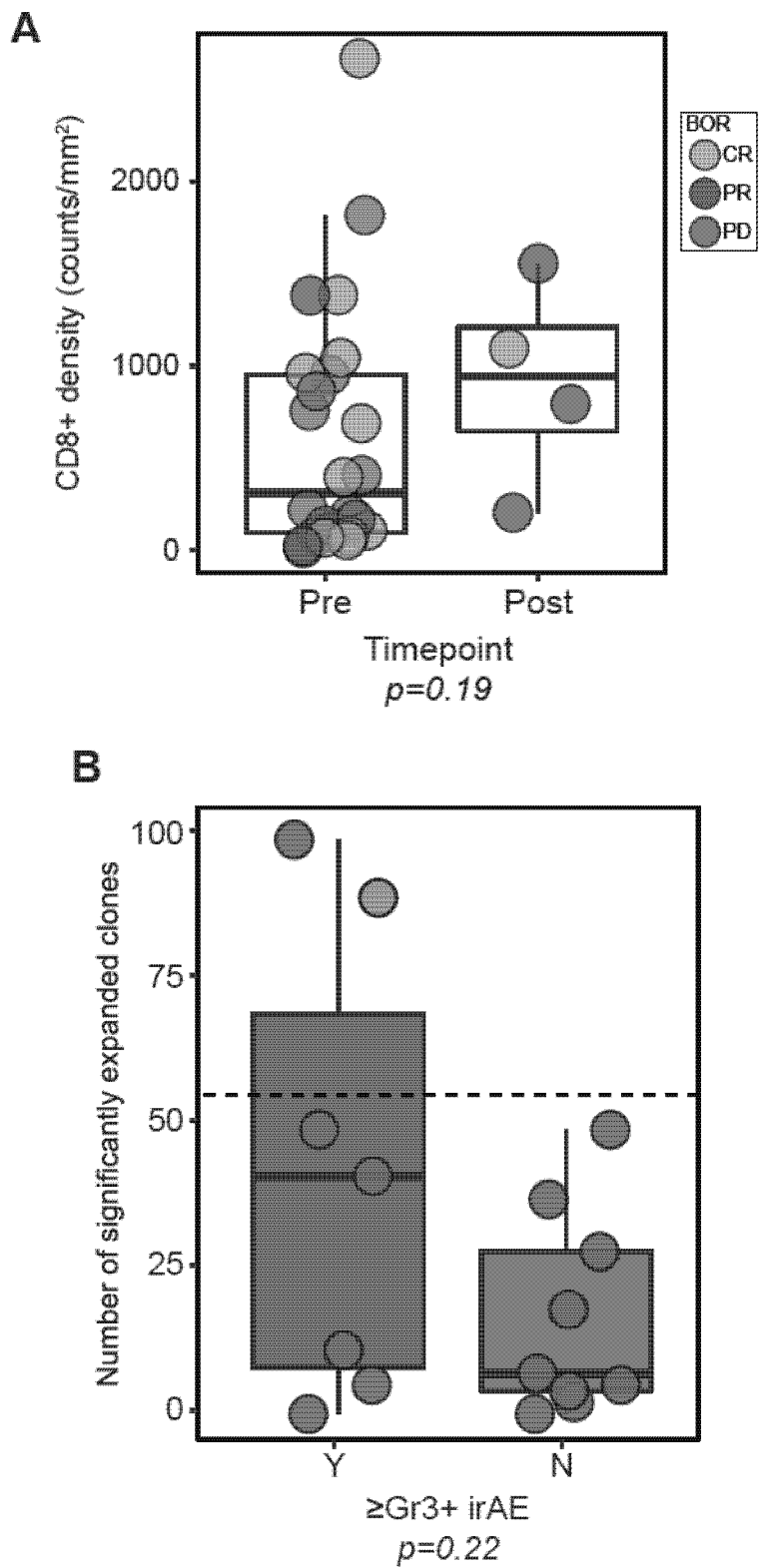
FIG. 9A-B

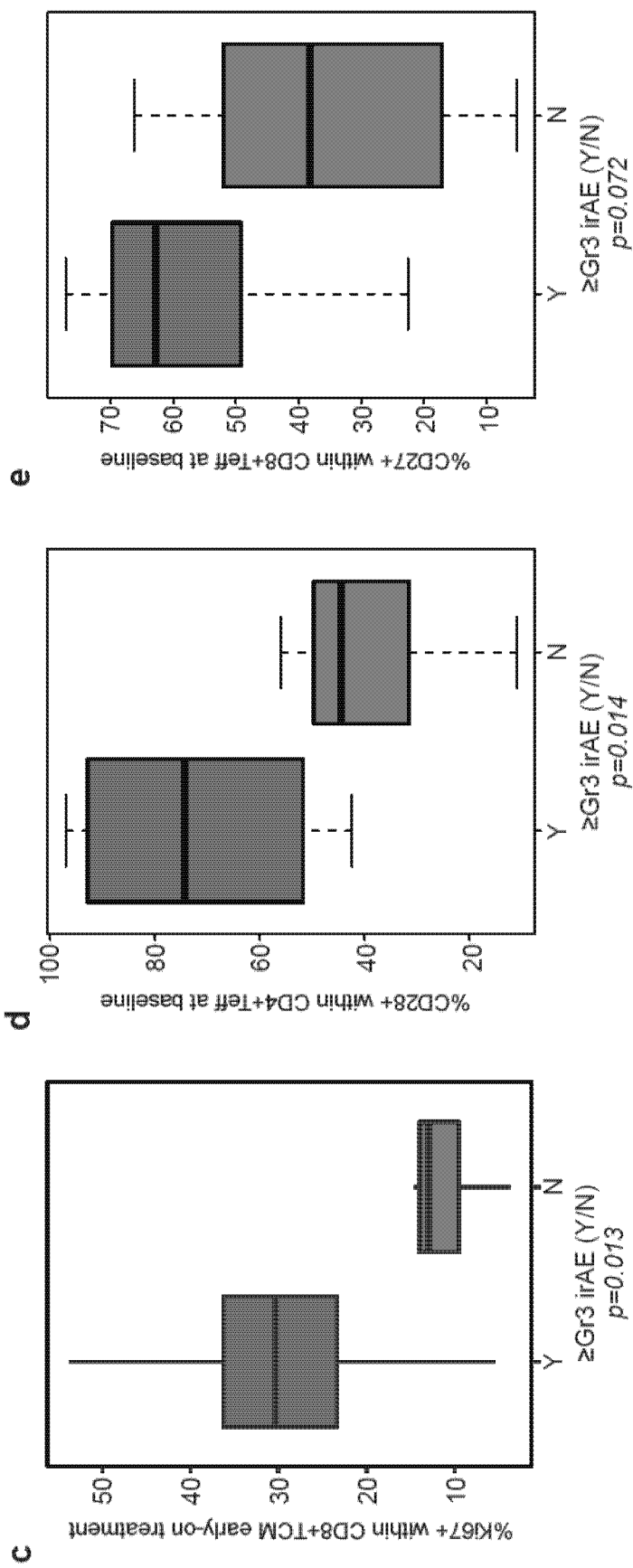
FIG. 9C-E

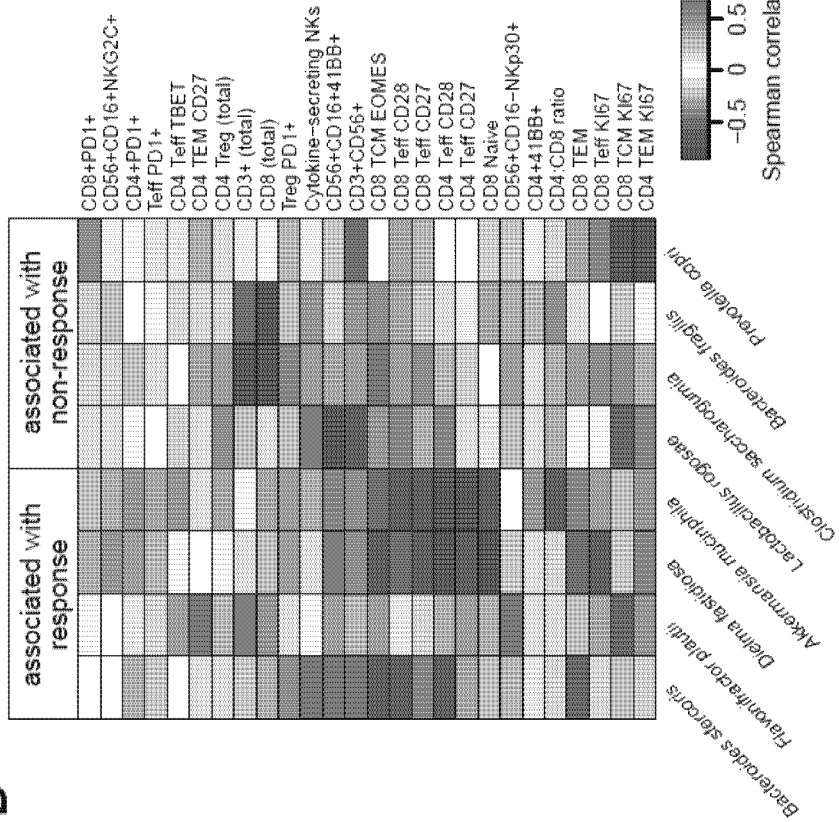
FIG. 10D-E

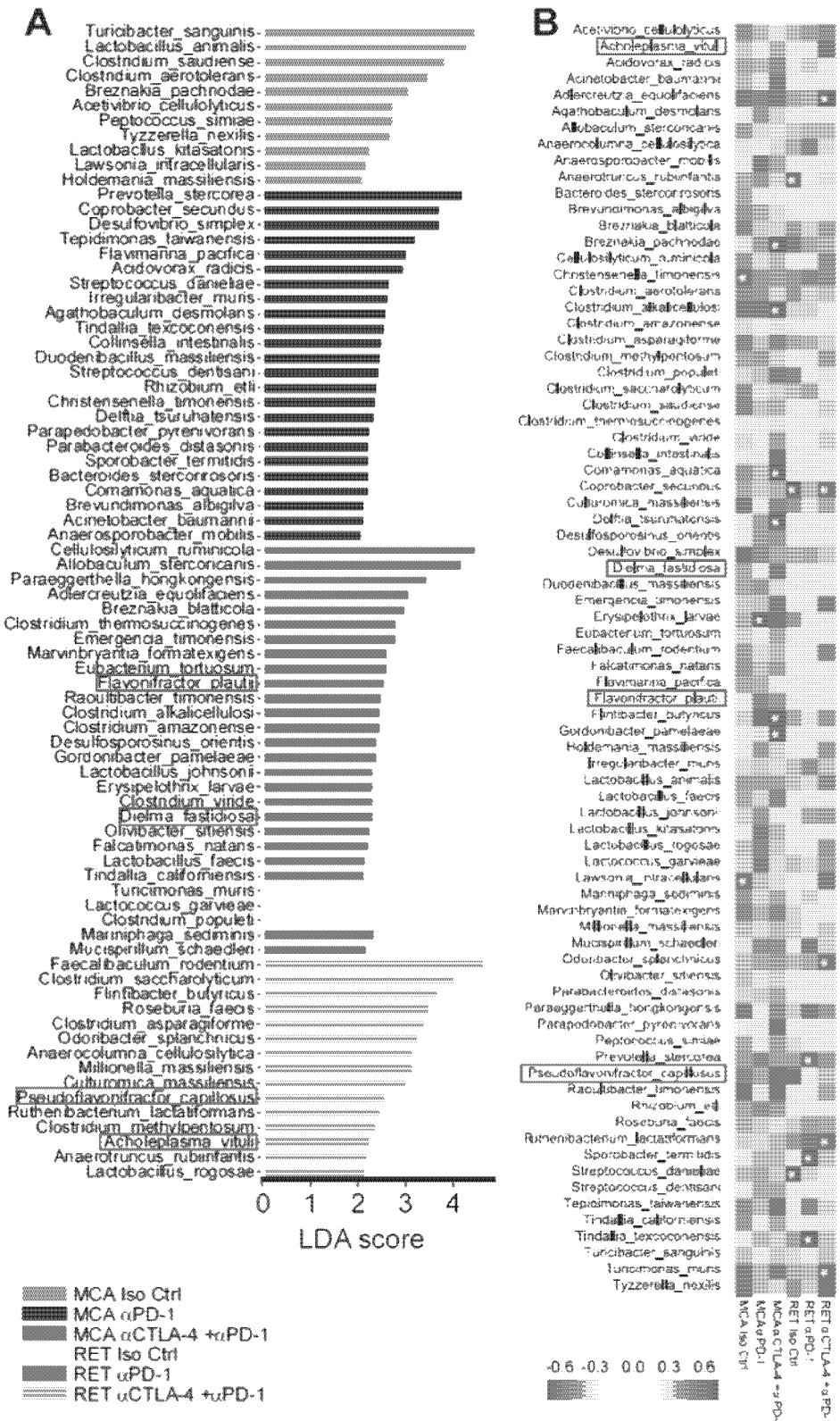
FIG. 11A-B

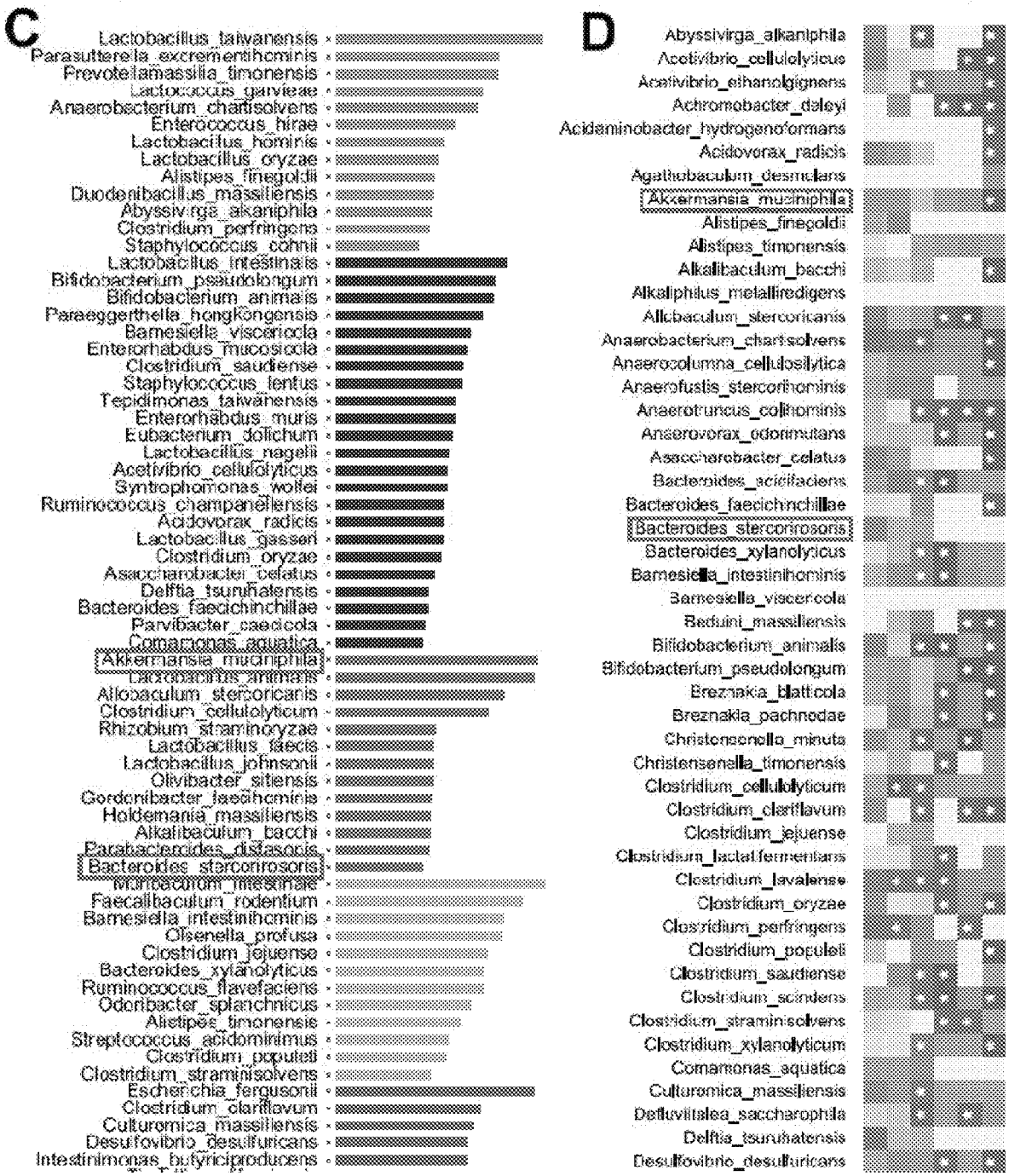
FIG. 11C-D

FIG. 11C-D (Continued)

A.
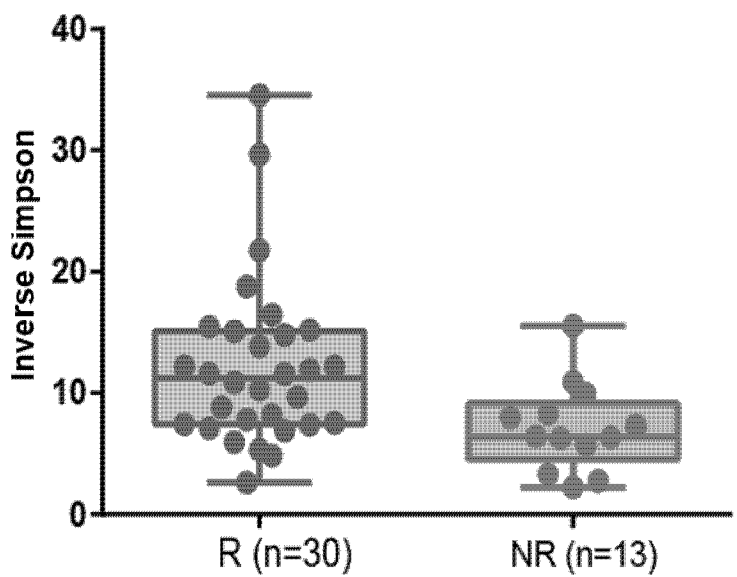
B.
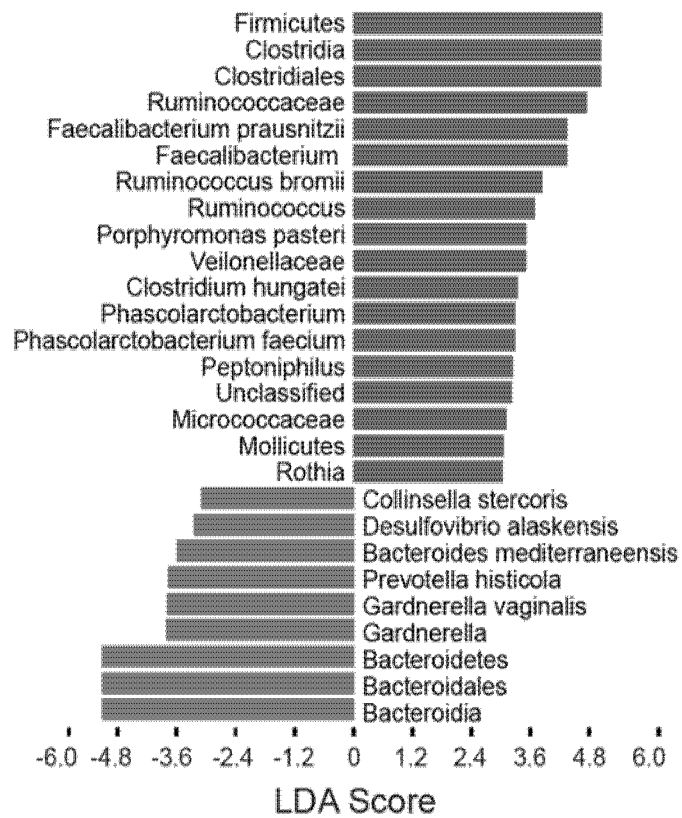
FIG. 13A-B

C.
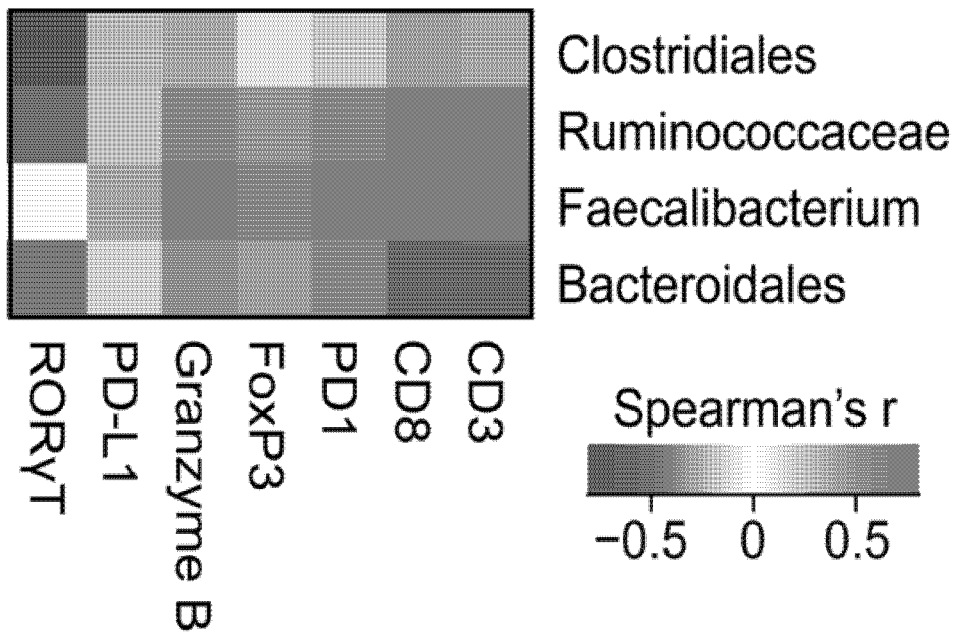
D.
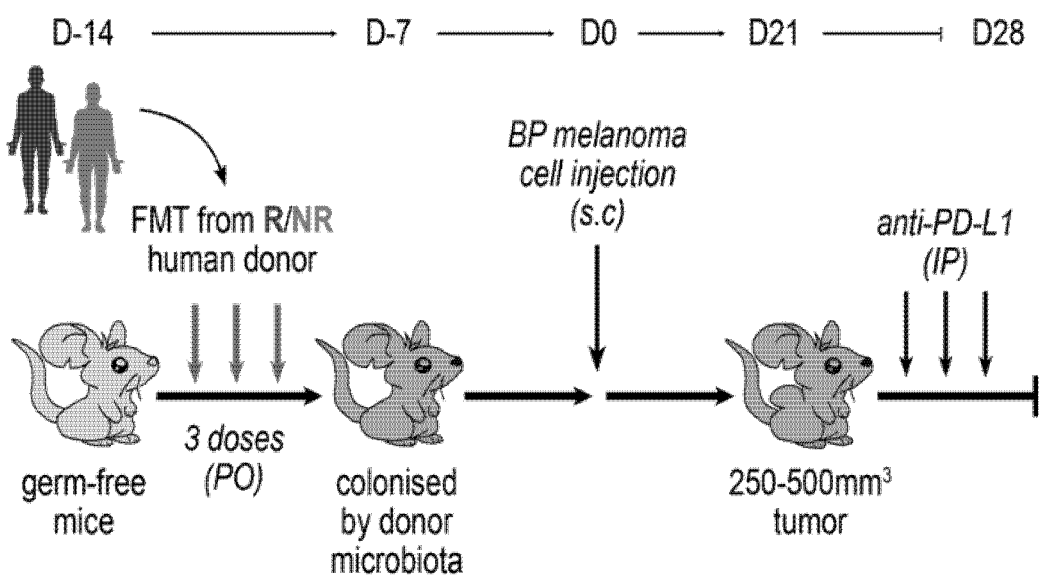
FIG. 13C-D

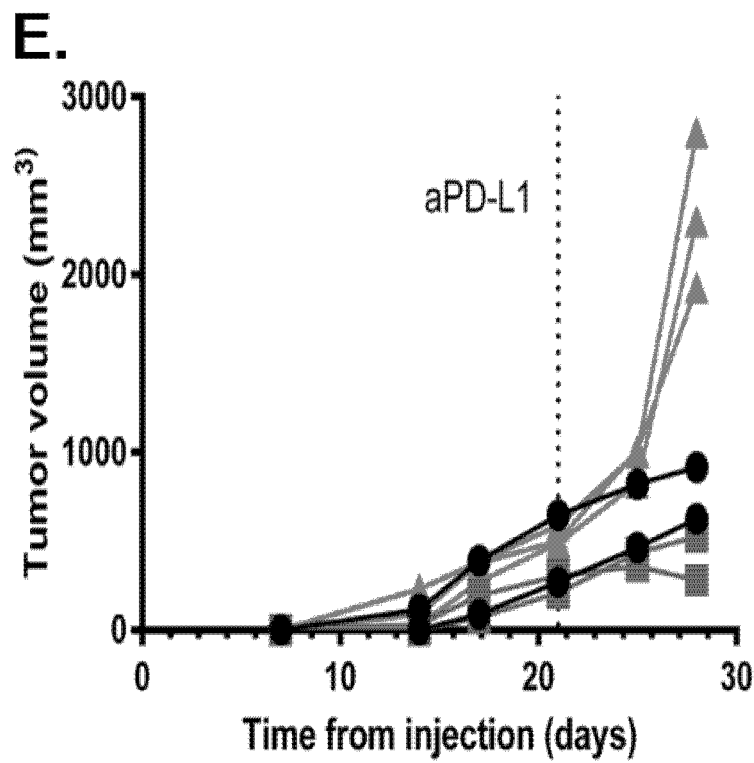
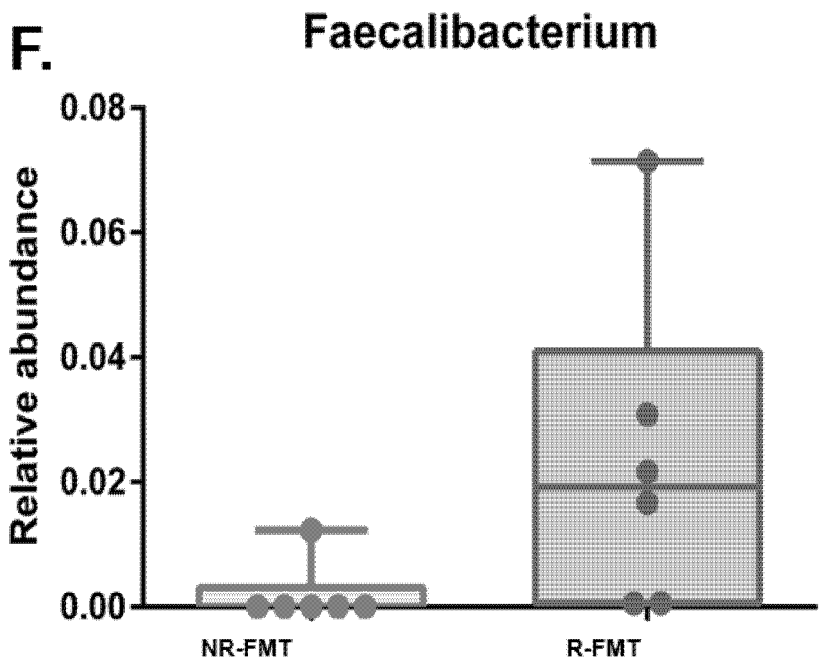
FIG. 13E-F

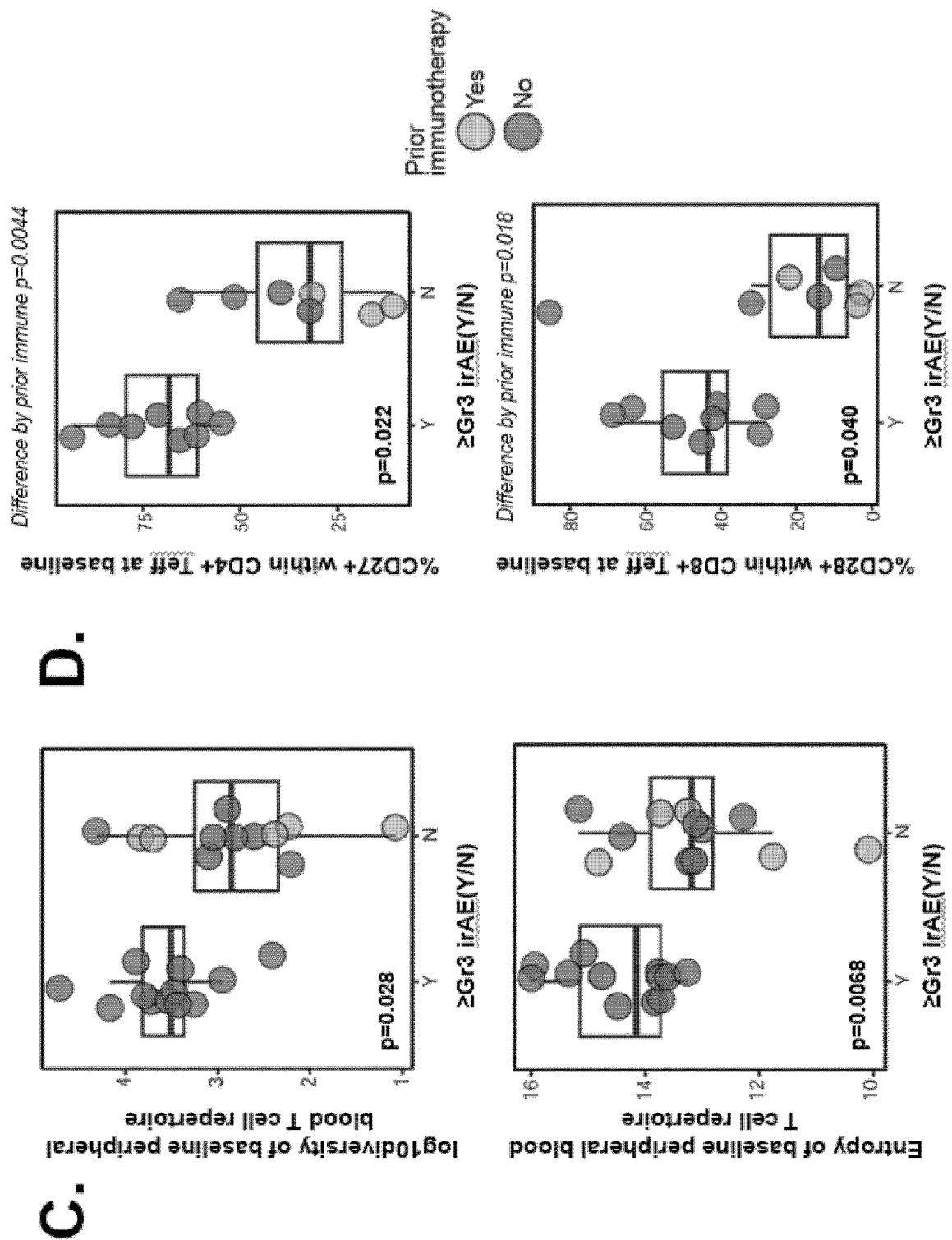
FIG. 15C-D

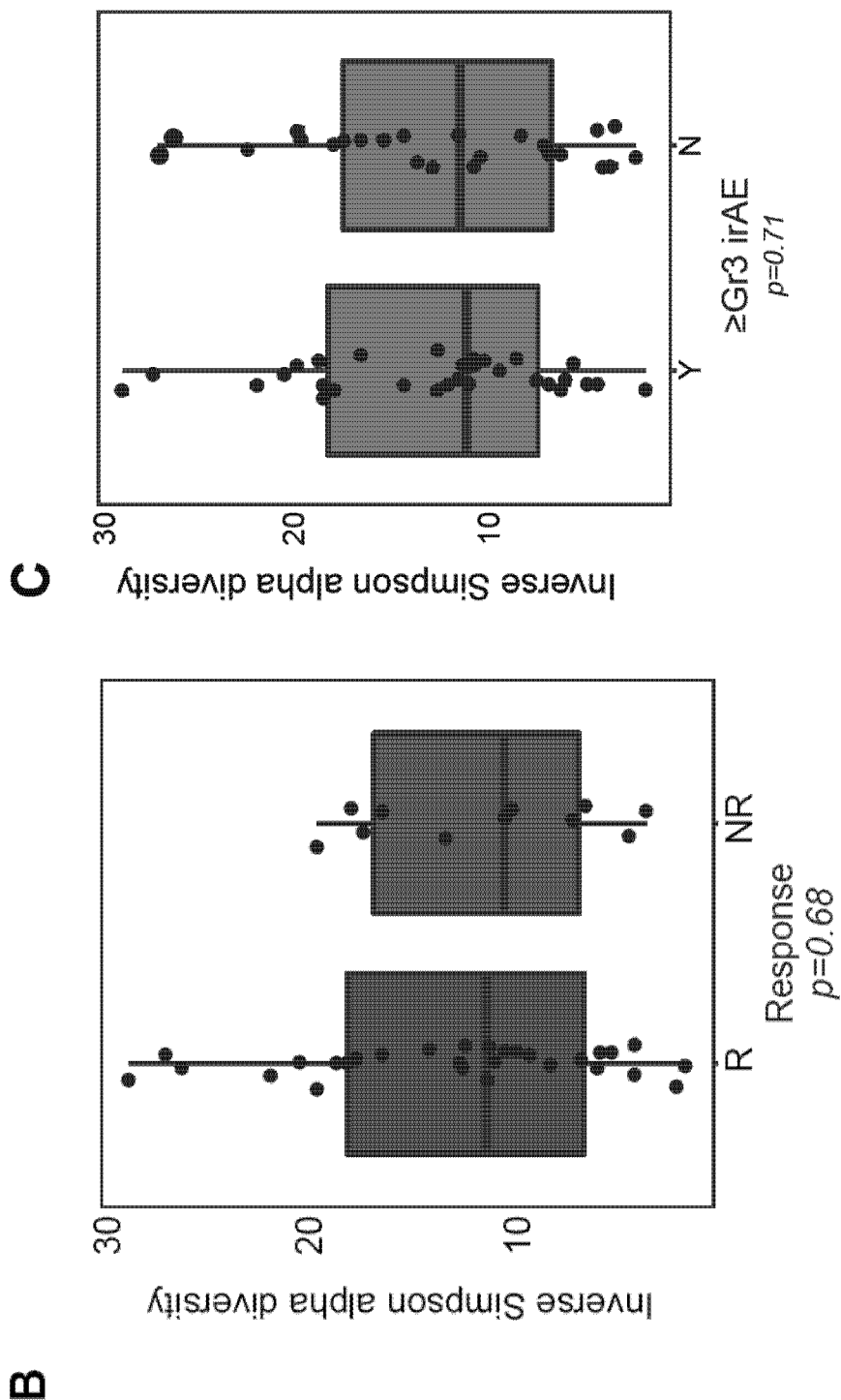
FIG. 16B-C

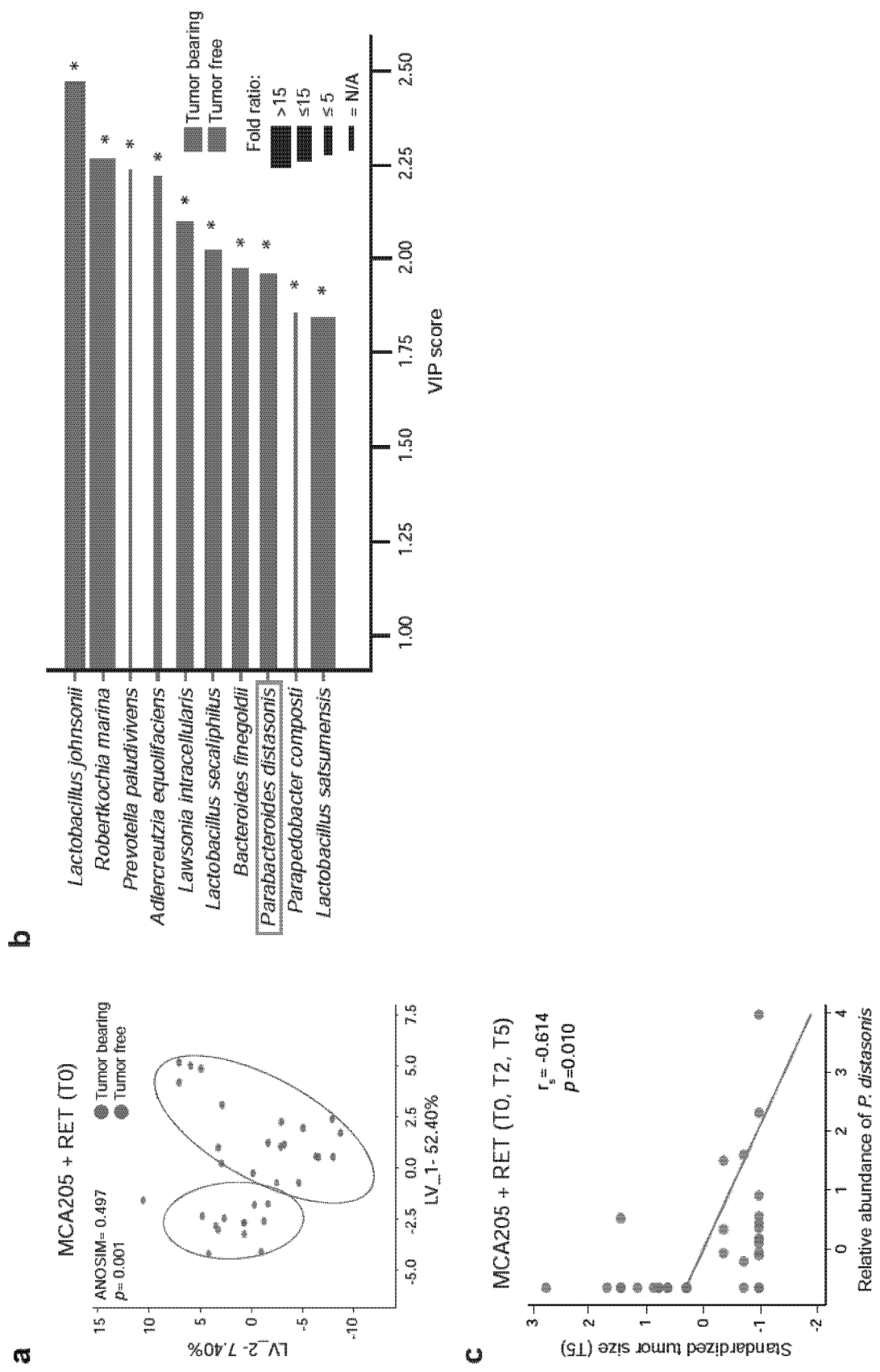
FIG. 20A-C

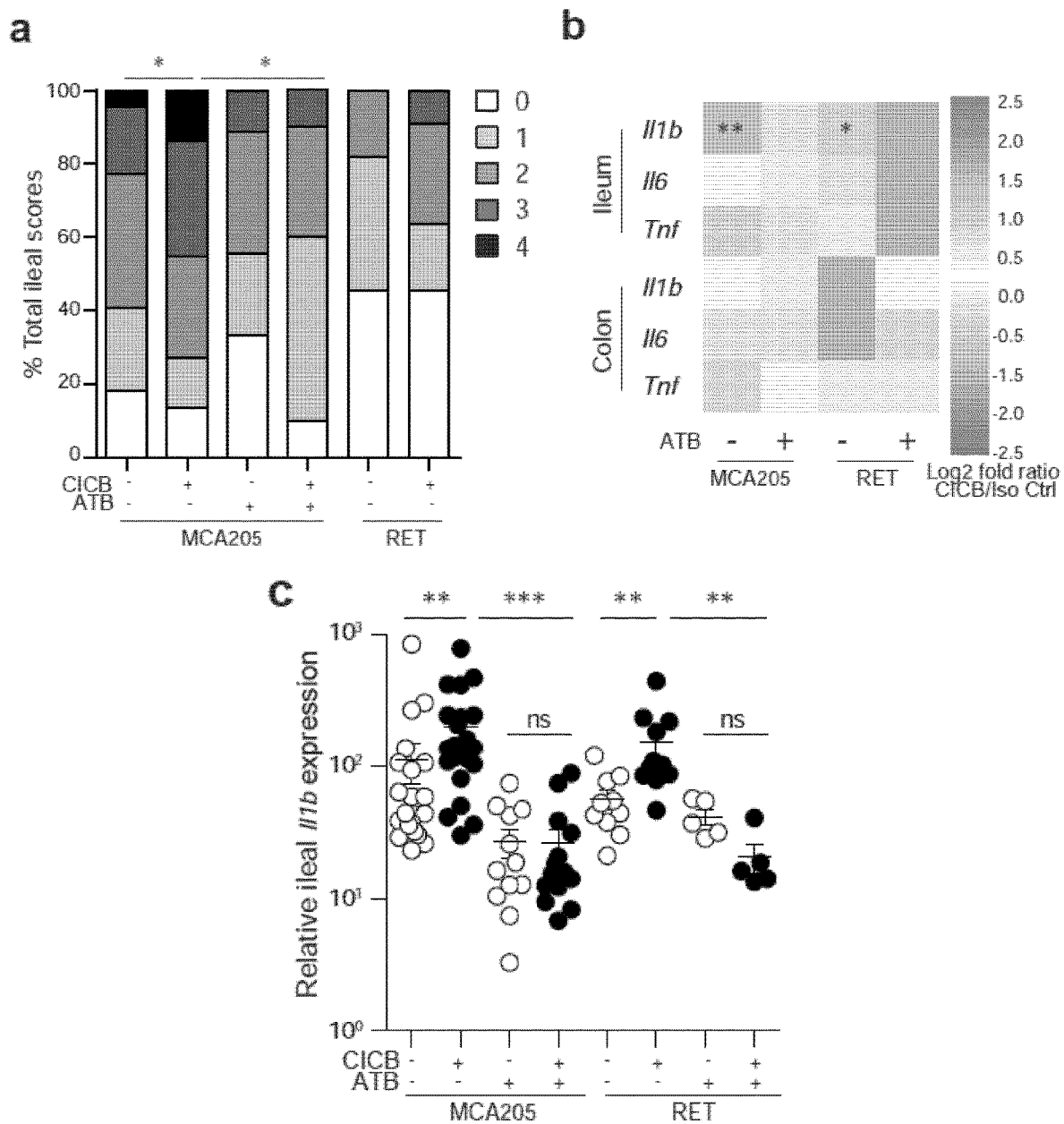
FIG. 22A-C

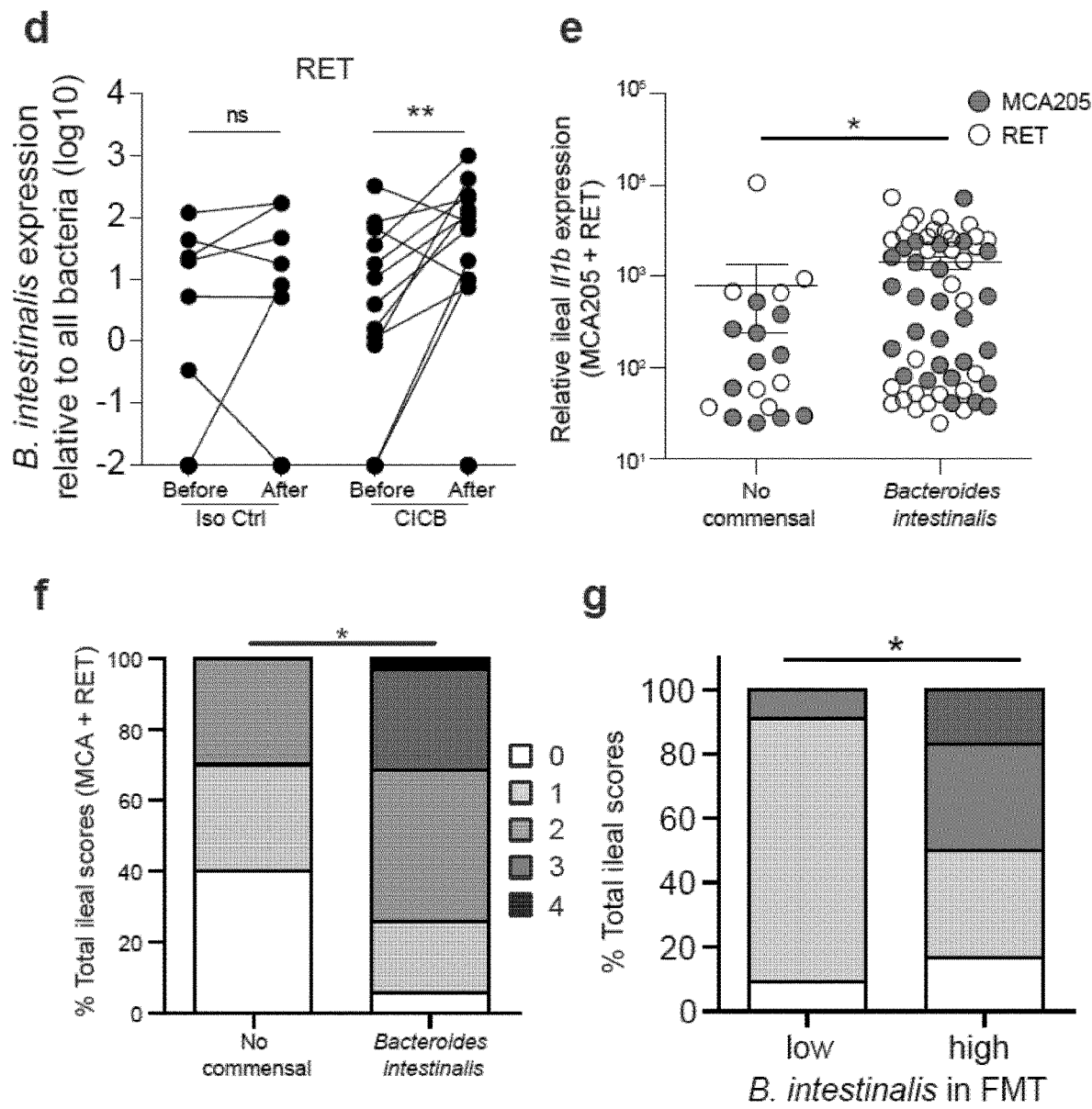
FIG. 22D-G

FIG. 24A-D

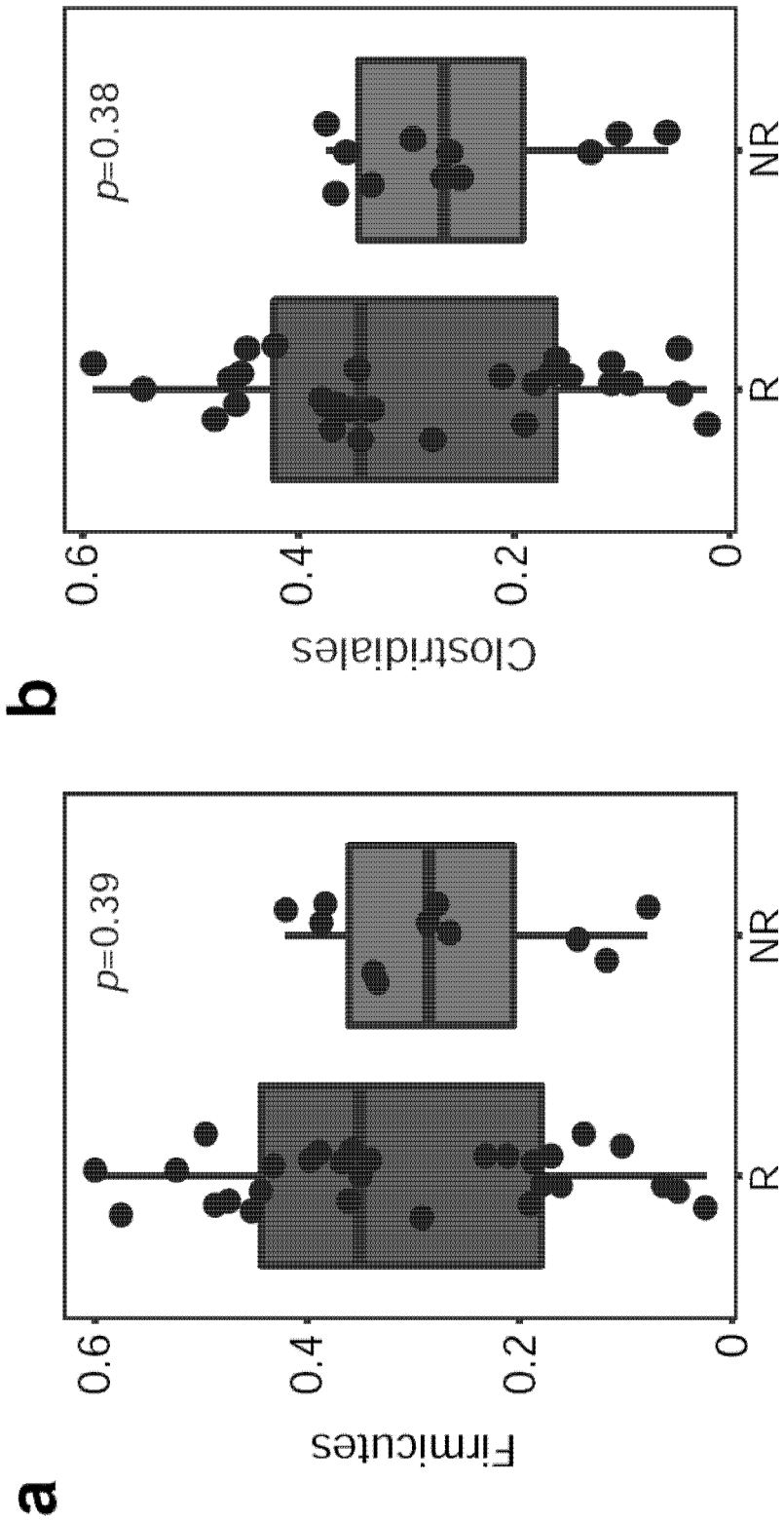
FIG. 26A-B

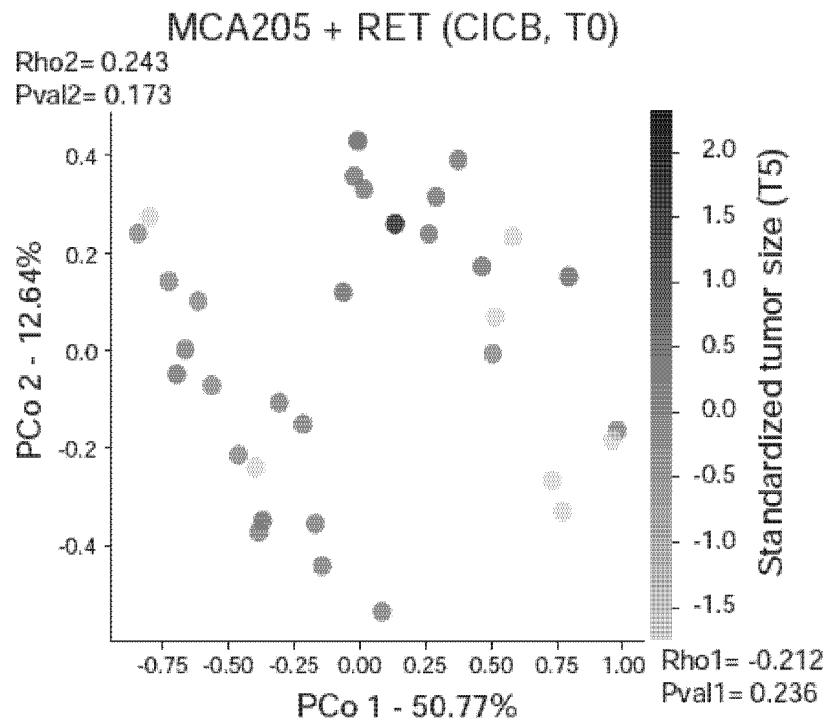
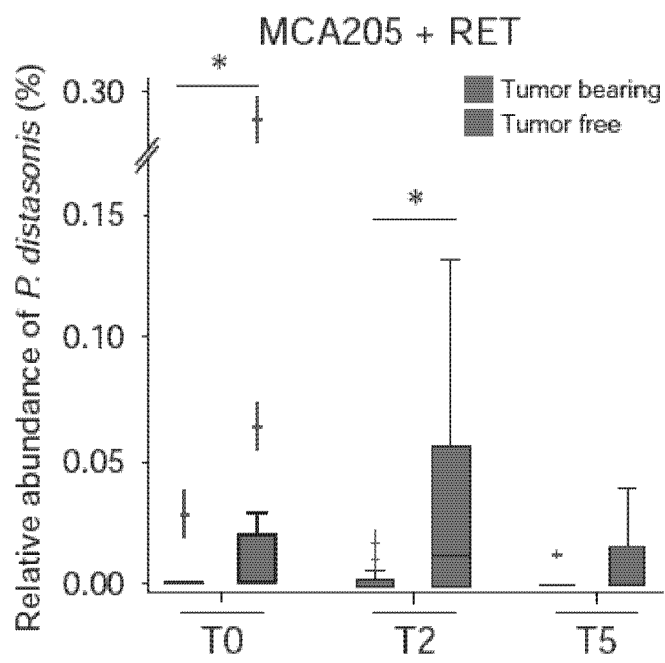
FIG. 27C-D

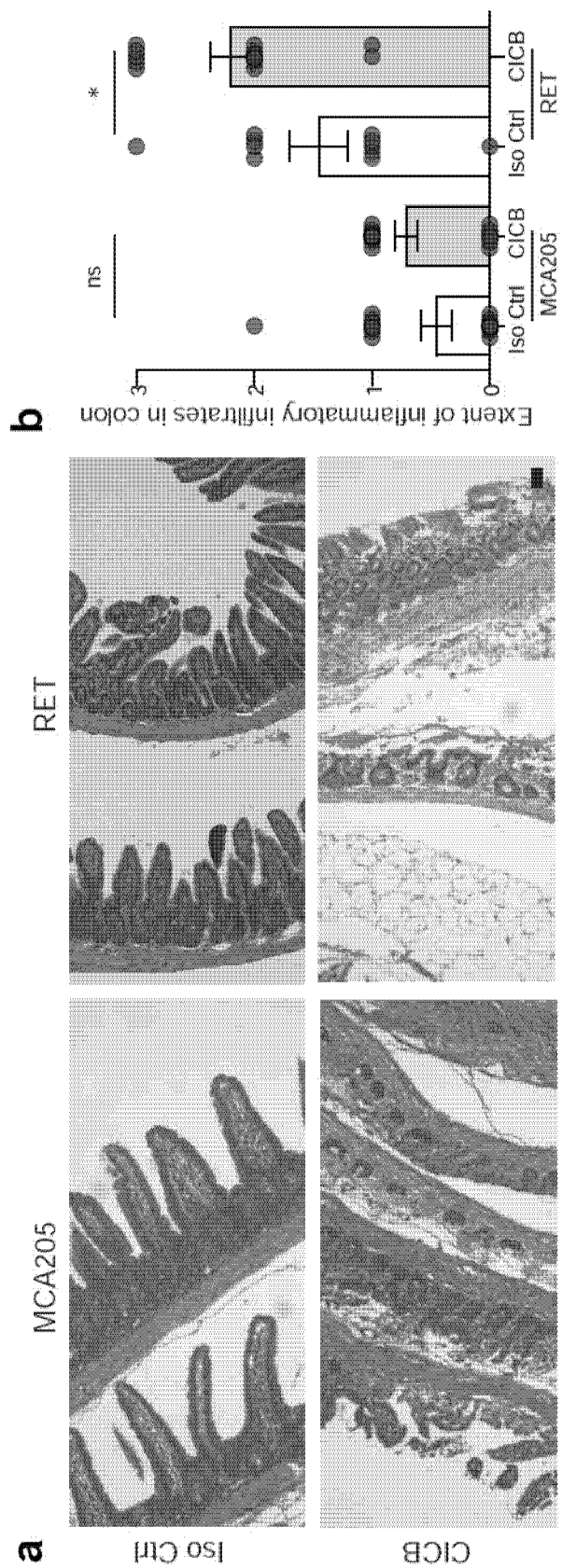
FIG. 28A-B

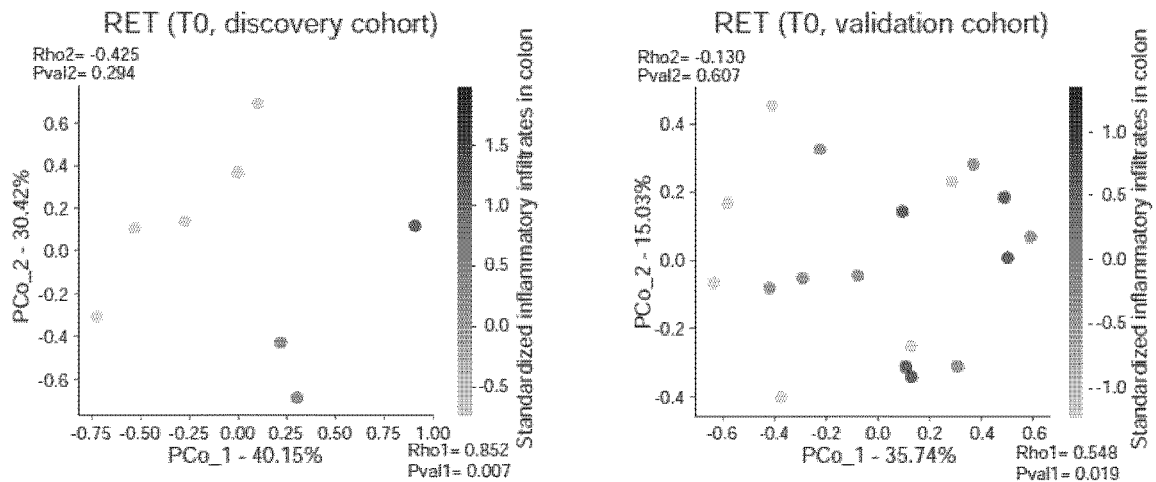
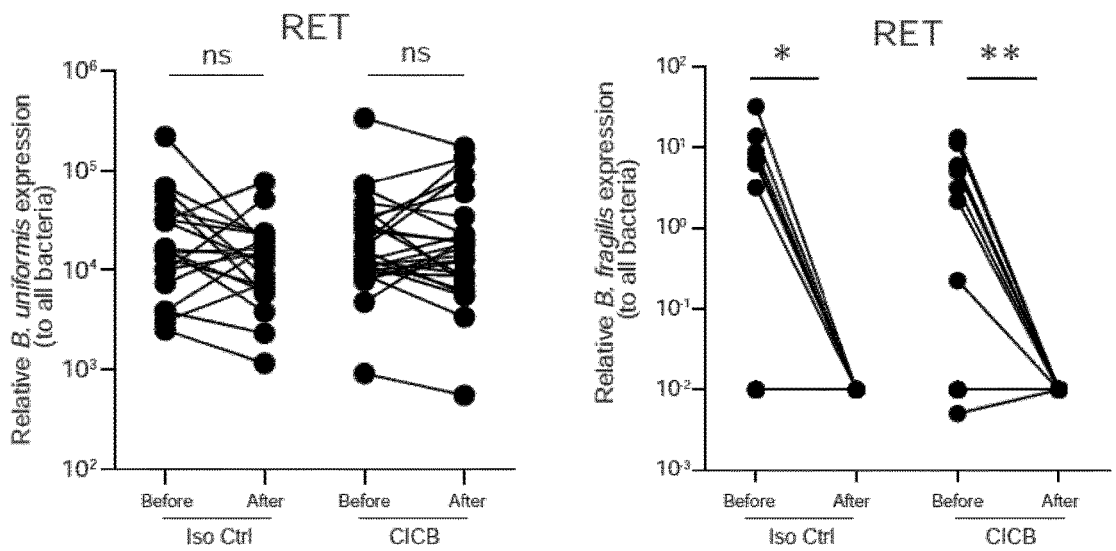
FIG. 28D-E

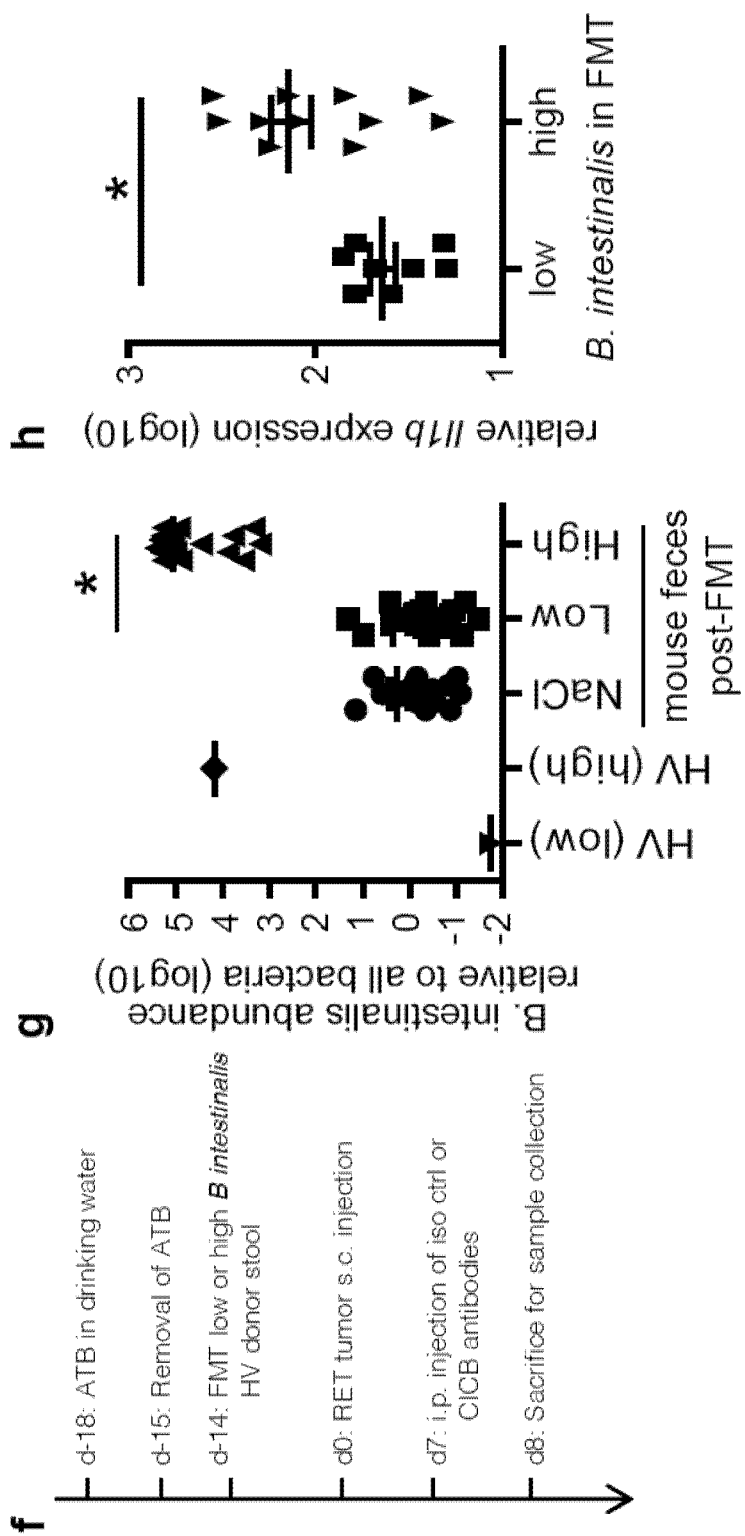
FIG. 28F-H

METHODS AND COMPOSITIONS FOR TREATING CANCER

CROSS-REFERENCE TO RELATED APPLICATIONS

This application is a national phase application under 35 U.S.C. § 371 of International Application No. PCT/US2019/062659, filed Nov. 21, 2021, which claims the benefit of priority of U.S. Provisional Patent Application No. 62/770,603 filed Nov. 21, 2018, and U.S. Provisional Patent Application No. 62/826,631 filed Mar. 29, 2019, all of which are hereby incorporated herein by reference in their entirety.

BACKGROUND OF THE INVENTION

1. Field of the Invention

This invention relates to the field of molecular biology and medicine.

2. Background

Tremendous advances were made in cancer therapy in the past decade through the use of targeted therapy and immune therapy. By blocking immune inhibitory ligand-receptor interactions involving CTLA-4 and PD-1, checkpoint blockade immunotherapy relieves T lymphocytes of major inhibitory signals, thus potentiating underlying T cell-mediated anti-tumor immune activity. However, ubiquitous relief of inhibitory signals systemically can also activate T lymphocytes reactive against self-antigens, leading to loss of self-tolerance and immune-related adverse events. Patients who develop high-grade toxicities commonly require either temporary or permanent discontinuation of treatment, and may require prolonged periods of heavy immunosuppression in order to manage their toxicities. Among various treatment regimens of immune therapy, anti-CTLA-4 and anti-PD-1 combination therapy provides a superior rate of response than the same agents given as monotherapies, however this is offset by much greater risk of developing severe toxicities. The high frequency of developing severe to life threatening toxicity to anti-CTLA-4 and anti-PD-1 combination therapy has become a limiting factor for clinicians to prescribe this form of therapy.

While some factors associated with patient response to immune checkpoint inhibitor therapy have been discovered, there is a need in the art for predictors of toxicity due to immune checkpoint blockade therapy and predictors of responders to combination immune checkpoint blockade therapy. Stratifying patients into those that are likely and unlikely to experience toxicity and/or to respond to checkpoint blockade therapy, based on one or more biomarkers, will provide for more effective and therapeutic treatment methods for patients, since patients can be provided with the most effective therapy before further spreading of the disease.

SUMMARY OF THE INVENTION

Described herein are methods and compositions for treating cancer and for predicting a subject's response to combination checkpoint inhibitor therapy. In one aspect, the disclosure relates to methods of treating cancer and/or reducing toxicity to a therapy in a subject comprising administering to the subject a composition comprising at least one isolated or purified population of bacteria belonging to one or more of the genera or species *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti*, and *Anaerotignum lactatifermentans*, or a bacterial species disclosed in FIG. 28C and wherein the method further comprises treating the subject with a combination of (i) a PD-1, PDL1, or PDL2 inhibitor and (ii) a CTLA-4, B7-1, or B7-2 inhibitor. In some embodiments, the composition comprises at least one isolated or purified population of bacteria belonging to one or more of the genera or species *Flavonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum*.

In another aspect, the disclosure relates to methods of treating cancer and/or reducing toxicity of a therapy in a subject comprising administering to the subject a composition comprising fecal matter from a healthy patient, from a patient determined to respond to immune checkpoint blockade mono or combination therapy, or from a patient determined to have a non-toxic response to immune checkpoint blockade mono or combination therapy, wherein the method further comprises treating the subject with a combination of (i) a PD-1, PDL1, or PDL2 inhibitor and (ii) a CTLA-4, B7-1, or B7-2 inhibitor. In some embodiments, the fecal matter is transplanted into the colon or rectum of the subject.

In another aspect, the disclosure relates to methods of reducing or preventing adverse events associated with combination checkpoint blockade therapy, comprising the step of administering a composition to the subject a composition comprising at least one isolated or purified population of bacteria belonging to one or more of the genera or species *Flavonfractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti*, and *Anaerotignum lactatifermentans* or a bacterial species disclosed in FIG. 28C.

In another aspect, the disclosure relates to methods of treating cancer and/or reducing toxicity to a therapy in a subject comprising administering to a subject determined to have a favorable microbial profile in the gut microbiome a combination of (i) a PD-1, PDL1, or PDL2 inhibitor and (ii) a CTLA-4, B7-1, or B7-2 inhibitor.

In another aspect, the disclosure relates to methods for predicting a response to combination immune checkpoint inhibitor therapy in a subject having cancer, the method comprising: detecting a microbial profile in a sample obtained from the subject; predicting a toxic response to the therapy when bacteria of one or one or more of the genera *Bacteroides, Dialister, Coprobacter, Intestinibacter*, and *Parasutterella* is detected in a sample from the subject; or predicting a non-toxic response to the therapy when bacteria of one or more of the genera or species *Bacteroides fragilis, Vampirovibrio, Tyzzerella, Dorea formicigenerans, Caloramator coolhaasi, Muricomes, Muricomes intestini,*

*Geosporobacter, Geosporobacter subterraneus, Anaerotignum lactatifermentans* is detected in a sample from the subject.

In another aspect, the disclosure relates to methods for predicting a response to combination immune checkpoint inhibitor therapy in a subject having cancer, the method comprising: detecting a microbial profile in a sample obtained from the subject; predicting a toxic response to the therapy when a favorable microbial profile is detected in a sample from the subject; or predicting a non-toxic response to the therapy when a non-favorable microbial profile is detected in a sample from the subject.

In some embodiments, a toxic-response comprises one or more irAEs. In some embodiments, a toxic response comprises grade 3 or higher adverse events. In some embodiments, a toxic response comprises one or more of interstitial pneumonia, colitis, hypothyroidism, liver dysfunction, skin rash, vitiligo, hypophysitis, type 1 diabetes, renal dysfunction, myasthenia gravis, neuropathy, myositis, and uveitis. In some embodiments, a toxic response excludes one or more of interstitial pneumonia, colitis, hypothyroidism, liver dysfunction, skin rash, vitiligo, hypophysitis, type 1 diabetes, renal dysfunction, myasthenia gravis, neuropathy, myositis, and uveitis is excluded. In some embodiments, the irAE comprises one or more of interstitial pneumonia, colitis, hypothyroidism, liver dysfunction, skin rash, vitiligo, hypophysitis, type 1 diabetes, renal dysfunction, myasthenia gravis, neuropathy, myositis, and uveitis. In some embodiments, one or more of interstitial pneumonia, colitis, hypothyroidism, liver dysfunction, skin rash, vitiligo, hypophysitis, type 1 diabetes, renal dysfunction, myasthenia gravis, neuropathy, myositis, and uveitis is excluded. In some embodiments, the methods exclude treatment of colitis and/or exclude patients diagnosed with or having colitis.

In some aspects, a subject is predicted to be a non-responder to CICB when one or more of *Robertkochia marina, Adlerrcreutizia equolifaciens, Lawsonia intracellularis*, or *Lactobacillus satsumensis* is detected in a biological sample from the subject.

In another aspect, the disclosure relates to methods of treating cancer in a subject comprising (1) first administering to the subject a composition comprising an isolated or purified population of bacteria comprising at least one bacterial species belonging to a genus or species selected from the group consisting of *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti*, and *Anaerotignum lactatifermentans*, and (2) subsequently administering to the subject a combination immunotherapy consisting essentially of (a) a PD-1, PDL1, or PDL2 inhibitor and (2) a CTLA-4, B7-1, or B7-2 inhibitor. In some embodiments, the isolated or purified population of bacteria comprises at least one bacterial species belonging to the genera or species: *Flavonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum.*

In another aspect, the disclosure relates to methods for predicting a response to combination immune checkpoint inhibitor therapy in a subject having cancer, the method comprising: detecting a microbial profile in a sample obtained from the subject; predicting an effective response to the therapy when bacteria of one or more of the genera or species *Bacteroides stercoris, Butyricimonas, Flavonifractor, Dielma, Alistipes*, and *Akkermansia muciniphila* is detected in a sample from the subject; or predicting a non-effective response to the therapy when bacteria of one or more of the genera or species *Lactobacillus, Bacteroides fragilis*, and *Prevotella* is detected in a sample from the subject.

In another aspect, the disclosure relates to methods for predicting a response to combination immune checkpoint inhibitor therapy in a subject having cancer, the method comprising: detecting a microbial profile in a sample obtained from the subject; predicting an effective response to the therapy when a favorable profile is detected in a sample from the subject; or predicting a non-effective response to the therapy when an unfavorable profile is detected in a sample from the subject.

In another aspect, the disclosure relates to methods comprising detecting one or more of *Bacteroides stercoris, Bacteroides caccae, Bacteroides intestinalis, Dialister, Bacteroides fragilis, Vampirovibrio, Tyzzerella, Bacteroides stercoris, Flavonifractor plautii, Butyricimonas faecihominis, Alistipes indistinctus, Dielma fastidiosa, Akkermansia muciniphila, Lactobacillus rogosae, Bacteroides fragilis, Prevotella copri*, and *Prevotella shalii* in a subject.

In another aspect, the disclosure relates to methods comprising detecting one or more of *Bacteroides stercoris, Bacteroides caccae, Bacteroides intestinalis, Dialister, Bacteroides fragilis, Vampirovibrio, Tyzzerella, Flavonifractor plautii, Dielma fastidiosa, Butyricimonas faecihominis, Alistipes, Akkermansia muciniphila, Lactobacillus rogosae, Prevotella copri, Prevotella shalii, Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Bacilli, Lactobacillales, Klebsiella aerogenes, Klebsiella, Coprobacter, Intestinibacter bartletti, Intestinibacter, Parasutterella secunda, Dialister propionicifaciens, Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus*, and *Anaerotignum lactatifermentans* in a subject or a bacterial species disclosed in FIG. 28C.

In another aspect, the disclosure relates to methods comprising detecting one or more of *Bacteroides stercoris, Bacteroides caccae, Bacteroides intestinalis, Dialister, Bacteroides fragilis, Vampirovibrio, Tyzzerella, Bacteroides stercoris, Flavonifractor plautii, Dielma fastidiosa, Akkermansia muciniphila, Lactobacillus rogosae, Bacteroides fragilis, Prevotella copri, Prevotella shalii, Firmicutes, Clostridiales, Ruminococcaceae, Alistipes indistinctus, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidi-*

*faciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichia fergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia californiensis, Tindallia texcoconensis, Turicibacter sanguinis, Turicimonas muris, Tyzzerella nexilis, Vallitalea pronyensis,* and *Vampirovibrio chlorellavorus* in a subject.

In another aspect, the disclosure relates to compositions comprising at least one isolated or purified population of bacteria belonging to one or more of the genera or species *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti,* and *Anaerotignum lactatifermentans.*

In some embodiments, the composition comprises at least one isolated or purified population of bacteria belonging to one or more of the genera or species: *Favonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum.*

In another aspect, the disclosure relates to compositions comprising at least two isolated or purified population of bacteria belonging to one or more of the genera or species *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti,* and *Anaerotignum lactatifermentans.* In some embodiments, the composition comprises at least two isolated or purified populations of bacteria belonging to one or more of the genera or species: *Flavonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum.*

In another aspect, the disclosure relates to compositions comprising an isolated or purified population of at least one, at least two, or 3, 4, 5, 6, 7, 8, 9, 10, 15, or 20 (or any derivable range therein) of *Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, Flavonfractor, Bacteroides, Butyricimonas, Dielma, Akkermansia, Alistipes, Anaerotignum lactatifermentans, Bacteroides coprophilus, Bacteroides stercoris, Bacteroides caccae, Bacteroides intestinalis, Dialister, Bacteroides fragilis, Vampirovibrio, Tyzzerella, Bacteroides stercoris, Flavonifractor plautii, Dielma fastidiosa, Akkermansia muciniphila, Lactobacillus rogosae, Bacteroides fragilis, Prevotella copri, Prevotella shalii, Firmicutes, Clostridiales, Ruminococcaceae, Alistipes indistinctus, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis,*

*Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia cahforniensis, Tindallia texcoconensis, Turicibacter sanguinis, Turicimonas muris, Tyzzerella nexilis, Vallitalea pronyensis*, and/or *Vampirovibrio chlorellavorus*.

In some embodiments, the composition comprises or further comprises at least one isolated or purified population of bacteria belonging to one or more of the species *Flavonifractor, Bacteroides stercoris, Butyricimonas faecihominis, Dielma, Akkermansia*, and *Alistipes indistinctus*. In some embodiments, the composition excludes *Bacteroides stercoris*. In some embodiments, the composition comprises or further comprises at least one isolated or purified population of bacteria belonging to one or more of the genera *Dielma* and *Akkermansia*. In some embodiments, the composition comprises or further comprises at least one isolated or purified population of bacteria belonging to one or more of the genera *Alistipes, Dielma*, and *Akkermansia*. In some embodiments, the composition comprises or further comprises at least one isolated or purified population of bacteria belonging to the *Akkermansia* genus. In some embodiments, the composition comprises or further comprises at least one isolated or purified population of *Akkermansia muciniphila*. In some embodiments, the composition comprises or further comprises a population of bacteria comprising one or more of *Akkermansia muciniphila* and *Dielma fastidiosa* but also *Alistipes indistinctus*. In some embodiments, the bacteria of the genera *Flavonifractor* comprises *Flavonifractor plautii*. In some embodiments, the composition comprises or further comprises at least one isolated or purified population of bacteria belonging to one or more of the genera or species *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans*. In some embodiments, the composition comprises or further comprises at least one isolated or purified population of *Bacteroides intestinalis*. In some embodiments, the composition comprises or further comprises at least one isolated or purified population of bacteria belonging to phylum Firmicutes, order Clostridiales, and family Ruminococcaceae. In some embodiments, the composition comprises or further comprises *Flavonifractor plautii* and/or *Dielma fastidiosa*. In some embodiments, the composition comprises or further comprises *Bacteroides stercoris, Butyricimonas faecihominis, Flavonfractor plautii, Dielma fastidiosa, Alistipes indistinctus*, and *Akkermansia muciniphila*

In some embodiments, the composition comprises less than $1 \times 10^5$, $1 \times 10^4$, $1 \times 10^3$, or $1 \times 10^2$ CFU or cells (or any derivable range therein) of bacteria classified as *Firmicutes, Clostridiales*, and Ruminococcaceae. In some embodiments, the composition comprises less than $1 \times 10^5$, $1 \times 10^4$, $1 \times 10^3$, or $1 \times 10^2$ CFU or cells (or any derivable range therein) of bacteria belonging to the family Ruminococcaceae, Clostridiaceae, Lachnospiraceae, Micrococcaceae, and/or Veilonellaceae.

In some embodiments, the cancer is a skin cancer. In some embodiments, the cancer is basal-cell skin cancer, squamous-cell skin cancer, melanoma, dermatofibrosarcoma protuberans, Merkel cell carcinoma, Kaposi's sarcoma, keratoacanthoma, spindle cell tumors, sebaceous carcinomas, microcystic adnexal carcinoma, Paget's disease of the breast, atypical fibroxanthoma, leiomyosarcoma, or angiosarcoma. In some embodiments, the cancer is melanoma. In some embodiments, the melanoma is metastatic melanoma, Lentigo Maligna, Lentigo Maligna Melanoma, Superficial Spreading Melanoma, Nodular Melanoma, Acral Lentiginous Melanoma, Cutaneous Melanoma, or Desmoplastic Melanoma. In some embodiments, the cancer comprises Cutaneous Melanoma.

In some embodiments, the cancer comprises recurrent cancer. In some embodiments, the cancer comprises recurrent metastatic cancer. In some embodiments, the cancer comprises a recurrence of the cancer in the area of the primary tumor. In some embodiments, the cancer comprises a metastatic cancer. In some embodiments, the cancer comprises a stage III or IV cancer. In some embodiments, the cancer comprises a stage I or II cancer. In some embodiments, the cancer excludes stage I or II cancer.

In some embodiments, the method further comprises administering at least one additional anticancer treatment. In some embodiments, the at least one additional anticancer treatment is surgical therapy, chemotherapy, radiation therapy, hormonal therapy, immunotherapy, small molecule therapy, receptor kinase inhibitor therapy, anti-angiogenic therapy, cytokine therapy, cryotherapy or a biological therapy. In some embodiments, the additional anticancer treatment comprises a cancer treatment described herein.

In some embodiments, (i) a PD-1, PDL1, or PDL2 inhibitor, (ii) a CTLA-4, B7-1, or B7-2 inhibitor, and/or at least one additional anticancer treatment is administered intratumorally, intraarterially, intravenously, intravascularly, intrapleurally, intraperitoneally, intratracheally, intrathecally, intramuscularly, endoscopically, intralesionally, percutaneously, subcutaneously, regionally, stereotactically, orally or by direct injection or perfusion. In some embodiments, the route of administration is a route described herein.

In some embodiments, the method is defined as method of treating a cancer in a subject diagnosed with cancer. In some embodiments, the method comprises or further comprises reducing or preventing one or more adverse events. In some embodiments, the method comprises or further comprises reducing or preventing one or more severe adverse events. In some embodiments, treating cancer comprises reducing or preventing one or more severe adverse events. In some embodiments, the method is for reducing the toxicity of an immunotherapy, such as combination immune checkpoint blockade therapy. In some embodiments, reducing toxicity comprises reducing adverse events. In some embodiments, the adverse event or severe adverse event is further classified as an immune-related adverse event. In some embodiments, the method comprises preventing or reducing immune-related adverse events. In some embodiments, the adverse event is classified as a severe adverse event. In some embodiments, grade 3 or higher adverse events are prevented. The grade of adverse events is scored by methods known in the art, for example, scoring according to the NCI Common Terminology Criteria for Adverse Events (CT-CAE).

In some embodiments, the subject has been determined to have an unfavorable microbial profile in the gut microbiome. In some embodiments, the unfavorable profile comprises a population of bacteria comprising bacteria belonging to one or one or more of the genera *Bacteroides*, *Dialister*, *Coprobacter*, *Intestinibacter*, and *Parasutterella*. In some embodiments, the unfavorable profile comprises a population of bacteria comprising one or more of *Bacteroides stercoris, Bacteroides caccae, Bacteroides intestinalis, Coprobacter, Intestinibacter bartletti, Parasutterella secunda*, and *Dialister propionicifaciens*. In some embodiments, the unfavorable profile comprises *Erysipelatoclostridium ramosum*. In some embodiments, the unfavorable profile comprises a population of bacteria comprising bacteria belonging to one or one or more of the genera *Lactobacillus, Bacteroides, Prevotella, Citrobacter, Clostridium, Hungateiclostridium, Eubacterium, Hafniaceae, Enterobacter, Hafnia, Roseburia*, Weissella, *Bacilli, Lactobacillales*, and *Klebsiella*. In some embodiments, the unfavorable profile comprises a population of bacteria comprising one or more of *Lactobacillus rogosae, Bacteroides fragilis, Prevotella copri*, and *Prevotella shalii*. In some embodiments, the unfavorable profile comprises one or more of *Prevotella copri, prevotella shalii, Butyrivibrio, Blautia hydrogenotrophica, Bacteroides fragilis, Butyrivibrio corssotus, Lactobacillales, Lactobacillus, Lactobacillaceae, Lactobacillus rogosae, Clostridium saccharagumia, andMegasphaera massiliensis*. In some embodiments, the unfavorable profile comprises at least, at most, or exactly 1, 2, 3, 4, 5, 6, 7, 8, 9, 10, 11, 12, or 13 (or any derivable range thereof) of *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis*, Weissella paramesenteroides, Enterobacter, *Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Prevotella copri, prevotella shalii, Butyrivibrio, Blautia hydrogenotrophica, Bacteroides fragilis, Butyrivibrio corssotus, Lactobacillales, Lactobacillus, Lactobacillaceae, Lactobacillus rogosae, Clostridium saccharagumia*, and *Megasphaera massiliensis*. In some embodiments, the unfavorable profile is further classified as a non-responsive or non-effective profile. A non-responsive profile refers to a microbial profile in the subject, particularly in the gut of the subject, that is present in subjects that are non-responsive to combination immune checkpoint blockade therapy. In some embodiments, the non-responsive profile comprises at least, at most, or exactly 1, 2, 3, 4, 5, 6, 7, 8, 9, 10, 11, 12, 13, 14, 15, 16, 17, 18, 19, 20, 21, 22, 23, 24, or 25 (or any derivable range thereof) of *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis*, Weissella paramesenteroides, Enterobacter, *Lactobacillus rogosae, Bacilli, Lactobacillales, Klebsiella aerogenes, Klebsiella, Prevotella copri, Prevotella shalii, Butyrivibrio, Blautia hydrogenotrophica, Bacteroides fragilis, Butyrivibrio corssotus, Lactobacillales, Lactobacillus, Lactobacillaceae, Lactobacillus rogosae, Clostridium saccharagumia*, and *Megasphaera massiliensis*. In some embodiments, the unfavorable profile comprises one or more of *Bacteroides stercoris, Bacteroides caccae, Negativicutes, Bacteroides intestinalis, Clostridium* species, *Clostridium clostridioforme*, and *Dialister*. In some embodiments, the unfavorable profile comprises at least, at most, or exactly 1, 2, 3, 4, 5, 6, or 7 (or any derivable range thereof) of *Coprobacter, Intestinibacter bartletti, Intestinibacter, Parasutterella secunda, Dialister propionicifaciens, Bacteroides stercoris, Bacteroides caccae, Negativicutes, Bacteroides intestinalis, Clostridium* species, *Clostridium clostridioforme*, and *Dialister*. In some embodiments, the unfavorable profile is further classified as a toxicity-associated profile. A toxicity-associated profile refers to a microbial profile in the subject, particularly in the gut of the subject, that is present in subjects that experience toxicity in response to combination immune checkpoint blockade therapy. In some embodiments, the non-responsive profile comprises at least, at most, or exactly 1, 2, 3, 4, 5, 6, or 7 (or any derivable range thereof) of *Bacteroides stercoris, Bacteroides caccae, Negativicutes, Bacteroides intestinalis, Clostridium* species, *Clostridium clostridioforme*, and *Dialister*.

In some embodiments, the bacteria belonging to the *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Lactobacillus rogosae, Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Bacteroides, Dialister, Lactobacillus*, and/or *Prevotella* genera or species were determined to be at least 10% in relative abundance. The term relative abundance is the percent composition of an organism of a particular kind relative to the total number of organisms in the area, such as the sample from the subject. In some embodiments, the bacteria belonging to the *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Lactobacillus rogosae, Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Dialister, Lactobacillus, Bacteroides*, and/or *Prevotella* genera or species were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the combined relative abundances of bacteria classified as one or more of *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Lactobacillus rogosae, Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Dialister, Lactobacillus, Bacteroides*, and/or *Prevotella* were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to the *Bacteroides* genera was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to the *Dialister* genera was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to the *Lactobacillus*, genera was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to the *Prevotella* genera was determined to be at least 2, 3, 5, 10, 15, 20, 25, 30, 35, 40, 45, 50, 55, 60, 65, 70, 75, 80, 85, or 90% (or any derivable range therein).

In some embodiments, the method further comprises comparing a microbial profile determined in a sample from a patient with a control sample. The control may be a microbial profile derived from a sample taken from a patient that is a non-responder, a responder, experienced toxicity, or did not experience toxicity to combination immune checkpoint blockade therapy.

In some embodiments, the subject was or is determined to comprise an unfavorable microbial profile by analyzing the microbiome in a sample from the subject. In some embodiments, the sample is a fecal sample or buccal sample. In some embodiments, the analyzing comprises performing 16S ribosomal sequencing and/or metagenomics whole genome sequencing.

In some embodiments, the subject has previously been treated for the cancer. In some embodiments, the subject has been determined to be a non-responder to the previous treatment. In some embodiments, the patient has been determined to have a toxic response to the previous treatment. In some embodiments, the previous treatment comprises immune checkpoint blockade monotherapy or immune checkpoint blockade combination therapy. In some embodiments, the previous treatment comprises immune checkpoint blockade monotherapy comprising only one of a PD-1, PDL1, PDL2, CTLA-4, B7-1, or B7-2 inhibitor. In some embodiments, the combination immune checkpoint blockade therapy comprises a combination of (i) a PD-1, PDL1, or PDL2 inhibitor and (ii) a CTLA-4, B7-1, or B7-2 inhibitor. In some embodiments, (i) is a PD-1 antibody and/inhibitor (ii) is a CTLA-4 inhibitor. In some embodiments, (i) is an anti-PD-1 monoclonal antibody and/or (ii) is an anti-CTLA-4 monoclonal antibody. In some embodiments, (i) comprises nivolumab, pembrolizumab, or pidilizumab. In some embodiments, (ii) comprises ipilimumab or tremelimumab. In some embodiments, the subject has not been previously treated with immune checkpoint blockade monotherapy or combination immune checkpoint blockade therapy.

In some embodiments, the subject is treated with the isolated population of bacteria prior to or concurrent with the treatment in (i) and (ii). In some embodiments, the subject is treated with the isolated population of bacteria after the treatment in (i) and (ii). In some embodiments, the treatment with the microbial composition occurs at least or at most 1, 2, 3, 4, 5, 6, 7, 8, 9, 10, 12, or 24 hours or 1 2, 3, 4, 5, or 6 days or 1, 2, 3, 4, 5, or 6 weeks (or any derivable range therein) before or after treatment with the inhibitors of (i) and (ii).). In some embodiments, the treatment with the microbial composition occurs within at least or at most 1, 2, 3, 4, 5, 6, 7, 8, 9, 10, 12, or24 hours or 12, 3, 4, 5, or6 days or 1, 2, 3, 4, 5, or 6 weeks (or any derivable range therein) of treatment with the inhibitors of (i) and (ii).

In some embodiments, the purified population of bacteria comprises bacteria from at least two genera or species, and wherein the ratio of the two bacteria is 11. In some embodiments, the purified population of bacteria comprises bacteria from at least, at most, or exactly 1, 2, 3, 4, 5, 6, 7, 8, 9, 10, 11, 12, 14, 16, 20, 30, 40, or 50 (or any derivable range therein) different families, genera, or species of bacteria. In some embodiments, the ratio of one family, genera, or species of bacteria to another family, genera, or species of bacteria present in the composition is at least, at most, or exactly 1:1, 1:2, 1:3, 1:4, 1:5, 1:6, 1:7, 1:8, 1:9, 1:10, 1:20, 1:25, 1:30, 1:35, 1:40, 1:45, 1:50, 1:55, 1:60, 1:65, 1:70, 1:75, 1:80, 1:85, 1:90, 1:95, 1:100, 1:150, 1:200, 1:250, 1:300, 1:350, 1:400, 1:450, 1:500, 1:600, 1:700, 1:800, 1:900, 1:1000, 1:1500, 1:2000, 1:2500, 1:3000, 1:3500, 1:4000, 1:4500, 1:5000, 1:1550, 1:6000, 1:6500, 1:7000, 1:7500, 1:8000, 1:8500, 1:9000, 1:9500, 1:10000, 1:1200, 1:14000, 1:16000, 1:18000, 1:20000, 1:30000, 1:40000, 1:50000, 1:60000, 1:70000, 1:80000, 1:90000, or 1:100000 (or any derivable range therein).

In some embodiments, the compositions provide for an alpha diversity of at least, at most, or exactly 1, 2, 3, 4, 5, 6, 7, 8, 9, 10, 11, 12, 13, 14, 15, 16, 17, 18, 19, or 20. Methods of calculating alpha diversity are known in the art.

For example, taxonomic alpha-diversity of samples can be estimated using the Inverse Simpson Index, which is described in Example 1. In some embodiments, the compositions are administered in an effective amount. In some embodiments, the effective amount comprises an amount that provides for an an alpha diversity of at least, at most, or exactly 1, 2, 3, 4, 5, 6, 7, 8, 9, 10, 11, 12, 13, 14, 15, 16, 17, 18, 19, or 20 (or any derivable range therein) in the subject.

In some embodiments, the bacteria belonging to the genera or species *Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti,* and *Anaerotignum lactatifermentans* are administered in an amount of at least, at most, or exactly $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$, or $1\times10^{16}$ cells or CFU (or any derivable range therein). In some embodiments, the bacteria belonging to the genera or species *Flavonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum* are administered in an amount of at least, at most, or exactly $1\times10^3$, $1\times10^4$, $1\times10^5$, $1\times10^6$, $1\times10^7$, $1\times10^8$, $1\times10^9$, $1\times0^{10}$, $1\times10^{11}$, $1\times10^{12}$, $1\times10^{13}$, $1\times10^{14}$, $1\times10^{15}$, or $1\times10^{16}$ cells or CFU (or any derivable range therein). In some embodiments, the total amount of bacteria administered is at least, at most, or exactly $1\times10^3$, $\mathbf{1\times10^4}$, $\mathbf{1\times10^5}$, $\mathbf{1\times10^6}$, $1\times10^7$, $\mathbf{1\times10^8}$, $\mathbf{1\times10^9}$, $\mathbf{1\times10^{10}}$, $1\times10^{11}$, $1\times10^{12}$, $1\times10^{13}$, $1\times10^{14}$, $1\times10^{15}$, or $1\times10^{16}$ cells or CFU (or any derivable range therein). In some embodiments, a particular amount of bacteria such as a particular species of bacteria may be at least, at most, or exactly in an amount of at least, at most, or exactly $1\times10^3$, $1\times10^4$, $1\times10^5$, $1\times10^6$, $1\times10^7$, $1\times10^8$, $\mathbf{1\times10^9}$, $\mathbf{1\times10^{10}}$, $1\times10^{11}$, $1\times10^{12}$, $1\times10^{13}$, $1\times10^{14}$, $1\times10^{15}$, or $1\times10^{16}$ cells or CFU (or any derivable range therein). In some embodiments, the composition may contain at least, at most, or exactly at least, at most, or exactly $1\times10^3$, $1\times10^4$, $1\times10^5$, $1\times10^6$, $1\times10^7$, $\mathbf{1\times10^8}$, $1\times10^9$, $\mathbf{1\times10^{10}}$, $1\times10^{11}$, $1\times10^{12}$, $1\times10^{13}$, $1\times10^{14}$, $1\times10^{15}$, or $1\times10^{16}$ cells or CFU (or any derivable range therein) from a phylum, family, genera or species of bacteria described herein. In some embodiments, the composition may contain less than at least, at most, or exactly $1\times10^6$, $1\times10^5$, $1\times10^4$, $\mathbf{1\times10^3}$, or $1\times10^2$ cells or CFU (or any derivable range therein) from a phylum, family, genus or species of bacteria described herein.

In some embodiments, the method further comprises administration of an antibiotic. In some embodiments, the antibiotic may be a broad-spectrum antibiotic. In some embodiments, a mixture of at least 1, 2, 3, 4, or 5 antibiotics is administered. In some embodiments, the antibiotics comprises ampicillin, streptomycin, and colistin, and combinations thereof. In some embodiments, the antibiotic is administered prior to the composition comprising at least one isolated or purified population of bacteria. In some embodiments, the antibiotic is administered concurrent with the composition comprising at least one isolated or purified population of bacteria. In some embodiments, the antibiotic is administered at least or at most 1, 2, 3, 4, 5, 6, 7, 8, 9, 10, 12, or 24 hours or 1 2, 3, 4, 5, or 6 days or 1, 2, 3, 4, 5, or 6 weeks (or any derivable range therein) before or after the microbial composition.

In some embodiments, the favorable profile comprises a population of bacteria comprising bacteria belonging to one or more of the genera *Bacteroides, Vampirovibrio,* and *Tyzzerella*. In some embodiments, the favourable profile comprises a population of bacteria comprising one or more of *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans*. In some embodiments, the favorable profile comprises a relative abundance of less than 30, 25, 20, 15, 10, 9, 8, 7, 6, 5, 4, 3, 2, or 1% of bacteria from one or more of the phylum *Firmicutes,* order *Clostridiales,* and family Ruminococcaceae. In some embodiments, the favorable profile comprises a population of bacteria comprising one or more of *Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus, Anaerotignum lactatifermentans, Bacteroides fragilis, Vampirovibrio, Tyzzerella, Akkermansia muciniphila, Bacteroides stercoris, Dielma fastidiosa, Firmicutes, Clostridiales, Ruminococcaceae, Flavonifractor plautii, Alistipes indistinctus, Akkermansia muciniphila, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris,*

*Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus anima/is, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia californiensis, Tindallia texcoconensis, Turicibacter sanguinis, Turicimonas muris, Tyzzerella nexilis, Vallitalea pronyensis*, and *Vampirovibrio chlorellavorus*.

In some embodiments, the favorable profile comprises a population of bacteria excluding one or more of *Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus, Anaerotignum lactatifermentans, Bacteroides fragilis, Vampirovibrio, Tyzzerella, Akkermansia muciniphila, Bacteroides stercoris, Dielma fastidiosa, Firmicutes, Clostridiales, Ruminococcaceae, Flavonifractor plautii, Alistipes indistinctus, Akkermansia muciniphila, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia californiensis, Tindallia texcoconensis, Turicibacter sanguinis, Turicimonas muris, Tyzzerella nexilis, Vallitalea pronyensis*, and *Vampirovibrio chlorellavorus*.

In some embodiments, the favorable profile comprises a population of bacteria comprising 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100 of (or any derivable range therein) *Parabacteroides distasonis, Fournierella,*

*Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus, Anaerotignum lactatifermentans, Bacteroides fragilis, Vampirovibrio, Tyzzerella, Akkermansia muciniphila, Bacteroides stercoris, Dielma fastidiosa, Firmicutes, Clostridiales, Ruminococcaceae, Flavonifractor plautii, Alistipes indistinctus, Akkermansia muciniphila, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equohfaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia californiensis, Tindallia texcoconensis, Turicibacter sanguinis, Turicimonas muris, Tyzzerella nexilis, Vallitalea pronyensis,* and *Vampirovibrio chlorellavorus.*

In some embodiments, the favorable profile comprises a population of bacteria comprising one or more of *Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus, Anaerotignum lactatifermentans, Bacteroides fragilis, Vampirovibrio, Tyzzerella, Akkermansia muciniphila, Bacteroides stercoris, Dielma fastidiosa, Firmicutes, Clostridiales, Ruminococcaceae, Flavonifractor plautii, Alistipes indistinctus, Akkermansia muciniphila, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfi-* tobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia cahforniensis, Tindallia texcoconensis, Turicibacter sanguinis, Turicimonas muris, Tyzzerella nexilis, Vallitalea pronyensis, and Vampirovibrio chlorellavorus in an amount of at least, at most, or exactly 2, 3, 5, 10, 15, 20, 25, 30, 35, 40, 45, 50, 55, 60, 65, 70, 75, 80, 85, or 90% (or any derivable range therein) in relative abundance.

In some embodiments, the favorable profile is further classified as a non-toxicity-associated profile. A non-toxic-associated profile refers to a microbial profile in the subject, particularly in the gut of the subject, that is present in subjects that do not experience toxicity, experience a low level of toxicity, or experience less than grade 3 immune related adverse in response to combination immune checkpoint blockade therapy. In some embodiments, the favorable profile comprises a population of bacteria comprising bacteria belonging to one or more of the genera Dorea, Caloramator, Muricomes, Geosporobacter, Geosporobacter, Anaerotignum, Bacteroides, Butyricimonas, Flavonifractor, Dielma, Alistipes, and Akkermansia. In some embodiments, the favorable profile comprises a population of bacteria comprising one or more of Dorea formicigenerans, Caloramator coolhaasi, Muricomes, Muricomes intestini, Geosporobacter, Geosporobacter subterraneus, Anaerotignum lactatifermentans, Bacteroides stercoris, Butyricimonas faecihominis, Flavonifractor plautii, Dielma fastidiosa, Alistipes indistinctus, and Akkermansia muciniphila. In some embodiments, the favorable profile is further defined as an effective profile. An effective profile refers to a microbial profile in the subject, particularly in the gut of the subject, that is present in subjects that respond to combination immune checkpoint blockade therapy. In some embodiments, an effective response comprises an increase in CD8+ cells in tumor samples or infiltrates. In some embodiments, an effective response comprises an increase in the number and/or density of T cells or in the entropy of tumor T cell infiltrates. The entropy can be determined by methods known in the art and described herein. For example, Shannon entropy and Renyi entropy can been used to compare the TCR diversities between different people or between different T-cell phenotypes.

In some embodiments, the bacteria belonging to the genera or species of Alistipes, Bacteroides, Butyricimonas, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, Anaerotignum lactatifermentans, Bacteroides fragilis, Vampirovibrio, Tyzzerella, Flavonifractor, Dielma or Akkermansia genera were determined to be at least 2, 3, 5, 10, 15, 20, 25, 30, 35, 40, 45, 50, 55, 60, 65, 70, 75, 80, 85, or 90% (or any derivable range therein) in relative abundance. In some embodiments, the bacteria belonging to the Alistipes, Bacteroides, Butyricimonas, Parabacteroides distasonis, Fournierella, Fournierella massiliensis, Eisenbergiella tayi, Tissierellales, Hungateiclostridium thermocellum, Doreaformicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, Anaerotignum lactatifermentans, Bacteroides fragilis, Vampirovibrio, Tyzzerella, Flavonifractor, Dielma or Akkermansia were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the relative abundances of Alistipes, Bacteroides, Butyricimonas, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, ParapedobAnaerotignum lactatifermentans, Bacteroides fragilis, Vampirovibrio, Tyzzerella, Flavonifractor, Dielma or Akkermansia combined were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to Bacteroides fragilis was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to Vampirovibrio was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to Tyzzerella was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to Flavonfractor was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Dielma* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Akkermansia* was determined to be at least 2, 3, 5, 10, 15, 20, 25, 30, 35, 40, 45, 50, 55, 60, 65, 70, 75, 80, 85, or 90% (or any derivable range therein). In some embodiments, a toxic response is predicted when one or more of *Bacteroides stercoris, Bacteroides caccae, Bacteroides intestinalis, Coprobacter, Intestinibacter bartletti, Parasutterella secunda*, and *Dialister propionicifaciens* is detected in a sample from the subject. In some embodiments, a toxic response is predicted when one or more of *Bacteroides stercoris, Bacteroides caccae, Bacteroides intestinalis, Coprobacter, Intestinibacter bartletti, Parasutterella secunda*, and *Dialister propionicifaciens* is determined to be at least 2, 3, 5, 10, 15, 20, 25, 30, 35, 40, 45, 50, 55, 60, 65, 70, 75, 80, 85, or 90% (or any derivable range therein) in relative abundance. In some embodiments, the bacteria belonging to *Bacteroides stercoris, Bacteroides caccae, Bacteroides intestinalis, Coprobacter, Intestinibacter bartletti, Parasutterella secunda*, and *Dialister propionicifaciens* were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the relative abundances of *Bacteroides stercoris, Bacteroides caccae, Bacteroides intestinalis, Coprobacter, Intestinibacter bartletti, Parasutterella secunda*, and *Dialister propionicifaciens* combined were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides stercoris* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides caccae* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides intestinalis* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Dialister* was determined to be at least 2, 3, 5, 10, 15, 20, 25, 30, 35, 40, 45, 50, 55, 60, 65, 70, 75, 80, 85, or 90% (or any derivable range therein).

In some embodiments, a non-toxic response is predicted when one or more of *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans* is detected. In some embodiments, a non-toxic response is predicted when one or more of *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans* is determined to be at least 2, 3, 5, 10, 15, 20, 25, 30, 35, 40, 45, 50, 55, 60, 65, 70, 75, 80, 85, or 90% (or any derivable range therein) in relative abundance. In some embodiments, the bacteria belonging to *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans* were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the relative abundances of *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans* combined were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides fragilis* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Vampirovibrio* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Tyzzerella* was determined to be at least 2, 3, 5, 10, 15, 20, 25, 30, 35, 40, 45, 50, 55, 60, 65, 70, 75, 80, 85, or 90% (or any derivable range therein).

In some embodiments, an effective response is predicted when one or more of *Parabacteroides distasonis, Fournierella, Fournierella massiliensis, Bacteroides coprophilus, Eisenbergiella tayi, Tissierellales, Hungateiclostridium thermocellum, Bacteroides stercoris, Flavonifractor plautii, Dielma fastidiosa* and *Akkermansia muciniphila* is detected in a sample from the subject. In some embodiments, an effective response is predicted when one or more of *Parabacteroides, Fournierella, Eisenbergiella, Tissierellales, Hungateiclostridium, Bacteroides, Butyricimonas, Flavonifractor, Dielma, Alistipes*, and *Akkermansia* is detected in a sample from the subject. In some embodiments, an effective response is predicted when one or more of *Bacteroides stercoris, Butyricimonas faecihominis, Flavonifractor plautii, Dielma fastidiosa, Alistipes indistinctus*, and *Akkermansia muciniphila* is detected in a sample from the subject. In some embodiments, an effective response is predicted when one or more of *Parabacteroides distasonis, Fournierella, Fournierella massiliensis, Bacteroides coprophilus, Eisenbergiella tayi, Tissierellales, Hungateiclostridium thermocellum, Bacteroides stercoris, Butyricimonas faecihominis, Flavonifractor plautii, Dielma fastidiosa, Alistipes indistinctus*, and *Akkermansia muciniphila* is determined to be at least 2, 3, 5, 10, 15, 20, 25, 30, 35, 40, 45, 50, 55, 60, 65, 70, 75, 80, 85, or 90% (or any derivable range therein) in relative abundance. In some embodiments, the bacteria belonging to *Parabacteroides distasonis, Fournierella, Fournierella massiliensis, Bacteroides coprophilus, Eisenbergiella tayi, Tissierellales, Hungateiclostridium thermocellum, Bacteroides stercoris, Butyricimonas faecihominis, Flavonifractor plautii, Dielma fastidiosa, Alistipes indistinctus*, and *Akkermansia muciniphila* were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the relative abundances of *Parabacteroides distasonis, Fournierella, Fournierella massiliensis, Bacteroides coprophilus, Eisenbergiella tayi, Tissierellales, Hungateiclostridium thermocellum, Bacteroides stercoris, Butyricimonas faecihominis, Flavonifractor plautii, Dielma fastidiosa, Alistipes indistinctus*, and *Akkermansia muciniphila* combined were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides stercoris* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Flavonifractor plautii* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Dielma fastidiosa* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Akkermansia muciniphila* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Butyricimonas faecihominis* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Alistipes indistinctus* was determined to be at least 2, 3, 5, 10, 15, 20, 25, 30, 35, 40, 45, 50, 55, 60, 65, 70, 75, 80, 85, or 90% (or any derivable range therein).

In some embodiments, a non-effective response is predicted when one or more of *Lactobacillus rogosae, Bacteroides fragilis, Prevotella copri, Prevotella shalii, Clostridium hylemonae, Hungateiclostridium aldrichii, Citrobacter rodentium, Eubacterium sulci, Citrobacter freundii, Eubacterium halii, Enterobacter cloacae, Hafnia alvei, Roseburia hominis, Weissella paramesenteroides,* and *Klebsiella aerogenes* is detected. In some embodiments, a non-effective response is predicted when one or more of *Lactobacillus rogosae, Bacteroides fragilis, Prevotella copri, Prevotella shalii, Clostridium hylemonae, Hungateiclostridium aldrichii, Citrobacter rodentium, Eubacterium sulci, Citrobacter freundii, Eubacterium halii, Enterobacter cloacae, Hafnia alvei, Roseburia hominis, Weissella paramesenteroides,* and *Klebsiella aerogenes* is determined to be at least 2, 3, 5, 10, 15, 20, 25, 30, 35, 40, 45, 50, 55, 60, 65, 70, 75, 80, 85, or 90% (or any derivable range therein) in relative abundance. In some embodiments, the bacteria belonging to *Lactobacillus rogosae, Bacteroides fragilis, Prevotella copri, Prevotella shalii, Clostridium hylemonae, Hungateiclostridium aldrichii, Citrobacter rodentium, Eubacterium sulci, Citrobacter freundii, Eubacterium halii, Enterobacter cloacae, Hafnia alvei, Roseburia hominis, Weissella paramesenteroides,* and *Klebsiella aerogenes* were determined to be present at a relative abundance of at least 2, 3, 5, 10, 15, 20, 25, 30, 35, 40, 45, 50, 55, 60, 65, 70, 75, 80, 85, or 90% (or any derivable range therein). In some embodiments, the relative abundances of *Lactobacillus rogosae, Bacteroides fragilis, Prevotella copri, Prevotella shalii, Clostridium hylemonae, Hungateiclostridium aldrichii, Citrobacter rodentium, Eubacterium sulci, Citrobacter freundii, Eubacterium halii, Enterobacter cloacae, Hafnia alvei, Roseburia hominis, Weissella paramesenteroides,* and *Klebsiella aerogenes* combined were determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Lactobacillus rogosae* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Bacteroides fragilis* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Prevotella copri* was determined to be at least 2, 3, 5, 10, 15, 20, 25, 30, 35, 40, 45, 50, 55, 60, 65, 70, 75, 80, 85, or 90% (or any derivable range therein). In some embodiments, the relative abundance of bacteria belonging to *Prevotella shalii* was determined to be at least 2, 3, 5, 10, 15, 20, 25, 30, 35, 40, 45, 50, 55, 60, 65, 70, 75, 80, 85, or 90% (or any derivable range therein).

In some embodiments, a favorable profile, non-toxicity-associated profile, and/or effective profile excludes bacteria from one or more of the families Ruminococcaceae, Clostridiaceae, Lachnospiraceae, Micrococcaceae, and/or Veilonellaceae or includes a relative abundance of less than 30, 25, 20, 15, 10, 9, 8, 7, 6, 5, 4, 3, 2, or 1% (or any derivable range therein) of bacteria from one or more of the families Ruminococcaceae, Clostridiaceae, Lachnospiraceae, Micrococcaceae, and/or Veilonellaceae.

In some embodiments, a favorable profile, non-toxicity-associated profile, and/or effective profile excludes bacteria from one or more of the following or comprises a relative abundance of less than 30%, 25%, 20%1, 5%, 10%, 9%, 8%, 7%, 6%, 5%, 4%, 3%, 2%, or 1% (or any derivable range therein) of bacteria from one or more of the following: *Bacteroides stercoris, Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus, Anaerotignum lactatifermentans, Bacteroides coagulans, Clostridium aldenense, Clostridium aldrichii, Clostridium alkalicellulosi, Clostridium amygdalinum, Clostridium asparagiforme, Clostridium cellulosi, Clostridium citroniae, Clostridium clariflavum* DSM 19732, *Clostridium clostridioforme, Clostridium colinum, Clostridium fimetarium, Clostridium hiranonis, Clostridium hungatei, Clostridium hylemonae* DSM 15053, *Clostridium indolis, Clostridium lactatifermentans, Clostridium leptum, Clostridium methylpentosum, Clostridium oroticum, Clostridium papyrosolvens* DSM 2782, *Clostridium populeti, Clostridium propionicum, Clostridium saccharolyticum, Clostridium scindens, Clostridium sporosphaeroides, Clostridium stercorarium, Clostridium straminisolvens, Clostridium sufflavum, Clostridium termitidis, Clostridium thermosuccinogenes, Clostridium viride, Clostridium xylanolyticum, Desulfotomaculum guttoideum, Eubacterium rectale* ATCC 33656, *Eubacterium dolichum, Eubacterium eligens* ATCC 27750, *Eubacterium hallii, Eubacterium infirmum, Eubacterium siraeum, Eubacterium tenue, Ruminococcus torques, Acetanaerobacterium elongatum, Acetatifactor muris, Acetivibrio cellulolyticus, Acetivibrio ethanolgignens, Acholeplasma brassicae* 0502, *Acholeplasma parvum, Acholeplasma vituli, Acinetobacter junii, Actinobacillus porcinus, Actinomyces bowdenii, Actinomyces dentalis, Actinomyces odontolyticus, Acutalibacter muris, Aerococcus viridans, Aeromicrobium fastidiosum, Alistipes finegoldii, Alistipes obesi, Alistipes onderdonkii, Alistipes putredinis, Alistipes shalii, Alistipes shalii* WAL 8301, *Alistipes timonensis* JC136, *Alkalibacter saccharofermentans, Alkaliphilus metalliredigens* QYMF, *Allisonella histaminiformans, Allobaculum stercoricanis* DSM 13633, *Alloprevotella rava, Alloprevotella tannerae, Anaerobacterium chartisolvens, Anaerobiospirillum thomasii, Anaerobium acetethylicum, Anaerococcus octavius* NCTC 9810, *Anaerococcus provenciensis, Anaerococcus vaginalis* ATCC 51170, *Anaerocolumna jejuensis, Anaerofilum agile, Anaerofustis stercorihominis, Anaeroglobus geminatus, Anaeromassilibacillus senegalensis, Anaeroplasma abactoclasticum, Anaerorhabdus furcosa, Anaerosporobacter mobilis, Anaerostipes butyraticus, Anaerostipes* caccae, Anaerostipes hadrus, Anaerotruncus colihominis, Anaerovorax odorimutans, Anoxybacillus rupiensis, Aquabacterium limnoticum, Arcobacter butzleri, Arthrospira platensis, Asaccharobacter celatus, Atopobium parvulum, Bacteroides caccae, Bacteroides caecimuris, Bacteroides cellulosilyticus, Bacteroides clarus YIT 12056, Bacteroides dorei, Bacteroides eggerthii, Bacteroides finegoldii, Bacteroides fragilis, Bacteroides gallinarum, Bacteroides massiliensis, Bacteroides oleiciplenus YIT 12058, Bacteroides plebeius DSM 17135, Bacteroides rodentium JCM 16496, Bacteroides thetaiotaomicron, Bacteroides uniformis, Bacteroides xylanisolvens XB1A, Bacteroides xylanolyticus, Barnesiella intestinihominis, Beduini massiliensis, Bifidobacterium bifidum, Bifidobacterium dentium, Bifidobacterium longum subsp. infantis, Blautia caecimuris, Blautia coccoides, Blautia faecis, Blautia glucerasea, Blautia hansenii DSM 20583, Blautia hydrogenotrophica, Blautia luti, Blautia luti DSM 14534, Blautia wexlerae DSM 19850, Budvicia aquatica, Butyricicoccus pullicaecorum, Butyricimonas paravirosa, Butyrivibrio crossotus, Caldicoprobacter oshimai, Caloramator coolhaasii, Caloramator proteoclasticus, Caloramator quimbayensis, Campylobacter gracilis, Campylobacter rectus, Campylobacter ureolyticus DSM 20703, Capnocytophaga gingivalis, Capnocytophaga leadbetteri, Capnocytophaga sputigena, Casaltella massiliensis, Catabacter hongkongensis, Catenibacterium mitsuokai, Christensenella minuta, Christensenella timonensis, Chryseobacterium taklimakanense, Citrobacter freundii, Cloacibacillus porcorum, Clostridioides difficile ATCC 9689 DSM 1296, Clostridium amylolyticum, Clostridium bowmanii, Clostridium butyricum, Clostridium cadaveris, Clostridium colicanis, Clostridium gasigenes, Clostridium lentocellum DSM 5427, Clostridium oceanicum, Clostridium oryzae, Clostridium paraputrificum, Clostridium pascui, Clostridium perfringens, Clostridium quinii, Clostridium saccharobutylicum, Clostridium sporogenes, Clostridium ventriculi, Collinsella aerofaciens, Comamonas testosteroni, Coprobacter fastidiosus NSBI, Coprococcus eutactus, Corynebacterium diphtheriae, Corynebacterium durum, Corynebacterium mycetoides, Corynebacterium pyruviciproducens ATCC BAA-1742, Corynebacterium tuberculostearicum, Culturomica massiliensis, Cuneatibacter caecimuris, Defluviitalea saccharophila, Delftia acidovorans, Desulfitobacterium chlororespirans, Desulfitobacterium metallireducens, Desulfosporosinus acididurans, Desulfotomaculum halophilum, Desulfotomaculum intricatum, Desulfotomaculum tongense, Desulfovibrio desulfuricans subsp. desulfuricans, Desulfovibrio idahonensis, Desulfovibrio litoralis, Desulfovibrio piger, Desulfovibrio simplex, Desulfovibrio zosterae, Desulfuromonas acetoxidans, Dethiobacter alkaliphilus AHT 1, Dethiosulfatibacter aminovorans, Dialister invisus, Dialister propionicifaciens, Dielma fastidiosa, Dietzia alimentaria 72, Dorea longicatena, Dysgonomonas gadei ATCC BAA-286, Dysgonomonas mossii, Eggerthella lenta, Eikenella corrodens, Eisenbergiella tayi, Emergencia timonensis, Enorma massiliensis phI, Enterococcus faecalis, Enterorhabdus muris, Ethanoligenens harbinense YUAN-3, Eubacterium coprostanoligenes, Eubacterium limosum, Eubacterium oxidoreducens, Eubacterium sulci ATCC 35585, Eubacterium uniforme, Eubacterium ventriosum, Eubacterium xylanophilum, Extibacter muris, Ezakiella peruensis, Faecalibacterium prausnitzii, Faecalicoccus acidiformans, Faecalitalea cylindroides, Filifactor villosus, Flavonifractor plautii, Flintibacter butyricus, Frisingicoccus caecimuris, Fucophilus fucoidanolyticus, Fusicatenibacter saccharivorans, Fusobacterium mortiferum, Fusobacterium nucleatum subsp. vincentii, Fusobacterium simiae, Fusobacterium varium, Garciella nitratireducens, Gemella haemolysans, Gemmiger formicilis, Gordonibacter urolithinfaciens, Gracilibacter thermotolerans JW/YJL-S1, Granulicatella elegans, Guggenheimella bovis, Haemophilus haemolyticus, Helicobacter typhlonius, Hespellia stercorisuis, Holdemanella biformis, Holdemania massiliensis AP2, Howardella ureilytica, Hungatella effluvii, Hungatella hathewayi, Hydrogenoanaerobacterium saccharovorans, Ihubacter massiliensis, Intestinibacter bartlettii, Intestinimonas butyriciproducens, Irregularibacter muris, Kiloniella laminariae DSM 19542, Kroppenstedtia guangzhouensis, Lachnoanaerobaculum orale, Lachnoanaerobaculum umeaense, Lachnoclostridium phytofermentans, Lactobacillus acidophilus, Lactobacillus algidus, Lactobacillus animalis, Lactobacillus casei, Lactobacillus delbrueckii, Lactobacillus fornicalis, Lactobacillus iners, Lactobacillus pentosus, Lactobacillus rogosae, Lactococcus garvieae, Lactonifactor longoviformis, Leptotrichia buccalis, Leptotrichia hofstadii, Leptotrichia hongkongensis, Leptotrichia wadei, Leuconostoc inhae, Levyella massiliensis, Loriellopsis cavernicola, Lutispora thermophila, Marinilabilia salmonicolor JCM 21150, Marvinbryantia formatexigens, Mesoplasma photuris, Methanobrevibacter smithii ATCC 35061, Methanomassiliicoccus luminyensis BIO, Methylobacterium extorquens, Mitsuokella jalaludinii, Mobilitalea sibirica, Mobiluncus curtisii, Mogibacterium pumilum, Mogibacterium timidum, Moorella glycerini, Moorella humiferrea, Moraxella nonliquefaciens, Moraxella osloensis, Morganella morganii, Moryella indoligenes, Muribaculum intestinale, Murimonas intestini, Natranaerovirga pectinivora, Neglecta timonensis, Neisseria cinerea, Neisseria oralis, Nocardioides mesophilus, Novibacillus thermophilus, Ochrobactrum anthropi, Odoribacter splanchnicus, Olsenella profusa, Olsenella uli, Oribacterium asaccharolyticum ACB7, Oribacterium sinus, Oscillibacter ruminantium GH1, Oscillibacter valericigenes, Oxobacter pfennigii, Pantoea agglomerans, Papillibacter cinnamivorans, Parabacteroides faecis, Parabacteroides goldsteinii, Parabacteroides gordonii, Parabacteroides merdae, Parasporobacterium paucivorans, Parasutterella excrementihominis, Parasutterella secunda, Parvimonas micra, Peptococcus niger, Peptoniphilus duerdenii ATCC BAA-1640, Peptoniphilus grossensis ph5, Peptoniphilus koenoeneniae, Peptoniphilus senegalensis JC140, Peptostreptococcus stomatis, Phascolarctobacterium succinatutens, Phocea massiliensis, Pontibacter indicus, Porphyromonas bennonis, Porphyromonas endodontalis, Porphyromonas pasteri, Prevotella bergensis, Prevotella buccae ATCC 33574, Prevotella denticola, Prevotella enoeca, Prevotella fusca JCM 17724, Prevotella loescheii, Prevotella nigrescens, Prevotella oris, Prevotella pallens ATCC 700821, Prevotella stercorea DSM 18206, Prevotellamassilia timonensis, Propionispira arcuata, Proteus mirabilis, Providencia rettgeri, Pseudobacteroides cellulosolvens ATCC 35603 DSM 2933, Pseudobutyrivibrio ruminis, Pseudoflavonfractor capillosus ATCC 29799, Pseudomonas aeruginosa, Pseudomonas fluorescens, Pseudomonas mandehii, Pseudomonas nitroreducens, Pseudomonas putida, Raoultella ornithinolytica, Raoultella planticola, Raoultibacter massiliensis, Robinsoniella peoriensis, Romboutsia timonensis, Roseburia faecis, Roseburia hominis A2-183, Roseburia intestinalis, Roseburia inulinivorans DSM 16841, Rothia dentocariosa ATCC 17931, Ruminiclostridium thermocellum, Ruminococcus albus, Ruminococcus bromii, Ruminococcus callidus, Ruminococcus champanellensis 18P13=JCM 17042, Ruminococcus faecis JCM 15917, *Ruminococcus flavefaciens, Ruminococcus gauvreauii, Ruminococcus lactaris* ATCC 29176, *Rummehiibacillus pycnus, Saccharofermentans acetigenes, Scardovia wiggsiae, Schlegelella thermodepolymerans, Sedimentibacter hongkongensis, Selenomonas sputigena* ATCC 35185, *Slackia exigua* ATCC 700122, *Slackia piriformis* YIT 12062, *Solitalea canadensis, Solobacterium moorei, Sphingomonas aquatilis, Spiroplasma alleghenense, Spiroplasma chinense, Spiroplasma chrysopicola, Spiroplasma culicicola, Spiroplasma lampyridicola, Sporobacter termitidis, Staphylococcus aureus, Stenotrophomonas maltophilia, Stomatobaculum longum, Streptococcus agalactiae* ATCC 13813, *Streptococcus cristatus, Streptococcus equinus, Streptococcus gordonii, Streptococcus lactarius, Streptococcus parauberis, Subdoligranulum variabile, Succinivibrio dextrinosolvens, Sutterella stercoricanis, Sutterella wadsworthensis, Syntrophococcus sucromutans, Syntrophomonas zehnderi* OL-4, *Terrisporobacter mayombei, Thermoleophilum album, Treponema denticola, Treponema socranskii, Tyzzerella nexilis* DSM 1787, *Vallitalea guaymasensis, Vallitalea pronyensis, Vampirovibrio chlorellavorus, Veillonella atypica, Veillonella denticariosi, Veillonella dispar, Veillonella parvula, Victivallis vadensis, Vulcanibacillus modesticaldus* and *Weissella confusa*.

In some embodiments, a non-favorable profile, toxicity-associated profile, and/or non-effective profile excludes one or more of *Citrobacter, Clostridium hylemonae, Hungateiclostridium aldrichii, Citrobacter rodentium, Eubacterium sulci, Hafniaceae, Citrobacter freundii, Eubacterium hali, Enterobacter cloacae, Hafnia alvei, Hafnia, Roseburia hominis, Weissella paramesenteroides, Enterobacter, Lactobacillus rogosae, Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Anaerotruncus colihominis, Klebsiella variicola, Escherichia coli, Bacteroides thetaiotaomicron, Oxalobacter formigenes, Paraprevotella clara, Adlercreutzia equohfaciens, Clostridium bolteae, Klebsiella pneumoniae, Clostridium, Parabacteroides merdae, Klebsiella quasipneumoniae, Lachnoclostridium, Bacteroides coprocola, Prevotella* sp. CAG:255, *Lachnospiraceae, Streptococcus pasteurianus, Lactococcus lactis, Clostridiales, Streptococcus mutans, Ruminococcaceae bacterium* D16, *Firmicutes bacterium* CAG:102, *Oscillibacter, Clostridium clostridioforme, Bacteroides massiliensis, Clostridium scindens, Parabacteroides merdae, Eubacterium* sp. CAG:161, *Ruminococcus gnavus, Clostridium clostridioforme*, or includes a relative abundance of less than 30, 25, 20, 15, 10, 9, 8, 7, 6, 5, 4, 3, 2, or 1% (or any derivable range therein) of bacteria from one or more of *Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Lactobacillus rogosae, Bacilli, Lactobacillales, Klebsiella aerogenes, Klebsiella, Bacteroides intestinalis, Coprobacter, Intestinibacter bartletti, Intestinibacter, Parasutterella secunda, Dialister propionicifaciens, Anaerotruncus colihominis, Klebsiella variicola, Escherichia coli, Bacteroides thetaiotaomicron, Oxalobacter formigenes, Paraprevotella clara, Adlercreutzia equohfaciens, Clostridium bolteae, Klebsiella pneumoniae, Clostridium, Parabacteroides merdae, Klebsiella quasipneumoniae, Lachnoclostridium, Bacteroides coprocola, Prevotella* sp. CAG:255, *Lachnospiraceae, Streptococcus pasteurianus, Lactococcus lactis, Clostridiales, Streptococcus mutans, Ruminococcaceae bacterium* D16, *Firmicutes bacterium* CAG:102, *Oscillibacter, Clostridium clostridioforme, Bacteroides massiliensis, Clostridium scindens, Parabacteroides merdae, Eubacterium* sp. CAG:161, *Ruminococcus gnavus*, and *Clostridium clostridioforme*.

In some embodiments, the microbial compositions of the disclosure exclude bacteria from one or more of the families Ruminococcaceae, Clostridiaceae, Lachnospiraceae, Micrococcaceae, and/or Veilonellaceae or includes less than $1 \times 10^6$, $1 \times 10^5$, $1 \times 10^4$, $1 \times 10^3$, or $1 \times 10^2$ cells or CFU (or any derivable range therein) of bacteria from one or more of the families Ruminococcaceae, Clostridiaceae, Lachnospiraceae, Micrococcaceae, and/or Veilonellaceae.

In some embodiments, the microbial compositions of the disclosure exclude bacteria from one or more of the following or comprises less than $1 \times 10^6$, $1 \times 10^5$, $1 \times 10^4$, $1 \times 10^3$, or $1 \times 10^2$ cells or CFU (or any derivable range therein) of bacteria from one or more of the following: *Bacteroides coagulans, Clostridium aldenense, Clostridium aldrichii, Clostridium alkalicellulosi, Clostridium amygdalinum, Clostridium asparagiforme, Clostridium cellulosi, Clostridium citroniae, Clostridium clariflavum* DSM 19732, *Clostridium clostridioforme, Clostridium colinum, Clostridium fimetarium, Clostridium hiranonis, Clostridium hungatei, Clostridium hylemonae* DSM 15053, *Clostridium indolis, Clostridium lactatifermentans, Clostridium leptum, Clostridium methylpentosum, Clostridium oroticum, Clostridium papyrosolvens* DSM 2782, *Clostridium populeti, Clostridium propionicum, Clostridium saccharolyticum, Clostridium scindens, Clostridium sporosphaeroides, Clostridium stercorarium, Clostridium straminisolvens, Clostridium sufflavum, Clostridium termitidis, Clostridium thermosuccinogenes, Clostridium viride, Clostridium xylanolyticum, Desulfotomaculum guttoideum, Eubacterium rectale* ATCC 33656, *Eubacterium dolichum, Eubacterium eligens* ATCC 27750, *Eubacterium hallii, Eubacterium infirmum, Eubacterium siraeum, Eubacterium tenue, Ruminococcus torques, Acetanaerobacterium elongatum, Acetatifactor muris, Acetivibrio cellulolyticus, Acetivibrio ethanolgignens, Acholeplasma brassicae* 0502, *Acholeplasma parvum, Acholeplasma vituli, Acinetobacter junii, Actinobacillus porcinus, Actinomyces bowdenii, Actinomyces dentalis, Actinomyces odontolyticus, Acutalibacter muris, Aerococcus viridans, Aeromicrobium fastidiosum, Alistipes finegoldii, Alistipes obesi, Alistipes onderdonkii, Alistipes putredinis, Alistipes shalii, Alistipes shalii* WAL 8301, *Alistipes timonensis* JC136, *Alkalibacter saccharofermentans, Alkaliphilus metalliredigens* QYMF, *Allisonella histaminiformans, Allobaculum stercoricanis* DSM 13633, *Alloprevotella rava, Alloprevotella tannerae, Anaerobacterium chartisolvens, Anaerobiospirillum thomasii, Anaerobium acetethylicum, Anaerococcus octavius* NCTC 9810, *Anaerococcus provenciensis, Anaerococcus vaginalis* ATCC 51170, *Anaerocolumna jejuensis, Anaerofilum agile, Anaerofustis stercorihominis, Anaeroglobus geminatus, Anaeromassilibacillus senegalensis, Anaeroplasma abactoclasticum, Anaerorhabdus furcosa, Anaerosporobacter mobilis, Anaerostipes butyraticus, Anaerostipes caccae, Anaerostipes hadrus, Anaerotruncus colihominis, Anaerovorax odorimutans, Anoxybacillus rupiensis, Aquabacterium limnoticum, Arcobacter butzleri, Arthrospira platensis, Asaccharobacter celatus, Atopobium parvulum, Bacteroides caccae, Bacteroides caecimuris, Bacteroides cellulosilyticus, Bacteroides clarus* YIT 12056, *Bacteroides dorei, Bacteroides eggerthii, Bacteroides finegoldii, Bacteroides fragilis, Bacteroides gallinarum, Bacteroides massiliensis, Bacteroides oleiciplenus* YIT 12058, *Bacteroides plebeius*

DSM 17135, *Bacteroides rodentium* JCM 16496, *Bacteroides thetaiotaomicron*, *Bacteroides unformis*, *Bacteroides xylanisolvens* XB1A, *Bacteroides xylanolyticus*, *Barnesiella intestinihominis*, *Beduini massiliensis*, *Bifidobacterium bifidum*, *Bifidobacterium dentium*, *Bifidobacterium longum* subsp. *infantis*, *Blautia caecimuris*, *Blautia coccoides*, *Blautia faecis*, *Blautia glucerasea*, *Blautia hansenii* DSM 20583, *Blautia hydrogenotrophica*, *Blautia luti*, *Blautia luti* DSM 14534, *Blautia wexlerae* DSM 19850, *Budvicia aquatica*, *Butyricicoccus pullicaecorum*, *Butyricimonas paravirosa*, *Butyrivibrio crossotus*, *Caldicoprobacter oshimai*, *Caloramator coolhaasii*, *Caloramator proteoclasticus*, *Caloramator quimbayensis*, *Campylobacter gracilis*, *Campylobacter rectus*, *Campylobacter ureolyticus* DSM 20703, *Capnocytophaga gingivalis*, *Capnocytophaga leadbetteri*, *Capnocytophaga sputigena*, *Casaltella massiliensis*, *Catabacter hongkongensis*, *Catenibacterium mitsuokai*, *Christensenella minuta*, *Christensenella timonensis*, *Chryseobacterium taklimakanense*, *Citrobacter freundii*, *Cloacibacillus porcorum*, *Clostridioides difficile* ATCC 9689 DSM 1296, *Clostridium amylolyticum*, *Clostridium bowmanii*, *Clostridium butyricum*, *Clostridium cadaveris*, *Clostridium colicanis*, *Clostridium gasigenes*, *Clostridium lentocellum* DSM 5427, *Clostridium oceanicum*, *Clostridium oryzae*, *Clostridium paraputrificum*, *Clostridium pascui*, *Clostridium perfringens*, *Clostridium quinii*, *Clostridium saccharobutylicum*, *Clostridium sporogenes*, *Clostridium ventriculi*, *Collinsella aerofaciens*, *Comamonas testosteroni*, *Coprobacter fastidiosus* NSB1, *Coprococcus eutactus*, *Corynebacterium diphtheriae*, *Corynebacterium durum*, *Corynebacterium mycetoides*, *Corynebacterium pyruviciproducens* ATCC BAA-1742, *Corynebacterium tuberculostearicum*, *Culturomica massiliensis*, *Cuneatibacter caecimuris*, *Defluviitalea saccharophila*, *Delftia acidovorans*, *Desulfitobacterium chlororespirans*, *Desulfitobacterium metallireducens*, *Desulfosporosinus acididurans*, *Desulfotomaculum halophilum*, *Desulfotomaculum intricatum*, *Desulfotomaculum tongense*, *Desulfovibrio desulfuricans* subsp. *desulfuricans*, *Desulfovibrio idahonensis*, *Desulfovibrio litoralis*, *Desulfovibrio piger*, *Desulfovibrio simplex*, *Desulfovibrio zosterae*, *Desulfuromonas acetoxidans*, *Dethiobacter alkaliphilus* AHT 1, *Dethiosulfatibacter aminovorans*, *Dialister invisus*, *Dialister propionicifaciens*, *Dielma fastidiosa*, *Dietzia alimentaria* 72, *Dorea longicatena*, *Dysgonomonas gadei* ATCC BAA-286, *Dysgonomonas mossii*, *Eggerthella lenta*, *Eikenella corrodens*, *Eisenbergiella tayi*, *Emergencia timonensis*, *Enorma massiliensis* phI, *Enterococcus faecalis*, *Enterorhabdus muris*, *Ethanoligenens harbinense* YUAN-3, *Eubacterium coprostanoligenes*, *Eubacterium limosum*, *Eubacterium oxidoreducens*, *Eubacterium sulci* ATCC 35585, *Eubacterium uniforme*, *Eubacterium ventriosum*, *Eubacterium xylanophilum*, *Extibacter muris*, *Ezakiella peruensis*, *Faecalibacterium prausnitzii*, *Faecalicoccus acidiformans*, *Faecalitalea cylindroides*, *Filfactor villosus*, *Flavonifractor plautii*, *Flintibacter butyricus*, *Frisingicoccus caecimuris*, *Fucophilus fucoidanolyticus*, *Fusicatenibacter saccharivorans*, *Fusobacterium mortiferum*, *Fusobacterium nucleatum* subsp. *vincentii*, *Fusobacterium simiae*, *Fusobacterium varium*, *Garciella nitratireducens*, *Gemella haemolysans*, *Gemmiger formicilis*, *Gordonibacter urolithinfaciens*, *Gracilibacter thermotolerans* JW/YJL-S1, *Granulicatella elegans*, *Guggenheimella bovis*, *Haemophilus haemolyticus*, *Helicobacter typhlonius*, *Hespellia stercorisuis*, *Holdemanella biformis*, *Holdemania massiliensis* AP2, *Howardella ureilytica*, *Hungatella effluvii*, *Hungatella hathewayi*, *Hydrogenoanaerobacterium saccharovorans*, *Ihubacter massiliensis*, *Intestinibacter bartlettii*, *Intestinimonas butyriciproducens*, *Irregularibacter muris*, *Kiloniella laminariae* DSM 19542, *Kroppenstedtia guangzhouensis*, *Lachnoanaerobaculum orale*, *Lachnoanaerobaculum umeaense*, *Lachnoclostridium phytofermentans*, *Lactobacillus acidophilus*, *Lactobacillus algidus*, *Lactobacillus animalis*, *Lactobacillus casei*, *Lactobacillus delbrueckii*, *Lactobacillus fornicalis*, *Lactobacillus iners*, *Lactobacillus pentosus*, *Lactobacillus rogosae*, *Lactococcus garvieae*, *Lactonifactor longoviformis*, *Leptotrichia buccalis*, *Leptotrichia hofstadii*, *Leptotrichia hongkongensis*, *Leptotrichia wadei*, *Leuconostoc inhae*, *Levyella massiliensis*, *Loriellopsis cavernicola*, *Lutispora thermophila*, *Marinilabilia salmonicolor* JCM 21150, *Marvinbryantia formatexigens*, *Mesoplasma photuris*, *Methanobrevibacter smithii* ATCC 35061, *Methanomassiliicoccus luminyensis* BIO, *Methylobacterium extorquens*, *Mitsuokella jalaludinii*, *Mobilitalea sibirica*, *Mobiluncus curtisii*, *Mogibacterium pumilum*, *Mogibacterium timidum*, *Moorella glycerini*, *Moorella humiferrea*, *Moraxella nonliquefaciens*, *Moraxella osloensis*, *Morganella morganii*, *Moryella indoligenes*, *Muribaculum intestinale*, *Murimonas intestini*, *Natranaerovirga pectinivora*, *Neglecta timonensis*, *Neisseria cinerea*, *Neisseria oralis*, *Nocardioides mesophilus*, *Novibacillus thermophilus*, *Ochrobactrum anthropi*, *Odoribacter splanchnicus*, *Olsenella profusa*, *Olsenella uli*, *Oribacterium asaccharolyticum* ACB7, *Oribacterium sinus*, *Oscillibacter ruminantium* GH1, *Oscillibacter valericigenes*, *Oxobacter pfennigii*, *Pantoea agglomerans*, *Papillibacter cinnamivorans*, *Parabacteroides faecis*, *Parabacteroides goldsteinii*, *Parabacteroides gordonii*, *Parabacteroides merdae*, *Parasporobacterium paucivorans*, *Parasutterella excrementihominis*, *Parasutterella secunda*, *Parvimonas micra*, *Peptococcus niger*, *Peptoniphilus duerdenii* ATCC BAA-1640, *Peptoniphilus grossensis* ph5, *Peptoniphilus koenoeneniae*, *Peptoniphilus senegalensis* JC140, *Peptostreptococcus stomatis*, *Phascolarctobacterium succinatutens*, *Phocea massiliensis*, *Pontibacter indicus*, *Porphyromonas bennonis*, *Porphyromonas endodontalis*, *Porphyromonas pasteri*, *Prevotella bergensis*, *Prevotella buccae* ATCC 33574, *Prevotella denticola*, *Prevotella enoeca*, *Prevotella fusca* JCM 17724, *Prevotella loescheii*, *Prevotella nigrescens*, *Prevotella oris*, *Prevotella pallens* ATCC 700821, *Prevotella stercorea* DSM 18206, *Prevotella massilia timonensis*, *Propionispira arcuata*, *Proteus mirabilis*, *Providencia rettgeri*, *Pseudobacteroides cellulosolvens* ATCC 35603 DSM 2933, *Pseudobutyrivibrio ruminis*, *Pseudoflavonfractor capillosus* ATCC 29799, *Pseudomonas aeruginosa*, *Pseudomonas fluorescens*, *Pseudomonas mandeii*, *Pseudomonas nitroreducens*, *Pseudomonas putida*, *Raoultella ornithinolytica*, *Raoultella planticola*, *Raoultibacter massiliensis*, *Robinsoniella peoriensis*, *Romboutsia timonensis*, *Roseburia faecis*, *Roseburia hominis* A2-183, *Roseburia intestinalis*, *Roseburia inulinivorans* DSM 16841, *Rothia dentocariosa* ATCC 17931, *Ruminiclostridium thermocellum*, *Ruminococcus albus*, *Ruminococcus bromii*, *Ruminococcus callidus*, *Ruminococcus champanellensis* 18P13=JCM 17042, *Ruminococcus faecis* JCM 15917, *Ruminococcus flavefaciens*, *Ruminococcus gauvreauii*, *Ruminococcus lactaris* ATCC 29176, *Rummehiibacillus pycnus*, *Saccharofermentans acetigenes*, *Scardovia wiggsiae*, *Schlegelella thermodepolymerans*, *Sedimentibacter hongkongensis*, *Selenomonas sputigena* ATCC 35185, *Slackia exigua* ATCC 700122, *Slackia piriformis* YIT 12062, *Solitalea canadensis*, *Solobacterium moorei*, *Sphingomonas aquatilis*, *Spiroplasma alleghenense*, *Spiroplasma chinense*, *Spiroplasma chrysopicola*, *Spiroplasma

*culicicola, Spiroplasma lampyridicola, Sporobacter termitidis, Staphylococcus aureus, Stenotrophomonas maltophilia, Stomatobaculum longum, Streptococcus agalactiae* ATCC 13813, *Streptococcus cristatus, Streptococcus equinus, Streptococcus gordonii, Streptococcus lactarius, Streptococcus parauberis, Subdoligranulum variabile, Succinivibrio dextrinosolvens, Sutterella stercoricanis, Sutterella wadsworthensis, Syntrophococcus sucromutans, Syntrophomonas zehnderi* OL-4, *Terrisporobacter mayombei, Thermoleophilum album, Treponema denticola, Treponema socranskii, Tyzzerella* nexilis DSM 1787, *Vallitalea guaymasensis, Vallitalea pronyensis, Vampirovibrio chlorellavorus, Veillonella atypica, Veillonella denticariosi, Veillonella dispar, Veillonella parvula, Victivallis vadensis, Vulcanibacillus modesticaldus* and *Weissella confusa.*

In some embodiments, the method further comprises treating the subject predicted to have a non-toxic or effective response with combination immune checkpoint blockade therapy. In some embodiments, the method further comprises treating the subject predicted to have a toxic and/or non-effective response with a composition of the disclosure. In some embodiments, the method further comprises treating the subject with a combination of (i) a PD-1, PDL1, or PDL2 inhibitor and (ii) a CTLA-4, B7-1, or B7-2 inhibitor.

In some embodiments, a toxic, non-toxic, effective, or non-effective response is predicted when one or more bacteria of a phylum, order, family, genera or species described herein is determined to be at least 2%, 3%, 5%, 10%, 15%, 20%, 25%, 30%, 35%, 40%, 45%, 50%, 55%, 60%, 65%, 70%, 75%, 80%, 85%, or 90% (or any derivable range therein) in relative abundance. In some embodiments, a combination of bacteria is determined to have a total relative abundance of at least 2%, 3%, 5%, 10%, 15%, 20%, 25%, 30%, 35%, 40%, 45%, 50%, 55%, 60%, 65%, 70%, 75%, 80%, 85%, or 90% (or any derivable range therein).

The compositions of the disclosure may exclude one or more bacteria genera or species described herein or may include less than $1\times10^6$, $1\times10^5$, $1\times10^4$, $1\times10^3$, or $1\times10^2$ cells or CFU (or any derivable range therein) of one or more of the bacteria described herein.

The favorable or unfavorable profiles described herein may exclude one or more bacteria described herein or may comprise a relative abundance of less than 30%, 25%, 20%, 15%, 10%, 9%, 8%, 7%, 6%, 5%, 4%, 3%, 2%, or 1% (or any derivable range therein) of one or more of the bacteria described herein.

In some embodiments, each of the populations of bacteria is present in the composition at a concentration of at least $1\times10^3$ CFU. In some embodiments, the composition is a live bacterial product or a live biotherapeutic product. In some embodiments, the bacteria are lyophilized, freeze dried, or frozen. In some embodiments, the composition is formulated for oral delivery. In some embodiments, the composition formulated for oral delivery is a tablet or capsule. In some embodiments, the tablet or capsule comprises an acid-resistant enteric coating. In some embodiments, the composition is formulated for administration rectally, via colonoscopy, sigmoidoscopy by nasogastric tube, or enema. In some embodiments, the composition is capable of being re-formulated for final delivery as comprising a liquid, a suspension, a gel, a geltab, a semisolid, a tablet, a sachet, a lozenge, a capsule, or as an enteral formulation. In some embodiments, the composition is formulated for multiple administrations. In some embodiments, the composition further comprises a pharmaceutically acceptable excipient.

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Summary of Invention, Detailed Description of the Embodiments, Claims, and description of Figure Legends.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 2A-G. Molecular and immune predictors of response. (A) Non-synonymous variant (NSV) count in pre-treatment tumor samples (n=26) grouped by binarized best overall response (BOR; R=responder, n=20, NR=non-responder, n=6). Specific objective responses are indicated by color of each data point (p=0.20, Mann-Whitney test). (B) Copy number loss burden (affected genomic regions) in pre-treatment tumor samples (n=26) grouped by binarized best overall response (p<0.05, Mann-Whitney test). (C) Significantly copy number variant (CNV)-affected genes. (D) CNV landscape assessed by whole-exome sequencing (n=26 tumors), showing CNV losses and gains affecting selected genes recurrently mutated in melanoma, IFN-signaling genes and antigen processing/presentation genes. (E) Density of infiltrating CD8+ cells (counts/mm$^2$) in pre-treatment tumors by singlet stain immunohistochemistry grouped by binarized response (n=19 R, n=6 NR; p=0.052, one-sided Mann-Whitney test). (F) Entropy of pre-treatment intratumoral T cell receptor (TCR) repertoires comparing R (n=19) versus NR (n=6) repertoires (p=0.058, Mann-Whitney test). (G) Clonality of pre-treatment intratumoral TCR repertoires grouped by response (n=19 R, n=6 NR; p=0.28, Mann-Whitney test).

FIG. 3A-F. Circulating T cell repertoire composition and phenotype predict toxicity. (A) Comparison of Ki67+ cells within CD8+ T effectors (Teffcells in early on-treatment blood samples between patients (n=14) grouped according to high-grade irAE (p<0.01 andp=0.013, respectively, Mann-Whitney test). (B) Diversity (Inverse Simpson) of the circulating T cell repertoire as measured from TCR sequencing data of pre-treatment peripheral blood lymphocytes (n=24) according to the development (or absence) of ≥Gr3 irAE (p=0.028, Mann-Whitney test). Receipt of prior systemic immunotherapy is indicated by color for each data point. (C) TCR sequencing-derived circulating T cell repertoire entropy in pre-treatment peripheral blood lymphocytes (n=24), grouped according to the development (or absence) of grade 3 or higher immune-related adverse events (≥Gr3 irAE) (p<0.01, Mann-Whitney test). Receipt of prior systemic immunotherapy is indicated by color. (D) Percentage of CD27+ cells within CD4+T effectors (Teff) and (E) of CD28+ cells within CD8+ Teff in pre-treatment peripheral blood samples (Mann-Whitney tests as shown; receipt of prior immunotherapy indicated by color). (F) Stacked bar plot (above) and contingency table (below) depicting the relationship between exposure to prior immunotherapy and risk of developing high-grade immune-related adverse events following combination anti-CTLA-4 and anti-PD-1 blockade (p=0.016, Fisher's exact test).

FIG. 4A-F. Gut microbiome profiles are associated with response and toxicity to CICB. (A) Stacked bar plot depicting microbial composition at the order level of each analyzed fecal sample (n=31). (B) Alpha diversity (Inverse Simpson) of the fecal microbiome grouped by response to combination immune checkpoint blockade (p=0.14, Mann-Whitney test). R=responder, NR=non-responder. (C) Alpha diversity (Inverse Simpson) of the fecal microbiome grouped by development of high-grade immune-related adverse events post initiation of CICB (p=0.59, Mann-Whitney test). (D) LEfSe plot of bacterial taxa differentially associated with either response or non-response to CICB. LDA=linear discriminant analysis. (E) LEfSe plot of bacterial taxa differentially associated with development of, or freedom from, high-grade (≥Grade 3) immune-related adverse events (irAE). (F) Heatmap of correlation (Spearman's rho) between key toxicity-associated or non-toxicity-associated bacterial taxa and circulating immune subsets quantitated by multiparameter flow cytometry of baseline blood samples (n=9). Teff=T effector cells, TCM=T central memory, TEM=T effector memory, Treg=regulatory T cell.

FIG. 5A-E. Microbiome shifts with CICB are associated with tumor size. (A). MCA205 sarcoma (left panels) or RET melanoma (right panels) tumor size after 4 injections of indicated antibody (x-axis). Overall, mice were treated with 6 or 5 injections of anti-PD-1 and anti-CTLA-4 respectively, or the relevant isotype control. Experimental conditions comprised of anti-PD-1 treated (n=6 MCA205, n=6 RET), CICB-treated (n=6 MCA205, n=10 RET) or isotype-treated (n=6 MCA205, n=8 RET) mice. Responders are indicated in blue and non-responders in red, corresponding to tumors that escape despite therapy. Mann-Whitney test was used: *p<0.05, p<0.01, *p<0.001. (B) Beta-diversity of fecal microbiota according to time (orange: before treatment initiation, blue: 48 h after 2 injections, red: 48 h after 5 injections) in MCA205 (left panel) and RET (right panel). (C) Beta-diversity coloured according to tumor size in MCA205 (left panel) and RET (right panel), intensity of purple indicates increasing tumor size. ANOSIM defines the separation of the groups; the p value defines the significance of such separation after 999 permutations of the samples. (D) Venn diagram showing the overlay of bacterial species prior to treatment initiation, shared or not shared between tumor models, corresponding to responders to CICB (left panel). *Flavonfractor plautii* preferentially found in R mice (right panel) which is shared with melanoma patients (FIG. 4D-E). (E) Time course of relative abundances in mice of taxa detected prior to therapy that were found to be differentially-abundant between R (in blue) and NR (in red) in both patients and murine tumor types, contrasting species-level variations in abundance over time.

FIG. 6A-I. Microbiota-dependent ileitis and colitis in tumor-bearing mice. (A-B) Representative micrographs of ilei from MCA205-bearing mice treated with isotype control, CICB or CICB+ATB followed by recolonization with *Erysipelatoclostridium ramosum* or *Bacteroides intestinalis* (scale bar: 50 m). Detailed scoring of H&E-stained ileum of MCA205 tumor bearing mice treated with isotype control or CICB, or antibiotics alone or followed by monocolonisation with *Bacteroides intestinalis* (BI), *Dielma fastidiosa* (DF), or *E. ramosum* (ER), n=9-22/group. Student t-test: *p<0.05. (C) Relative ileal IL1 expression in MCA205- and RET-tumor bearing mice with or without antibiotics, or mono-colonisation with indicated bacteria. n=5-22. (D) Scoring of H&E-stained ilei of MCA205 tumor bearing mice treated with CICB or CICB with blockade of IL1R1 receptor, n=10-12 mice/group. (E) Pathological assessment of inflammatory areas in the lamina propria after H&E-staining of colons in RET- or MCA205-tumor bearing mice treated with isotype control or CICB, n=7-16/group. (F) Beta diversity (Bray-Curtis dissimilarity) of the fecal microbiota assessed in 16S rDNA sequencing of gene amplicons colored according to score of colonic inflammatory infiltrates in RET tumor-bearing mice, intensity of purple indicating increasing inflammatory infiltrate score (left panel). Relative abundance of *Bacteroides intestinalis* and *Vampirovibrio chlorellavorus*, which are shared between mice and patients (right panel) contrasting abundance by response (NR, red; R blue) and hosts exhibiting colon toxicity from those who did not (high inflammatory score, green; low inflammatory score, yellow). (G) Experimental setting used in (H) and (I): FMT with non-responder (NR) kidney cancer patient feces was performed following 3 days of antibiotics in SPF mice. Two weeks later, luciferase-expressing RENCA cells were orthotopically implanted. Five days later, isotype control or CICB with or without oral gavage with *Akkermansia muciniphila* (Akk) or FMT with feces from a responder (R) patient who did not experience grade 3-4 irAE was performed. (H-I) Pathological assessment of inflammatory areas in the colonic lamina propria after H&E-staining in RENCA tumor-bearing mice treated with isotype control or CICB at day 15. (I) ELISA of fecal lipocalin-2 levels (n=16/group). Mann-Whitney test in C, D, E, H, I: *p<0.05, p<0.01, *p<0.001.

FIG. 7A-B, relating to FIG. 1 and Table 3: Patient treatment outcomes. (A) Kaplan-Meier curve of progression-free survival in the patient cohort (n=53). (B) Swimmer plot indicating per-patient best overall response (color shading), duration of best overall response (length of shaded portion of bar), and duration of overall follow-up (shaded+ unshaded portion of bar), measured from the day of first dose of combined immune checkpoint blockade therapy.

FIG. 8A-E, relating to FIG. 2: Molecular markers of combined immune checkpoint blockade. (A) Landscape of non-synonymous variants (NSV) identified by whole-exome sequencing (n=26 tumors) affecting selected genes recurrently mutated in melanoma, IFN-signaling genes and antigen processing/presentation genes. (B) NSV count compared between BRAF V600-mutated (n=19) and wild-type (n=6) patients (p<0.001, permutation test). (C) Differences in counts of total predicted neoantigens, and all-, strong- or weak-binding neoantigens in patients grouped by best overall response (R=responder (blue), n=20; NR=non-responder (red), n=6; all p>0.05, Mann-Whitney test). (D) Barplot of number of genes affected by copy number losses by chromosome demonstrating dominant burden within chromosomes 5, 10 and 15. (E) genome-wide SGOL scores show enrichment of CNVs affecting chromosome 10.

FIG. 9A-E, relating to FIG. 2 and FIG. 3: Immune markers of CICB response and toxicity. (A) Comparison of CD8+ cell density within tumors prior to (Pre) and after (Post) initiation of CICB (n=19 R, n=6 NR; p=ns, Mann-Whitney test; best overall response (BOR) indicated by color of each data point). (B) Boxplots of the number of significantly-expanded T cell clones (pre- to on-treatment) detected by TCR sequencing of the peripheral blood immune repertoire, grouped by presence or absence of high-grade immune-related adverse events (Gr3 irAE; n=7 Yes, n=9 No; p=0.22, Mann-Whitney test). (C) Comparison of Ki67+ cells within T central memory (TCM) cells in early on-treatment blood samples between patients (n=14) grouped according to high-grade irAE (p<0.01 and p=0.013, respectively, Mann-Whitney test). (D) Percentage of CD28+ cells within CD4+ Teff and of (E) CD27+ cells within CD8+ Teff prior to treatment initiation, according to high-grade irAE (p=0.014, p>0.05, respectively, Mann-Whitney test). Percentage of CD27+ of CD28+ cells within CD4+ Teff.

FIG. 10A-E, relating to FIG. 4: Fecal microbiome characteristics associated with CICB response and toxicity. (A) Alpha diversity of the gut microbiota in CICB-treated patients (n=31) taken prior to or shortly after commencement of therapy, measured by the indicated metrics (p values as shown, Mann-Whitney test). (B-C) Volcano plots of pairwise comparisons of OTUs (all taxonomic levels) by dichotomized response categories (B) or development of high-grade toxicity (C). (D) Heatmap of correlation (Spearman's r) between response or non-response-associated taxa and circulating immune cell populations at baseline (n=9).

FIG. 11A-D relating to FIG. 5. Kinetics of therapy-induced shifts in intestinal bacteria composition and correlations with tumor sizes. (A, C). LEfSe plot of discriminating species 48 hours after 2 (A) or 5 (C) mAb injections (orange: isotype control antibody, purple: anti-PD-1 antibody, green: CICB). Linear discriminant analysis (LDA) was coupled with effect size measurements to represent species differentially present among each treatment group. LDA score ≥2 (B, D) Heat map of Spearman correlation indices, representing the correlation of each bacterial species after 2 (B) or 5 (D) injections identified from the LEfSe analysis for each tumor model with tumor size, listed in alphabetical order. Red represents a positive correlation, whilst blue represents a negative correlation with tumor size. *p<0.05.

FIG. 13A-F. Gut microbiome influences responses to anti-PD1 therapy in late-stage melanoma patients through beneficial changes in the anti-tumor immune infiltrate A) Alpha-diversity comparison between responders (R) and non-responders (NR) in the gut microbiome. B) LDA effect sizes histogram shows bacteria differentially enriched in R vs NR, where the length of the bar indicates the effect size associated with a taxon. C) Spearman correlation matrix between pro-R gut bacteria and immune infiltrate within the tumor (n=15) as quantified by immunohistochemistry. D) Experimental design of studies in germ-free mice. E) Tumor growth curves in mice treated with anti-PDL1 post transplantation with responder (R-FMT-Square) or non-responder (NR-FMT—triangle) stool or No FMT (circle). F) *Faecalibacterium* levels in the stool of R-FMT vs NR-FMT mice on day 14 post tumor injection

FIG. 15A-D: Molecular and immune predictors of response A) Copy number loss burden (CNV) (affected genomic regions) in pre-treatment tumor samples (n=26) grouped by binarized best overall response (p<0.05, Mann-Whitney test). B) CNV landscape assessed by whole-exome sequencing (n=26 tumors), of selected genes recurrently mutated in melanoma, IFN-signaling genes and antigen processing/presentation genes. C) top) Diversity (Inverse Simpson) of the pre-treatment circulating T cell repertoire (n=24) according to the development (or absence) of ≥Gr3 irAE (p=0.028, Mann-Whitney test), and bottom) Entropy of the circulating T cell repertoire of pre-treatment peripheral blood lymphocytes (n=24) according to the development (or absence) of ≥Gr3 irAE. D) top) CD27 expression within CD4+T-effector cells and bottom) CD28 expression within CD8+ T-effector cells, grouped according to < or ≥Gr3 irAE (n=15; p<0.01, p<0.05, respectively, Mann-Whitney test).

FIG. 16A-C: Characterization of the gut microbiome by 16S rRNA sequencing. A) Stacked bar plot depicting microbial composition of each analyzed fecal sample from the cutaneous and unknown primary cohort at the order level (n=40). B) Alpha diversity of the fecal microbiome grouped by response in CICB-treated patients with cutaneous or unknown primary melanomas (n=40) taken prior to or shortly after commencement of therapy, measured by the indicated metrics (p=0.68, Mann-Whitney test; R=responder, NR=non-responder). C) Alpha diversity (Inverse Simpson) of the fecal microbiome grouped by development of high-grade immune-related adverse events in all patients with fecal samples (p=0.71, Mann-Whitney test, n=54).

FIG. 20A-C. Gut microbial associations with CICB response. (A) Partial Least Squares Discriminant Analysis (PLS-DA) plot of the variance in beta-diversity at T0, between CICB treated mice which were eventually tumor-free or tumor-bearing at sacrifice, in both tumor models combined. LV, latent variable. (B) Variable importance (VIP) score barplot highlighting bacterial species present at T0 significantly enriched (*p<0.05, p<0.01, *p<0.001) in the group defined by the bar color compared to the group defined by the border color, indicating mice that were eventually tumor-free versus tumor-bearing following CICB treatment (RET and MCA205 models). For each species, the bar color depicts the cohort with the highest mean relative abundance for a defined species, whilst the border color indicates the cohort with the lowest mean relative abundance. An absent border indicates mean relative abundance of zero in the compared cohort(s). The green box highlights species in common with patient data. Mann-Whitney test: *p<0.05, p<0.01, *p<0.001, ns=not significant. Bar thickness reports the fold ratio value of the mean relative abundances for each species among the two cohorts. N/A=not applicable. (C) Pearson correlation of the relative abundance of *Parabacteroides distasonis* (at T0, T2, and T5) in CICB treated mice with tumor size at T5.

FIG. 22A-G. Gut microbiome profiles are associated with response and toxicity to CICB. (A) Scoring (range 0-4) of H&E-stained ilea of MCA205 or RET tumor-bearing mice treated with isotype control or CICB, ±antibiotics, n=9-22/group. Student's t-test. (B) Heat map of $\log_2$-fold change of pro-inflammatory immune gene expression (CICB-treated vs isotype) in ilea and colons of MCA205 and RET tumor-bearing mice±antibiotics (left panel). (C) Relative ileal Il1b expression in tumor-bearing mice treated with isotype/CICB±antibiotics. Mann-Whitney test. n=10-22 mice/group. (D) qPCR quantification of the relative abundance of *Bacteroides intestinalis* in stools of mice from isotype versus CICB-treated groups, before versus after therapy in a paired manner (linked dots). n=21-26 mice/group. Wilcoxon signed-rank test. Relative ileal Il1b expression (E) and ileal toxicity scoring (F) 48 hrs after one CICB injection, in mice treated with antibiotics, then after cessation of antibiotics, allowed to recolonize naturally or gavaged once with *Bacteroides intestinalis* in MCA205 (n=5-32/group, grey dots) and RET (n=5-26/group, white dots) combined. Data represent a pool of two individual experiments using three different strains of *B. intestinalis*. For ileal toxicity scoring, mice were classified according to low (score 0 or 1) vs high toxicity (score 2, 3 or 4), Chi-square test. Ileal Il1b expression analyzed using Mann-Whitney test. (G) Ileal toxicity scores following CICB (or isotype) treatment comparing mice colonized with *B. intestinalis*-high versus-low donor FMT. *p<0.05, p<0.01, *p<0.001

FIG. 26A-B Comparison of group-wise abundances of *Firmicutes* (A) and *Clostridiales* (B) by response outcome in the cutaneous/unknown primary cohort (n=40).

FIG. 27A-D. Microbiome and response in murine models. (A) MCA205 fibrosarcoma (left panel) or RET melanoma (middle panel) tumor growth kinetics and percentage of tumor-bearing or tumor-free mice at sacrifice (right panel) after 5 injections of indicated antibody. Experimental groups comprised of isotype, anti-PD-1 or CICB treatment. Arrows on x-axis indicate a feces collection time point: T0=before treatment initiation, T2=48 hours after 2 treatments, T5=48 hours after 5 treatments. Tumor growth shown is representative of 2 experiments. n=12-16 mice/group. Statistical analysis was performed using software detailed in methods: p<0.01, *p<0.001. (B) Microbial alpha diversity (upper panel) and Partial Least Square Discriminant Analysis (PLS-DA) of fecal microbial beta diversity (lower panel) in fecal samples taken before treatment initiation (T0, orange), 48 hours after 2 injections (T2, blue) and 48 hours after 5 injections (T5, red) of CICB or isotype control in MCA205 (left panel) and RET (right panel) tumor-bearing mice assessed by sequencing of 16S rRNA gene amplicons using the Shannon index. Mann-Whitney U test: *p<0.05, **p<0.01. ANOSIM and PERMANOVA define the separation of the groups; p values define the significance of group separation after 999 permutations of the samples. (C) Beta-diversity at T0 colored according to tumor size at T5 in CICB-treated MCA205 and RET; intensity of purple indicates increasing tumor size. For each principal coordinate axis (PCo1 and PCo2), the collected variance, the Pearson rho coefficient and the corresponding p value are shown. (D) Relative abundance of *P. distasonis* in feces sampled from mice at T0, T2, and T5, contrasting mice eventually found to be tumor-bearing or tumor-free at T5 in both tumor models combined. Mann-Whitney test: *p<0.05.

FIG. 28A-H. (A) Representative micrographs of ilea from MCA205 and RET-bearing mice treated with isotype or CICB (scale bar: 50 magnification: 100×) (left panel). (B) Graph providing quantitation of the extent of inflammatory infiltrates in the colon from MCA205 and RET-bearing mice treated with isotype or CICB compared to control untreated mice. (C). Heatmap of correlation (Pearson's rho) between colonic infiltrate score and relative abundance of taxa at T0, T2 and T5 for RET in combined discovery and validation cohort data. Red represents a positive correlation, whilst blue represents a negative correlation with colonic infiltrate score. (D) Beta diversity ordination (Bray-Curtis dissimilarity) of the fecal microbiota assessed by sequencing of 16S rRNA gene amplicons colored according to score of colonic inflammatory infiltrate in RET tumor-bearing mice, intensity of purple indicates increasing inflammatory infiltrate score in the discovery (left panel) and validation (right panel) cohort. Bacterial relative abundances and colonic inflammatory infiltrate were both normalized and standardized before correlation analysis. Pearson correlation and associated p-values comparing each principal component with inflammatory infiltrate are indicated. (E) qPCR quantification of the relative abundance of *Bacteroides uniformis* and *Bacteroides fragilis* in stools of mice in isotype control versus CICB treated-groups, before versus after at least one injection of CICB therapy in a paired manner (linked dots), n=21-26/group. (F) Schematic of experimental setting used in FIG. 3K and panels H-I. (G) *B. intestinalis* abundance in healthy volunteer donor feces (selected for low vs high) and confirmed engraftment in mice following FMT comparing control, B. int-low and B. int-high donor recipient mice (*p<0.05, Mann-Whitney test). (H) relative Il1b expression in mice following CICB after FMT with *B. intestinalis*-low or -high donor feces (*p<0.05, Mann-Whitney test).

DESCRIPTION OF ILLUSTRATIVE EMBODIMENTS

Figure 1:
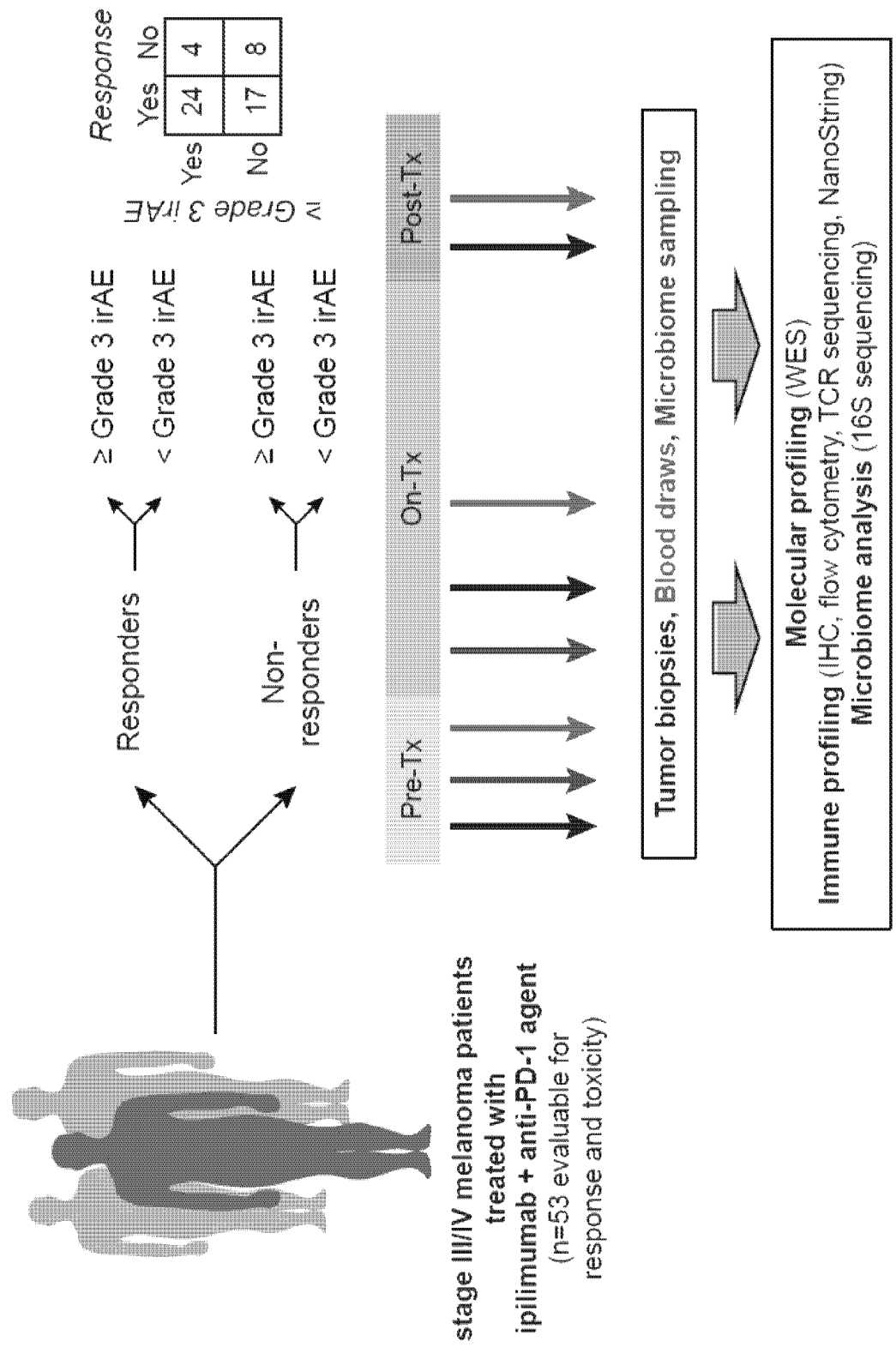
FIG. 1. Patient cohort and biospecimen schema. Patients with advanced melanoma (n=53) were evaluated for clinical outcomes and correlative biospecimen (tumor, peripheral blood mononuclear cells, fecal microbiome) analyses prior to and following initiation of combined anti-CTLA-4 and anti-PD-1 blockade.

Treatment with combined immune checkpoint blockade (CICB) targeting cytotoxic T lymphocyte antigen-4 (CTLA-4) and programmed death receptor-1 (PD-1) is associated with clinical benefit across several tumor types but a high rate of immune related adverse events (irAE). Therefore, biomarkers of response to CICB and likelihood of developing irAE after treatment with CICB are needed. Described herein are microbial determinants of response and toxicity to CICB that were identified in the gut microbiota in human and murine cohorts. The examples of the application also provide evidence that targeting these can reduce toxicity in preclinical models. Together, these findings have potentially important implications for clinical management of cancer using CICB.

I. DEFINITIONS

As used herein, the term "antibody" refers to an immunoglobulin, derivatives thereof which maintain specific binding ability, and proteins having a binding domain which is homologous or largely homologous to an immunoglobulin binding domain. These proteins may be derived from natural sources, or partly or wholly synthetically produced. An antibody may be monoclonal or polyclonal. The antibody may be a member of any immunoglobulin class, including any of the human classes: IgG, IgM, IgA, IgD, and IgE. Antibodies used with the methods and compositions described herein are generally derivatives of the IgG class. The term antibody also refers to antigen-binding antibody fragments. Examples of such antibody fragments include, but are not limited to, Fab, Fab', F(ab')2, scFv, Fv, dsFv diabody, and Fd fragments. Antibody fragments may be produced by any means. For instance, the antibody fragment may be enzymatically or chemically produced by fragmentation of an intact antibody, it may be recombinantly produced from a gene encoding the partial antibody sequence, or it may be wholly or partially synthetically produced. The antibody fragment may optionally be a single chain antibody fragment. Alternatively, the fragment may comprise multiple chains which are linked together, for instance, by disulfide linkages. The fragment may also optionally be a multimolecular complex. A functional antibody fragment retains the ability to bind its cognate antigen at comparable affinity to the full antibody.

The term "monoclonal antibody" as used herein refers to an antibody obtained from a population of substantially homogeneous antibodies, e.g., the individual antibodies comprising the population are identical except for possible mutations, e.g., naturally occurring mutations, that may be present in minor amounts. Thus, the modifier "monoclonal" indicates the character of the antibody as not being a mixture of antibodies with different epitope specificities. In certain embodiments, such a monoclonal antibody typically includes an antibody comprising a polypeptide sequence that binds a target, wherein the target-binding polypeptide sequence was obtained by a process that includes the selection of a single target binding polypeptide sequence from a plurality of polypeptide sequences. For example, the selection process can be the selection of a unique clone from a plurality of clones, such as a pool of hybridoma clones, phage clones, or recombinant DNA clones. It should be understood that a selected target binding sequence can be further altered, for example, to improve affinity for the target, to humanize the target binding sequence, to improve its production in cell culture, to reduce its immunogenicity in vivo, to create a multispecific antibody, etc., and that an antibody comprising the altered target binding sequence is also a monoclonal antibody of this disclosure. In contrast to polyclonal antibody preparations, which typically include several different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins.

The phrases "pharmaceutical composition" or "pharmacologically acceptable composition" refers to molecular entities and compositions that do not produce an adverse, allergic, or other untoward reaction when administered to an animal, such as a human, as appropriate. The preparation of a pharmaceutical composition comprising an antibody or additional active ingredient will be known to those of skill in the art in light of the present disclosure. Moreover, for animal (e.g., human) administration, it will be understood that preparations should meet sterility, pyrogenicity, general safety, and purity standards as required by FDA Office of Biological Standards.

As used herein, "pharmaceutically acceptable carrier" includes any and all aqueous solvents (e.g., water, alcoholic/aqueous solutions, saline solutions, parenteral vehicles, such as sodium chloride, and Ringer's dextrose), non-aqueous solvents (e.g., propylene glycol, polyethylene glycol, vegetable oil, and injectable organic esters, such as ethyloleate), dispersion media, coatings, surfactants, antioxidants, preservatives (e.g., antibacterial or antifungal agents, anti-oxidants, chelating agents, and inert gases), isotonic agents, absorption delaying agents, salts, drugs, drug stabilizers, gels, binders, excipients, disintegration agents, lubricants, sweetening agents, flavoring agents, dyes, fluid and nutrient replenishers, such like materials and combinations thereof, as would be known to one of ordinary skill in the art. The pH and exact concentration of the various components in a pharmaceutical composition may be adjusted according to well-known parameters.

The term "unit dose" or "dosage" refers to physically discrete units suitable for use in a subject, each unit containing a predetermined quantity of the therapeutic composition calculated to produce the desired responses discussed herein in association with its administration, i.e., the appropriate route and treatment regimen. The quantity to be administered, both according to number of treatments and unit dose, depends on the effect desired. The actual dosage amount of a composition of the present embodiments administered to a patient or subject can be determined by physical and physiological factors, such as body weight, the age, health, and sex of the subject, the type of disease being treated, the extent of disease penetration, previous or concurrent therapeutic interventions, idiopathy of the patient, the route of administration, and the potency, stability, and toxicity of the particular therapeutic substance. For example, a dose may also comprise from about 1 µg/kg/body weight to about 1000 mg/kg/body weight (this such range includes intervening doses) or more per administration, and any particular dose derivable therein. In non-limiting examples of a range derivable from the numbers listed herein, a range of about 5 µg/kg/body weight to about 100 mg/kg/body weight, about 5 µg/kg/body weight to about 500 mg/kg/body weight, etc., can be administered. The practitioner responsible for administration will, in any event, determine the concentration of active ingredient(s) in a composition and appropriate dose(s) for the individual subject.

A "population" of bacteria may refer to a composition of bacteria comprising a single species, or a mixture of different species.

The term "immune checkpoint" refers to various stimulatory, co-stimulatory and inhibitory signals that regulate the breadth and magnitude of the immune response that are essential for the maintenance of immune homeostasis and host survival. Known immune checkpoint proteins comprise CTLA-4, PD-1 and its ligands PD-L1 and PD-L2 and in addition LAG-3, BTLA, B7H3, B7H4, TIM3, KIR. The pathways involving LAG3, BTLA, B7H3, B7H4, TIM3, and KIR are recognized in the art to constitute immune checkpoint pathways similar to the CTLA-4 and PD-1 dependent pathways (see e.g. Pardoll, 2012, Nature Rev Cancer 12:252-264; Mellman et al., 2011, Nature 480:480-489).

The term "inhibitor" refers to a molecule that may be organic or inorganic, a protein, polypeptide, antibody, small molecule, carbohydrate, or nucleic acid that blocks or decreases one or more functions of the protein. The inhibitor may be a direct inhibitor that acts by directly interacting with the protein or an indirect inhibitor that may not interact directly with the protein but still inhibits one or more functions of the protein.

An "immune checkpoint inhibitor" refers to any compound inhibiting the function of an immune checkpoint protein. Inhibition includes reduction of function and full blockade. In particular the immune checkpoint protein is a human immune checkpoint protein. Thus the immune checkpoint protein inhibitor in particular is an inhibitor of a human immune checkpoint protein.

"Subject" and "patient" refer to either a human or non-human, such as primates, mammals, and vertebrates. In particular embodiments, the subject is a human.

As used herein, the terms "treat," "treatment," "treating," "ameliorating", or "amelioration" when used in reference to a disease, disorder or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), diminishment of extent of the deficit, stabilized (i.e., not worsening) state of a tumor or malignancy, delay or slowing of tumor growth and/or metastasis, and an increased lifespan as compared to that expected in the absence of treatment.

The "gut microbiota" or "gut microbiome" designates the population of microorganisms (and their genomes) living in the intestine of a subject.

The term "alpha diversity" is a measure of intra-sample diversity and refers to the distribution and assembly patterns of all microbiota within samples and is calculated as a scalar value for each sample. "Beta diversity" is a term for inter-sample diversity, and involves the comparison of samples to each which provides a measure of the distance or dissimilarity between each sample pair.

The term "relative amount", which can also be designated as the "relative abundance", is defined as the number of bacteria of a particular taxonomic level (from phylum to species) as a percentage of the total number of bacteria of that level in a biological sample. This relative abundance can be assessed, for example, by measuring the percentage of 16S rRNA gene sequences present in the sample which are assigned to these bacteria. It can be measured by any appropriate technique known by the skilled artisan, such as 454 pyrosequencing of the specific bacterial 16S rRNA gene markers or quantitative PCR of a specific gene.

In the present text, a "good responder to a treatment", also called a "responder" or "responsive" patient or in other words a patient who "benefits from" this treatment, refers to a patient who is affected with a cancer and who shows or will show a clinically significant relief in the cancer after receiving this treatment. Conversely, a "bad responder" or "non-responder" is one who does not or will not show a clinically significant relief in the cancer after receiving this treatment. The decreased response to treatment may be assessed according to the standards recognized in the art, such as immune-related response criteria (irRC), WHO or RECIST criteria. For example, a responsive patient may be one identified as having a complete response (CR), which is disappearance of all target lesions or a partial response (PR), which is at least a 30% decrease in the sum of the longest diameter (LD) target lesions (taking as reference the baseline sum LD), and a non-responsive patient may be identified as having stable disease (SD), which corresponds to neither sufficient shrinkage to qualify for PR nor sufficient increase to qualify for progressive disease (PD) (taking as reference the smallest LD sum since the treatment started) or progressive disease (PD), which is at least a 20% increase in the sum of the LD of target lesions (taking as reference the smallest sum LD recorded since the treatment started or the appearance of one or more new lesions).

The term "isolated" encompasses a bacterium or other entity or substance that has been (1) separated from at least some of the components with which it was associated when initially produced (whether in nature or in an experimental setting), and/or (2) produced, prepared, purified, and/or manufactured by the hand of man. Isolated bacteria may be separated from at least about 10%, about 20%, about 30%, about 40%, about 50%, about 60%, about 70%, about 80%, about 90%, or more of the other components with which they were initially associated. In some embodiments, isolated bacteria are more than about 80%, about 85%, about 90%, about 91%, about 92%, about 93%, about 94%, about 95%, about 96%, about 97%, about 98%, about 99%, or more than about 99% pure. As used herein, a substance is "pure" if it is substantially free of other components.

The terms "purify," "purifying" and "purified" refer to a bacterium or other material that has been separated from at least some of the components with which it was associated either when initially produced or generated (e.g., whether in nature or in an experimental setting), or during any time after its initial production. A bacterium or a bacterial population may be considered purified if it is isolated at or after production, such as from a material or environment containing the bacterium or bacterial population, and a purified bacterium or bacterial population may contain other materials up to about 10%, about 20%, about 30%, about 40%, about 50%, about 60%, about 70%, about 80%, about 90%, or above about 90% and still be considered "isolated." In some embodiments, purified bacteria and bacterial populations are more than about 80%, about 85%, about 90%, about 91%, about 92%, about 93%, about 94%, about 95%, about 96%, about 97%, about 98%, about 99%, or more than about 99% pure. In the instance of bacterial compositions provided herein, the one or more bacterial types present in the composition can be independently purified from one or more other bacteria produced and/or present in the material or environment containing the bacterial type. Bacterial compositions and the bacterial components thereof are generally purified from residual habitat products.

The term "determined to have" refers to a patient population that has been tested and reported as having a certain outcome, such as microbiome status.

The terms "lower," "reduced," "reduction," "decrease," or "inhibit" are all used herein generally to mean a decrease by a statistically significant amount. However, for 5 avoidance of doubt, "lower," "reduced," "reduction, "decrease," or "inhibit" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level.

The terms "increased," "increase," "enhance," or "activate" are all used herein to generally mean an increase by a statically significant amount; for the avoidance of any doubt, the terms "increased," "increase," "enhance," or "activate" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. The term permits the presence of additional elements that do not materially affect the basic and novel or functional characteristic(s) of that embodiment of the invention. With respect to pharmaceutical compositions, the term "consisting essentially of" includes the active ingredients recited, excludes any other active ingredients, but does not exclude any pharmaceutical excipients or other components that are not therapeutically active. It is contemplated that embodiments described in the context of the term "comprising" may also be implemented in the context of the term "consisting of" or "consisting essentially of."

The term "consisting of" refers to compositions, methods, and respective components thereof as described herein, which are exclusive of any element not recited in that description of the embodiment.

As used in this specification and the appended claims, the singular forms "a", "an", and "the" include plural references unless the context clearly dictates otherwise. Thus for example, references to "the method" includes one or more methods, and/or steps of the type described herein and/or which will become apparent to those persons skilled in the art upon reading this disclosure and so forth.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.01%. Most preferred is a composition in which no amount of the specified component can be detected with standard analytical methods.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

Throughout this application, the term "about" is used according to its plain and ordinary meaning in the area of cell biology to indicate that a value includes the standard deviation of error for the device or method being employed to determine the value.

The phrase "effective amount" or "therapeutically effective amount" or "sufficient amount" means a dosage of a drug or agent sufficient to produce a desired result. The desired result can be a decrease in tumor size, a decrease in the rate of growth of cancer cells, a decrease in metastasis, increase in CD8+ T lymphocytes in the tumor or tumor immune infiltrate, an increase in CD45+, CD3+/CD20+/CD56+, CD68+ and/or HLA-DR+ cells in the tumor, an increase in CD3, CD8, PD1, FoxP3, Granzyme B and/or PD-L1 expression in a tumor immune infiltrate, a decrease in RORγT expression in a tumor immune infiltrate, an increase of effector CD4+, CD8+ T, monocytes and/or myeloid dendritic cell in the systemic circulation or the peripheral blood, a decrease of B cells, regulatory T cells and/or myeloid derived suppressor cells in the systemic circulation or the peripheral blood of the subject or any combination of the above.

II. CHECKPOINT INHIBITORS AND COMBINATION TREATMENT

Embodiments relate to a combination treatment comprising a) a CTLA-4, B7-1, and/or B7-2 inhibitor and b) a PD-1, PDL1, and/or PDL2 inhibitor. In some embodiments, the treatment is with a combination of an inhibitor that blocks the interaction between CTLA-4 and B7-1 or B7-2 and an inhibitor that blocks the interaction of PD-1 and PDL1 or PDL2.

In some embodiments of any one of the methods, compositions or kits provided, the immune checkpoint inhibitor is a small molecule inhibitor. In some embodiments of any one of the methods, compositions or kits provided, the immune checkpoint inhibitor is a polypeptide that inhibits an immune checkpoint pathway. In some embodiments of any one of the methods, compositions or kits provided, the inhibitor is a fusion protein. In some embodiments of any one of the methods, compositions or kits provided, the immune checkpoint inhibitor is an antibody. In some embodiments of any one of the methods, compositions or kits provided, the antibody is a monoclonal antibody.

A. PD-1, PDL1, and PDL2 Inhibitors

PD-1 can act in the tumor microenvironment where T cells encounter an infection or tumor. Activated T cells upregulate PD-1 and continue to express it in the peripheral tissues. Cytokines such as IFN-gamma induce the expression of PDL1 on epithelial cells and tumor cells. The main role of PD-1 is to limit the activity of effector T cells in the periphery and prevent excessive damage to the tissues during an immune response. Inhibitors of the disclosure may block one or more functions of PD-1 and/or PDL1 activity.

Alternative names for "PD-i" include CD279 and SLEB2. Alternative names for "PDL1" include B7-H1, B7-4, CD274, and B7-H. Alternative names for "PDL2" include B7-DC, Btdc, and CD273. In some embodiments, PD-1, PDL1, and PDL2 are human PD-1, PDL1 and PDL2.

In some embodiments, the PD-1 inhibitor is a molecule that inhibits the binding of PD-1 to its ligand binding partners. In a specific aspect, the PD-1 ligand binding partners are PDL1 and/or PDL2. In another embodiment, a PDL1 inhibitor is a molecule that inhibits the binding of PDL1 to its binding partners. In a specific aspect, PDL1 binding partners are PD-1 and/or B7-1. In another embodiment, the PDL2 inhibitor is a molecule that inhibits the binding of PDL2 to its binding partners. In a specific aspect, a PDL2 binding partner is PD-1. The inhibitor may be an antibody, an antigen binding fragment thereof, an immunoadhesin, a fusion protein, or oligopeptide. Exemplary antibodies are described in U.S. Pat. Nos. 8,735,553, 8,354,509, and 8,008,449, all incorporated herein by reference. Other PD-1 inhibitors for use in the methods and compositions provided herein are known in the art such as described in U.S. Patent Application Nos. US2014/0294898, US2014/022021, and US2011/0008369, all incorporated herein by reference.

In some embodiments, the PD-1 inhibitor is an anti-PD-1 antibody (e.g., a human antibody, a humanized antibody, or a chimeric antibody). In some embodiments, the anti-PD-1 antibody is selected from the group consisting of nivolumab, pembrolizumab, and pidilizumab. In some embodiments, the PD-1 inhibitor is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PDL1 inhibitor comprises AMP-224. Nivolumab, also known as MDX-1106-04, MDX-1106, ONO-4538, BMS-936558, and OPDIVO®, is an anti-PD-1 antibody described in WO2006/121168. Pembrolizumab, also known as MK-3475, Merck 3475, lambrolizumab, KEYTRUDA®, and SCH-900475, is an anti-PD-1 antibody described in WO2009/114335. Pidilizumab, also known as CT-011, hBAT, or hBAT-1, is an anti-PD-1 antibody described in WO2009/101611. AMP-224, also known as B7-DCIg, is a PDL2-Fc fusion soluble receptor described in WO2010/027827 and WO2011/066342. Additional PD-1 inhibitors include MEDI0680, also known as AMP-514, and REGN2810.

In some embodiments, the immune checkpoint inhibitor is a PDL1 inhibitor such as Durvalumab, also known as MEDI4736, atezolizumab, also known as MPDL3280A, avelumab, also known as MSB00010118C, MDX-1105, BMS-936559, or combinations thereof. In certain aspects, the immune checkpoint inhibitor is a PDL2 inhibitor such as rHIgM12B7.

In some embodiments, the antibody described herein (such as an anti-PD-1 antibody, an anti-PDL1 antibody, or an anti-PDL2 antibody) further comprises a human or murine constant region. In some embodiments, the human constant region is selected from the group consisting of IgG1, IgG2, IgG2, IgG3, and IgG4. In a still further specific aspect, the human constant region is IgG1. In a still further aspect, the murine constant region is selected from the group consisting of IgG1, IgG2A, IgG2B, and IgG3. In a still further specific aspect, the antibody has reduced or minimal effector function. In a still further specific aspect, the minimal effector function results from production in prokaryotic cells. In a still further specific aspect the minimal effector function results from an "effector-less Fc mutation" or aglycosylation.

In some embodiments, the inhibitor comprises the heavy and light chain CDRs or VRs of nivolumab, pembrolizumab, or pidilizumab. Accordingly, in one embodiment, the inhibitor comprises the CDR1, CDR2, and CDR3 domains of the VH region of nivolumab, pembrolizumab, or pidilizumab, and the CDR1, CDR2 and CDR3 domains of the VL region of nivolumab, pembrolizumab, or pidilizumab. In another embodiment, the antibody competes for binding with and/or binds to the same epitope on PD-1, PDL1, or PDL2 as the above-mentioned antibodies. In another embodiment, the antibody has at least about 70, 75, 80, 85, 90, 95, 97, or 99% (or any derivable range therein) variable region amino acid sequence identity with the above-mentioned antibodies.

Accordingly, an antibody used herein can be aglycosylated. Glycosylation of antibodies is typically either N-linked or O-linked. N-linked refers to the attachment of the carbohydrate moiety to the side chain of an asparagine residue. The tripeptide sequences asparagine-X-serine and asparagine-X-threonine, where X is any amino acid except proline, are the recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-acetylgalactosamine, galactose, or xylose to a hydroxy amino acid, most commonly serine or threonine, although 5-hydroxyproline or 5-hydroxylysine may also be used. Removal of glycosylation sites from an antibody is conveniently accomplished by altering the amino acid sequence such that one of the above-described tripeptide sequences (for N-linked glycosylation sites) is removed. The alteration may be made by substitution of an asparagine, serine or threonine residue within the glycosylation site another amino acid residue (e.g., glycine, alanine or a conservative substitution).

The antibody or antigen binding fragment thereof, may be made using methods known in the art, for example, by a process comprising culturing a host cell containing nucleic acid encoding any of the previously described anti-PDL1, anti-PD-1, or anti-PDL2 antibodies or antigen-binding fragment in a form suitable for expression, under conditions suitable to produce such antibody or fragment, and recovering the antibody or fragment.

B. CTLA-4, B7-1, and B7-2

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to B7-1 (CD80) or B7-2 (CD86) on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to B7-1 and B7-2 on antigen-presenting cells. CTLA-4 transmits an inhibitory signal to T cells, whereas CD28 transmits a co-stimulatory signal. Intracellular CTLA-4 is also found in regulatory T cells and may be important to their function. T cell activation through the T cell receptor and CD28 leads to increased expression of CTLA-4, an inhibitory receptor for B7 molecules. Inhibitors of the disclosure may block one or more functions of CTLA-4, B7-1, and/or B7-2 activity. In some embodiments, the inhibitor blocks the CTLA-4 and B7-1 interaction. In some embodiments, the inhibitor blocks the CTLA-4 and B7-2 interaction.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156; Hurwitz et al., 1998; can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001/014424, WO2000/037504, and U.S. Pat. No. 8,017,114; all incorporated herein by reference.

A further anti-CTLA-4 antibody useful as a checkpoint inhibitor in the methods and compositions of the disclosure is ipilimumab (also known as 10D1, MDX-010, MDX-101, and Yervoy®) or antigen binding fragments and variants thereof (see, e.g., WO01/14424).

In some embodiments, the inhibitor comprises the heavy and light chain CDRs or VRs of tremelimumab or ipilimumab. Accordingly, in one embodiment, the inhibitor comprises the CDR1, CDR2, and CDR3 domains of the VH region of tremelimumab or ipilimumab, and the CDR1, CDR2 and CDR3 domains of the VL region of tremelimumab or ipilimumab. In another embodiment, the antibody competes for binding with and/or binds to the same epitope on PD-1, B7-1, or B7-2 as the above-mentioned antibodies. In another embodiment, the antibody has at least about 70, 75, 80, 85, 90, 95, 97, or 99% (or any derivable range therein) variable region amino acid sequence identity with the above-mentioned antibodies.

Other molecules for modulating CTLA-4 include soluble CTLA-4 ligands and receptors such as described in U.S. Pat. Nos. U.S. Pat. Nos. 5,844,905, 5,885,796 and International Patent Application Nos. WO1995001994 and WO1998042752; all incorporated herein by reference, and immunoadhesins such as described in U.S. Pat. No. 8,329,867, incorporated herein by reference.

III. MICROBIAL MODULATORS

Figure 28C:
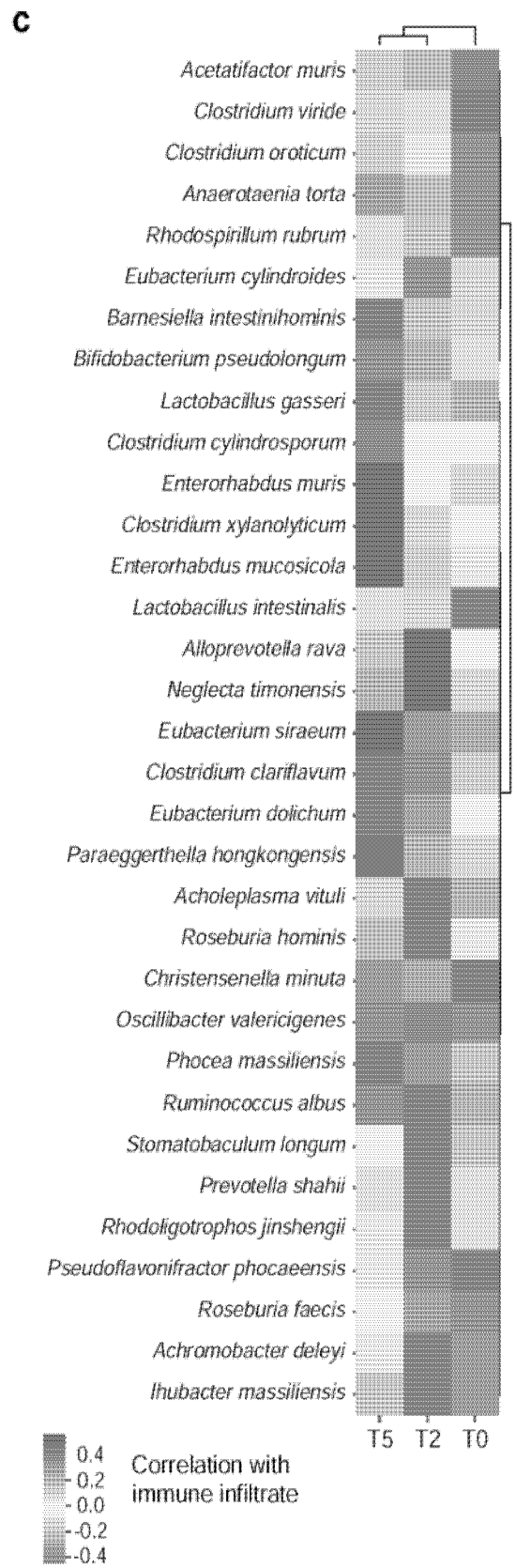

In some aspects, the disclosure relates to methods comprising detecting one or more of *Bacteroides stercoris, Bacteroides caccae, Bacteroides intestinalis, Dialister, Bacteroides fragilis, Vampirovibrio, Tyzzerella, Flavonifractor plautii, Dielma fastidiosa, Butyricimonas faecihominis, Alistipes, Akkermansia muciniphila, Lactobacillus rogosae, Prevotella copri, Prevotella shalii, Citrobacter, Clostridium hylemonae, Hungateiclostridium aldrichii, Citrobacter rodentium, Eubacterium sulci, Hafniaceae, Citrobacter freundii, Eubacterium halii, Enterobacter cloacae, Hafnia alvei, Hafnia, Roseburia hominis, Weissella paramesenteroides, Enterobacter, Bacilli, Lactobacillales, Klebsiella aerogenes, Klebsiella, Coprobacter, Intestinibacter bartletti, Intestinibacter, Parasutterella secunda, Dialister propionicifaciens, Parabacteroides distasonis, Fournierella, Fournierella massiliensis, Bacteroides coprophilus, Eisenbergiella tayi, Tissierellales, Hungateiclostridium thermocellum, Dorea formicigenerans, Caloramator coolhaasi, Muricomes, Muricomes intestini, Geosporobacter, Geosporobacter subterraneus*, and *Anaerotignum lactatifermentans* in a subject or a bacterial species disclosed in FIG. 28C.

In another aspect, the disclosure relates to methods comprising detecting one or more of *Bacteroides stercoris, Bacteroides caccae, Bacteroides intestinalis, Dialister, Bacteroides fragilis, Vampirovibrio, Tyzzerella, Bacteroides stercoris, Flavonifractor plautii, Dielma fastidiosa, Akkermansia muciniphila, Lactobacillus rogosae, Bacteroides fragilis, Prevotella copri, Prevotella shalii, Firmicutes, Clostridiales, Ruminococcaceae, Alistipes indistinctus, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vitui, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae, Escherichiafergusonii, Eubacterium coprostanoligenes, Eubacterium dolichum, Eubacterium ruminantium, Eubacterium siraeum, Eubacterium tortuosum, Eubacterium ventriosum, Faecalibaculum* rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia californiensis, Tindallia texcoconensis, Turicibacter sanguinis, Turicimonas muris, Tyzzerella nexilis, Vallitalea pronyensis, and Vampirovibrio chlorellavorus, and/or a bacteria disclosed in FIG. 28C in a subject.

In another aspect, the disclosure relates to compositions comprising at least one isolated or purified population of bacteria belonging to one or more of the genera or species Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, and Anaerotignum lactatifermentans.

In some embodiments, the composition comprises at least one isolated or purified population of bacteria belonging to one or more of the genera or species: Favonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum.

In another aspect, the disclosure relates to compositions comprising at least two isolated or purified population of bacteria belonging to one or more of the genera or species Flavonifractor, Dielma, Akkermansia, Alistipes, Bacteroides, Butyricimonas, Vampirovibrio, Tyzzerella, Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, and Anaerotignum lactatifermentans. In some embodiments, the composition comprises at least two isolated or purified populations of bacteria belonging to one or more of the genera or species: Flavonifractor, Bacteroides, Butyricimonas, Dielma, Akkermansia, Alistipes, Bacteroides stercoris, Parabacteroides distasonis, Fournierella, Fournierella massiliensis, Bacteroides coprophilus, Eisenbergiella tayi, Tissierellales, Hungateiclostridium thermocellum.

In another aspect, the disclosure relates to compositions comprising an isolated or purified population of at least one, at least two, or 3, 4, 5, 6, 7, 8, 9, 10, 15, or 20 (or any derivable range therein) of Parabacteroides distasonis, Fournierella, Fournierella massiliensis, Eisenbergiella tayi, Tissierellales, Hungateiclostridium thermocellum, Dorea formicigenerans, Caloramator coolhaasi, Muricomes, Geosporobacter, Prevotella paludivivens, Lactobacillus secaliphilus, Bacteroides finegoldii, Lactobacillus johnsonii, Parapedobacter composti, Flavonfractor, Bacteroides, Butyricimonas, Dielma, Akkermansia, Alistipes, Anaerotignum lactatifermentans, Bacteroides coprophilus, Bacteroides stercoris, Bacteroides caccae, Bacteroides intestinalis, Dialister, Bacteroides fragilis, Vampirovibrio, Tyzzerella, Bacteroides stercoris, Flavonifractor plautii, Dielma fastidiosa, Akkermansia muciniphila, Lactobacillus rogosae, Bacteroides fragilis, Prevotella copri, Prevotella shalii, Firmicutes, Clostridiales, Ruminococcaceae, Alistipes indistinctus, Bacteroides stercorirosoris, Clostridium lactatifermentans orus, Abyssivirga alkaniphila, Acetatifactor muris, Acetivibrio cellulolyticus, Acetivibrio ethanolgignens, Acholeplasma vituli, Achromobacter deleyi, Acidovorax radices, Adlercreutzia equolifaciens, Akkermansia muciniphila, Alistipes indistinctus, Alistipes obesi, Alistipes putredinis, Alistipes senegalensis, Alistipes timonensis, Alkalibacter saccharofermentans, Alkalibaculum bacchi, Allobaculum stercoricanis, Anaerobacterium chartisolvens, Anaerocolumna cellulosilytica, Anaerosporobacter mobilis, Anaerotaenia torta, Anaerotruncus colihominis, Anaerotruncus rubiinfantis, Anaerovorax odorimutans, Bacteroides acidifaciens, Bacteroides caecimuris, Bacteroides dorei, Bacteroides faecichinchillae, Bacteroides rodentium, Bacteroides stercorirosoris, Bacteroides xylanolyticus, Barnesiella intestinihominis, Beduini massiliensis, Bifidobacterium pseudolongum, Blautia luti, Breznakia blatticola, Breznakia pachnodae, Butyricicoccus pullicaecorum, Butyrivibrio crossotus, Catabacter hongkongensis, Christensenella massiliensis, Christensenella minuta, Christensenella timonensis, Clostridium aerotolerans, Clostridium aldenense, Clostridium alkalicellulosi, Clostridium asparagiforme, Clostridium celerecrescens, Clostridium cellobioparum, Clostridium cellulolyticum, Clostridium clariflavum, Clostridium cocleatum, Clostridium colinum, Clostridium hylemonae, Clostridium indolis, Clostridium jejuense, Clostridium lactatifermentans, Clostridium lavalense, Clostridium methylpentosum, Clostridium oroticum, Clostridium oryzae, Clostridium papyrosolvens, Clostridium polysaccharolyticum, Clostridium populeti, Clostridium saccharolyticum, Clostridium saudiense, Clostridium scindens, Clostridium straminisolvens, Clostridium viride, Clostridium xylanolyticum, Coprobacter secundus, Coprococcus catus, Culturomica massiliensis, Defluviitalea saccharophila, Desulfitobacterium hafniense, Desulfitobacterium metallireducens, Desulfosporosinus orientis, Desulfovibrio desulfuricans, Desulfovibrio simplex, Dorea formicigenerans, Eisenbergiella massiliensis, Emergencia timonensis, Enterococcus hirae, Enterorhabdus mucosicola, Enterorhabdus muris, Erysipelatoclostridium ramosum, Erysipelothrix larvae,

*Escherichia fergusonii, Eubacterium coprostanoligenes, Eubacterium dolichum, Eubacterium ruminantium, Eubacterium siraeum, Eubacterium tortuosum, Eubacterium ventriosum, Faecalibaculum rodentium, Flavimarina pacifica, Flavonifractor plautii, Flintibacter butyricus, Gordonibacter faecihominis, Gracilibacter thermotolerans, Harryflintia acetispora, Holdemania massiliensis, Hydrogenoanaerobacterium saccharovorans, Ihubacter massiliensis, Intestinimonas butyriciproducens, Irregularibacter muris, Lachnoclostridium pacaense, Lactobacillus animalis, Lactobacillus faecis, Lactobacillus gasseri, Lactobacillus hominis, Lactobacillus intestinalis, Lactobacillus johnsonii, Lactobacillus reuteri, Lactobacillus rogosae, Lactobacillus taiwanensis, Lawsonia intracellularis, Longibaculum muris, Marvinbryantia formatexigens, Millionella massiliensis, Mucispirillum schaedleri, Muribaculum intestinale, Murimonas intestini, Natranaerovirga pectinivora, Neglecta timonensis, Odoribacter splanchnicus, Olsenella profusa, Oscillibacter ruminantium, Oscillibacter valericigenes, Papillibacter cinnamivorans, Parabacteroides goldsteinii, Paraeggerthella hongkongensis, Parasutterella excrementihominis, Parvibacter caecicola, Peptococcus niger, Phocea massiliensis, Porphyromonas catoniae, Prevotella oralis, Prevotella stercorea, Prevotellamassilia timonensis, Pseudobutyrivibrio ruminis, Pseudoflavonifractor capillosus, Pseudoflavonifractor phocaeensis, Raoultibacter timonensis, Rhizobium straminoryzae, Roseburia faecis, Roseburia hominis, Roseburia intestinalis, Ruminiclostridium thermocellum, Ruminococcus champanellensis, Ruminococcus faecis, Ruminococcus flavefaciens, Ruminococcus gnavus, Ruthenibacterium lactatiformans, Sphingomonas kyeonggiensis, Spiroplasma velocicrescens, Sporobacter termitidis, Stomatobaculum longum, Streptococcus acidominimus, Streptococcus danieliae, Syntrophomonas wolfei, Tepidimonas taiwanensis, Tindallia cahforniensis, Tindallia texcoconensis, Turicibacter sanguinis, Turicimonas muris, Tyzzerella nexilis, Vallitalea pronyensis,* and/or *Vampirovibrio chlorellavorus.*

In some embodiments, the composition comprises or further comprises at least one isolated or purified population of bacteria belonging to one or more of the species *Flavonifractor, Bacteroides stercoris, Butyricimonas faecihominis, Dielma, Akkermansia,* and *Alistipes indistinctus.* In some embodiments, the composition excludes *Bacteroides stercoris.* In some embodiments, the composition comprises or further comprises at least one isolated or purified population of bacteria belonging to one or more of the genera *Dielma* and *Akkermansia.* In some embodiments, the composition comprises or further comprises at least one isolated or purified population of bacteria belonging to one or more of the genera *Alistipes, Dielma,* and *Akkermansia.* In some embodiments, the composition comprises or further comprises at least one isolated or purified population of bacteria belonging to the *Akkermansia* genus. In some embodiments, the composition comprises or further comprises at least one isolated or purified population of *Akkermansia muciniphila.* In some embodiments, the composition comprises or further comprises a population of bacteria comprising one or more of *Akkermansia muciniphila* and *Dielma fastidiosa* but also *Alistipes indistinctus.* In some embodiments, the bacteria of the genera *Flavonifractor* comprises *Flavonifractor plautii.* In some embodiments, the composition comprises or further comprises at least one isolated or purified population of bacteria belonging to one or more of the genera or species *Bacteroides fragilis, Vampirovibrio, Tyzzerella, Dorea formicigenerans, Caloramator coolhaasi, Muricomes, Muricomes intestini, Geosporobacter, Geosporobacter subterraneus, Anaerotignum lactatifermentans.* In some embodiments, the composition comprises or further comprises at least one isolated or purified population of *Bacteroides intestinalis.* In some embodiments, the composition comprises or further comprises at least one isolated or purified population of bacteria belonging to phylum *Firmicutes,* order *Clostridiales,* and family Ruminococcaceae. In some embodiments, the composition comprises or further comprises *Flavonifractor plautii* and/or *Dielma fastidiosa.* In some embodiments, the composition comprises or further comprises *Bacteroides stercoris, Butyricimonas faecihominis, Flavonfractor plautii, Dielma fastidiosa, Alistipes indistinctus,* and *Akkermansia muciniphila*

In some embodiments, the composition comprises less than $1\times10^5$, $1\times10^4$, $1\times10^3$, or $1\times10^2$ CFU or cells (or any derivable range therein) of bacteria classified as *Firmicutes, Clostridiales,* and Ruminococcaceae. In some embodiments, the composition comprises less than $1\times10^5$, $1\times10^4$, $1\times10^3$, or $1\times10^2$ CFU or cells (or any derivable range therein) of bacteria belonging to the family Ruminococcaceae, Clostridiaceae, Lachnospiraceae, Micrococcaceae, and/or Veionellaceae.

In another aspect, provided herein are microbial modulator compositions for the treatment of cancer and in particular methods for modifying the microbiome of subjects that have been treated with or will be treated with combination immune checkpoint inhibitor therapy.

The present disclosure also provides a pharmaceutical composition comprising one or more microbial populations as described above and at, for example, in the summary of the invention. The bacterial species therefore are present in the dose form as live bacteria, whether in dried, lyophilized, or sporulated form. This may be preferably adapted for suitable administration; for example, in tablet or powder form, potentially with an enteric coating, for oral treatment.

In particular aspects, the composition is formulated for oral administration. Oral administration may be achieved using a chewable formulation, a dissolving formulation, an encapsulated/coated formulation, a multi-layered lozenge (to separate active ingredients and/or active ingredients and excipients), a slow release/timed release formulation, or other suitable formulations known to persons skilled in the art. Although the word "tablet" is used herein, the formulation may take a variety of physical forms that may commonly be referred to by other terms, such as lozenge, pill, capsule, or the like.

While the compositions of the present disclosure are preferably formulated for oral administration, other routes of administration can be employed, however, including, but not limited to, subcutaneous, intramuscular, intradermal, transdermal, intraocular, intraperitoneal, mucosal, vaginal, rectal, and intravenous.

The desired dose of the composition of the present disclosure may be presented in multiple (e.g., two, three, four, five, six, or more) sub-doses administered at appropriate intervals throughout the day.

In one aspect, the disclosed composition may be prepared as a capsule. The capsule (i.e., the carrier) may be a hollow, generally cylindrical capsule formed from various substances, such as gelatin, cellulose, carbohydrate or the like.

In another aspect, the disclosed composition may be prepared as a suppository. The suppository may include but is not limited to the bacteria and one or more carriers, such as polyethylene glycol, acacia, acetylated monoglycerides, carnauba wax, cellulose acetate phthalate, corn starch, dibutyl phthalate, docusate sodium, gelatin, glycerin, iron oxides, kaolin, lactose, magnesium stearate, methyl paraben, pharmaceutical glaze, povidone, propyl paraben, sodium benzoate, sorbitan monooleate, sucrose talc, titanium dioxide, white wax and coloring agents.

In some aspects, the disclosed microbial modulator composition may be prepared as a tablet. The tablet may include the bacteria and one or more tableting agents (i.e., carriers), such as dibasic calcium phosphate, stearic acid, croscarmellose, silica, cellulose and cellulose coating. The tablets may be formed using a direct compression process, though those skilled in the art will appreciate that various techniques may be used to form the tablets.

In other aspects, the disclosed microbial modulator composition may be formed as food or drink or, alternatively, as an additive to food or drink, wherein an appropriate quantity of bacteria is added to the food or drink to render the food or drink the carrier.

The microbial modulator compositions of the present disclosure may further comprise one or more prebiotics known in the art, such as lactitol, inulin, or a combination thereof.

In some embodiments, the microbial modulator composition may further comprise a food or a nutritional supplement effective to stimulate the growth of bacteria of the order *Clostridiales* present in the gastrointestinal tract of the subject. In some embodiments, the nutritional supplement is produced by a bacterium associated with a healthy human gut microbiome.

IV. ADDITIONAL THERAPIES

The current methods and compositions of the disclosure may include one or more additional therapies known in the art and/or described herein. In some embodiments, the additional therapy comprises an additional cancer treatment. Examples of such treatments are described herein.

A. Immunotherapies

In some embodiments, the additional therapy comprises a further cancer immunotherapy. Cancer immunotherapy (sometimes called immuno-oncology, abbreviated IO) is the use of the immune system to treat cancer. Immunotherapies can be categorized as active, passive or hybrid (active and passive). These approaches exploit the fact that cancer cells often have molecules on their surface that can be detected by the immune system, known as tumor-associated antigens (TAAs); they are often proteins or other macromolecules (e.g. carbohydrates). Active immunotherapy directs the immune system to attack tumor cells by targeting TAAs. Passive immunotherapies enhance existing anti-tumor responses and include the use of monoclonal antibodies, lymphocytes and cytokines. Immunotherapies are known in the art, and some are described below.

1. Inhibition of Co-Stimulatory Molecules

In some embodiments, the immunotherapy comprises an inhibitor of a co-stimulatory molecule. In some embodiments, the inhibitor comprises an inhibitor of B7-1 (CD80), B7-2 (CD86), CD28, ICOS, OX40 (TNFRSF4), 4-1BB (CD137; TNFRSF9), CD40L (CD40LG), GITR (TNFRSF18), and combinations thereof. Inhibitors include inhibitory antibodies, polypeptides, compounds, and nucleic acids.

2. Dendritic Cell Therapy

Dendritic cell therapy provokes anti-tumor responses by causing dendritic cells to present tumor antigens to lymphocytes, which activates them, priming them to kill other cells that present the antigen. Dendritic cells are antigen presenting cells (APCs) in the mammalian immune system. In cancer treatment they aid cancer antigen targeting. One example of cellular cancer therapy based on dendritic cells is sipuleucel-T, marketed as Provenge(R).

One method of inducing dendritic cells to present tumor antigens is by vaccination with autologous tumor lysates or short peptides (small parts of protein that correspond to the protein antigens on cancer cells). These peptides are often given in combination with adjuvants (highly immunogenic substances) to increase the immune and anti-tumor responses. Other adjuvants include proteins or other chemicals that attract and/or activate dendritic cells, such as granulocyte macrophage colony-stimulating factor (GM-CSF).

Dendritic cells can also be activated in vivo by making tumor cells express GM-CSF. This can be achieved by either genetically engineering tumor cells to produce GM-CSF or by infecting tumor cells with an oncolytic virus that expresses GM-CSF.

Another strategy is to remove dendritic cells from the blood of a patient and activate them outside the body. The dendritic cells are activated in the presence of tumor antigens, which may be a single tumor-specific peptide/protein or a tumor cell lysate (a solution of lysed tumor cells). These cells (with optional adjuvants) are infused and provoke an immune response.

Dendritic cell therapies include the use of antibodies that bind to receptors on the surface of dendritic cells. Antigens can be added to the antibody and can induce the dendritic cells to mature and provide immunity to the tumor. Dendritic cell receptors such as TLR3, TLR7, TLR8 or CD40 have been used as antibody targets.

3. CAR-T Cell Therapy

Chimeric antigen receptors (CARs, also known as chimeric immunoreceptors, chimeric T cell receptors or artificial T cell receptors) are engineered receptors that combine a new, non-MHC restricted specificity with an immune cell to target cancer cells. Typically, these receptors graft the specificity of a monoclonal antibody onto a T cell. The receptors are called chimeric because they are fused of parts from different sources. CAR-T cell therapy refers to a treatment that uses such transformed cells for therapeutic purposes, such as cancer, for example.

The basic principle of CAR-T cell design involves recombinant receptors that combine antigen-binding and T-cell activating functions. The general premise of CAR-T cells is to artificially generate T-cells targeted to markers found on cancer cells. Scientists can remove T-cells from a person, genetically alter them, and put them back into the patient for them to attack the cancer cells. Once the T cell has been engineered to become a CAR-T cell, it acts as a "living drug". CAR-T cells create a link between an extracellular ligand recognition domain to an intracellular signaling molecule which in turn activates T cells. The extracellular ligand recognition domain is usually a single-chain variable fragment (scFv) derived from an antibody. An important aspect of the safety of CAR-T cell therapy is how to ensure that only cancerous tumor cells are targeted, and not normal cells. The specificity of CAR-T cells is determined by the choice of molecule that is targeted.

Exemplary CAR-T therapies include Tisagenlecleucel (Kymriah®) and Axicabtagene ciloleucel (Yescarta®). In some embodiments, the CAR-T therapy targets CD19.

4. Cytokine Therapy

Cytokines are proteins produced by many types of cells present within a tumor. They can modulate immune responses. The tumor often employs them to allow it to grow and reduce the immune response. These immune-modulating effects allow them to be used as drugs to provoke an immune response. Two commonly used cytokines are interferons and interleukins.

Interferons are produced by cells of the immune system. They are usually involved in anti-viral response, but also have impact on cancer. They are classified in three groups: type I (IFNα and IFNβ), type II (IFNγ) and type III (IFNλ).

Interleukins have an array of immune system effects. IL-2 is an exemplary interleukin cytokine therapy.

5. Adoptive T-Cell Therapy

Adoptive T cell therapy is a form of passive immunization by the transfusion of T-cells (adoptive cell transfer). T cells are found in blood and tissue and usually activate when they find foreign pathogens. Specifically, they activate when the T cell receptor (TCR) encounter cells that display parts of foreign proteins on their surface antigens. These can be either infected cells, or antigen presenting cells (APCs). They are found in normal tissue and in tumor tissue, where they are known as tumor infiltrating lymphocytes (TILs). They are activated by the presence of APCs such as dendritic cells that present tumor antigens. Although these cells can attack the tumor, the environment within the tumor is highly immunosuppressive, preventing immune-mediated tumor death.

Multiple ways of producing and obtaining tumor targeted T-cells have been developed. T-cells specific to a tumor antigen can be removed from a tumor sample (TILs) or filtered from blood. Subsequent activation and culturing is performed ex vivo, with the resulting preparation of activated T cells reinfused. Activation can take place by exposing the T cells to tumor antigens.

B. Oncolytic virus

In some embodiments, the additional therapy comprises an oncolytic virus. An oncolytic virus is a virus that preferentially infects and kills cancer cells. As the infected cancer cells are destroyed by oncolysis, they release new infectious virus particles or virions to help destroy the remaining tumor. Oncolytic viruses are thought not only to cause direct destruction of the tumor cells, but also to stimulate host anti-tumor immune responses for long-term immunotherapy C. Polysaccharides In some embodiments, the additional therapy comprises polysaccharides. Certain compounds found in mushrooms, primarily polysaccharides, can up-regulate the immune system and may have anti-cancer properties. For example, beta-glucans such as lentinan have been shown in laboratory studies to stimulate macrophage, NK cells, T cells and immune system cytokines and have been investigated in clinical trials as immunologic adjuvants.

D. Neoantigens

In some embodiments, the additional therapy comprises neoantigen administration. Many tumors express mutations. These mutations potentially create new targetable antigens (neoantigens) for use in T cell immunotherapy. The presence of CD8+ T cells in cancer lesions, as identified using RNA sequencing data, is higher in tumors with a high mutational burden. The level of transcripts associated with cytolytic activity of natural killer cells and T cells positively correlates with mutational load in many human tumors.

E. Chemotherapies

In some embodiments, the additional therapy comprises a chemotherapy. Suitable classes of chemotherapeutic agents include (a) Alkylating Agents, such as nitrogen mustards (e.g., mechlorethamine, cylophosphamide, ifosfamide, melphalan, chlorambucil), ethylenimines and methylmelamines (e.g., hexamethylmelamine, thiotepa), alkyl sulfonates (e.g., busulfan), nitrosoureas (e.g., carmustine, lomustine, chlorozoticin, streptozocin) and triazines (e.g., dacarbazine), (b) Antimetabolites, such as folic acid analogs (e.g., methotrexate), pyrimidine analogs (e.g., 5-fluorouracil, floxuridine, cytarabine, azauridine) and purine analogs and related materials (e.g., 6-mercaptopurine, 6-thioguanine, pentostatin), (c) Natural Products, such as *vinca* alkaloids (e.g., vinblastine, vincristine), epipodophylotoxins (e.g., etoposide, teniposide), antibiotics (e.g., dactinomycin, daunorubicin, doxorubicin, bleomycin, plicamycin and mitoxanthrone), enzymes (e.g., L-asparaginase), and biological response modifiers (e.g., Interferon-α), and (d) Miscellaneous Agents, such as platinum coordination complexes (e.g., cisplatin, carboplatin), substituted ureas (e.g., hydroxyurea), methylhydrazine derivatives (e.g., procarbazine), and adrenocortical suppressants (e.g., taxol and mitotane). In some embodiments, cisplatin is a particularly suitable chemotherapeutic agent.

Cisplatin has been widely used to treat cancers such as, for example, metastatic testicular or ovarian carcinoma, advanced bladder cancer, head or neck cancer, cervical cancer, lung cancer or other tumors. Cisplatin is not absorbed orally and must therefore be delivered via other routes such as, for example, intravenous, subcutaneous, intratumoral or intraperitoneal injection. Cisplatin can be used alone or in combination with other agents, with efficacious doses used in clinical applications including about 15 mg/m$^2$ to about 20 mg/m$^2$ for 5 days every three weeks for a total of three courses being contemplated in certain embodiments. In some embodiments, the amount of cisplatin delivered to the cell and/or subject in conjunction with the construct comprising an Egr-1 promoter operably linked to a polynucleotide encoding the therapeutic polypeptide is less than the amount that would be delivered when using cisplatin alone.

Other suitable chemotherapeutic agents include antimicrotubule agents, e.g., Paclitaxel ("Taxol") and doxorubicin hydrochloride ("doxorubicin"). The combination of an Egr-1 promoter/TNFα construct delivered via an adenoviral vector and doxorubicin was determined to be effective in overcoming resistance to chemotherapy and/or TNF-α, which suggests that combination treatment with the construct and doxorubicin overcomes resistance to both doxorubicin and TNF-α.

Doxorubicin is absorbed poorly and is preferably administered intravenously. In certain embodiments, appropriate intravenous doses for an adult include about 60 mg/m$^2$ to about 75 mg/m$^2$ at about 21-day intervals or about 25 mg/m$^2$ to about 30 mg/m$^2$ on each of 2 or 3 successive days repeated at about 3 week to about 4 week intervals or about 20 mg/m2 once a week. The lowest dose should be used in elderly patients, when there is prior bone-marrow depression caused by prior chemotherapy or neoplastic marrow invasion, or when the drug is combined with other myelopoietic suppressant drugs.

Nitrogen mustards are another suitable chemotherapeutic agent useful in the methods of the disclosure. A nitrogen mustard may include, but is not limited to, mechlorethamine (HN$_2$), cyclophosphamide and/or ifosfamide, melphalan (L-sarcolysin), and chlorambucil. Cyclophosphamide (CYTOXAN®) is available from Mead Johnson and NEOSTAR® is available from Adria), is another suitable chemotherapeutic agent. Suitable oral doses for adults include, for example, about 1 mg/kg/day to about 5 mg/kg/day, intravenous doses include, for example, initially about 40 mg/kg to about 50 mg/kg in divided doses over a period of about 2 days to about 5 days or about 10 mg/kg to about 15 mg/kg about every 7 days to about 10 days or about 3 mg/kg to about 5 mg/kg twice a week or about 1.5 mg/kg/day to about 3 mg/kg/day. Because of adverse gastrointestinal effects, the intravenous route is preferred. The drug also sometimes is administered intramuscularly, by infiltration or into body cavities.

Additional suitable chemotherapeutic agents include pyrimidine analogs, such as cytarabine (cytosine arabinoside), 5-fluorouracil (fluorouracil; 5-FU) and floxuridine (fluorode-oxyuridine; FudR). 5-FU may be administered to a subject in a dosage of anywhere between about 7.5 to about 1000 mg/m². Further, 5-FU dosing schedules may be for a variety of time periods, for example up to six weeks, or as determined by one of ordinary skill in the art to which this disclosure pertains.

Gemcitabine diphosphate (GEMZAR®, Eli Lilly & Co., "gemcitabine"), another suitable chemotherapeutic agent, is recommended for treatment of advanced and metastatic pancreatic cancer, and will therefore be useful in the present disclosure for these cancers as well.

The amount of the chemotherapeutic agent delivered to the patient may be variable. In one suitable embodiment, the chemotherapeutic agent may be administered in an amount effective to cause arrest or regression of the cancer in a host, when the chemotherapy is administered with the construct. In other embodiments, the chemotherapeutic agent may be administered in an amount that is anywhere between 2- to 10,000-fold less than the chemotherapeutic effective dose of the chemotherapeutic agent. For example, the chemotherapeutic agent may be administered in an amount that is about 20-fold less, about 500-fold less or even about 5000-fold less than the effective dose of the chemotherapeutic agent. The chemotherapeutics of the disclosure can be tested in vivo for the desired therapeutic activity in combination with the construct, as well as for determination of effective dosages. For example, such compounds can be tested in suitable animal model systems prior to testing in humans, including, but not limited to, rats, mice, chicken, cows, monkeys, rabbits, etc. In vitro testing may also be used to determine suitable combinations and dosages, as described in the examples.

F. Radiotherapy

In some embodiments, the additional therapy or prior therapy comprises radiation, such as ionizing radiation. As used herein, "ionizing radiation" means radiation comprising particles or photons that have sufficient energy or can produce sufficient energy via nuclear interactions to produce ionization (gain or loss of electrons). An exemplary and preferred ionizing radiation is an x-radiation. Means for delivering x-radiation to a target tissue or cell are well known in the art.

In some embodiments, the amount of ionizing radiation is greater than 20 Grays (Gy) and is administered in one dose. In some embodiments, the amount of ionizing radiation is 18 Gy and is administered in three doses. In some embodiments, the amount of ionizing radiation is at least, at most, or exactly 2, 4, 6, 8, 10, 15, 16, 17, 18, 19, 20, 21, 22, 23, 24, 25, 26, 27, 18, 19, 30, 31, 32, 33, 34, 35, 36, 37, 38, 39, 40, 41, 42, 43, 44, 45, 46, 47, 48, 49, or 40 Gy (or any derivable range therein). In some embodiments, the ionizing radiation is administered in at least, at most, or exactly 1, 2, 3, 4, 5, 6, 7, 8, 9, or 10 does (or any derivable range therein). When more than one dose is administered, the does may be about 1, 4, 8, 12, or 24 hours or 1, 2, 3, 4, 5, 6, 7, or 8 days or 1, 2, 3, 4, 5, 6, 7, 8, 9, 10, 12, 14, or 16 weeks apart, or any derivable range therein.

In some embodiments, the amount of IR may be presented as a total dose of IR, which is then administered in fractionated doses. For example, in some embodiments, the total dose is 50 Gy administered in 10 fractionated doses of 5 Gy each. In some embodiments, the total dose is 50-90 Gy, administered in 20-60 fractionated doses of 2-3 Gy each. In some embodiments, the total dose of IR is at least, at most, or about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 125, 130, 135, 140, or 150 (or any derivable range therein). In some embodiments, the total dose is administered in fractionated doses of at least, at most, or exactly 1, 2, 3, 4, 5, 6, 7, 8, 9, 10, 12, 14, 15, 20, 25, 30, 35, 40, 45, or 50 Gy (or any derivable range therein. In some embodiments, at least, at most, or exactly 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 fractionated doses are administered (or any derivable range therein). In some embodiments, at least, at most, or exactly 1, 2, 3, 4, 5, 6, 7, 8, 9, 10, 11, or 12 (or any derivable range therein) fractionated doses are administered per day. In some embodiments, at least, at most, or exactly 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 (or any derivable range therein) fractionated doses are administered per week.

G. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

H. Other Agents

It is contemplated that other agents may be used in combination with certain aspects of the present embodiments to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

V. ADMINISTRATION OF THERAPEUTIC COMPOSITIONS

The therapy provided herein comprises administration of a combination of immune checkpoint inhibitors and a microbial modulator. The therapy may be administered in any suitable manner known in the art. For example, of an immune checkpoint inhibitor (e.g., PD-1 inhibitor and/or CTLA-4 inhibitor), and the microbial modulator may be administered sequentially (at different times) or concurrently (at the same time). In some embodiments, the immune checkpoint inhibitors are in a separate composition as the microbial modulator. In some embodiments, the immune checkpoint inhibitor is in the same composition as the microbial modulator.

Embodiments of the disclosure relate to compositions and methods comprising one or more of a CTLA-4, B7-1, and/or B7-2 inhibitor in combination with one or more of a PD-1, PDL1, and/or PDL2 inhibitor. The immune checkpoint inhibitors may be administered in one composition or in more than one composition such as 2 compositions, 3 compositions, or 4 compositions. Various combinations of the inhibitors may be employed, for example, a CTLA-4, B7-1, or B7-2 inhibitor is "A" and a PD-1, PDL1, or PDL2 inhibitor is "B":

| | | | | | | | |
|---|---|---|---|---|---|---|---|
| A/B/A | B/A/B | B/B/A | A/A/B | A/B/B | B/A/A | A/B/B/B | B/A/B/B |
| B/B/B/A | B/B/A/B | A/A/B/B | A/B/A/B | A/B/B/A | B/B/A/A | | |
| B/A/B/A | B/A/A/B | A/A/A/B | B/A/A/A | A/B/A/A | A/A/B/A | | |

In some embodiments, the method comprises administration of one or more of a CTLA-4, B7-1, and/or B7-2 inhibitor at the same time as one or more of a PD-1, PDL1, and/or PDL2 inhibitor. In some embodiments, one or more of a CTLA-4, B7-1, and/or B7-2 inhibitor is administered prior to one or more of a PD-1, PDL1, and/or PDL2 inhibitor. In some embodiments, one or more of a CTLA-4, B7-1, and/or B7-2 inhibitor is administered at least, at most, or exactly 3, 5, 6, 12, 24 hours or 2, 3, 4, 6, 8, 10, days or 2, 3, 4, 5, 6, 7, or 8 weeks (or any derivable range therein) prior to one or more of a PD-1, PDL1, and/or PDL2 inhibitor. In some embodiments, one or more of a PD-1, PDL1, and/or PDL2 inhibitor is administered prior to one or more of a CTLA-4, B7-1, and/or B7-2 inhibitor. In some embodiments, one or more of a PD-1, PDL1, and/or PDL2 inhibitor is administered at least, at most, or exactly 3, 5, 6, 12, 24 hours or 2, 3, 4, 6, 8, 10, days or 2, 3, 4, 5, 6, 7, or 8 weeks (or any derivable range therein) prior to one or more of a CTLA-4, B7-1, and/or B7-2 inhibitor. In some embodiments, one or more of a CTLA-4, B7-1, and/or B7-2 inhibitor is administered within 1, 2, 3, 4, 5, 6, 7, days or 2, 3, 4, 5, 6, 7, 8, 9, 10, 12, 14, 16, 18, or 20 weeks (or any derivable range therein) of administration of one or more of a PD-1, PDL1, and/or PDL2 inhibitor.

In some embodiments, the microbial modulator composition is administered prior to the immune checkpoint inhibitors. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to the immune checkpoint inhibitors. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to the immune checkpoint inhibitors. In some embodiments, the microbial modulator composition is administered after the immune checkpoint inhibitors. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after the immune checkpoint inhibitors or after at least one of the immune checkpoint inhibitors or after at least 2 of the immune checkpoint inhibitors. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after the immune checkpoint inhibitors or after at least one of the immune checkpoint inhibitors or after at least 2 of the immune checkpoint inhibitors.

The combination therapy of the disclosure also includes a microbial modulator composition. In some embodiments, the microbial modulator composition is administered prior to one or more of a PD-1, PDL1, and/or PDL2 inhibitor. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to one or more of a PD-1, PDL1, and/or PDL2 inhibitor. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to one or more of a PD-1, PDL1, and/or PDL2 inhibitor. In some embodiments, the microbial modulator composition is administered after one or more of a PD-1, PDL1, and/or PDL2 inhibitor. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after one or more of a PD-1, PDL1, and/or PDL2 inhibitor or after at least one of, or at least two of a PD-1, PDL1, or PDL2. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after one or more of a PD-1, PDL1, or PDL2 inhibitor or after at least one of, or at least two of a PD-1, PDL1, or PDL2 inhibitor.

The combination therapy of the disclosure also includes a microbial modulator composition. In some embodiments, the microbial modulator composition is administered prior to one or more of a CTLA-4, B7-1, and/or B7-2 inhibitor. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to one or more of a CTLA-4, B7-1, and/or B7-2 inhibitor. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) prior to one or more of a CTLA-4, B7-1, and/or B7-2 inhibitor. In some embodiments, the microbial modulator composition is administered after one or more of a CTLA-4, B7-1, and/or B7-2 inhibitor. In some embodiments, the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after one or more of a CTLA-4, B7-1, and/or B7-2 inhibitor or after at least one of, or at least two of a CTLA-4, B7-1, or B7-2 inhibitor. In some embodiments, at least 1, 2, 3, 4, 5, 6, or 7 doses (or any derivable range therein) of the microbial modulator composition is administered at least, at most, or exactly 1, 2, 3, 5, 6, 12, 24 hours or 2, 3, 4, 6, 8, 10, days or 2, 3, 4, 5, 6, 7, or 8 weeks (or any derivable range therein) after one or more of a CTLA-4, B7-1, and/or B7-2 inhibitor or after at least one of, or at least two of a CTLA-4, B7-1, or B7-2 inhibitor.

In some embodiments, the microbial modulator composition is formulated for oral administration. The skilled artisan knows a variety of formulas which can encompass living or killed microorganisms and which can present as food supplements (e.g., pills, tablets and the like) or as functional food such as drinks or fermented yogurts.

The immune checkpoint inhibitors and microbial modulator may be administered by the same route of administration or by different routes of administration. In some embodiments, the immune checkpoint inhibitor is administered intravenously, intramuscularly, subcutaneously, topically, orally, transdermally, intraperitoneally, intraorbitally, by implantation, by inhalation, intrathecally, intraventricularly, or intranasally. In some embodiments, the microbial modulator is administered intravenously, intramuscularly, subcutaneously, topically, orally, transdermally, intraperitoneally, intraorbitally, by implantation, by inhalation, intrathecally, intraventricularly, or intranasally. In particular aspects, the immune checkpoint inhibitors are administered intravenously and the microbial modulator is administered orally. An effective amount of the immune checkpoint inhibitor and the microbial modulator may be administered for prevention or treatment of disease. The appropriate dosage of immune checkpoint inhibitor and/or the microbial modulator may be determined based on the type of disease to be treated, severity and course of the disease, the clinical condition of the individual, the individual's clinical history and response to the treatment, and the discretion of the attending physician.

For example, the therapeutically effective or sufficient amount of each of the at least one isolated or purified population of bacteria or each of the at least two, 3, 4, 5, 6, 7, 8, 9, 10 11, 12, 13, 14, or 15 isolated or purified populations of bacteria of the microbial modulator compositions of the embodiments that is administered to a human will be at least about $1\times10^3$ colony forming units (CFU) of bacteria or at least about $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU (or any derivable range therein). In some embodiments, a single dose will contain an amount of bacteria (such as a specific bacteria or species, genus, or family described herein) of at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times10^{15}$ CFU (or any derivable range therein) of a specified bacteria. In some embodiments, a single dose will contain at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times10^{15}$ CFU (or any derivable range therein) of total bacteria. In specific embodiments, the bacteria are provided in spore form or as sporulated bacteria. In particular embodiments, the concentration of spores of each isolated or purified population of bacteria, for example of each species, subspecies or strain, is at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times10^{15}$ (or any derivable range therein) viable bacterial spores per gram of composition or per administered dose. In some embodiments, the composition comprises or the method comprises administration of at least, at most, or exactly 1, 2, 3, 4, 5, 6, 7, 8, 9, 10, 11, 12, 13, 14, 15, 20, 25, 30, 40, or 50 (or any derivable range therein) of different bacterial species, different bacterial genus, or different bacterial family.

In some embodiments, the therapeutically effective or sufficient amount of each of the at least one isolated or purified population of bacteria or each of the at least two, 3, 4, 5, 6, 7, 8, 9, 10 11, 12, 13, 14, or 15 isolated or purified populations of bacteria of the microbial modulator compositions of the embodiments that is administered to a human will be at least about $1\times10^3$ cells of bacteria or at least about $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ cells (or any derivable range therein). In some embodiments, a single dose will contain an amount of bacteria (such as a specific bacteria or species, genus, or family described herein) of at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times10^{15}$ cells (or any derivable range therein) of a specified bacteria. In some embodiments, a single dose will contain at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times10^{15}$ cells (or any derivable range therein) of total bacteria. In specific embodiments, the bacteria are provided in spore form or as sporulated bacteria. In particular embodiments, the concentration of spores of each isolated or purified population of bacteria, for example of each species, subspecies or strain, is at least, at most, or exactly $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ or greater than $1\times100^{15}$ (or any derivable range therein) viable bacterial spores per gram of composition or per administered dose. In some embodiments, the composition comprises or the method comprises administration of at least, at most, or exactly 1, 2, 3, 4, 5, 6, 7, 8, 9, 10, 11, 12, 13, 14, 15, 20, 25, 30, 40, or 50 (or any derivable range therein) of different bacterial species, different bacterial genus, or different bacterial family.

Intratumoral injection, or injection into the tumor vasculature is specifically contemplated for discrete, solid, accessible tumors. Local, regional or systemic administration also may be appropriate. For tumors of >4 cm, the volume to be administered will be about 4-10 ml (in particular 10 ml), while for tumors of <4 cm, a volume of about 1-3 ml will be used (in particular 3 ml). Multiple injections delivered as single dose comprise about 0.1 to about 0.5 ml volumes. For example, adenoviral particles may advantageously be contacted by administering multiple injections to the tumor.

Treatment regimens may vary as well, and often depend on tumor type, tumor location, disease progression, and health and age of the patient. Obviously, certain types of tumors will require more aggressive treatment, while at the same time, certain patients cannot tolerate more taxing protocols. The clinician will be best suited to make such decisions based on the known efficacy and toxicity (if any) of the therapeutic formulations.

In certain embodiments, the tumor being treated may not, at least initially, be resectable. Treatments with therapeutic viral constructs may increase the resectability of the tumor due to shrinkage at the margins or by elimination of certain particularly invasive portions. Following treatments, resection may be possible. Additional treatments subsequent to resection will serve to eliminate microscopic residual disease at the tumor site.

The treatments may include various "unit doses." Unit dose is defined as containing a predetermined-quantity of the therapeutic composition. The quantity to be administered, and the particular route and formulation, is within the skill of determination of those in the clinical arts. A unit dose need not be administered as a single injection but may comprise continuous infusion over a set period of time. In some embodiments, a unit dose comprises a single administrable dose.

The quantity to be administered, both according to number of treatments and unit dose, depends on the treatment effect desired. An effective dose is understood to refer to an amount necessary to achieve a particular effect. In the practice in certain embodiments, it is contemplated that doses in the range from 10 mg/kg to 200 mg/kg can affect the protective capability of these agents. Thus, it is contemplated that doses include doses of about 0.1, 0.5, 1, 5, 10, 15, 20, 25, 30, 35, 40, 45, 50, 55, 60, 65, 70, 75, 80, 85, 90, 100, 105, 110, 115, 120, 125, 130, 135, 140, 145, 150, 155, 160, 165, 170, 175, 180, 185, 190, 195, and 200, 300, 400, 500, 1000 µg/kg, mg/kg, µg/day, or mg/day or any range derivable therein. Furthermore, such doses can be administered at multiple times during a day, and/or on multiple days, weeks, or months.

In some embodiments, the therapeutically effective or sufficient amount of the immune checkpoint inhibitor, such as an antibody and/or microbial modulator, that is administered to a human will be in the range of about 0.01 to about 50 mg/kg of patient body weight whether by one or more administrations. In some embodiments, the inhibitor used is about 0.01 to about 45 mg/kg, about 0.01 to about 40 mg/kg, about 0.01 to about 35 mg/kg, about 0.01 to about 30 mg/kg, about 0.01 to about 25 mg/kg, about 0.01 to about 20 mg/kg, about 0.01 to about 15 mg/kg, about 0.01 to about 10 mg/kg, about 0.01 to about 5 mg/kg, or about 0.01 to about 1 mg/kg administered daily, for example. In some embodiments, the inhibitor is administered at 15 mg/kg. However, other dosage regimens may be useful. In one embodiment, an inhibitor described herein is administered to a subject at a dose of about 100 mg, about 200 mg, about 300 mg, about 400 mg, about 500 mg, about 600 mg, about 700 mg, about 800 mg, about 900 mg, about 1000 mg, about 1100 mg, about 1200 mg, about 1300 mg or about 1400 mg on day 1 of 21-day cycles. The dose may be administered as a single dose or as multiple doses (e.g., 2 or 3 doses), such as infusions. The progress of this therapy is easily monitored by conventional techniques.

In certain embodiments, the effective dose of the pharmaceutical composition is one which can provide a blood level of about 1 µM to 150 µM. In another embodiment, the effective dose provides a blood level of about 4 µM to 100 µM; or about 1 µM to 100 µM; or about 1 µM to 50 µM; or about 1 µM to 40 µM; or about 1 µM to 30 µM; or about 1 µM to 20 µM; or about 1 µM to 10 µM; or about 10 µM to 150 µM; or about 10 µM to 100 µM; or about 10 µM to 50 µM; or about 25 µM to 150 µM; or about 25 µM to 100 µM; or about 25 µM to 50 µM; or about 50 µM to 150 µM; or about 50 µM to 100 µM (or any range derivable therein). In other embodiments, the dose can provide the following blood level of the agent that results from a therapeutic agent being administered to a subject: about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 10 µM or any range derivable therein. In certain embodiments, the therapeutic agent that is administered to a subject is metabolized in the body to a metabolized therapeutic agent, in which case the blood levels may refer to the amount of that agent. Alternatively, to the extent the therapeutic agent is not metabolized by a subject, the blood levels discussed herein may refer to the unmetabolized therapeutic agent.

Precise amounts of the therapeutic composition also depend on the judgment of the practitioner and are peculiar to each individual. Factors affecting dose include physical and clinical state of the patient, the route of administration, the intended goal of treatment (alleviation of symptoms versus cure) and the potency, stability and toxicity of the particular therapeutic substance or other therapies a subject may be undergoing.

It will be understood by those skilled in the art and made aware that dosage units of µg/kg or mg/kg of body weight can be converted and expressed in comparable concentration units of µg/ml or mM (blood levels), such as 4 µM to 100 µM. It is also understood that uptake is species and organ/tissue dependent. The applicable conversion factors and physiological assumptions to be made concerning uptake and concentration measurement are well-known and would permit those of skill in the art to convert one concentration measurement to another and make reasonable comparisons and conclusions regarding the doses, efficacies and results described herein.

VI. METHODS OF TREATMENT

Provided herein are methods for treating or delaying progression of cancer in an individual comprising administering to the individual an effective of microbial modifier compositions to a subject who has been or is currently being administered immune checkpoint therapy. Also provided herein are methods of selecting subjects who will respond favorably to immune checkpoint therapy by assessing the microbial profile of the subject and administering immune checkpoint inhibitor to a subject identified to have a favorable microbial profile.

In some embodiments, the treatment results in a sustained response in the individual after cessation of the treatment. The methods described herein may find use in treating conditions where enhanced immunogenicity is desired such as increasing tumor immunogenicity for the treatment of cancer. Also provided herein are methods of enhancing immune function such as in an individual having cancer comprising administering to the individual an effective amount of an immune checkpoint inhibitor (e.g., PD-1 inhibitor and/or CTLA-4 inhibitor) and a microbial modulator. In some embodiments, the individual is a human.

In some embodiments, the individual has cancer that is resistant (has been demonstrated to be resistant) to one or more anti-cancer therapies. In some embodiments, resistance to anti-cancer therapy includes recurrence of cancer or refractory cancer. Recurrence may refer to the reappearance of cancer, in the original site or a new site, after treatment. In some embodiments, resistance to anti-cancer therapy includes progression of the cancer during treatment with the anti-cancer therapy. In some embodiments, the cancer is at early stage or at late stage.

In some embodiments of the methods of the present disclosure, the cancer has low levels of T cell infiltration. In some embodiments, the cancer has no detectable T cell infiltrate. In some embodiments, the cancer is a non-immunogenic cancer (e.g., non-immunogenic colorectal cancer and/or ovarian cancer). Without being bound by theory, the combination treatment may increase T cell (e.g., CD4+ T cell, CD8+ T cell, memory T cell) priming, activation, proliferation, and/or infiltration relative to prior to the administration of the combination.

The cancer may be a solid tumor, metastatic cancer, or non-metastatic cancer. In certain embodiments, the cancer may originate in the bladder, blood, bone, bone marrow, brain, breast, urinary, cervix, esophagus, duodenum, small intestine, large intestine, colon, rectum, anus, gum, head, kidney, liver, lung, nasopharynx, neck, ovary, prostate, skin, stomach, testis, tongue, or uterus.

The cancer may specifically be of the following histological type, though it is not limited to these: neoplasm, malignant; carcinoma; undifferentiated, bladder, blood, bone, brain, breast, urinary, esophageal, thymomas, duodenum, colon, rectal, anal, gum, head, kidney, soft tissue, liver, lung, nasopharynx, neck, ovary, prostate, skin, stomach, testicular, tongue, uterine, thymic, cutaneous squamous-cell, noncolorectal gastrointestinal, colorectal, melanoma, Merkel-cell, renal-cell, cervical, hepatocellular, urothelial, non-small cell lung, head and neck, endometrial, esophagogastric, small-cell lung mesothelioma, ovarian, esophagogastric, glioblastoma, adrencorical, uveal, pancreatic, germ-cell, giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; bronchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; Paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; Sertoli cell carcinoma; Leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; malignant melanoma in giant pigmented nevus; epithelioid cell melanoma; cutaneous melanoma, blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; Mullerian mixed tumor; nephroblastoma; hepatoblastoma; carcinosarcoma; mesenchymoma, malignant; Brenner tumor, malignant; phyllodes tumor, malignant; synovial sarcoma; malignant; dysgerminoma; embryonal carcinoma; teratoma, malignant; struma ovarii, malignant; choriocarcinoma; mesonephroma, malignant; hemangiosarcoma; hemangioendothelioma, malignant; Kaposi sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; Ewing sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia.

In some embodiments, the cancer comprises cutaneous squamous-cell carcinoma, non-colorectal and colorectal gastrointestinal cancer, Merkel-cell carcinoma, anal cancer, cervical cancer, hepatocellular cancer, urothelial cancer, melanoma, lung cancer, non-small cell lung cancer, small cell lung cancer, head and neck cancer, kidney cancer, bladder cancer, Hodgkin's lymphoma, pancreatic cancer, or skin cancer.

In some embodiments, the cancer comprises lung cancer, pancreatic cancer, metastatic melanoma, kidney cancer, bladder cancer, head and neck cancer, or Hodgkin's lymphoma.

Methods may involve the determination, administration, or selection of an appropriate cancer "management regimen" and predicting the outcome of the same. As used herein the phrase "management regimen" refers to a management plan that specifies the type of examination, screening, diagnosis, surveillance, care, and treatment (such as dosage, schedule and/or duration of a treatment) provided to a subject in need thereof (e.g., a subject diagnosed with cancer).

The term "treatment" or "treating" means any treatment of a disease in a mammal, including: (i) preventing the disease, that is, causing the clinical symptoms of the disease not to develop by administration of a protective composition prior to the induction of the disease; (ii) suppressing the disease, that is, causing the clinical symptoms of the disease not to develop by administration of a protective composition after the inductive event but prior to the clinical appearance or reappearance of the disease; (iii) inhibiting the disease, that is, arresting the development of clinical symptoms by administration of a protective composition after their initial appearance; and/or (iv) relieving the disease, that is, causing the regression of clinical symptoms by administration of a protective composition after their initial appearance. In some embodiments, the treatment may exclude prevention of the disease.

In certain aspects, further cancer or metastasis examination or screening, or further diagnosis such as contrast enhanced computed tomography (CT), positron emission tomography-CT (PET-CT), and magnetic resonance imaging (MRI) may be performed for the detection of cancer or cancer metastasis in patients determined to have a certain gut microbiome composition.

VII. METHODS OF DETERMINING MICROBIOME COMPOSITION

In some embodiments, the methods relate to obtaining a microbiome profile. In some embodiments, obtaining a microbiome profile comprises the steps of or the ordered steps of. i) obtaining a sample obtained from a subject (e.g., a human subject), ii) isolating one or more bacterial species from the sample, iii) isolating one or more nucleic acids from at least one bacterial species, iv) sequencing the isolated nucleic acids, and v) comparing the sequenced nucleic acids to a reference nucleic acid sequence. When performing the methods necessitating genotyping, any genotyping assay can be used. For example, this can be done by sequencing the 16S or the 23S ribosomal subunit or by metagenomics shotgun sequencing associated with metatranscriptomics.

Methods for determining microbiome composition may include one or more microbiology methods such as sequencing, next generation sequencing, wester blotting, comparative genomic hybridization, PCR, ELISA, etc.

VIII. KITS

Certain aspects of the disclosure also encompass kits for performing the methods of the disclosure, such as detection of, diagnosis of, or treatment of cancers and/or detection and qualitative or quantitative characterization of microorganisms. Such kits can be prepared from readily available materials and reagents. For example, such kits can comprise any one or more of the following materials: enzymes, reaction tubes, buffers, detergent, primers, probes, antibodies. In a preferred embodiment, these kits allow a practitioner to obtain samples of neoplastic cells in blood, tears, semen, saliva, urine, tissue, serum, stool, sputum, cerebrospinal fluid and supernatant from cell lysate. In another preferred embodiment these kits include the needed apparatus for performing RNA extraction, RT-PCR, and gel electrophoresis. Instructions for performing the assays can also be included in the kits.

In a particular aspect, these kits may comprise a plurality of agents for assessing or identifying microorganisms, wherein the kit is housed in a container. The kits may further comprise instructions for using the kit for assessing sequences, means for converting and/or analyzing sequence data to generate prognosis. The agents in the kit for measuring biomarker expression may comprise a plurality of PCR probes and/or primers for qRT-PCR and/or a plurality of antibody or fragments thereof for assessing expression of the biomarkers. In another embodiment, the agents in the kit for measuring biomarker expression may comprise an array of polynucleotides complementary to the mRNAs of the biomarkers of the invention. Possible means for converting the expression data into expression values and for analyzing the expression values to generate scores that predict survival or prognosis may be also included.

Kits may comprise a container with a label. Suitable containers include, for example, bottles, vials, and test tubes. The containers may be formed from a variety of materials such as glass or plastic. The container may hold a composition which includes a probe that is useful for prognostic or non-prognostic applications, such as described above. The label on the container may indicate that the composition is used for a specific prognostic or non-prognostic application, and may also indicate directions for either in vivo or in vitro use, such as those described above. The kit may comprise the container described above and one or more other containers comprising materials desirable from a commercial and user standpoint, including buffers, diluents, filters, needles, syringes, and package inserts with instructions for use.

Further kit embodiments relate to kits comprising the therapeutic compositions of the disclosure. The kits may be useful in the treatment methods of the disclosure and comprise instructions for use.

IX. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Molecular, Immune and Microbial Factors in Response & Toxicity to Combined CTLA-4 and PD-1 Blockade Therapeutic paradigms in cancer are rapidly evolving, driven by parallel advances in the understanding and ability to characterize tumors in-depth at a genomic and immune level. Checkpoint blockade immunotherapy targeting negative regulatory pathways that contribute to ineffective anti-tumor immune responses in patients is now a practical and effective strategy in widespread clinical use. Multiple new agents are under development, which are designed to block immunoinhibitory or activate immunostimulatory molecular targets. Efforts to improve response rates to checkpoint blockade are currently dominated by combination drug strategies, exemplified by the combination of CTLA-4 and PD-1 inhibitors (combination immune checkpoint blockade, CICB). Whilst more effective at inducing objective responses (Larkin et al., 2015), this combination is associated with significant immune-related adverse events (irAE) (Hammers et al., 2017; Sznol et al., 2017) and may be neither necessary nor appropriate for up to 40% of unselected patients who would be expected to respond to PD-1 blockade alone, with lower attendant risk of severe irAE (Robert et al., 2015a; Robert et al., 2015b). Reliable pre-treatment predictors of toxicity have not been identified despite recent efforts, and are critically needed.

The inventors sought to identify potential tumor-derived and systemic molecular, immune and gut microbial biomarkers of both response and immune-related toxicity in melanoma patients receiving CICB. A cohort of patients with advanced melanoma who were treated concurrently with the anti-CTLA-4 antibody ipilimumab and an anti-PD-1 antibody, either nivolumab or pembrolizumab, were assembled. Patients were categorized for response and toxicity using objective radiographic assessment to determine response, and incidence of high-grade (grade 3 or higher) irAE to determine toxicity.

Lesser toxicity was associated with a less diverse peripheral T cell repertoire, and an immune phenotype suggestive of more antigen-experienced T cells. Strikingly, this phenotype was also associated with receipt of prior immunotherapy agents which predicted for lower-grade toxicity. Median fecal microbial alpha-diversity was numerically higher in responders, with a differential abundance of *Bacteroides stercoris, Akkermansia muciniphila, Prevotella copri*, and *Bacteroides fragilis* related to response and toxicity. The causative role of the gut microbiota in facilitating CICB-mediated subclinical ileitis and colitis was examined in two tumor mouse models, demonstrating commonalities across mammalian species of distinct commensal ecosystems driving immunostimulatory or inhibitory effects.

A. Results

1. Study Schema and Biospecimen Collection

The inventors assembled a cohort of patients with metastatic melanoma receiving CICB either on clinical trials or as standard of care (SOC) therapy between Jan. 1, 2014 and Aug. 31, 2017 (FIG. 1, Table 1). Patients were excluded from the primary study cohort if they had mucosal or uveal melanoma subtypes, lacked appropriate biospecimens relevant to the treatment period, or if insufficient data were available to determine radiographic responses and toxicity data.

Patients were classified as "responders" (R) or "non-responders" (NR) based on their best overall response (BOR) to CICB measured by RECIST v1.1 and were also categorized as having any grade 3 or higher irAE versus less than grade 3 irAE. Available pre- and on-treatment tumor and peripheral blood samples were assembled for correlative molecular and immune analyses, whilst pre- or early on-treatment fecal specimens were collected and frozen using the OMNIgene-GUT kit prior to microbiome profiling by 16S rDNA sequencing (Table 1).

2. Patient Characteristics, Clinical Efficacy and Toxicity of CICB

The cohort comprised 53 patients, predominantly with stage IV disease (n=45, 85%), with the majority of patients naïve to prior systemic therapy for advanced disease (n=39, 74%) (Table 2). One fifth (n=11, 20.8%) of patients had received some form of prior immunotherapy; ipilimumab or anti-PD-1 not as combined therapy, anti-PD-L1 agent, cytokine agent alone or as part of a biochemotherapy regimen with adjuvant or palliative intent (Table 2).

The median number of doses of combination ipilimumab+ anti-PD-1 agent was 3 (range 1-4) (Table 3), with a median number of anti-PD-1 agent monotherapy doses after initial combination dosing of 1 (range 0-44). The overall response rate was 77.4% (41/53 patients) and after a median follow-up time of 15.6 months, progression had occurred in 21 patients (median PFS not reached overall, median time-to-progression 3.0 months in progressors; FIG. 1). Nearly all patients (n=51, 96.2%) experienced a treatment-related ("possible", "probable" or "definite" association) adverse event (AE) of any grade, with high-grade treatment-related immune-related AEs (irAE) (≥grade 3) occurring in 28 (52.8%) of patients, most commonly diarrhea/colitis, transaminitis, hypo/hyper-thyroidism, other endocrinopathies and dermal toxicities (rash, pruritus) (Table 3). Treatment-related toxicity led to treatment discontinuation in 21 (39.6%) patients, however there were no treatment-related deaths.

3. Molecular and Immune Determinants of Response and Resistance to CICB

As mutational burden varies widely across tumor types and has previously been shown to influence objective response to CTLA-4 or PD-1 blockade monotherapies (Hugo et al., 2016; Snyder et al., 2014; Van Allen et al., 2015) with some evidence also reported in the setting of treatment with CICB in non-small cell lung cancer (Hellmann et al., 2018), the inventors first investigated the relationship between mutational load and response to CICB. Whole-exome sequencing was performed in available pre-treatment tumor samples (n=26, Table 1). All cases displayed predominance of a UV damage signature characterized by C>T transitions, as expected for cutaneous melanomas (data not shown). No statistically significant difference was observed between total exonic mutations or non-synonymous variants (NSVs) between responders (R, n=20) and non-responders (NR, n=6) to CICB (FIG. 2A), although significant overlap was noted in the low-mutational burden range (<1000 NSVs) suggesting that a high mutational burden could be permissive of, but not essential for, response.

Figure 8A:
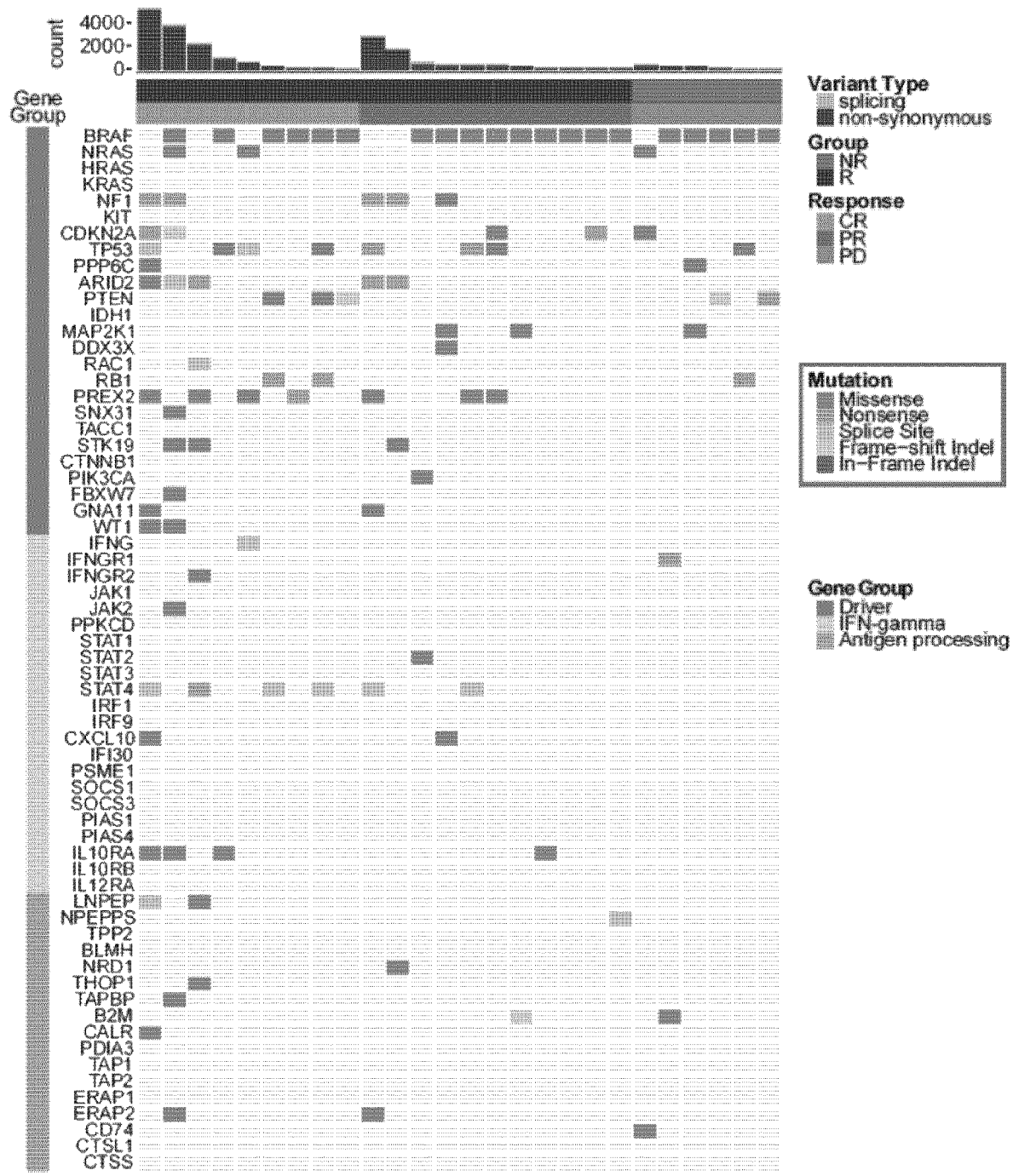

Next, the inventors examined whether specific mutational drivers of melanoma or immune-related signaling pathways were associated with CICB response. Common melanoma driver mutations were evenly distributed throughout patient-derived tumors irrespective of response status, without clear patterns according to mutational type (eg: missense, nonsense, indel), affected gene, or gene group when classified into melanoma drivers, IFN-γ-pathway and antigen processing pathway gene sets (FIG. 8A). BRAF$^{V600}$ mutations were significantly associated with a lower overall somatic mutational load (p<0.001) (FIG. 8B) as expected, but were not associated with response.

Figure 2D:
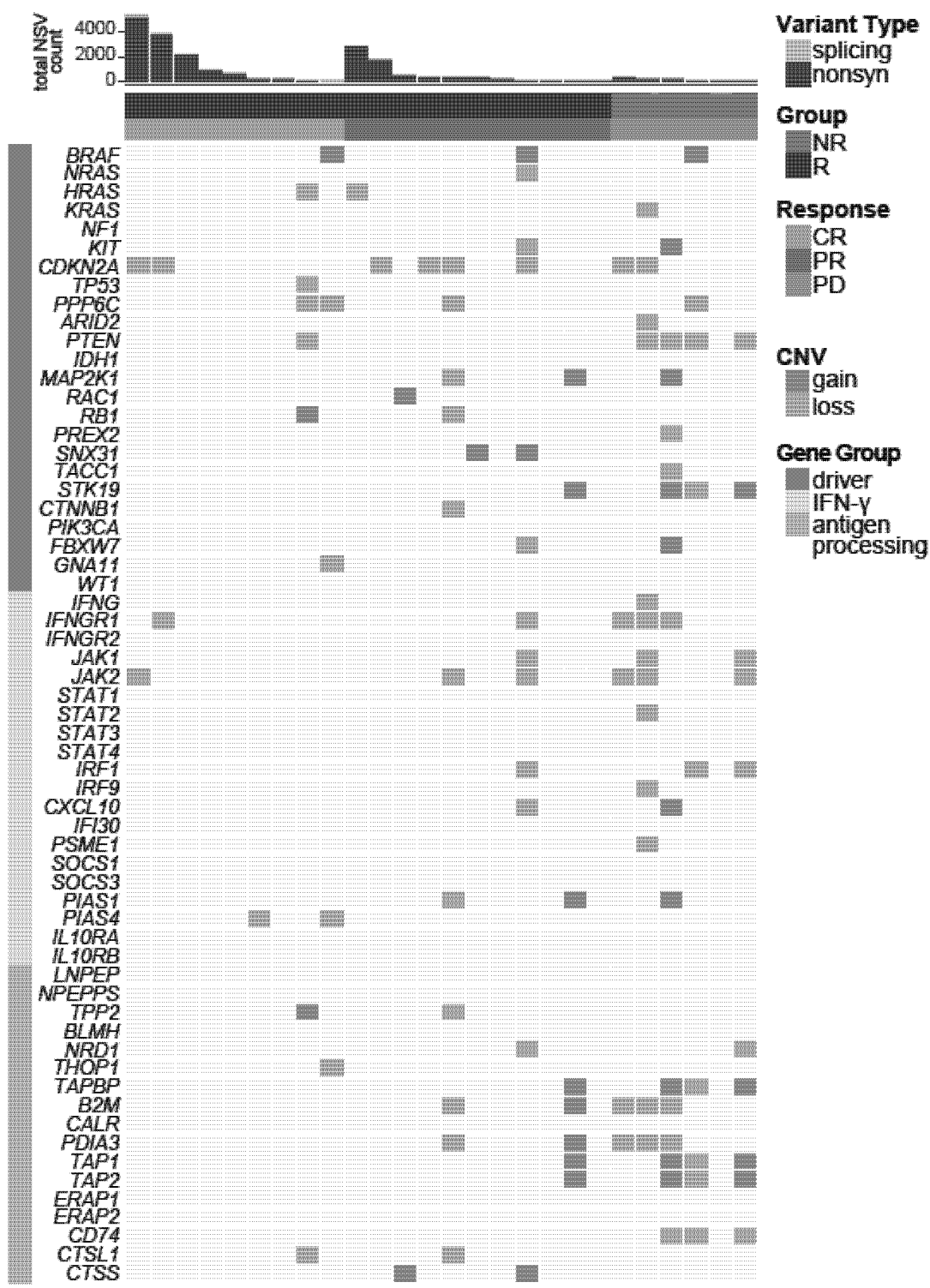

Given that immunogenicity relating to neoantigen load is expected to be proportional to the underlying non-synonymous mutation load, the inventors performed in silico neoantigen prediction using the netNMCpan algorithm (Nielsen et al., 2007) which revealed no significant differences in the number of total or high-binding affinity predicted neoantigens between the two response groups (n=26, FIG. 8C). Due to an absence of correlation between mutational or predicted neoantigen load and response, the inventors then examined if genomic copy number alterations (CNA) influence response. Unlike mutational burden, copy number loss burden demonstrated a statistically significant association with response (p=0.04, FIG. 2B), driven by a higher burden of chromosomal copy number losses in NR, principally affecting chromosomes 5, 15, and particularly 10 (FIG. 2C, FIG. 8D-E). Several genes previously implicated in resistance to immune checkpoint blockade monotherapies appeared either exclusively (CD74) or disproportionately (PDIA3, B2M, PTEN) affected by copy number losses in NR tumors (FIG. 2D), suggesting potential immuno-genomic mechanisms of resistance to CICB (Ekmekcioglu et al., 2016; Peng et al., 2016; Roh et al., 2017; Tanese et al., 2015; Zaretsky et al., 2016).

To further explore the complex microenvironmental interactions between tumor and infiltrating immune cells in shaping outcome to CICB, the inventors next examined intratumoral and systemic immune populations to identify potential markers of response. As expected, a numerically higher CD8+ density was observed in baseline tumor immune infiltrates of R compared with NR tumors, however this did not reach statistical significance, likely owing to the limited cohort size and a relatively small proportion of non-responders (n=19 R, n=6 NR; p=0.052, one-sided Mann-Whitney test, FIG. 2E). Notably, CD8+ T cell density tended to increase following CICB treatment irrespective of treatment response (FIG. 9A). Analysis of intratumoral T cell repertoires by T cell receptor (TCR) sequencing (n=25, Table 1) revealed a strong trend for higher entropy of tumor T cell infiltrates of R (FIG. 2F). TCR sequencing of baseline tumors demonstrated no significant differences in clonality between R and NR (p=0.28, FIG. 2G), however this was again limited by the cohort size and proportion of R/NR (n=19 R, n=6 NR).

4. Antigen-Experienced T Cell Repertoire and Prior Immunotherapy are Associated with Absence of Grade 3-4 irAE Severe irAEs are particularly common in patients receiving CICB, and occurrence of grade 3 or higher irAEs often leads to discontinuation of therapy despite clinical response. Precise immune mechanisms of irAEs from CICB and reliable predictive biomarkers are lacking (Carlino and Long, 2016). The inventors studied the association between systemic immune parameters and toxicity, hypothesizing that the systemic circulation represented the most readily accessible compartment from which to sample potentially auto-reactive immune cells and thus identify immune signatures of a patient's susceptibility to irAEs with CICB. The inventors performed comprehensive immune profiling of peripheral blood leukocytes using multiparameter flow cytometry, and evaluated the circulating T cell repertoire with TCR sequencing. Consistent with previously-reported findings that treatment-induced expansion of circulating CD8+ T cell clones following ipilimumab therapy was predictive of toxicity in prostate cancer patients (Subudhi et al., 2016), the TCR sequencing analysis (n=16) also showed that whilst a cut-off of 55 expanded clones in the peripheral blood was associated with high-grade toxicity, there was no useful negative predictive value of a TCR repertoire bearing lower numbers of expanded clones (p=0.22 overall, FIG. 9B). Patients experiencing toxicity also had a higher Ki67 proliferative index in their effector and central memory CD8+ T lymphocytes early on-treatment, consistent with accelerated expansion of cytotoxic T cells contributing to immune-related toxicity (p=0.0044, n=14; FIG. 3A, FIG. 9C). Notably, peripheral blood lymphocytes collected prior to initiation of CICB (n=24) revealed significantly higher diversity of the T cell repertoire (p=0.028, FIG. 3B) and significantly higher entropy in patients who subsequently experienced high-grade irAEs (p=0.0068, FIG. 3C). Together these results suggest that a less-focused T cell repertoire harboring greater numbers of potentially auto-reactive clones may contribute to toxicity to CICB.

To gain further insight into the phenotype of these circulating lymphocytes, the inventors performed multiparameter flow cytometry on baseline peripheral blood samples (n=14-18). Significantly lower expression of surface CD28 and CD27 was noted in circulating CD4+ and CD8+ T lymphocytes of patients who did not develop severe irAEs (CD27 in CD4 Teff, p=0.0022; CD28 in CD4 Teff, p=0.014; CD27 in CD8 Teff, p=0.072; CD28 in CD8 Teff, p=0.04; FIG. 3D-E, FIG. 9D-E), suggesting that patients with a more antigen-experienced T cell repertoire have a lower incidence of subsequent toxicity on treatment with CICB.

As this immune profile suggested features of prior immune activation, the inventors next compared T lymphocyte expression of CD27 and CD28 between patients who received prior immunotherapy versus those who did not. It was hypothesized that prior immunotherapy would lead to a more antigen-experienced T cell repertoire with a phenotype more closely resembling terminally-differentiated, repeatedly-stimulated T-cells. The inventors first stratified the patient cohort by their history of prior immune stimulating therapy and irAE status. The inventors observed a markedly lower risk of high-grade irAE (RR=0.29, 95% CI=0.08-0.81) in patients with exposure to any prior immunotherapy (p=0.01[6], Fisher's exact test) (FIG. 3F). In addition, consistent with the hypothesis, immunotherapy-naïve patients indeed had markedly higher expression of CD27 and/or CD28 on effector CD4/8 T cell populations at baseline when compared to patients who received prior immunotherapy (n=12 immunotherapy-naïve, n=3 immunotherapy-experienced; CD27 in CD4 T effector cells, p=0.0044, CD28 in CD8 T effector cells, p=0.018; FIG. 3D-E, prior immunotherapy indicated by color).

5. Gut Microbiome Profiles are Associated with Efficacy and Toxicity of CICB

Figure 10A:
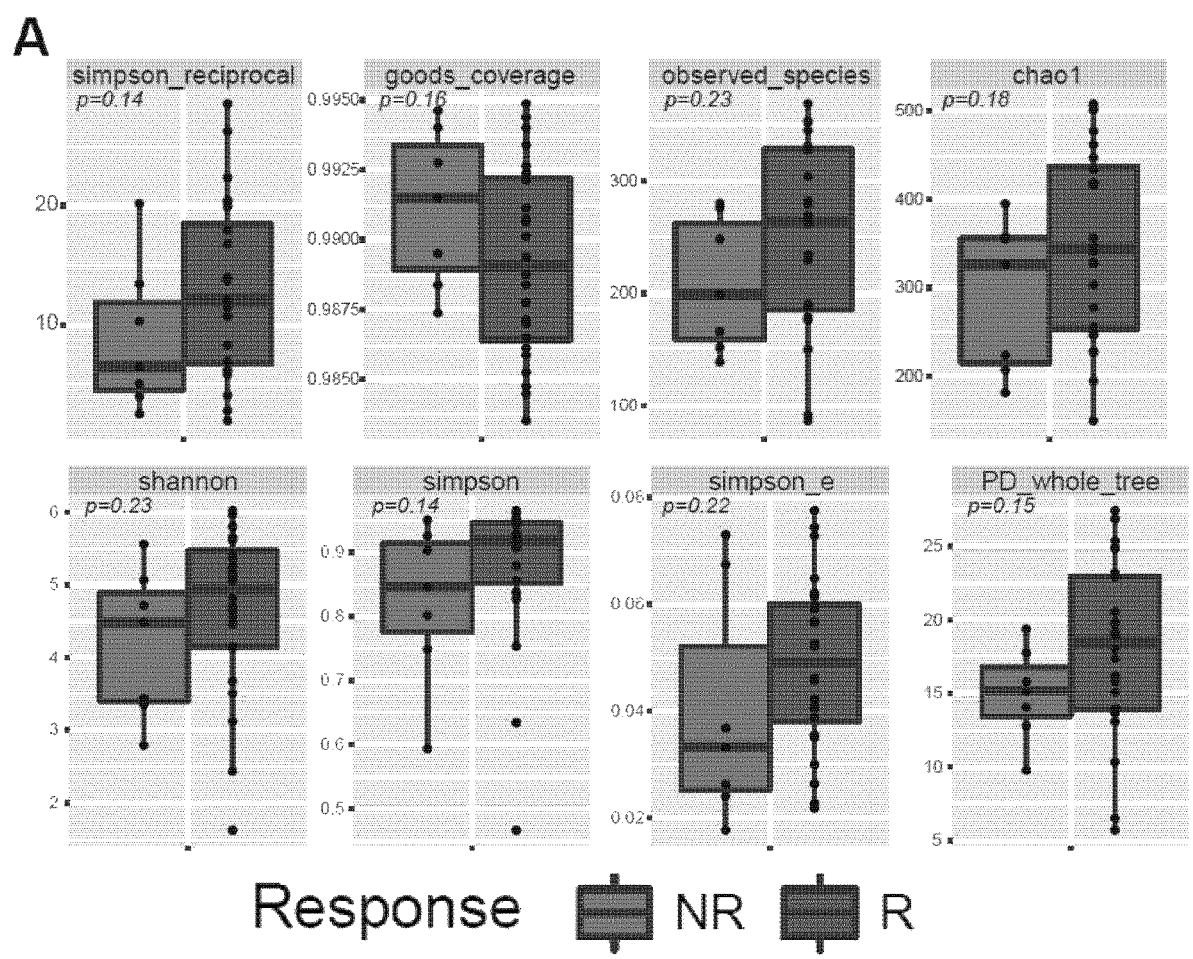
Figure 10B:
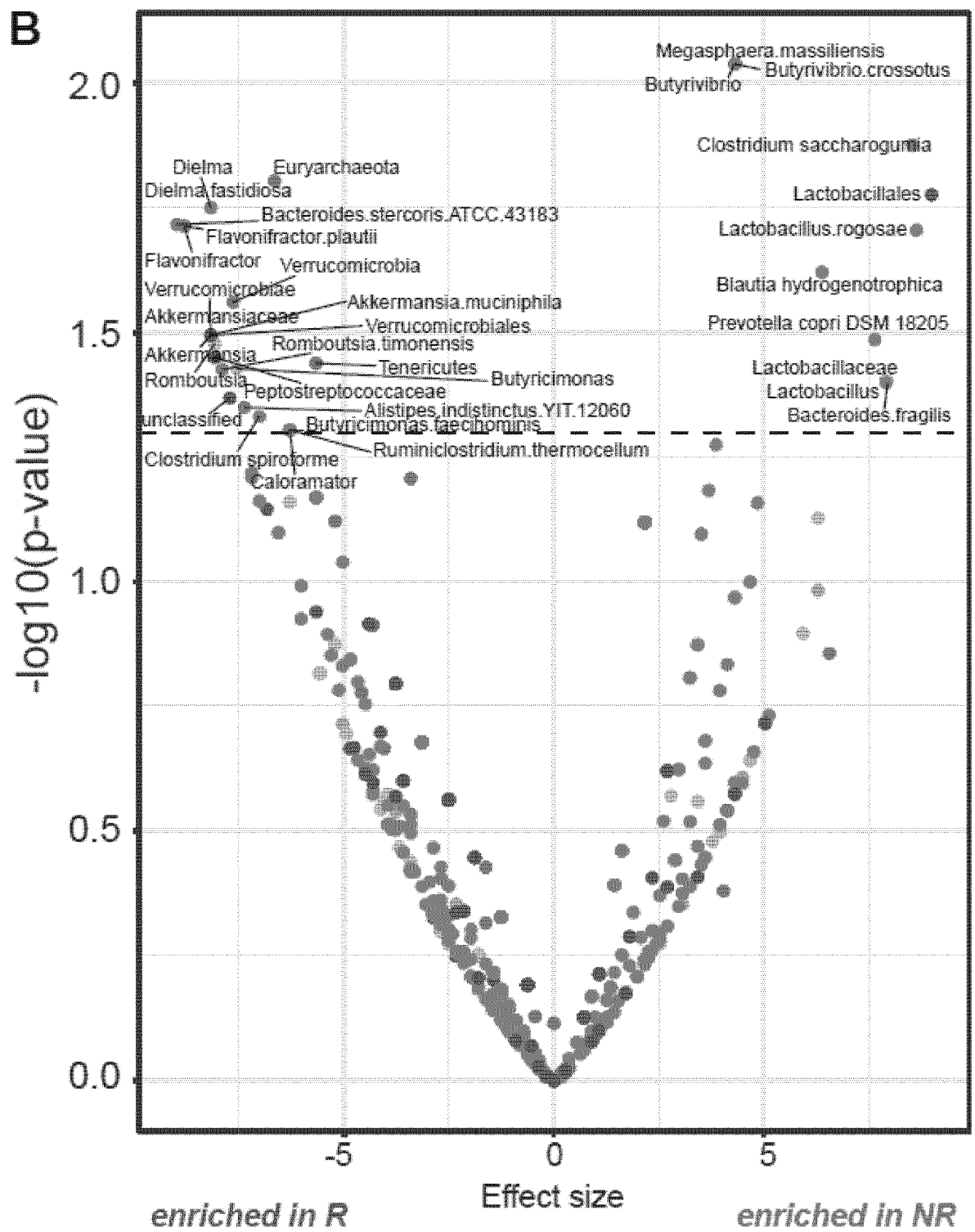
Figure 10C:
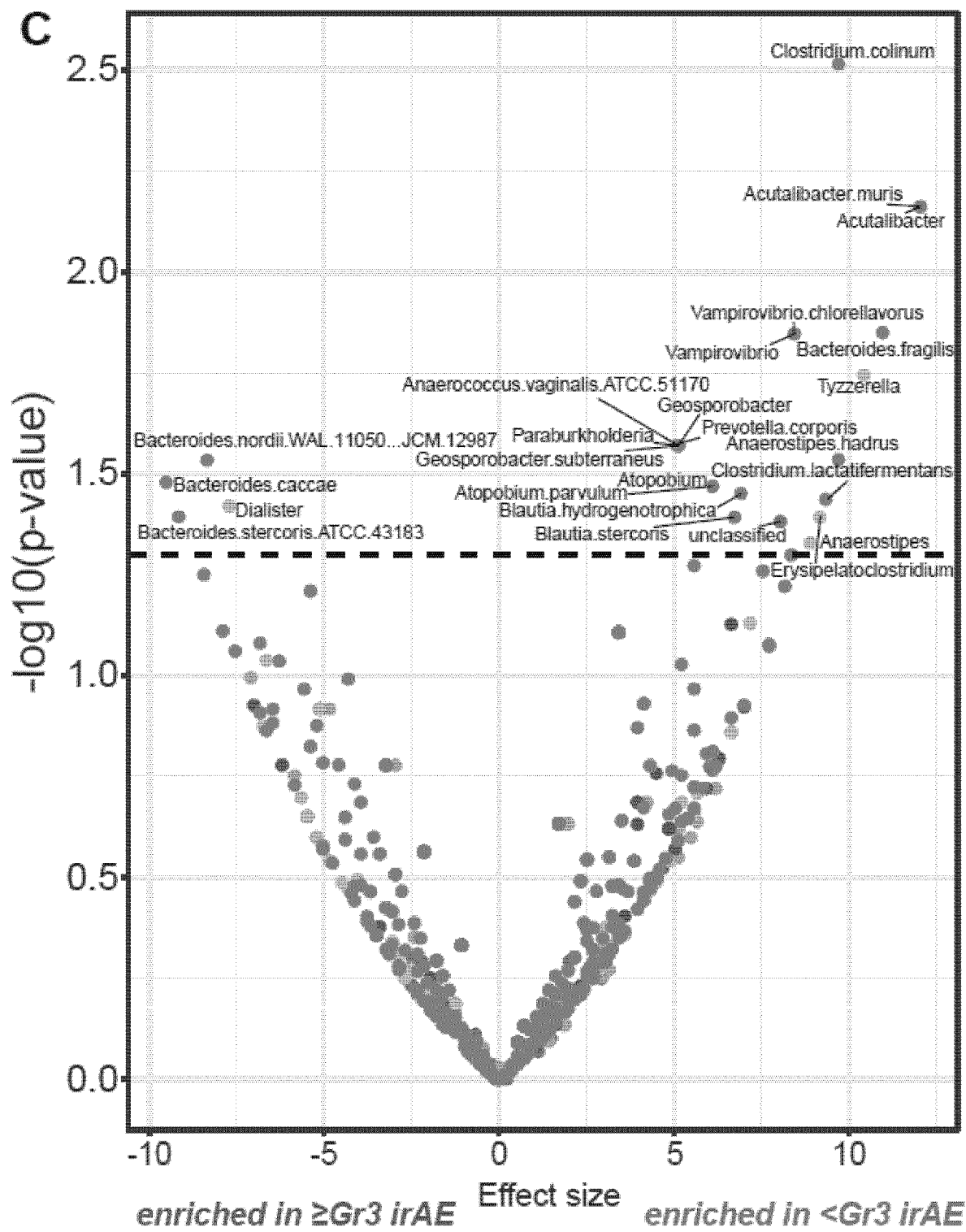

The inventors next sought to study the influence of the differential diversity and the composition of the gut microbiota on clinical outcomes of immune checkpoint blockade monotherapies in patients treated with CICB. Fecal microbiome samples were collected at treatment initiation when feasible in patients going onto CICB as described (FIG. 1), and microbial signatures were profiled using 16S rDNA sequencing (n=31, comprising n=24 R, n=7 NR, n=19≥Gr3 irAE, n=12 without ≥Gr3 irAE; Table 1). Across the cohort, fecal microbial composition was quite varied, with Bacteroidales and *Clostridiales* being the most abundant in all fecal samples (FIG. 4A). Based on prior studies demonstrating a higher diversity of the gut microbiome in R to anti-PD-1 blockade (Gopalakrishnan et al., Science 2018), the inventors first compared the median alpha diversity in R vs NR to CICB, and observed a similar trend which was preserved across multiple diversity metrics (p=0.14, FIG. 4B, FIG. 10A). The inventors next evaluated the relationship between diversity of the gut microbiome and toxicity to CICB, demonstrating no apparent trend between patients with severe irAEs versus those without (p=0.59, FIG. 4C). The inventors then evaluated compositional differences between R and NR to CICB using linear discriminant analysis of effect size (LEfSe) (Segata et al., 2011), and pairwise comparison of relative taxonomic abundances. Several bacterial taxa were enriched in R to CICB, including *Akkermansia muciniphila, Bacteroides stercoris*, and *Dielma fastidiosa*, among others (p=0.032, p=0.019, p=0.018, respectively by Mann-Whitney tests; FIG. 4D, FIG. 10B). Conversely, additional bacterial taxa were noted to be enriched in NR, including *Lactobacillus rogosae, Bacteroides fragilis*, and *Prevotella copri* (FIG. 4D) (p=0.040, p=0.040, p=0.033, respectively by Mann-Whitney tests; FIG. 10B). Additionally, consistent with prior findings, *Firmicutes, Clostridiales* (p=0.21), Ruminococcaceae (p=0.56) also tended to be higher in responders however the association was relatively weak, possibly due to distinct microbial-response associations in the context of anti-PD-1 monotherapy compared with CICB (FIG. 10B). Several bacterial taxa were also associated with high-grade irAE, including *Bacteroides stercoris* (also implicated in patients who responded), *Bacteroides caccae*, and *Dialister* (p=0.040, p=0.033, p=0.038 by Mann-Whitney tests, respectively; FIG. 4E, FIG. 10C). Bacterial taxa enriched in patients without irAEs included *Bacteroides fragilis, Vampirovibrio*, and *Tyzzerella*, among others (LEfSe, FIG. 4E; pairwise p=0.014, p=0.014, p=0.018, respectively, FIG. 10C).

To determine if specific systemic immune populations mediate microbial influences on the development of treatment-related irAE, the inventors then examined correlations between circulating immune cell subsets and key taxa associated with response in cases with matched fecal microbiome data and pre-treatment peripheral blood immune phenotyping (n=9) and fecal microbiome data. The key response-associated taxa *B. stercoris, Flavonifractor plautii, Dielma fastidiosa* and *Akkermansia muciniphila* identified previously (FIG. 4D) were directly correlated with pre-treatment abundance of circulating PD-1+ T cell populations and measures of overall CD8 T cell abundance (CD8 total, inversely-correlated with CD4:CD8 ratio; FIG. 10D) consistent with a systemic immune profile enriched for potentially tumor-reactive lymphocytes and poised to respond upon CICB treatment. The inventors then performed similar analyses between circulating immune populations and bacterial taxa associated with development of, or freedom from, high-grade irAE. Consistently positive correlations were observed between the abundance of several toxicity-associated *Bacteroides* taxa and PD-1+ T cell populations, consistent with the potential (re)activation of diverse immune specificities upon CICB initiation leading to toxicity (FIG. 4F). Unexpectedly, toxicity-associated *Bacteroides* species demonstrated discordant associations with the previously-identified CD4+ and CD8+ T cell expression of CD27 and CD28; notably *B. stercoris*, which was inversely correlated with CD27/CD28 levels, was also highly associated with response. Additionally, discordant correlations between several toxicity-associated *Bacteroides* species and the CD27/28+ fractions within T cell subsets became more evident in on-treatment samples (n=9, FIG. 10E). These data suggest that distinct bacterial-immune associations exist between taxa more specifically associated with toxicity versus those associated with both toxicity and/or response (FIG. 4F).

6. CICB-Induced Bacterial Shifts in the Gut Microbiome are Associated with Responsiveness Driven by the association of the gut microbial composition in influencing efficacy and toxicity of CICB in melanoma patients, the inventors next investigated whether microbial patterns could influence outcomes to ICB monotherapy or CICB in mice. The inventors treated established MCA205 sarcoma and RET melanoma with anti-PD-1 antibodies alone or in combination with anti-CTLA-4 antibodies for 2 weeks (6 and 5 administrations, respectively), and observed prolonged and/or complete regressions in MCA205 with each treatment modality (2/6 anti-PD-I-treated and 6/6 CICB-treated mice were responders (R), defined as mice with tumors which either regressed or did not increase in size over two consecutive measurements; FIG. 5A, left panel). Analogous studies in the RET melanoma model demonstrated similar results but with higher numbers of non-responder (NR) mice, defined as mice whose tumors enlarged over two consecutive measurements (5/6 anti-PD-I-treated and 2/10 CICB-treated were NR; FIG. 5A, right panel).

To test for differences in microbial composition over the course of therapy across both tumor models, the inventors performed principal coordinate analyses of microbial beta diversity, which provides a measure of the overall relatedness (or lack thereof) between samples. When considering longitudinal fecal samples collected prior to and after 2 or 5 doses of CICB, the inventors identified significant changes of the microbiome composition over time in both tumor models (FIG. 5B, left and right panels), with the most apparent clustering effect observed in samples obtained after 5 doses of CICB in the RET model (FIG. 10A-D). In the same mixture of longitudinal samples, principal coordinate analysis revealed a significant association between the fecal microbiota and the tumor size at each sample collection time point, for both tumor models (p=0.001 in MCA205, p=0.039 in RET; FIG. 5C). Together, these data identify a dynamic interplay between microbiota, immunotherapy, and tumor growth kinetics.

The inventors next compared bacteria present in the pre-treatment gut microbiota of mice that subsequently responded to CICB in either of the two tumor models (MCA205 and RET), finding 169 taxa present in both models, including *Alistipes indistinctus* and *Akkermansia muciniphila*. Furthermore, *Flavonifractor plautii* was also enriched in human patients responding to CICB (FIG. 4D, FIG. 5D, Table 4). To identify further commonalities in bacteria across patient samples and murine tumor models, the inventors compared response-associated taxa identified by LEfSe in patients with those identified as differentially enriched between R and NR mice to CICB using LEfSe in both murine tumor models. Furthermore, given the finding of significant and model-dependent variation in gut microbial composition over time, the inventors sought to enrich the taxonomic discovery with additional biological information by focusing on human response-associated taxa which became or remained differentially enriched in either mouse model during the course of CICB, and which were correlated (or anti-correlated) with tumor size (FIG. 11A-D). The inventors examined two timepoints in an attempt to determine if treatment and tumor size were associated with the gut microbiota, and if the gut microbiota remained stable after commencing therapy. Early on-therapy (after 2 injections), *Flavonifractor* (*F. plautii* in MCA205) and *Dielma* (*D. fastidiosa* in MCA205) were identified as overlapping with microbiota fingerprints of CICB responder patients (FIG. 11A-B). After 5 injections, *Akkermansia* (*A. muciniphila*, in MCA205), *Bacteroides* spp. (*B. stercorirosoris* in MCA205), and *Dielma* (*D. fastidiosa* in RET) were commonly found in both responding mice and patients (FIG. 11C). Notably, *A. muciniphila* anti-correlated with tumor size in RET tumors along with previously reported commensal species (such as *E. hirae*) (FIG. 11D) (Routy et al., 2018). In contrast, distinct *Lactobacillus* spp. (such as *L. animalis*) positively correlated with tumor growth in CICB-treated RET and anti-PD-1-treated MCA205 tumors (FIG. 11D) and were noted to be associated with non-response to CICB in human patients (FIG. 4D). When segregating responders (R) from the non-responding (NR) mice to CICB at different timepoints, regardless of tumor type, the inventors found not only *A. muciniphila* and *Dielma fastidiosa* but also *Alistipes indistinctus* as associated with response in melanoma patients (FIG. 5E, Table 4).

Figure 12A:
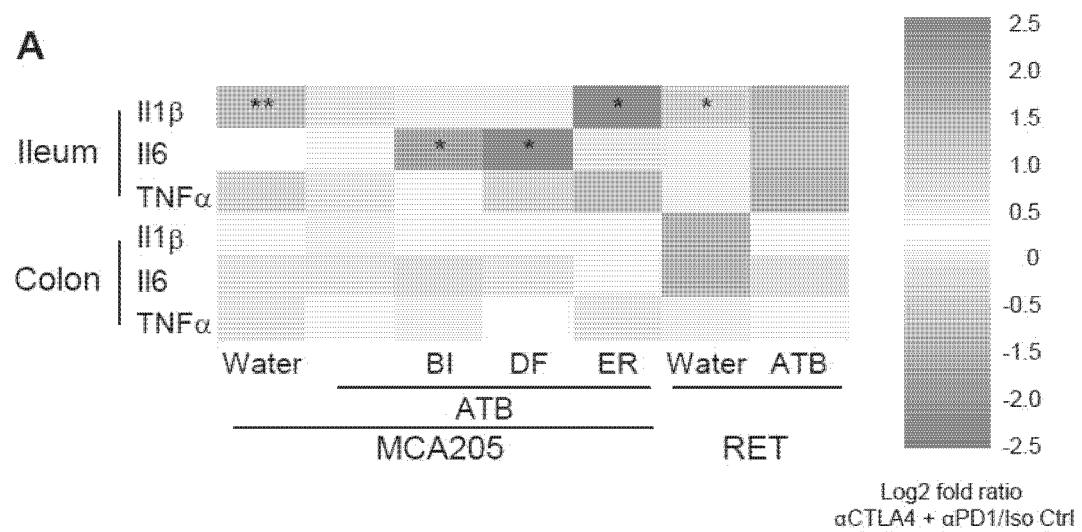
FIG. 12A. Microbiota-dependent inflammatory cytokine patterns of ilei and colons in tumor-bearing mice. (A) Heat map of log 2-fold change in the CICB/isotype control ratio of relative proinflammatory gene expression in ileum and colon of MCA205 and RET tumor bearing mice with or without antibiotics, or monocolonization with indicated bacteria. n=5-22/group. *p<0.05, **p<0.01, Mann-Whitney test.

7. Intestinal Commensals Cause or Mitigate Subclinical Ileitis or Colitis Induced by CICB Next, the inventors analyzed potential correlations between the gut microbiota and toxicity in mouse models, focusing on gut toxicity (colonic and ileal). Of note, murine models poorly reproduce overt colonic irAE (e.g.: weight loss, mucosal bleeding, altered stool volume and consistency), therefore the inventors first scored histologic abnormalities of the gut epithelium and lamina propria (irregularities or destruction or length reduction of villi and crypts, presence of inflammatory infiltrates) after administration of CICB alone or co-administered with broad-spectrum antibiotics (ATB), with or without monocolonization by specific commensal bacteria informed by the parallel analyses in humans. Indeed, CICB induced subclinical ileal toxicity that was highly mitigated by sterilization of the mouse intestines with ATB (FIG. 6A-B). Supplementation of ATB-treated mice with distinct commensals (such as *Erysipelatoclostridium ramosum*) could reinstate ileal toxicity while others (*Bacteroides intestinalis*) appeared protective (FIG. 6A-B). Next, the inventors performed gene expression profiling on the ileum and colon of the treated mice showing that this ileal toxicity was accompanied by a prompt and selective upregulation of the transcription of the pro-inflammatory cytokine IL-1β but neither TNFα nor IL-6, and only in the presence of a gut microflora or monocolonization with *E. ramosum*, but not *B. intestinalis* or *D. fastidiosa* (FIG. 6C, FIG. 12). Consistent with a specific role for IL-1β in the genesis of ileal inflammation in response to CICB, IL-1R1 blockade concomitant with CICB alleviated ileal toxicity (FIG. 6D).

In contrast to ileal toxicity, the development of subclinical mouse colitis was tumor-related, and was observed during CICB against RET melanoma but not MCA205 fibrosarcoma (FIG. 6E). Moreover, the composition of the fecal microbiome was associated with the presence of immune infiltrates in the colonic mucosa in the RET tumor model (FIG. 6F left panel). Out of ten species associated with high colonic immune infiltrates suggestive of colitis in mice, only *Bacteroides intestinalis* was also noted to be associated with toxicity in the human cohort, acknowledging that the definition of high-grade irAE in patients was not restricted to gastrointestinal toxicity, which was only experienced by 7/31 patients in the microbiome cohort (FIG. 4E, FIG. 6F right panel). In contrast, high abundance of *Vampirovibrio chlorellavorus* was associated with low immune infiltrates in the colons of treated mice, and was also noted in patients to be associated with a lower likelihood of high-grade toxicity (FIG. 6F right panel, FIG. 4E). *Clostridium lactatifermentans*, which was associated with less toxicity in patients, (FIG. 4E) was also present in mice responding to CICB (Table 4).

Finally, the inventors tested the impact of the gut microbiome on subclinical colonic toxicity by transferring fecal material from a renal cell carcinoma (RCC) patient who failed to respond to ICB and did not experience toxicity, into ATB-sterilized avatar mice with subsequent implantation of orthotopic RENCA tumors and treatment with CICB as previously described (FIG. 6G) (Routy et al., 2018). Transplantation of fecal material into tumor-bearing mice conferred colonic inflammation upon CICB treatment that could be prevented by oral gavage of *A. muciniphila*, which has been previously identified as a species associated with anti-PD-1 response (Routy et al., 2018), or fecal material from a RCC patient who responded to therapy and did not experience grade 3-4 irAE, as monitored by immunohistochemistry and fecal levels of the antimicrobial peptide lipocalin-2 (FIG. 6H-I). Metagenomic analysis of responding RCC patient feces indicated the presence of *A. indistinctus* which was also present in the fecal microbiota of responding melanoma patients (FIG. 4D) and responding mice (FIG. 5E) but absent in the non-responding RCC patient feces.

Together these microbial analyses implicate a causal role of bacterial ecosystems in modulating therapeutic response and toxicity to CICB, demonstrating robust associations between pre-treatment intestinal microbiome composition and CICB-induced compositional shifts with therapeutic outcome or toxicity. These findings also highlight unexpected commonalities of distinct bacterial communities across tumor types and mammalian species (humans, mice).

B. Discussion

Combined anti-CTLA-4 and anti-PD-1 therapy affords a superior response rate in the treatment of advanced melanoma relative to single-agent therapy, however this intensive regimen is hampered by a high incidence of severe irAEs (Carlino and Long, 2016). The studies described in this Example identify novel biomarkers of response and irAE in the context of combined immune checkpoint blockade. It was found that a higher burden of copy number losses is a predictor of CICB resistance. The genes that were preferentially lost in non-responders were concentrated on chromosomes 5, 10 and 15. Upon close inspection, genes previously implicated in tumor inflammation or response to immune therapies were identified on these copy number alteration-affected regions, including PTEN, B2M, and CD74 (Ekmekcioglu et al., 2016; Peng et al., 2016; Tanese et al., 2015; Zaretsky et al., 2016).

Analysis of the gut microbiota afforded intriguing insights into potentially modifiable biomarkers of response. The inventors identified members of the *Bacteroides* and *Akkermansia* genus to be preferentially enriched in responders, whilst members of the *Lactobacillus* genus were enriched in non-responders to CICB. *Akkermansia* genus and *A. muciniphila* strain were also over-represented in sarcoma-bearing mice during CICB (and all responded to CICB) and remained at least stable in responders whilst decreasing in non-responders across tumor models. *A. indistinctus* was also found in the group of responding patients in this cohort of metastatic melanoma patients treated with CICB, and in the group of responding mice across tumor models during therapy with CICB. *D. fastidiosa* was also a common trait in the present cohort of patients and in CICB-responding mice during therapy and highlights the importance of culturomics as a tool for studying the microbiota.

The majority of biomarker attention to date has been focused on objective anti-tumor response, however the safe and optimal use of these agents—particularly in combination regimens—requires greater consideration of biomarkers for toxicity. In this study, the inventors found that a more diverse TCR repertoire can predict high-grade irAE. These data are highly suggestive that therapy-related autoimmunity may be driven by latent, low-abundance self-reactive T cell clones, the existence of which is proportional to the overall diversity of the circulating lymphocyte pool. Most importantly, it was found that features of a more terminally-differentiated/antigen-experienced T cell repertoire—consistent with the notion of a more 'focused', less-diverse repertoire—was associated with markedly lower likelihood of high-grade toxicity. The population-level structure of the circulating lymphocyte pool conceivably influences the relative likelihood of activating tumor-reactive (desirable) versus auto-reactive (undesirable) T cell clones, and may underlie the observed link between response and toxicity in immunotherapy-treated patients. The parallel observation that prior immunotherapy exposure may promote a T cell phenotype favorable to the avoidance of toxicity provides tantalizing preliminary evidence that pre-treatment pharmacological maneuvers may be capable of mitigating the toxicity of high-intensity immunotherapy regimens. Larger cohorts with well-documented and more homogeneous prior exposures (or not) to modern immunotherapeutic agents will afford valuable opportunities to study the interaction of the circulating T cell repertoire, immune modulating interventions, the microbiota, and irAE. Additionally, large cohorts will be necessary in order to dissect etiologic differences between associations with any type of irAE, or organ-system specific (e.g.: transaminitis versus colitis versus thyroiditis) irAEs.

The gut microbiota may also represent a critical—and modifiable—influence on the likelihood of developing checkpoint immunotherapy-related autoimmune toxicities. The inventors identified several taxa as strongly associated either with the development of, or freedom from high-grade immune-related toxicities. Importantly, most response-associated bacterial taxa were not highly associated with toxicity, except for B. *stercoris*, and apparent species-level variation in the correlation to toxicity-associated systemic lymphocyte sub-populations. This data suggests that potentially distinct immunomodulatory microbial mechanisms underlying associations with irAE extend to very low (species) levels of taxonomy such that even closely-related taxa can have conflicting associations with irAE. In mice, CICB was more toxic at the ileal than the colonic level, with a clear causative role of distinct ecosystems. Indeed, therapy with broad spectrum antibiotics or fecal microbial transplantation could ameliorate the ileitis or colitis score. Some bacterial species appeared more toxic than others (such as E. *ramosum*). CICB-induced ileitis might be ascribed to the capacity of toxicity-associated commensals to induce mucosal IL-1β, as IL-1R1 blockade mitigated the CICB-induced ileitis. It was also found commonalities across mammals with respect to the commensals associated with gut toxicity. B. *intestinalis* featured among the commensals associated with grade 3-4 toxicity in the present cohort of metastatic melanoma patinets treated with CICB as well as in (C)ICB-treated RET/MCA205 tumor bearing mice. However, B. *intestinalis* alone failed to induce ileitis or colitis in the model system, either because this strain is devoid of intrinsic cytotoxicity or because it requires a proper ecosystem (and other strains) to alter the mucosal barrier.

Beyond their role in predictive biomarker identification, these comprehensive molecular, immune and microbial studies have identified promising avenues to explore manipulation of the gut microbiota and sculpting of the lymphocyte repertoire with the aim of uncoupling response and toxicity in the setting of CICB. These findings have important clinical implications in the era of personalized medicine and warrant verification in larger datasets and across multiple cancer types.

C. Experimental Model and Subject Details

1. Patient Cohort

Patients with advanced (stage III/IV) melanoma treated at the UT MD Anderson Cancer Center between 1/23/2014 and 08/31/2017 who received at least one dose of ipilimumab in combination with a PD-1 checkpoint blockade agent (either nivolumab or pembrolizumab) as combination immune checkpoint blockade (CICB) were identified from detailed retrospective and prospective review of clinic records. CICB treatment was provided as part of clinical trial or expanded access program protocols (NCT01844505, NCT02186249, NCT02089685, NCT01621490, NCT02519322, NCT02320058) or as standard of care therapy. Due to known differences in underlying biology and immunotherapy responses between melanoma subtypes, only cutaneous melanomas were included (i.e.: mucosal and uveal melanomas were excluded from this study). To enable translational analyses, patients without available biospecimens relevant to the CICB treatment period, or for whom insufficient data were available to determine radiographic responses and toxicity outcomes were excluded. Overall, an initial cohort of 40 patients meeting the above criteria was identified and studied for molecular and immune correlates of response and toxicity. Due to initially limited fecal microbiota sampling and more widespread uptake during the study interval, an additional 13 patients from whom available fecal specimens were available were subsequently identified and included in microbiome-related translational analyses and were fully integrated into all clinical analyses.

2. Mice

All mice experiments were approved by the local institutional board and performed in accordance with government and institutional guidelines and regulations. Female C57Bl/6 and BALB/c were purchased from Harlan (France) and Janvier (France), respectively. Mice were used between 8 and 16 weeks of age. All mice experiments were performed at Gustave Roussy Cancer Campus and mice were housed in specific pathogen-free conditions or maintained in isolators.

3. Cell Lines

MCA205 and RET melanoma (a transgene-enforced expression of the Ret protooncogene under the control of the metallothionein-1 promoter driving spontaneous melanomagenesis, kindly provided by Professor Viktor Umansky) (syngeneic from C57BL/6J mice) and luciferase-transfected renal cancer (RENCA) cell lines (syngeneic for BALB/c mice, kindly provided by Transgene, Illkirch, France) were cultured at 37° C. under 5% $CO_2$ in RPMI-1640 medium supplemented with 10% heat-inactivated fetal bovine serum (FBS), 1% penicillin/streptomycin, 2 mM L-glutamine and 1% of sodium pyruvate and non-essential amino acids (all from Gibco-Invitrogen), referred herein as complete RPMI medium. RENCA was maintained in complete RPMI supplemented with 0.7 mg/ml geneticin (Invitrogen, LifeTechnologies). Cell lines were regularly tested for *mycoplasma* contamination and cells were not used for more than 10 passages.

D. Method Details

1. Clinical Assessments and Biospecimens

Response assessments. Clinical response annotation was performed independently by at least two clinical investigators per patient (MCA, PAP, HT). Treatment responses were defined using the best overall response (BOR) according to RECIST 1.1 criteria (Eisenhauer et al., 2009) comparing tumor burden on restaging imaging performed at standard disease re-assessment time points studies with baseline (pre-treatment) studies. Longitudinal restaging scans were evaluated throughout the period of treatment until the initiation of a subsequent line of therapy or last known follow-up date. Imaging modality was matched whenever possible, favoring contrast-enhanced CT of the chest, abdomen and pelvis, contrast-enhanced MRI or CT brain, and imaging of the neck or extremities as indicated by known sites of disease. Patients were classified as "responders" (R) if they achieved objective complete response (CR; 100% reduction in tumor burden) or partial response (PR; ≥30% reduction in tumor burden) attributable to CICB. Patients were classified as non-responders if they achieved a BOR of 15 progressive disease (PD; ≥20% increase in disease burden) or stable disease (SD; not meeting criteria for CR/PR/PD). Mice were defined as responders (R) if their tumors either regressed or were stable during treatment, or as non-responders (NR) when tumors increased in size over two consecutive measurements.

Toxicity assessments. Immune-related adverse events (irAE) was scored according to the NCI Common Terminology Criteria for Adverse Events (CTCAE) 4.0 criteria and immune-relatedness to CICB therapy ("possible", "probable", "definite" association) assigned by consensus opinion of at least two independent clinical investigators (MCA, HT, WSC).

Biospecimen collections. Available tumor and peripheral blood samples were identified by querying institutional research biospecimen holdings and, when necessary, archival pathology holdings from diagnostic specimens. Tumor biopsies were obtained as punch, core needle, or excisional biopsies and preserved as snap-frozen (for RNA/DNA extraction) or formalin-fixed paraffin-embedded (FFPE; for immunohistochemistry or DNA extraction) specimens. Peripheral blood samples underwent density-gradient centrifugation to isolate peripheral blood mononuclear cells (PBMC) prior to cryopreservation until required for germline DNA extraction or flow cytometry. Biospecimens were retrieved, collected and analyzed under UT MD Anderson Cancer Center Institutional Review Board-approved protocols in accordance with the Declaration of Helsinki. Fecal samples were obtained on an outpatient basis using the OMNIgene-GUT Kit (DNA Genotek Inc, Ottawa, Canada) according to the manufacturer's recommendations after detailed explanation and instruction by treating clinicians. Stabilized fecal samples were returned in person or by mail within 30 days of collection.

2. Genomic Analyses

Whole exome sequencing analysis. Whole-exome sequencing (WES) was performed using the same protocol as previously described (Roh et al., 2017). A total of 26 pre-treatment samples were included (19R, 7NR). DNA was extracted from tumor samples after pathological assessment and confirmation of tumor content. Matched peripheral blood leukocytes were collected as germline DNA control. The initial genomic DNA input into the shearing step was 750 ng. End repair, A-base addition, adapter ligation using forked Illumina paired-end adapters, and library enrichment polymerase chain reaction (PCR) was performed using the KAPA Hyper Prep Kit (#KK8504) followed by solid-phase reverse immobilization bead cleanup and cluster generation. Library construction was performed per the manufacturer's instructions. Target enrichment was performed using the Agilent SureSelectXT Target Enrichment (#5190-8646) protocol as per the manufacturer's instructions, using 650-750 ng of prepared libraries. Enriched libraries were normalized to equal concentrations using an Eppendorf Mastercycler EP Gradient instrument, pooled to equimolar amounts on the Agilent Bravo B platform and quantified using the KAPA LibraryQuantification Kit (#KK4824). Pooled libraries were adjusted to 2 nM, denatured with 0.2 M NaOH, diluted using Illumina hybridization buffer, and underwent cluster amplification using HiSeq v3 cluster chemistry and the Illumina Multiplexing Sequencing Primer Kit as per manufacturer's instructions. Pools were then sequenced on an Illumina HiSeq 2000/2500 v3 system using 76 bp paired-end reads, and analyzed using RTA v.1.13 or later. The mean coverage for exome data was 221×in tumors and 100× in germ line. Aligned BAM files were then processed using Picard and GATK software to identify duplication, realignment and recalibration. Somatic point mutations were identified using MuTect (v1.1.4) and small insertions/deletions identified using Pindel (v0.2.4). Additional post-calling filters were then applied, including: (a) total read count in tumor sample >30, (b) total read count in matched normal sample >10, (c) VAF (Variant Allele Frequency) in tumor sample >0.05, (d) VAF in matched normal sample <0.01, and (e) SNVs reported in dbSNP129 and 1000 Genomes Project were removed.

Copy number alteration analysis. Copy number alteration analysis was performed as previously described (Roh et al., 2017). Essentially, Sequenza (v2.1.2) algorithm was applied to the aligned BAM data to obtain the log 2 copy number ratio (tumor/normal) for each tumor sample. Using R package "CNTools" (v1.24.0), copy number gain (log 2 copy ratios >$log_2$ 1.5) and loss ($log_2$ copy ratios <–$log_2$ 1.5) at the gene level were identified. The burden of copy number gain or loss was defined as the total number of genes with copy number gain or loss per sample. To define recurrent CNA, R package "cghMCR" (v1.26.0) was applied to the calculated log 2 copy ratios (tumor/normal) to identify genomic regions of recurrent CNAs (minimum common regions, MCRs). To identify genes preferentially lost or gained in responders versus nonresponders, Fisher's exact test was performed at each gene location, and statistical significance was defined by FDR adjusted $p<0.05$. Genes with CNA in less than 3 samples were excluded.

Neoantigen prediction. Non-synonymous exonic mutations (NSEM) from WES were reviewed and all possible 8- to 12-mer peptides encompassing NSEM were used for neoantigen prediction and compared with wild type peptides. HLA of each case was predicted using PHLAT (Bai et al., 2014). Binding affinity was evaluated, taking into account patient HLA, by the NetMHCpan (v2.8) algorithm (Hoof et al., 2009). Candidate peptides with a predicted IC50<500 nM were considered HLA-binding.

3. Immune Analyses

Flow cytometry. Peripheral blood mononuclear cells (PBMCs) obtained from the study patients were analyzed by members of the MD Anderson Immunotherapy Platform. Pre-treatment and post-treatment blood samples were drawn for immunophenotypic analysis of PBMCs. PBMC samples were available from 20 patients, including 10 patients with ≥Grade 3 irAE, and 10 patients with <Grade 3 irAE. Multiparametric flow cytometry analysis of PBMCs was performed using fluorescently conjugated monoclonal antibodies across several panels: CD4 AF532 (SK3, eBioscience), CD3 PerCP-Cy5.5 (UCHT1, Biolegend) CD8 AF700 (RPA-T8, BD Biosciences), CD127 BV711 (HIL-7R-M21, BD Biosciences), ICOS PE-Cy7 (ISA-3, eBioscience), PD-1 BV650 (EH12.1 BD Biosciences) and FOXP3 PE-e610 (PCH101; eBioscience); CD3 PE-CF594, CD4 Pe-Cy5.5, CD8 AF532, CD45RA BV650 (HI100, Biolegend), CCR7 BV785 (G043H7, Biolegend) CD27 PeCy5 (0323, eBioscience), CD28 APC-e780 (CD28.2 eBioscience), PD-1 BV650 (EH12.1 BD Biosciences), EOMES e660 (WD1928, eBioscience), and TBET BV605 (4B10 Biolegend). Live/Dead fixable yellow stain was obtained from Thermo Fisher Scientific. Samples were run using an LSR Fortessa (BD Biosciences) and analyzed using the FlowJo software program. After appropriate forward/side scatter and live single cell gating, the inventors determined the frequency of total CD3+ T cells, CD8+ T cells (CD3+CD8+) and CD4+ T cells (CD3+CD4+). Among the CD4, CD4+ effector T cells (CD4+FOXP3−) and CD4+ regulatory T cells (CD4+FOXP3+CD127−/low). PD-1 and ICOS expression were evaluated on these populations. CD45RA and CCR7 expression on CD4 and CD8 T cells was used to define naïve, T central memory (TCM), T effector memory (TEM) and effector T (Teff) sub-populations. PD-1, CD28, CD27, EOMES and TBET expression was evaluated in each of these compartments.

Immunohistochemistry. A hematoxylin & eosin (H&E) stained slide from each FFPE tumor sample was obtained to confirm the presence of tumor. Heavily pigmented samples were pretreated with melanin bleaching by low concentration hydrogen peroxide. The selected antibody panel included programmed death-ligand 1 (PD-L1) clone E1L3N (1:100, Cell Signaling Technology), PD-1 clone EPR4877 (1:250, Epitomics), CD3 polyclonal (1:100, DAKO), CD4 clone 4B12 (1:80, Leica Biosystems), CD8 clone C8/144B (1:25, Thermo Scientific), FOXP3 clone 206D (1:50, BioLegend) and Granzyme B clone 11F1 (ready to use, Leica Microsystems). IHC staining of a limited antibody panel was performed using a Leica Bond Max automated stainer (Leica Biosystems, Buffalo Grove, IL). The IHC reaction was preformed using Leica Bond Polymer Refine detection kit (Leica Biosystems) and diaminobenzidine (DAB) was used as chromogen. Counterstaining was with hematoxylin. All IHC slides were scanned using an Aperio AT Turbo (Leica Biosystems) prior to all downstream IHC analyses. Using the Aperio Image Toolbox analysis software (Leica Biosystems), average values for each marker from five randomly-selected 1 mm$^2$ areas within the tumor region were selected for digital analysis as previously described (Chen et al., 2016). PD-L1 expression was evaluated by H-score, which evaluates the percentage of positive cells (0 to 100) and the intensity of staining (0 to 3+), with a total score ranging from 0 to 300. The remaining markers were scored as density of cells.

TCR Sequencing. DNA was extracted from available FFPE tumor tissues (19R, 6NR) and PBMC (15 patients with ≥Grade 3 irAE, and 12 patients with <Grade 3 irAE) using the QIAamp DNA FFPE Tissue Kit (Qiagen). Next generation TCR sequencing of CDR3 variable regions was performed using the ImmunoSeq hsTCRB kit (Adaptive Biotechnologies) followed by sequencing on a MiSeq 150× (Illumina) and analysis using the ImmunoSeq™ Analyzer software v3.0 (Adaptive Biotechnologies), considering only samples for which a minimum of 1000 unique templates were detected. Clonality is an index inversely correlated with TCR diversity and was measured as 1−(entropy)/log$_2$(# of productive unique sequences). Preferential clonal expansion was defined as the number of T cell clones significantly expanded in post-treatment compared to pre-treatment blood samples.

4. Murine Models

Antibiotic treatments. Mice were treated with an antibiotic solution (ATB) containing ampicillin (1 mg/ml), streptomycin (5 mg/ml), and colistin (1 mg/ml) (Sigma-Aldrich), with or without the addition of vancomycin (0.25 mg/ml) via the drinking water. Solutions and bottles were replaced 3 times and once weekly, respectively. Antibiotic activity was confirmed by cultivating fecal pellets resuspended in BHI+ 15% glycerol at 0.1 g/ml on COS (Columbia Agar with 5% Sheep Blood) plates for 48 h at 37° C. in aerobic and anaerobic conditions. The duration of ATB treatments was slightly different based on the experimental settings. In brief, mice were treated for 2 weeks prior to tumor implantation and continuously throughout the experiment in MCA205 and RET experiments, whilst in experiments where RENCA was used, ATB treatment was administered for 3 days prior to fecal microbiota transfer.

Tumor challenge and treatment. Flanks of mice were subcutaneously (s.c.) injected with 0.8×10$^6$ MCA205 or 0.5×10$^6$ RET cells. Treatment commenced when tumors reached 20 to 30 mm$^2$. Mice were injected intraperitoneally (i.p) with anti-PD-1 mAb (250 g/mouse; clone RMP1-14) and/or anti-CTLA-4 mAb (100 g/mouse, clone 9D9), with or without anti-IL1R (anakinra, 500 g/mouse) or respective isotype controls as indicated in figures. All mAbs for in vivo use were obtained from BioXcell (West Lebanon, NH, USA), using the recommended isotype control mAbs except anakinra (Swedish Orphan Biovitrum, Sweden).

Fecal microbiota transfer experiments. After 3 days of ATB treatment, fecal microbiota transfer (FMT) was performed using samples from non-responding patients. Frozen fecal samples were thawed and thoroughly vortexed. Large particulate material was allowed to settle by gravity. 200 μL of supernatant was administered in a single dose by oral gavage. An additional 100 μL was topically applied onto the fur of each animal. Two weeks after FMT, BALB/c mice were anesthetized with isofluorane, 1×10$^4$ RENCA tumor cells in 30 μL PBS were injected into the subcapsular space of the right kidney. The skin incision was then closed with surgical clips. Treatment began 5 days after tumor inoculation. Mice were treated with anti-PD-1 mAb and anti CTLA-4 with or without oral gavage of fecal samples from responding patients or of Akkermansia muciniphila. Tumor growth was monitored once weekly on an IVIS Imaging System 50 Series (Analytic Jenap).

Gut colonization with dedicated commensal species. Akkermansia muciniphila CSURP2261 (provided by Institut hospitalo-universitaire Méditerranée Infection, Marseille, France) Dielma fastidiosa (isolated from human samples), Erysipelatoclostridium ramosum (isolated from human samples) and Bacteroides intestinalis (isolated from mouse samples) were cultured on COS plates in anaerobic conditions using anaerobic generators (Biomerieux) at 37° C. for 24-72 hours. Suspensions of 10$^9$ CFU/mL were obtained using a fluorescence spectrophotometer (Eppendorf) at an optical density of 1 measured at 600 nm. Oral gavages of 10$^8$ or 10$^9$ CFU in 100 μL were administered 24 hours prior to antibody treatment and with each antibody treatment. Bacteria were verified using a Matrix-Assisted Laser Desorption/Ionization Time of Flight (MALDI-TOF) mass spectrometer (Microflex LT analyser, Bruker Daltonics, Germany).

Cytokine quantification. Stool samples were collected and stored at −80° C. until further processing. Samples were thawed and resuspended (at 100 mg/mL) in PBS containing 0.1% Tween 20. After a 20 min incubation with shaking at room temperature, samples were centrifuged for 10 min at 12,000 rpm and supernatants were harvested and stored at −20° C. until analysis. Lipocalin-2 levels were measured using the mouse Lipocalin-2/NGAL DuoSet ELISA kit (R&D Systems, Minneapolis, MN) following the manufacturer's instructions.

Immunohistochemistry. Gut tissue was preserved in either formalin fixed paraffin embedded (FFPE) or optimum cutting temperature compound (OCT). At mouse sacrifice the ileum and colon were removed, washed in PBS, cut longitudinally, rolled and fixed in 4% PFA overnight at 4° C. or, in some experiments for 2 hours at room temperature. Tissues were then either paraffin-embedded with a Tissue-Tek® VIP® 6 Vacuum Infiltration Processor (Sakura) or rehydrated in 15% sucrose for 1 h followed by 30% sucrose overnight, OCT embedded (Sakura) and snap frozen. Longitudinal sections were counterstained with hematoxylin, eosin & safran stain (H&E).

Histological assessment of gut tissue for toxicity. Ileum: Inflammatory foci, appearance of the submucosa, length of villi, and the thickness of lamina propria were scored for each section by a pathologist (P.O.). The score was defined as: 0=normal, 1=focal and minor lesions; 2=diffuse and minor lesions; 3=diffuse, minor and major lesions; 4=major lesions with areas containing only connective tissue. Colon: Inflammatory infiltrate, defined as either physiological (0), low (1), moderate (2) and high (3) levels were scored.

5. Microbiome Analyses

Patient fecal samples. Baseline stool samples were collected using the OMNIgene GUT kit (DNA Genotek, Ottawa, Canada). From the initial 40 patient cohort, 18 stool samples were available for analysis. To expand on the microbiome analysis, stool samples were collected from additional 13 patients receiving CICB. A total of 31 stool samples were subject to bacterial 16S rDNA sequencing (6 R and 24 NR; 19 patients with ≥Grade 3 irAE and 12 patients with <Grade 3 irAE). Within this cohort, a number of samples obtained early after initiation of CICB were included as surrogate baseline samples, as the parallel study on longitudinal samples collected from patients undergoing immune checkpoint blockade monotherapies showed no significant change in fecal microbiota after treatment initiation (Gopalakrishnan et al., 2018).

Human fecal DNA extraction and bacterial 16S rDNA sequencing. Preparation and sequencing of the human fecal samples was performed in collaboration with the Alkek Center for Metagenomics and Microbiome Research (CMMR), Baylor College of Medicine using methods adapted from the NIH-Human Microbiome Project (Human Microbiome Project, 2012a, b). Extended details of the analytical pipeline have been reported previously (Gopalakrishnan et al., 2018). Briefly, bacterial genomic DNA extracted using the MO BIO PowerSoil DNA Isolation Kit (MO BIO Laboratories, USA) underwent PCR amplification of the 16S rDNA V4 region and was sequenced using the MiSeq platform (Illumina, Inc, San Diego, CA). Quality filtered sequences with >97% identity were clustered into bins known as Operational Taxonomic Units (OTUs) by open-reference OTU picking and classified at species level by reference to the NCBI 16S ribosomal RNA sequence database (release date Feb. 11, 2017; ncbi-blast+ package 2.5.0). Phylogenetic information was obtained by mapping the representative OTU sequences against the NCBI taxonomy database (release date Feb. 16, 2017) using BLAST.

Mouse microbiota characterization. Raw FASTQ files were analyzed with Mothur pipeline v.1.39.5 for quality check and filtering (sequencing errors, chimerae) on a Workstation DELL T7910 (Round Rock, Texas, United States). Raw reads (15512959 in total, on average 125104 per sample) were filtered (6342281 in total, on average 51147 per sample) and clustered into Operational Taxonomic Units (OTUs), followed by elimination of low-populated OTUs (till 5 reads) and by de novo OTU picking at 97% pair-wise identity using standardized parameters and SILVA rDNA Database v.1.19 for alignment. In all, considering RET and MCA samples, 427 bacterial species were identified. Sample coverage was computed with Mothur and resulted to be on average higher than 99% for all samples, thus meaning a suitable normalization procedure for subsequent analyses. Bioinformatic and statistical analyses on recognized OTUs were performed with Python v.2.7.11. The most representative and abundant read within each OTU (as evidenced in the previous step with Mothur v.1.39.5) underwent a nucleotide Blast using the National Center for Biotechnology Information (NCBI) Blast software (ncbi-blast-2.3.0) and the latest NCBI 16S Microbial Database accessed at the end of Apr. 2018 (found online at ftp.ncbi.nlm.nih.gov/blast/db/). A matrix of bacterial relative abundances was built at each taxon level (phylum, class, order, family, genus, species) for subsequent multivariate statistical analyses.

Microbiota and OTU-level analyses. Measurements of a diversity (within sample diversity) such as observed_otus and Shannon index, were calculated at OTU level using the SciKit-learn package v.0.4.1. Exploratory analysis of P-diversity (between sample diversity) was calculated using the Bray-Curtis measure of dissimilarity calculated with Mothur and represented in Principal Coordinate Analyses (PCoA), while for Hierarchical Clustering Analysis (HCA) 'Bray-Curtis' metrics and 'complete linkage' method were implemented using custom scripts (Python v.2.7.11). In order to compare the microbiota taxa with gene expression datasets, a multivariate statistical Spearman correlation analysis (and related P values) was performed with custom Python scripts. Mann-Whitney U and Kruskall-Wallis tests were employed to assess significance for pair-wise or multiple comparisons, respectively, taking into account a p-value ≤0.05 as significant.

Differentially-enriched taxa within patient samples were computed using the pairwise Mann-Whitney test between groups. Effect sizes were estimated as the ratio of the test-statistic to the square root of the sample size. Rarefaction limits for the calculation of alpha diversity were set based on the least number of reads in all fecal samples. Taxonomic alpha-diversity of patient samples was estimated using the Inverse Simpson Index calculated as $D=1/\Sigma_{k=1}^{S} pi^2$ (pi is the proportion of the total species S that is comprised by the species i) (Morgan and Huttenhower, 2012), and additional diversity metrics as indicated in figures. ANalysis Of SIMilarity (ANOSIM, which represents the difference of datasets' centroids) or, when indicated, Pearson correlation coefficient, were computed with Python 2.7.11.

Statistical assessment of microbial biomarkers using LEfSe. The LEfSe method was used to compare abundances of all bacterial clades according to response (i.e.: between R versus NR) and by occurrence of toxicity (i.e.: between patients with ≥Grade 3 irAE versus those with <Grade 3 irAE) using the Kruskal-Wallis test (statistical significance was defined as p<0.05 for response and 0.1 for toxicity) (Segata et al., 2011). Bacterial taxa with differential abundance between study groups were used as input for the linear discriminant analysis (LDA) to calculate an effect size. LEfSe analysis for murine taxa was performed with Mothur v.1.39.5.

E. Quantification and Statistical Analysis

1. Statistical Analyses

Data analyses and representations were performed either with the R software (found on line at R-project.org/), Microsoft Excel (Microsoft Co., 436 Redmont, WA, US) or Prism 5 (GraphPad, San Diego, CA, USA). Patient cohort survival curves were generated using the R package "survival" (Therneau and Grambsch, 2000). Between-group comparisons of patient cohort genomic and immune parameters were performed using unpaired Mann-Whitney U tests or Fisher's exact test in the case of low-sample dichotomous variables, taking p<0.05 as statistically significant. All comparisons were two-sided unless a strong a priori hypothesis warranted a one-sided approach (indicated where appropriate). Permutation testing was performed by randomly permuting sample labels for a total of 1000 iterations. In murine studies, statistical analyses gathering more than two groups were performed using ANOVA followed with pairwise comparisons with Bonferroni adjustments. Otherwise, for two groups, statistical analyses were performed using the unpaired t-test. Outliers within a given distribution were tested using Grubbs' test (found online at graphpad.com/quickcalcs/Grubbsl.cfm) with a threshold atp<0.05. All tumor growth curves were analyzed using software developed in Professor Guido Kroemer's laboratory and information about statistical analyses can be found at this following link: found online at kroemerlab.shinyapps.io/TumGrowth/. Briefly, for longitudinal analyses, original tumor measurements were log transformed before statistical testing. When complete regressions of tumors were observed, zeros were imputed by the minimum value divided by 2. An automatic outlier detection atp<0.1 was retained, both for the longitudinal analyses and the Kaplan Meier curves. Survival curves were estimated using the Cox regression and the multiple testing was taken account using the Bonferroni adjustment. p-values were two-sided with 95% confidence intervals and were considered significant when p<0.05. Symbol significance: *p<0.05, p<0.01, *p<0.001.

F. Tables

TABLE 1 relating to FIG. 1: Biospecimen utilization.

| | Patient Data | | WES | TCRseq | | | IHC | | Flow Cytometry | | | | Fecal Microbiome |
|---|---|---|---|---|---|---|---|---|---|---|---|---|---|
| | Prior Immuno- | Gr3+ | Tumor | Tumor | | PBMC | Tumor | | PBMC | | | | Feces |
| ID | therapy | irAE | BOR | Pre | Pre | Post | Pre | On | Post | Pre | Post | Pre | Early | Late | Post | Pre/Early |
| 1 | N | Y | PD | N | Y | Y | N | Y | N | N | Y | Y | Y | Y | Y | N |
| 2 | N | N | CR | Y | Y | N | N | N | N | Y | N | N | N | N | N | N |
| 3 | N | N | CR | Y | Y | N | Y | N | N | Y | N | Y | N | N | N | N |
| 4 | N | Y | CR | Y | Y | N | Y | N | Y | Y | N | Y | Y | Y | Y | N |
| 5 | N | Y | PR | N | Y | Y | Y | Y | N | Y | N | Y | Y | Y | N | Y |
| 6 | Y | N | CR | Y | Y | N | Y | N | Y | Y | N | Y | Y | N | Y | N |
| 7 | Y | N | PR | Y | Y | N | Y | N | Y | Y | Y | Y | Y | Y | Y | N |
| 8 | N | N | PD | Y | N | Y | N | N | Y | Y | N | Y | Y | Y | Y | Y |
| 9 | N | Y | CR | Y | Y | N | Y | N | N | Y | N | Y | Y | N | Y | Y |
| 10 | N | N | PD | N | Y | N | N | N | N | N | N | N | N | N | N | N |
| 11 | N | N | CR | Y | Y | N | Y | Y | Y | Y | N | N | N | N | Y | Y |
| 12 | N | Y | CR | Y | Y | N | Y | N | N | Y | N | N | N | N | N | N |
| 13 | N | Y | PD | N | N | Y | N | N | Y | N | Y | N | N | N | N | N |
| 14 | N | Y | PR | Y | Y | N | Y | N | N | Y | N | Y | Y | N | Y | N |
| 15 | N | Y | PR | N | N | Y | Y | N | Y | N | N | Y | Y | Y | Y | Y |
| 16 | N | N | PR | Y | Y | N | Y | Y | Y | Y | N | Y | Y | Y | Y | N |
| 17 | N | Y | PR | N | N | N | Y | N | Y | N | N | Y | Y | Y | Y | Y |
| 18 | N | Y | PR | N | N | N | N | N | Y | N | N | Y | Y | N | N | N |
| 19 | Y | N | PR | Y | Y | N | Y | N | Y | Y | N | Y | Y | N | Y | N |
| 20 | Y | N | PD | Y | Y | N | N | N | N | Y | N | N | N | N | N | N |
| 21 | N | Y | CR | N | N | N | Y | N | Y | N | N | N | N | N | N | N |
| 22 | N | Y | CR | N | N | N | Y | N | Y | N | N | Y | Y | N | Y | Y |
| 23 | N | Y | PR | N | N | N | Y | N | Y | N | N | N | N | N | N | Y |
| 24 | N | Y | CR | Y | Y | N | N | N | N | N | N | N | N | N | N | Y |
| 25 | N | N | PD | Y | Y | N | N | N | N | Y | N | Y | Y | N | N | Y |
| 26 | Y | N | PD | Y | Y | Y | N | N | N | Y | Y | N | N | Y | N | Y |
| 27 | Y | N | PD | Y | Y | N | N | N | N | Y | N | N | N | N | N | N |
| 28 | N | Y | PD | Y | N | N | N | N | N | Y | N | N | N | N | N | Y |
| 29 | N | N | PR | Y | Y | N | Y | Y | N | Y | N | N | N | N | N | N |
| 30 | Y | N | PR | Y | Y | N | Y | Y | N | Y | N | Y | Y | N | N | Y |
| 31 | Y | N | PR | N | N | N | N | N | N | Y | N | N | N | N | N | N |
| 32 | N | Y | PR | Y | N | N | N | N | N | Y | N | N | N | N | N | N |
| 33 | Y | N | PR | Y | Y | N | Y | N | Y | Y | N | N | N | N | N | N |
| 34 | N | N | PR | Y | Y | N | Y | N | N | Y | N | N | N | N | N | N |
| 35 | Y | Y | PR | N | N | N | N | N | Y | N | N | N | N | N | N | Y |
| 36 | N | Y | PR | Y | Y | N | N | N | N | Y | N | N | N | N | N | Y |
| 37 | N | Y | CR | N | N | N | Y | N | N | N | N | N | N | N | N | Y |
| 38 | N | Y | CR | Y | Y | N | Y | N | N | Y | N | Y | Y | Y | N | Y |
| 39 | N | N | PR | Y | N | N | Y | N | N | N | N | N | N | N | N | Y |
| 40 | N | Y | PR | N | N | N | Y | N | N | N | N | N | N | N | N | Y |
| X1 | N | N | PR | N | N | N | N | N | N | N | N | N | N | N | N | Y |
| X2 | Y | Y | PR | N | N | N | N | N | N | N | N | N | N | N | N | Y |
| X3 | N | N | PR | N | N | N | N | N | N | N | N | N | N | N | N | Y |
| X4 | N | Y | PR | N | N | N | N | N | N | N | N | N | N | N | N | Y |
| X5 | N | N | PR | N | N | N | N | N | N | N | N | N | N | N | N | Y |
| X6 | N | Y | PR | N | N | N | N | N | N | N | N | N | N | N | N | Y |
| X7 | N | Y | PR | N | N | N | N | N | N | N | N | N | N | N | N | Y |
| X8 | N | Y | PR | N | N | N | N | N | N | N | N | N | N | N | N | Y |
| X9 | N | Y | PR | N | N | N | N | N | N | N | N | N | N | N | N | Y |
| X10 | N | Y | PD | N | N | N | N | N | N | N | N | N | N | N | N | Y |
| X11 | N | N | PD | N | N | N | N | N | N | N | N | N | N | N | N | Y |
| X12 | N | N | PD | N | N | N | N | N | N | N | N | N | N | N | N | Y |
| X13 | N | N | PD | N | N | N | N | N | N | N | N | N | N | N | N | Y |

Prior immunotherapies: IL-2, IFN, anti-CTLA-4, anti-PD-1 (pembrolizumab, nivolumab). Gr3+ irAE: grade 3 or higher immune-related adverse event.
Pre/Post/Early: time point of specimen sampling relative to CICB initiation. BOR: best overall response by RECIST v1.1.

TABLE 2 relating to FIG. 1: Patient characteristics.

| CHARACTERISTIC | NUMBER (%), or MEDIAN [RANGE] |
|---|---|
| Sex | |
| Male | 39 (73.6) |
| Female | 14 (26.4) |
| Age | 55.0 [27.1-85.9] |
| Melanoma type | |
| Cutaneous unspecified | 19 (35.8) |
| Superficial spreading | 8 (15.1) |
| Lentigo maligna melanoma | 3 (5.7) |
| Nodular | 9 (17.0) |
| Unknown primary | 14 (26.4) |
| Disease stage (AJCCv7) | |
| IIIa/b | 2 (3.8) |
| IIIc | 6 (11.3) |
| IVa | 2 (3.8) |
| IVb | 9 (17.0) |
| IVc | 34 (64.2) |
| LDH at baseline | |
| Normal range | 34 (64.2) |
| Elevated | 14 (26.4) |
| NA | 5 (9.4) |
| BRAF status | |
| wt | 19 (35.8) |
| V600E | 22 (41.5) |
| V600K | 7 (13.2) |
| V600R | 1 (19) |
| V600 mutated, unspecified | 2 (3.8) |
| NA | 2 (3.8) |
| Prior lines of systemic therapy for advanced disease | 0 [0-7] |
| 0 | 39 (73.6) |
| 1 | 7 (13.2) |
| 2 | 2 (3.8) |
| ≥3 | 5 (9.4) |
| Prior immunotherapies | |
| Cytokine | 1 (1.9) |
| Ipilimumab | 4 (7.5) |
| Anti-PD-1/anti-PD-L1 | 6 (11.3) |
| None | 42 (79.2) |

TABLE S3 relating to FIG. 1: Clinical outcomes.

| CHARACTERISTIC | NUMBER (%), or MEDIAN [RANGE] | CICB RESPONSE* R (n = 41) | CICB RESPONSE* NR (n = 12) |
|---|---|---|---|
| Treatment received | | | |
| Doses of ipilimumab + anti-PD-1 | 3 [1-4] | 3 [1-4] | 3 [1-4] |
| Doses of maintenance anti-PD-1 | 1 [0-49] | 2 [0-49] | 1 [0-5] |
| Best overall response [RECIST 1.1] | | | |
| CR | 12 (22.6) | | |
| PR | 29 (54.8) | — | — |
| PD | 12 (22.6) | | |
| Cycle of best overall response | | | |
| CR | 4 [1-22] | | |
| PR | 4 [1-8] | — | — |
| PD | 3 [1-6] | | |
| Maximum grade AE | | | |
| 0 | 2 (3.8) | 1 (2.4) | 1 (8.3) |
| 1 | 10 (18.9) | 8 (19.5) | 2 (16.7) |
| 2 | 13 (24.5) | 8 (19.5) | 5 (41.7) |
| 3 | 23 (43.4) | 19 (46.3) | 4 (33.3) |
| 4 | 5 (9.4) | 5 (12.2) | 0 |
| High-grade (≥Grade 3) irAE [CTCAE v4.0] | | | |
| All types | 28 (52.8) | 24 (58.5) | 4 (33.3) |
| Skin | 4 (7.5) | 4 (9.8) | 0 |
| Liver | 10 (18.9) | 9 (22.0) | 1 (8.3) |
| Diarrhoea/colitis | 9 (17.0) | 8 (19.5) | 1 (8.3) |
| Thyroid | 1 (1.9) | 1 (2.4) | 0 |
| Lung | 5 (9.4) | 4 (9.8) | 1 (8.3) |

*R = best overall response of PR + CR, NR = best overall response of PD. Percentages are expressed relative to the number of patients within each response group.

TABLE 4 relating to FIG. 5: Microbial associations with response.
Species common to CICB-responding mice
across MCA205 and RET tumor models Abyssivirga alkaniphila
Acetatifactor muris
Acetivibrio cellulolyticus
Acetivibrio ethanolgignens
Acholeplasma vituli
Achromobacter deleyi
Acidovorax radicis
Adlercreutzia equolifaciens
Akkermansia muciniphila
Alistipes indistinctus
Alistipes obesi
Alistipes putredinis
Alistipes senegalensis
Alistipes timonensis
Alkalibacter saccharofermentans
Alkalibaculum bacchi
Allobaculum stercoricanis
Anaerobacterium chartisolvens
Anaerocolumna cellulosilytica
Anaerosporobacter mobilis
Anaerotaenia torta
Anaerotruncus colihominis
Anaerotruncus rubiinfantis
Anaerovorax odorimutans
Bacteroides acidifaciens
Bacteroides caecimuris
Bacteroides dorei
Bacteroides faecichinchillae
Bacteroides rodentium
Bacteroides stercorirosoris
Bacteroides xylanolyticus
Barnesiella intestinihominis
Beduini massiliensis
Bifidobacterium pseudolongum
Blautia luti
Breznakia blatticola
Breznakia pachnodae
Butyricicoccus pullicaecorum
Butyrivibrio crossotus
Catabacter hongkongensis
Christensenella massiliensis
Christensenella minuta
Christensenella timonensis
Clostridium aerotolerans
Clostridium aldenense
Clostridium alkalicellulosi
Clostridium asparagiforme
Clostridium celerecrescens
Clostridium cellobioparum
Clostridium cellulolyticum
Clostridium clariflavum
Clostridium cocleatum
Clostridium colinum
Clostridium hylemonae
Clostridium indolis
Clostridium jejuense
Clostridium lactatifermentans
Clostridium lavalense
Clostridium methylpentosum
Clostridium oroticum
Clostridium oryzae
Clostridium papyrosolvens
Clostridium polysaccharolyticum
Clostridium populeti
Clostridium saccharolyticum
Clostridium saudiense
Clostridium scindens
Clostridium straminisolvens
Clostridium viride
Clostridium xylanolyticum
Coprobacter secundus
Coprococcus catus
Culturomica massiliensis
Defluviitalea saccharophila
Desulfitobacterium hafniense
Desulfitobacterium metallireducens
Desulfosporosinus orientis
Desulfovibrio desulfuricans
Desulfovibrio simplex
Dorea formicigenerans
Eisenbergiella massiliensis
Emergencia timonensis
Enterococcus hirae
Enterorhabdus mucosicola
Enterorhabdus muris
Erysipelatoclostridium ramosum
Erysipelothrix larvae
Escherichia fergusonii
Eubacterium coprostanoligenes
Eubacterium dolichum
Eubacterium ruminantium
Eubacterium siraeum
Eubacterium tortuosum
Eubacterium ventriosum
Faecalibaculum rodentium
Flavimarina pacifica
Flavonifractor plautii
Flintibacter butyricus
Gordonibacter faecihominis
Gracilibacter thermotolerans
Harryflintia acetispora
Holdemania massiliensis
Hydrogenoanaerobacterium saccharovorans
Ihubacter massiliensis
Intestinimonas butyriciproducens
Irregularibacter muris
Lachnoclostridium pacaense
Lactobacillus animalis
Lactobacillus faecis
Lactobacillus gasseri
Lactobacillus hominis
Lactobacillus intestinalis
Lactobacillus johnsonii
Lactobacillus reuteri
Lactobacillus rogosae
Lactobacillus taiwanensis
Lawsonia intracellularis
Longibaculum muris
Marvinbryantia formatexigens
Millionella massiliensis
Mucispirillum schaedleri
Muribaculum intestinale
Murimonas intestini
Natranaerovirga pectinivora
Neglecta timonensis
Odoribacter splanchnicus
Olsenella profusa
Oscillibacter ruminantium
Oscillibacter valericigenes
Papillibacter cinnamivorans
Parabacteroides goldsteinii
Paraeggerthella hongkongensis
Parasutterella excrementihominis
Parvibacter caecicola
Peptococcus niger
Phocea massiliensis
Porphyromonas catoniae
Prevotella oralis
Prevotella stercorea
Prevotellamassilia timonensis
Pseudobutyrivibrio ruminis
Pseudoflavonifractor capillosus
Pseudoflavonifractor phocaeensis
Raoultibacter timonensis
Rhizobium straminoryzae
Roseburia faecis
Roseburia hominis
Roseburia intestinalis
Ruminiclostridium thermocellum
Ruminococcus champanellensis
Ruminococcus faecis
Ruminococcus flavefaciens TABLE 4-continued relating to FIG. 5: Microbial associations with response.
Species common to CICB-responding mice
across MCA205 and RET tumor models

*Ruminococcus gnavus*
*Ruthenibacterium lactatiformans*
*Sphingomonas kyeonggiensis*
*Spiroplasma velocicrescens*
*Sporobacter termitidis*
*Stomatobaculum longum*
*Streptococcus acidominimus*
*Streptococcus danieliae*
*Syntrophomonas wolfei*
*Tepidimonas taiwanensis*
*Tindallia californiensis*
*Tindallia texcoconensis*
*Turicibacter sanguinis*
*Turicimonas muris*
*Tyzzerella nexilis*
*Vallitalea pronyensis*
*Vampirovibrio chlorellavorus*

Example 2: Therapeutic Efficacy and Tolerability of Combined Immune Checkpoint Blockade in Metastatic Melanoma is Influenced by the Gut Microbiome The gut microbiome is increasingly being recognized as a strong modulator of anti-PD1 based cancer immunotherapy. Compelling evidence demonstrates differential bacterial enrichment and diversity in responders (R) versus non-responders (NTR), mediated by profound influences on systemic and anti-tumor immune infiltrates. However, this has not been studied in the setting of treatment with combined immune checkpoint blockade (CJCB), which is associated with superior response rates, but higher rates of potentially debilitating toxicities. Methods: The inventors assembled a cohort of patients with metastatic melanoma receiving CICB (n=54). All patients were classified as R (n=31, CR+PR) or NR (n=23, SD+PD) based on RECIST v1.1, and as having grade 3 or higher (T; n=29) or less than grade 3 (NT; n=25) immune related adverse event(s) by NCI CTCAE 4.0 criteria. Baseline stool samples were characterized by 16S rRNA sequencing. Correlative analyses of peripheral immune cell populations by flow cytometry (n=12) and circulating T cell repertoire by TCR-sequencing (n=12) were done on matched pre-treatment blood samples. Results: The overall gut microbial landscape in these patients was varied with high abundance of Bacteroidales and *Clostridiales*. Ordination of beta-diversity distances revealed a lack of clustering by subtype of primary tumor (uveal, mucosal, cutaneous) consistent with no significant effect of the tumor histology. While no apparent response or toxicity associations were evident based on diversity, notable compositional differences were appreciated. Comparison of relative abundances by LEfSe (LDA>2, p<0.05), and pairwise Mann-Whitney tests revealed an enrichment of *Bacteroides stercoris* (p=0.03), and *Parabacteroides distasonis* (p=0.04) in R, and *Lactobacillales* (p=0.005) in NR. Consistent with the prior findings, the median relative abundance of the order *Clostridiales* was again higher in R (0.34) versus NR (0.26). On the other hand, *Bacteroides intestinalis* (p=0.01) and *Anaerotignum lactatifermentans* (p=0.006) were enriched in T and NT, respectively. Importantly, correlative analyses with circulating immune cell subsets revealed distinct associations by differential bacterial enrichment (including positive correlations between overall CD8+ T-cell abundance and R-taxa), and a clustering effect by high or low T cell repertoire entropy. Conclusion: These findings build on prior work and support the notion of a close link between the gut microbiome and therapeutic outcomes to checkpoint blockade therapy. Extensive studies are underway in both matched human biospecimens and in pre-clinical models to further understand mechanisms of interactions with immune markers, and to establish causality. Taken together, these data support a critical role for the gut microbiome as both a predictive tool and therapeutic target.

Combined anti-CTLA-4 and anti-PD-1 therapy affords a superior response rate in the treatment of advanced melanoma relative to single-agent therapy, however this intensive regimen is hampered by a high incidence of severe irAEs. FIGS. 13-19 demonstrate that, while there were no major differences in gut diversity by response or toxicity, notable differences existed in terms of taxonomic enrichment, specifically *Bacteroides stercoris* in R and *Lactobacillus rogosae* in NR (also associated with PFS); and *Bacteroides intestinalis* in patients with Grade 3 (or higher irAE), and *Anaerotignum lactatifermentans* in patients with less than Grade 3 irAE. Correlative analyses revealed contrasting associations with circulating immune cell subsets in taxa that were differentially enriched by response and irAE. Further experiments contemplate the integration of microbiome associations across treatment types in patients with metastatic melanoma, mechanistic studies in pre-clinical murine models, and investigation of host lifestyle factors and their association with microbial features.

Example 3: Peripheral Immune Repertoire and Gut Microbiome Signatures are Associated with Toxicity to Combined CTLA-4 and PD-1 Blockade Treatment with combined immune checkpoint blockade (CICB) targeting CTLA-4 and PD-1 is associated with clinical benefit across several tumor types but also a high rate of immune-related adverse events (irAE). Insights into biomarkers and mechanisms of response and toxicity to CICB are needed. To address this, the inventors profiled the blood, tumor and gut microbiome of 77 advanced melanoma patients treated with CICB, with a high rate of any ≥Grade 3 irAEs (49%). Immune and genomic biomarkers of response to CICB were similar to those identified for anti-CTLA-4 and anti-PD-1 monotherapy. Toxicity from CICB was associated with a more diverse T cell repertoire and a less antigen-experienced phenotype. Novel microbial determinants of toxicity to CICB identified in the patient gut microbiota, such as *Bacteroides intestinalis*, with validation in murine models. Taken together, these findings have important implications for clinical management using CICB regarding potential biomarkers and mechanisms of therapeutic toxicity.

Treatment with CICB is associated with high rates of objective responses (Larkin, 2015 #1), however a substantial proportion of patients experience immune-related adverse events (irAE) (Hammers, 2017 #3; Sznol, 2017 #2). Interestingly, rates of clinical response and irAE appear to be linked (Attia, 2005 #10), though distinct mechanisms behind therapeutic toxicity are incompletely understood. Robust biomarkers of response to CICB are currently lacking, and it is likely that up to 40% of unselected melanoma patients treated with CICB would be expected to respond to PD-1 blockade alone, and thus could potentially be spared the increased risk of severe irAE associated with this regimen (Robert, 2015 #4; Robert, 2015 #5; Larkin, 2015 #1).

Figure 14:
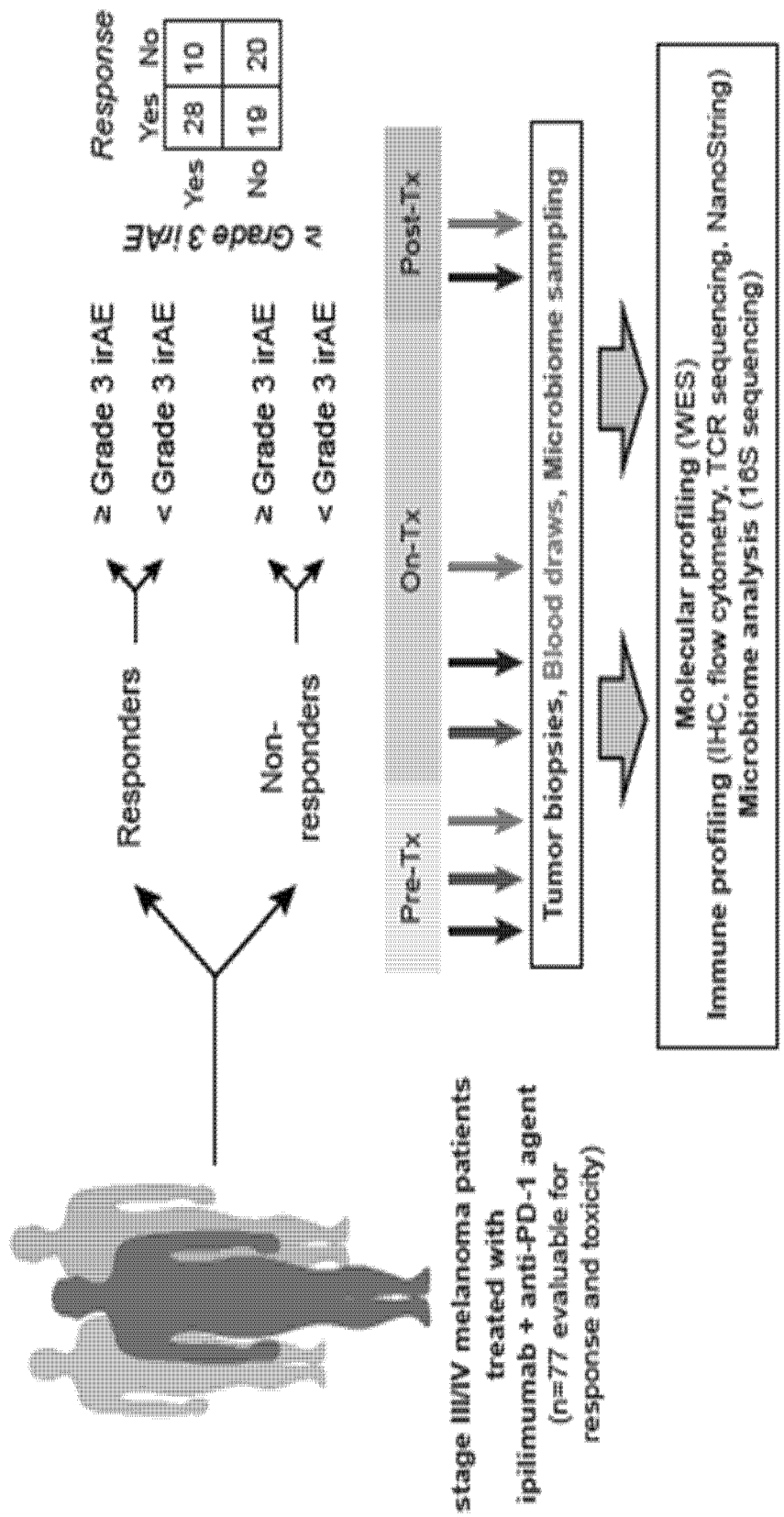
FIG. 14: Cohort of patients with advanced melanoma (n=77) evaluated for clinical outcomes and correlative biospecimen analyses prior to and following initiation of combined anti-CTLA-4 and anti-PD-1 blockade.
Figure 15A:
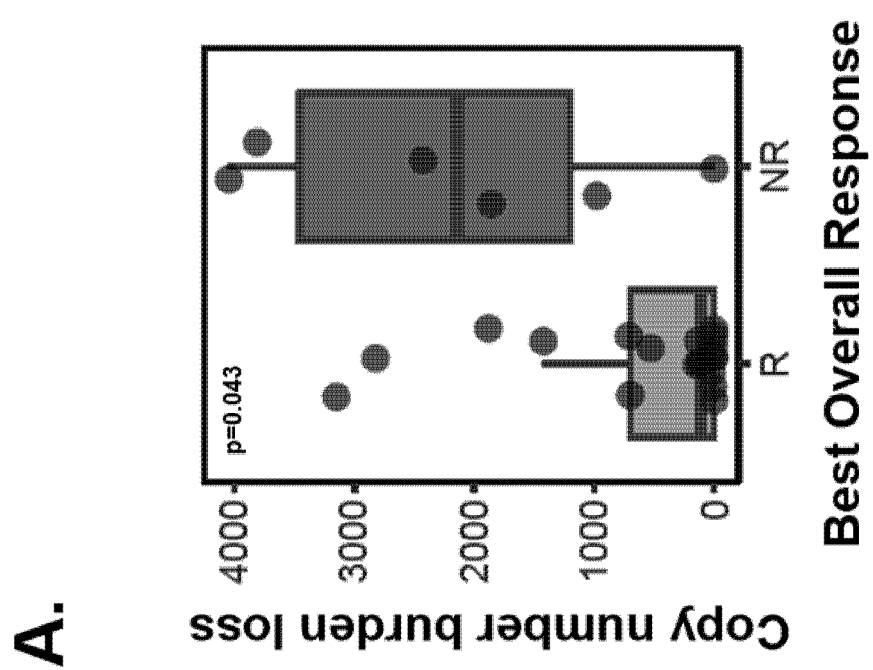
Figure 15B:
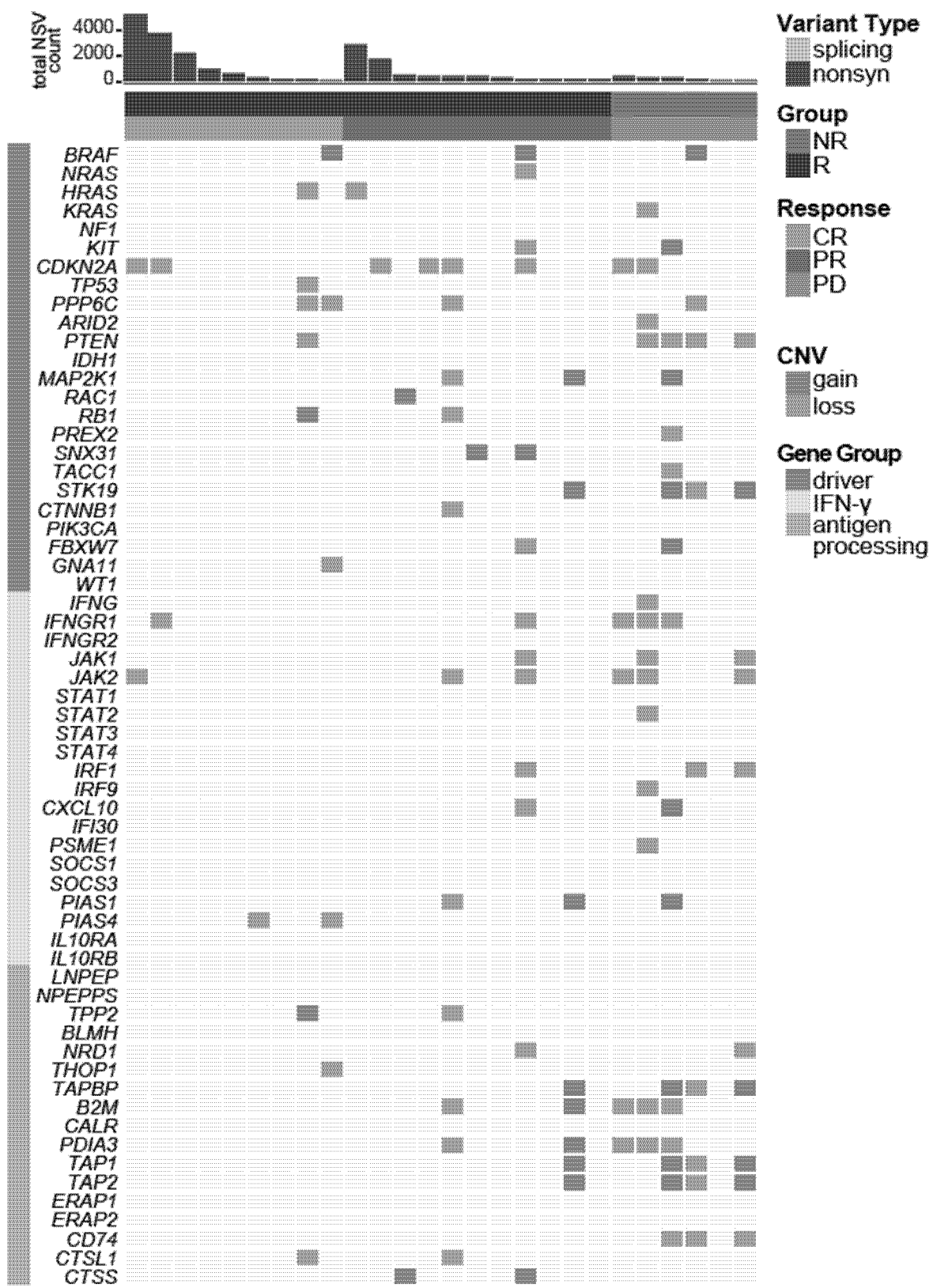
Figure 16A:
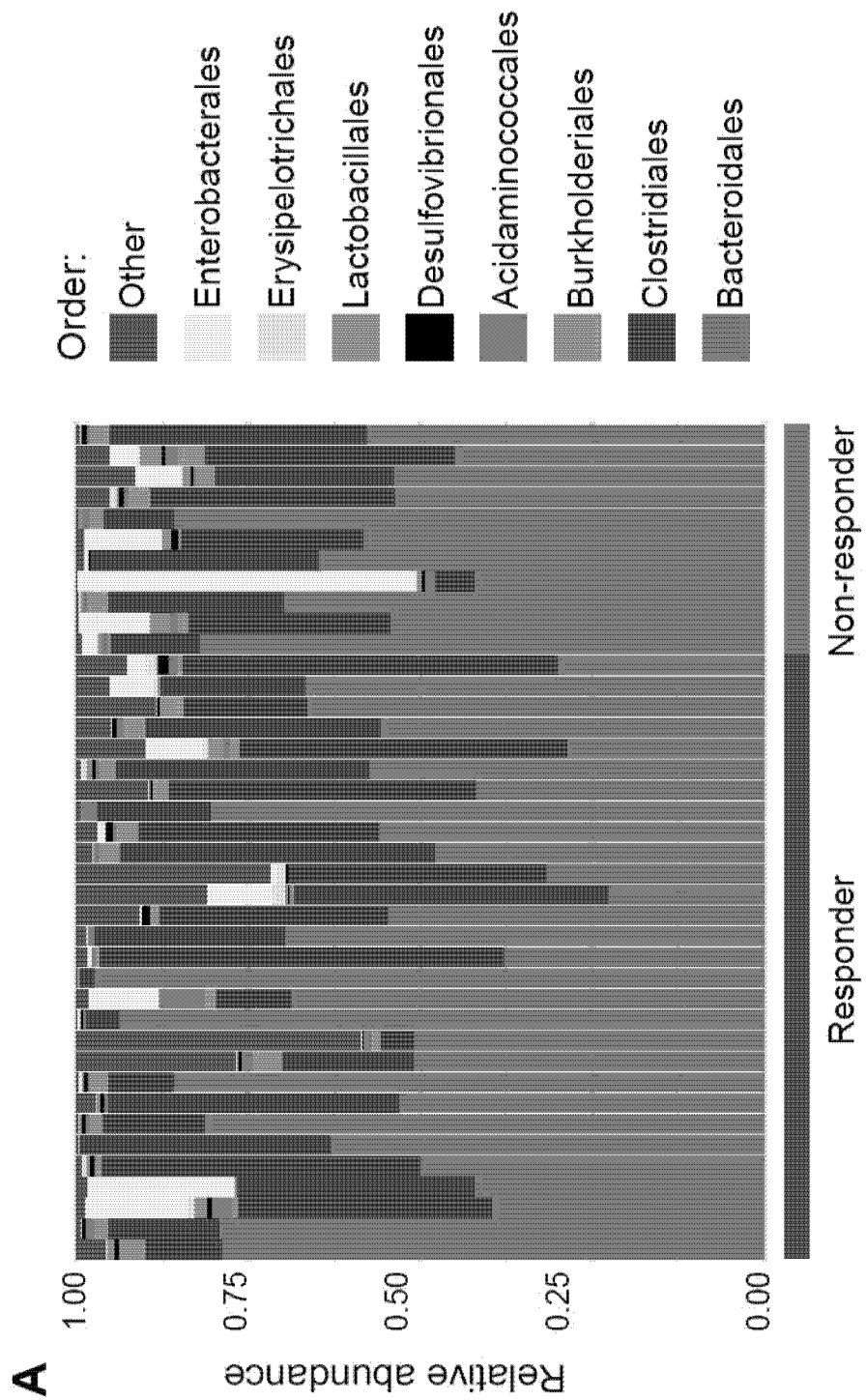
Figure 23:
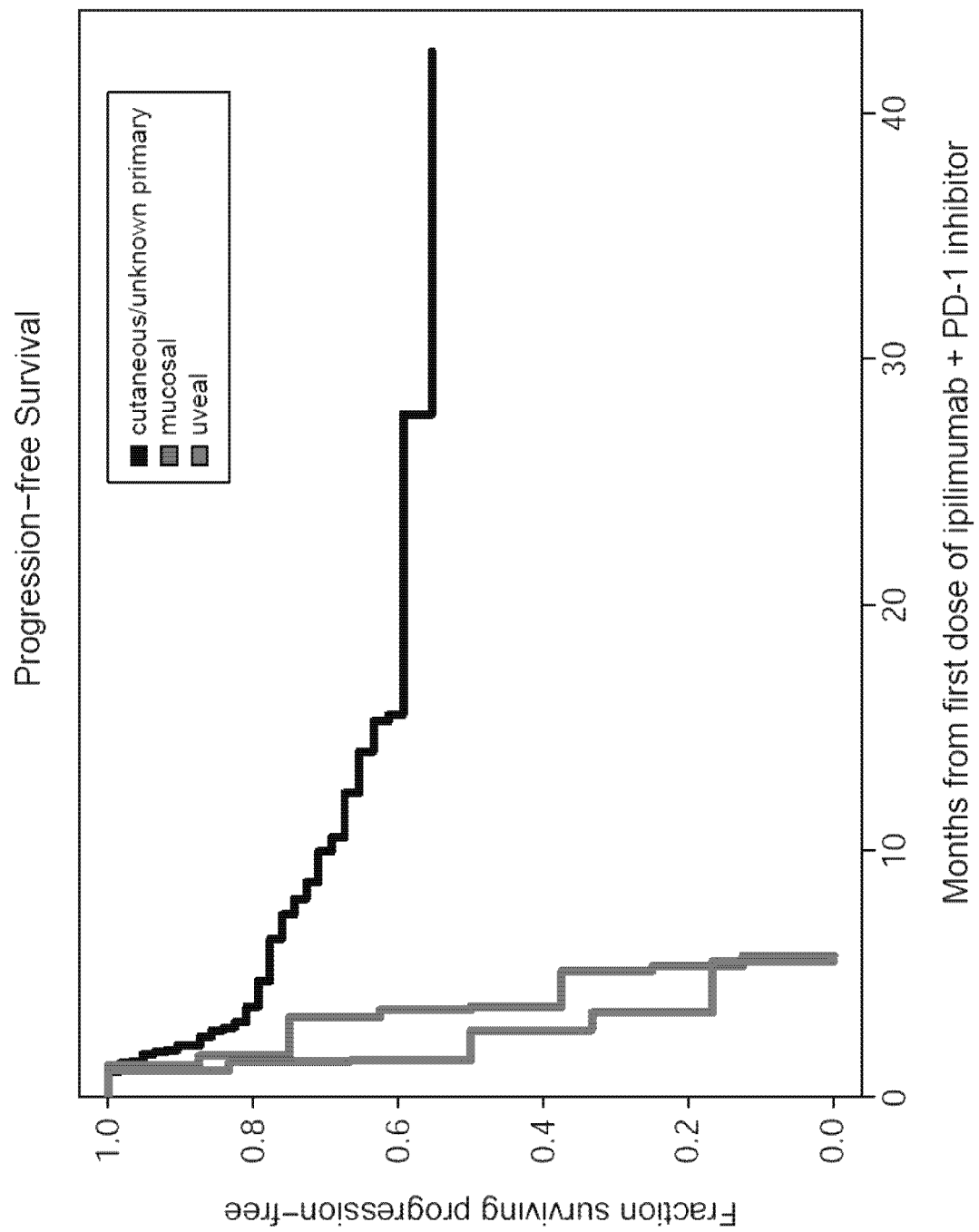
FIG. 23. Patient treatment outcomes. Kaplan-Meier curve of progression-free survival in the patient cohort stratified by melanoma subtype (n=77, n=63 cutaneous/unknown primary, n=8 mucosal, n=6 uveal).
Figure 24:
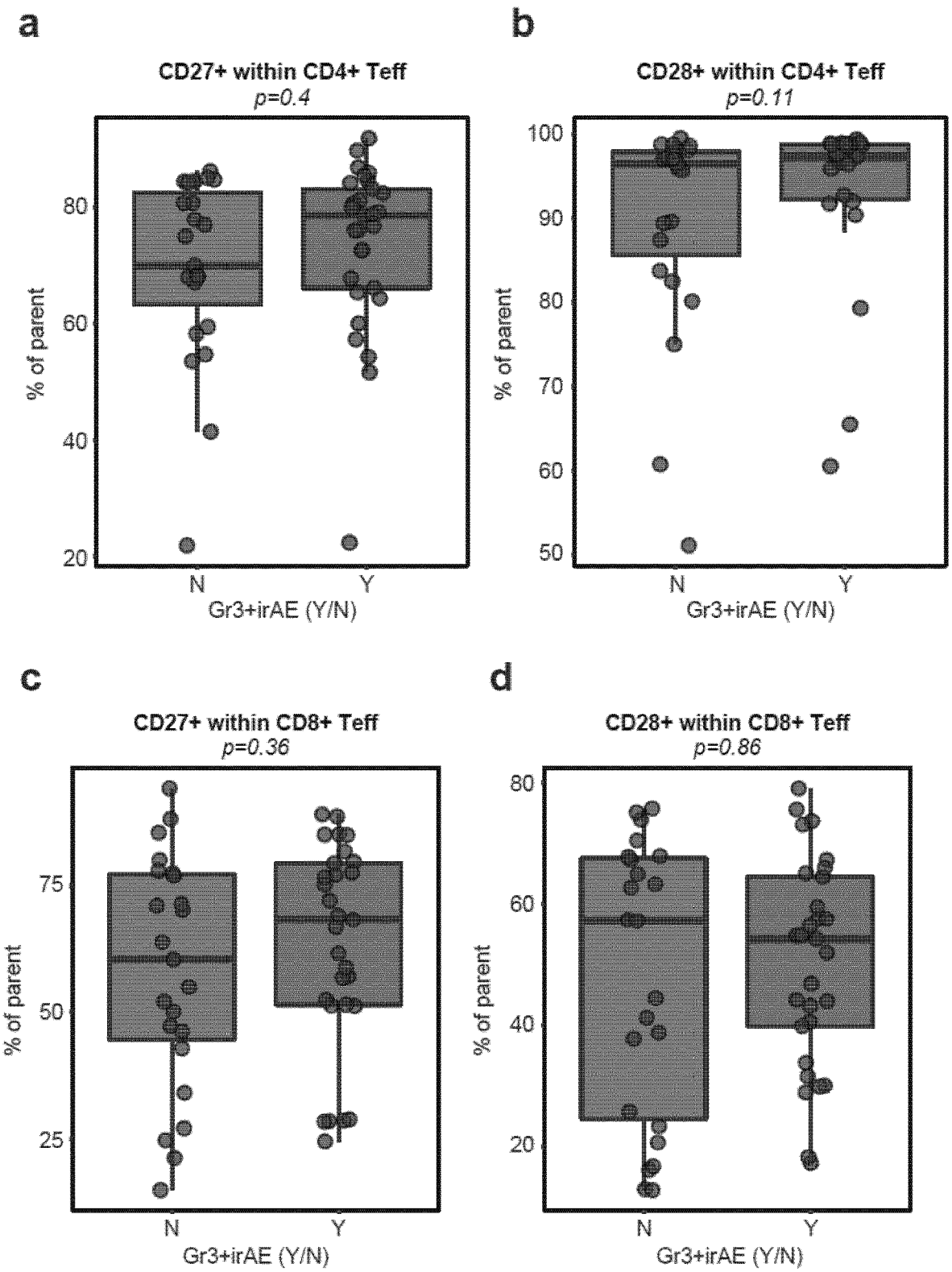
FIG. 24A-D. Immune markers of CICB response and toxicity. CD4+ Teff (A,B) and CD8+ Teff (C,D) from a separate CICB-treated cohort, in pre-treatment peripheral blood samples (p values from Mann-Whitney tests as shown).

To help address this issue, the inventors studied biomarkers of response and toxicity to CICB in a cohort of 77 patients with advanced predominantly cutaneous-type melanoma receiving CICB, either on clinical trials or as standard of care therapy (FIG. 14, Extended Data Table 1). The majority of patients had stage IV disease (n=65, 84%), and were naïve to prior systemic therapy (n=57, 74%) (Extended Data Table 1, FIG. 23). In this cohort, the rate of any grade irAE was high (n=72, 93.5%) and nearly half of patients (49%) experienced severe (≥Grade 3) irAEs (Extended Data Table 2), which is in line with other published series (Sznol, 2017 #2; Wolchok, 2013 #9; Postow, 2015 #71; Larkin, 2015 #1; D'Angelo, 2017 #70).

The inventors first performed whole-exome sequencing in available pre-treatment tumor samples to assess the association of total mutational burden (TMB) with response to CICB (n=26, Extended Data Table 3). The inventors observed a higher TMB in responders (R, n=20) compared with non-responders (NR, n=6) to CICB overall (FIG. 2A, p=0.20), consistent with findings from prior studies (Hellmann, 2018 #40; Hugo, 2016 #14; Snyder, 2014 #13; Van Allen, 2015 #6). However, there appeared to be 2 subsets within the responder population; one with a high TMB for whom anti-PD-1 monotherapy may have been sufficient; and one with a lower TMB that overlaps with the non-responder range, and for whom mutational burden is therefore not a useful predictive factor for response. There is therefore a subpopulation of patients with low TMB who can respond to CICB, though the mechanisms by which these patients respond are unknown. Qualitative assessment of the mutational landscape in this cohort did not reveal significant differences in the frequency of mutations in common melanoma driver, IFN-7-pathway and antigen processing pathway gene sets in R vs NR (FIG. 8A). Similarly, no significant differences were noted in neoantigen burden between R and NR (FIG. 8C) however the cohort size for these analyses was relatively small.

The inventors next assessed the association between copy number loss and response to CICB given prior findings suggesting that a high burden of copy number loss was associated with resistance to treatment with sequential checkpoint blockade targeting CTLA-4 and PD-1 (Roh, 2017 #22). In the current cohort, the inventors observed that NR to CICB had a significantly higher burden of copy number loss compared with R (p=0.04, FIG. 15A). Resistance to CICB was principally associated with copy number loss affecting chromosomes 5, 10 and 15 (FIG. 8D-E, 2C). Several genes previously implicated in resistance to immune checkpoint blockade monotherapies appeared either exclusively (CD74) or disproportionately (PDIA3, B2M, PTEN) affected by copy number losses in NR tumors (FIG. 15B), suggesting potential immuno-genomic mechanisms of resistance to CICB (Ekmekcioglu, 2016 #25; Peng, 2016 #23; Roh, 2017 #22; Tanese, 2015 #26; Zaretsky, 2016 #24).

Given prior studies highlighting the prognostic significance of the density and distribution of CD8+ T cells in response to ICB monotherapy (Tumeh, 2014 #72; Peng, 2016 #23), the inventors next assessed the density of CD8+ T cells in baseline tumor biopsies of R versus NR to CICB. A higher density of CD8+ T cells was observed in tumors of R compared with NR, (n=19 R, n=6 NR; p=0.052, one-sided, FIG. 2E), The inventors also assessed the T cell repertoire via TCR sequencing in baseline tumor samples of R versus NR to CICB. Although associations with response were limited, T cell repertoire entropy was higher in R (p=0.058, FIG. 2F) suggesting possible regimen-specific differences compared with ICB monotherapy (Roh, 2017 #22).

Following this, the inventors sought to identify putative biomarkers of toxicity to CICB, as severe irAEs are particularly common, and may be treatment-limiting due to unplanned discontinuation of therapy (Carlino, 2016 #16). To do this, the inventors first studied the association between systemic immune parameters via TCR sequencing of peripheral blood lymphocytes (PBL) at baseline and on-treatment. In these studies, the inventors observed a significantly higher diversity of the baseline T cell repertoire in patients who subsequently experienced high-grade irAEs (p=0.028, n=24; FIG. 15C (top)). This is in line with previously published reports in checkpoint blockade monotherapy (Oh, 2017 #11; Subudhi, 2016 #12), and suggests that TCR diversity at baseline could help predict toxicity to CICB, though this needs to be tested in additional cohorts. Polyclonal expansion of T cell clones from baseline to on-treatment was also observed, with patients experiencing grade 3 or above toxicity on CICB having expansion of ≥55 circulating CD8+ T cell clones compared to those with <grade 3 irAE (p=0.22, FIG. 9A) which is consistent with previously reported findings in prostate cancer patients receiving ICB monotherapy targeting CTLA-4 (Subudhi, 2016 #12).

Next, the inventors interrogated the phenotype of PBL in patients with grade 3 or above irAEs via multi-parameter flow cytometry at baseline and on-treatment. In these studies, the inventors observed a higher proliferative index in their effector and central memory CD8+ T lymphocytes at early on-treatment time points (p=0.0044, n=14, FIG. 3A, 9C), suggesting that accelerated expansion of cytotoxic T cells could contribute to immune-related toxicity. Together with TCR sequencing data, these results suggest that a more diverse T cell repertoire harboring greater numbers of potentially auto-reactive clones may contribute to irAEs following CICB.

Figure 25:
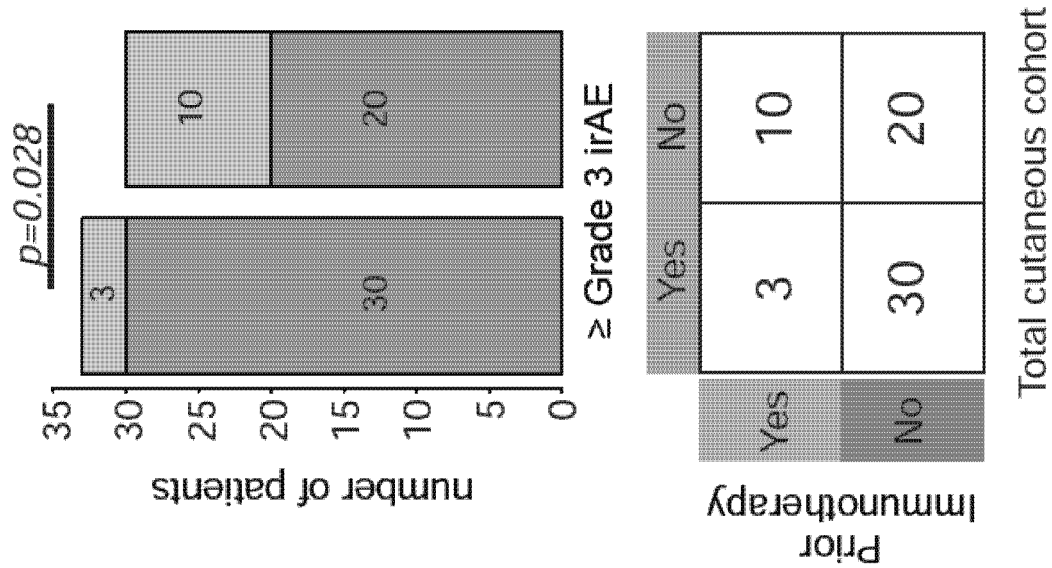
FIG. 25. Prior immunotherapy and toxicity-associated T cell phenotype. (C) Stacked bar plot (above) and contingency table (below) depicting the relationship between exposure to prior immunotherapy and risk of developing ≥Gr3 irAE following combination anti-CTLA-4 and anti-PD-1 blockade in patients with cutaneous or unknown primary melanomas (p=0.028, Fisher's exact test).

Intrigued by these findings, the inventors then assessed the expression of CD28 and CD27 in PBL of patients with high-versus low-grade irAEs, as these markers are known to be progressively down-regulated in antigen-experienced T cells adopting a distinct "aged" functional state (Moro-Garcia, 2012 #73; Chen, 2010 #74). In these studies, the inventors observed significantly lower expression of surface CD28 and CD27 on circulating CD4+ and CD8+ effector T lymphocytes of patients who did not develop severe irAEs (CD27 in CD4 Teff, p=0.0022; CD28 in CD4 Teff, p=0.014; CD27 in CD8 Teff, p=0.072; CD28 in CD8 Teff, p=0.04; FIG. 3D, 15D (bottom), FIG. 9D-E). Notably, similar phenotypic trends were also observed in a second cohort of melanoma patients treated with CICB examining pre-treatment peripheral blood lymphocyte samples from patients comparing ≥Grade 3 toxicity versus <Grade 3 toxicity (FIG. 24A-D), characterized by trends towards lower CD27/28 expression in CD4/8 T effector cell subsets. Interestingly, in the cohort this phenotype was observed more frequently in patients previously exposed to systemic immunotherapy (odds ratio 0.21, 95% CI=0.03-0.93, p=0.028, Fisher's exact test) (FIG. 3D, 3E, 25), and the association between prior immunotherapy exposure and freedom from high-grade irAE remained significant when considering all melanoma subtypes (odds ratio 0.27, 95% CI=0.06-1.02, p=0.047, Fisher's exact test). These data could indicate that prior immunotherapy exposure drives development of this phenotype, however further studies are needed to validate and potentially capitalize on this finding.

Figure 17A:
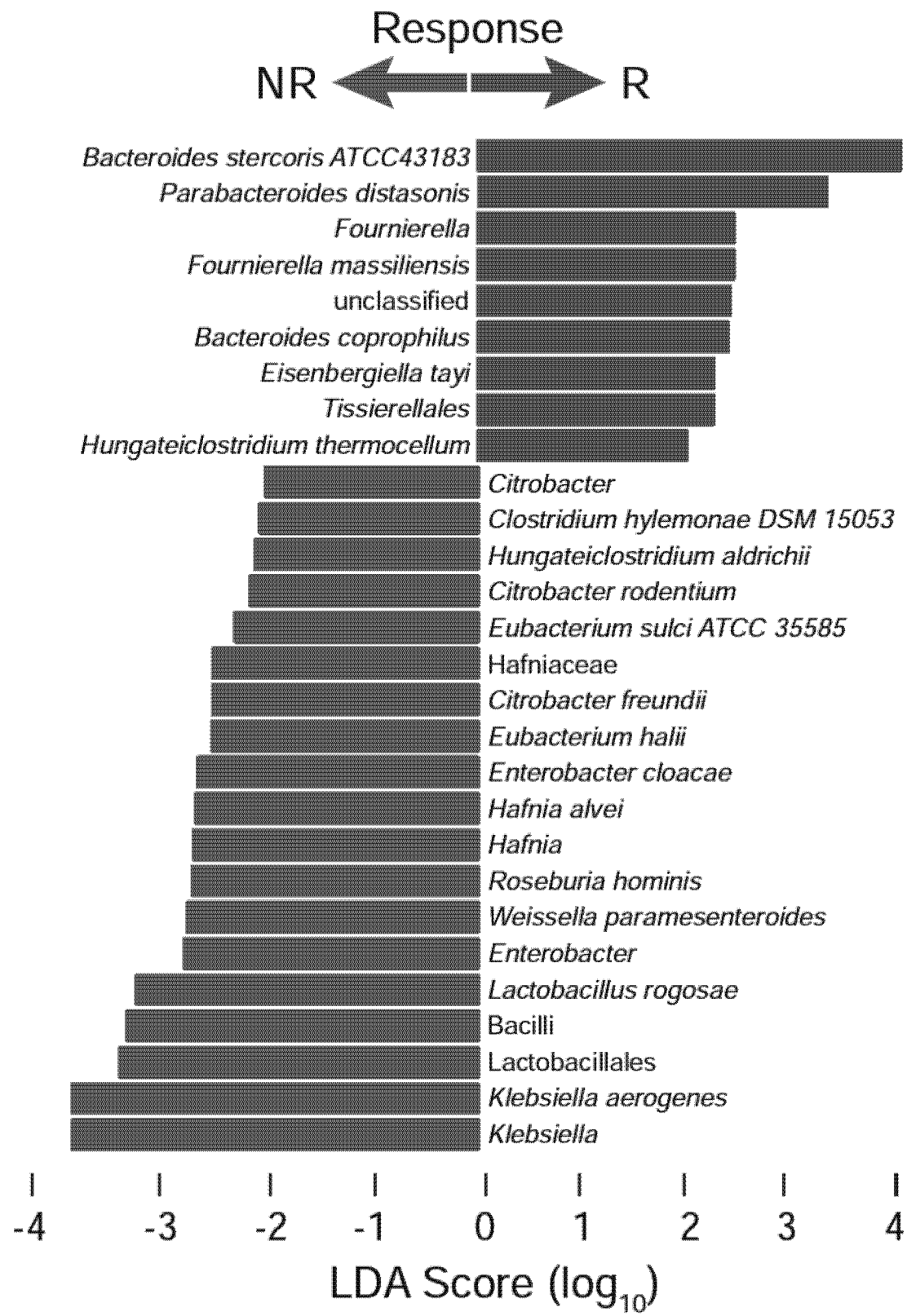
FIG. 17A-B: Differential enrichment of bacterial taxa by LEfSe. Linear Discriminant Analysis score plot of bacterial taxa differentially enriched in patients with either A) LDA-score plot of bacterial taxa significantly enriched in patients with either R or NR to CICB from the cutaneous and unknown primary cohort (n=40). LDA=linear discriminant analysis. p<0.05., or B) LDA-score plot of bacterial taxa significantly associated with development of, or freedom from, high-grade (≥Grade 3) immune-related adverse events (irAE) in all patients with fecal samples (n=54). p<0.05.
Figure 18A:
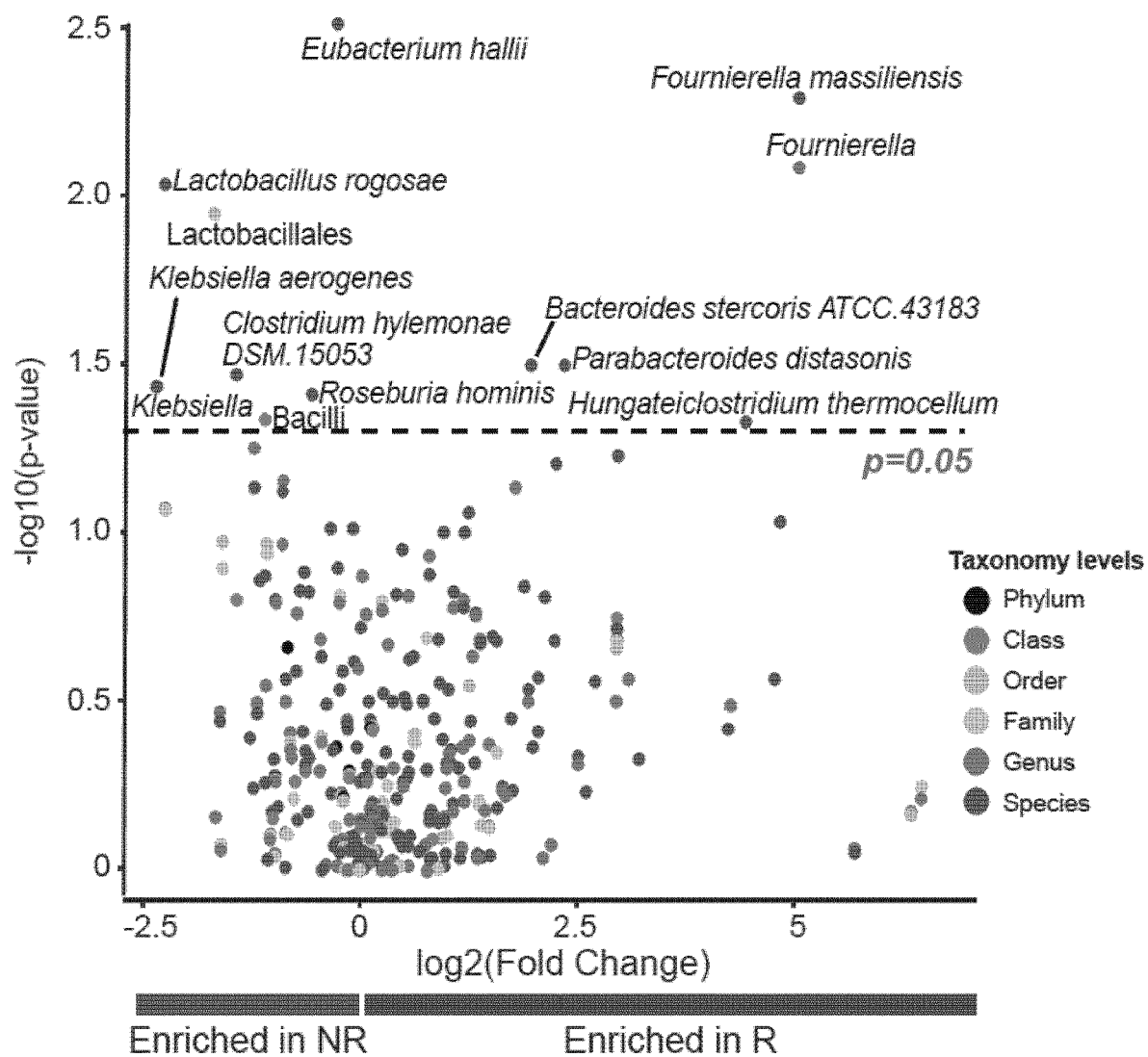
FIG. 18A-C: Candidate bacterial taxa discovery and association with progression free survival. Volcano plot of pairwise Mann-Whitney comparisons of relative bacterial abundances by bootstrapping (at all levels), by A) Volcano plot of pairwise comparisons of taxa (at all levels) by dichotomized response categories in the cutaneous/unknown primary cohort (n=40) using Mann-Whitney tests applied to 1000 permutations of differential bacterial abundance. and B) Volcano plot of pairwise comparisons of bacterial taxa (at all levels) by dichotomized high-grade (≥Grade 3) immune-related adverse event categories (n=54) using Mann-Whitney tests applied to 1000 permutations of differential bacterial abundance. (C) shows the proportion of progression free survival vs. The number at risk.

Following the interrogation of blood and tumor samples, the inventors next assessed the association of gut microbiome signatures with response and toxicity to CICB given the growing evidence regarding the role of the gut microbiota in response to checkpoint blockade (Gopalakrishnan, 2018 #19; Matson, 2018 #20; Routy, 2018 #18). Importantly, the inventors assessed profiles in human patients, and performed studies in pre-clinical models for cross-species validation of putative microbial contributors to response and/or toxicity. Focusing first on candidate taxa associated with response, the inventors profiled baseline fecal microbiome samples using 16S rRNA gene sequencing (n=54; Extended Data Table 3, FIG. 16A). The inventors first queried associations of gut microbiota with response through studies of compositional differences between R and NR using LEfSE (FIG. 17A) and pairwise comparisons (FIG. 18A). Several differentially-enriched bacterial taxa were identified, including *Bacteroides stercoris, Parabacteroides distasonis,* and *Fournierella massiliensis* in R (p=0.03, p=0.03, p=0.005, respectively by Mann-Whitney tests; FIG. 17A, 18A) and *Klebsiella aerogenes* and *Lactobacillus rogosae* in NR (p=0.04, p=0.009, respectively by Mann-Whitney tests; FIG. 17A, 18A). Consistent with prior findings, the orders *Firmicutes* and *Clostridiales* tended to be higher in responders (p=0.39, p=0.38, respectively; FIG. 26A-B). The inventors did not observe any significant differences in alpha diversity comparing R with NR in this cohort which is in contrast to the inventors' findings in patients on anti-PD-1 monotherapy (FIG. 16B), however sample size was admittedly limited.

Figure 27A:
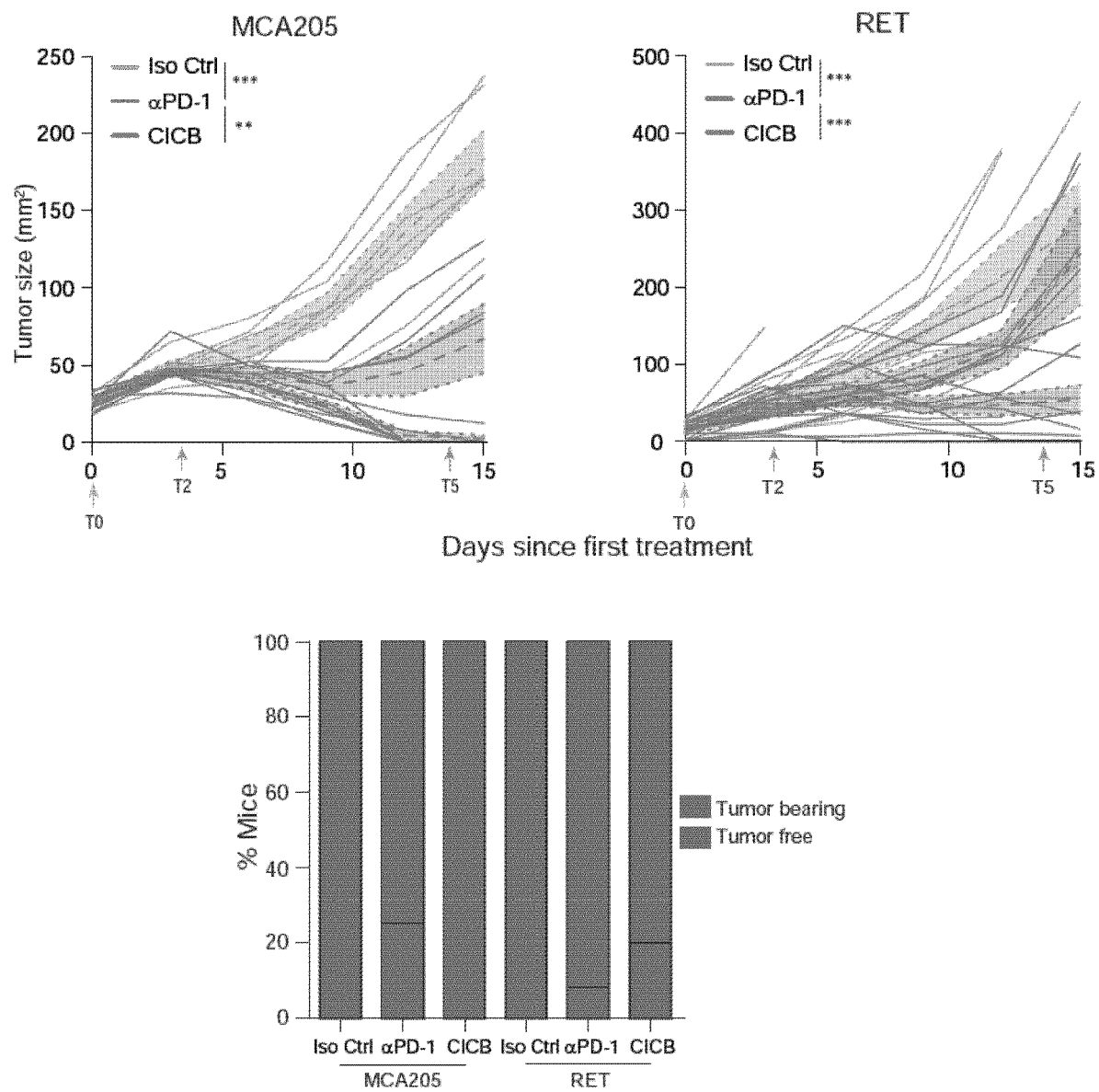
Figure 27B:
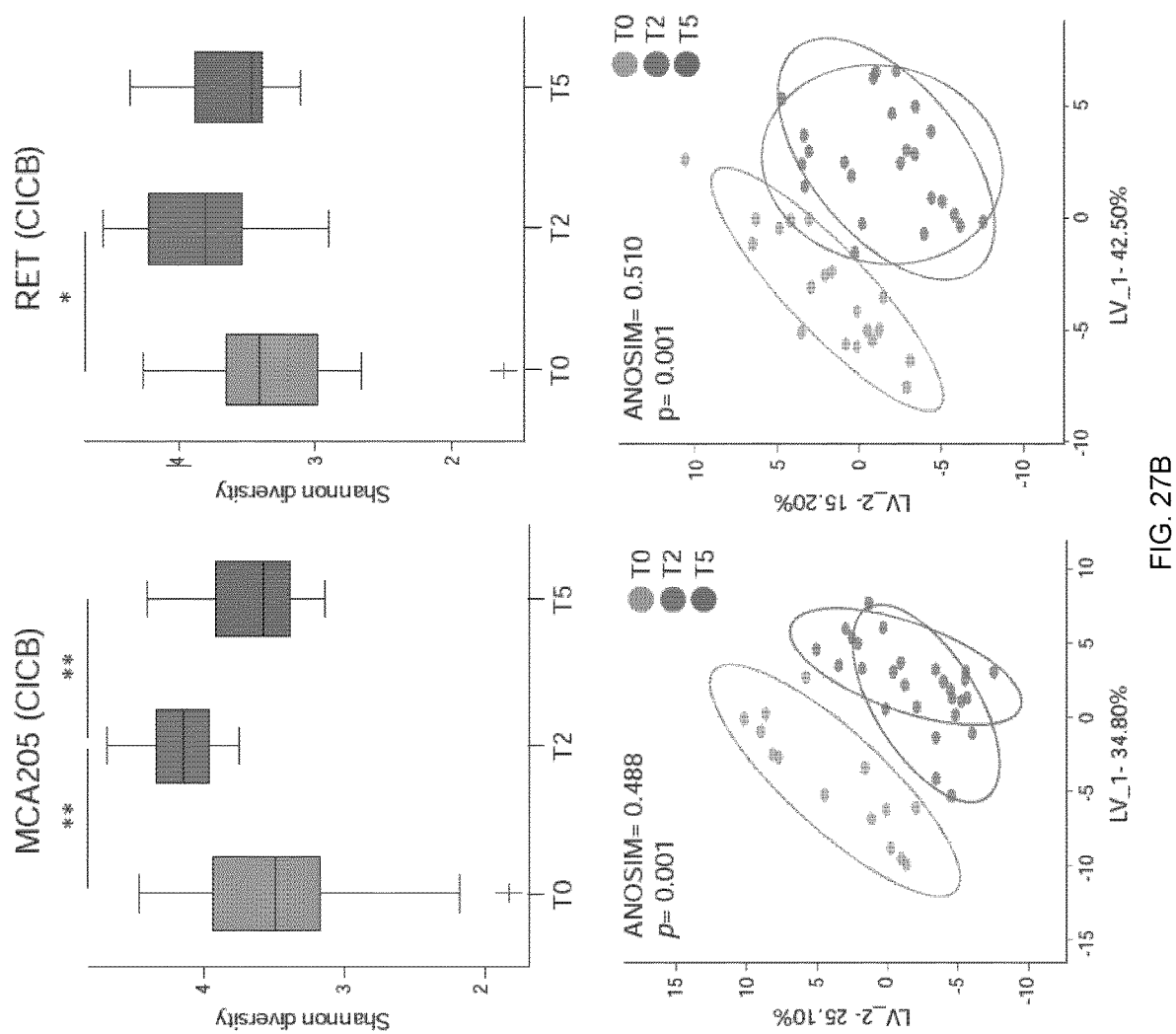

The inventors next interrogated candidate taxa associated with response in pre-clinical models treated with CICB (data not shown). In these studies, treatment with CICB was associated with prolonged response and/or complete tumor regression in both tumor models compared with control and mice treated with anti-PD-1 monotherapy (FIG. 27A). Interestingly, treatment with CICB was associated with shifts in the gut microbiota over time, with an increase in alpha diversity (FIG. 27B).

In order to determine if the microbiome could predict response to CICB, the inventors utilized a supervised analysis (Partial Least Squares Discriminant Analysis; PLS-DA) to explore the variance in microbiome composition at T0 comparing mice eventually tumor-bearing versus tumor-free mice at T2, and noted a clear discrimination between the two groups (FIG. 20A, p=0.001). Comparing the relative contribution of each bacterial species abundance at T0 to the observed group separation using the PLS-DA-derived variable importance (VIP) score (FIG. 20B) revealed pre-treatment *Parabacteroides distasonis* as predictive of CICB response, which was also observed in human patients. Importantly, the relative abundance of *P. distasonis* at T0, T2 and T5 was negatively correlated with tumor size at T5 (FIG. 20C) and was significantly over-represented at T0 and T2 in mice receiving CICB that were eventually tumor-free (FIG. 27D). Additional taxa associated with response in each tumor model were noted (Extended Data Tables 4-5). Together, these data identify a dynamic interplay between CICB and gut commensal microbiota, with commonalities in enriched taxa between the two murine tumor models and human patients, such as *P. distasonis*, which was positively associated with beneficial tumor responses.

Figure 17B:
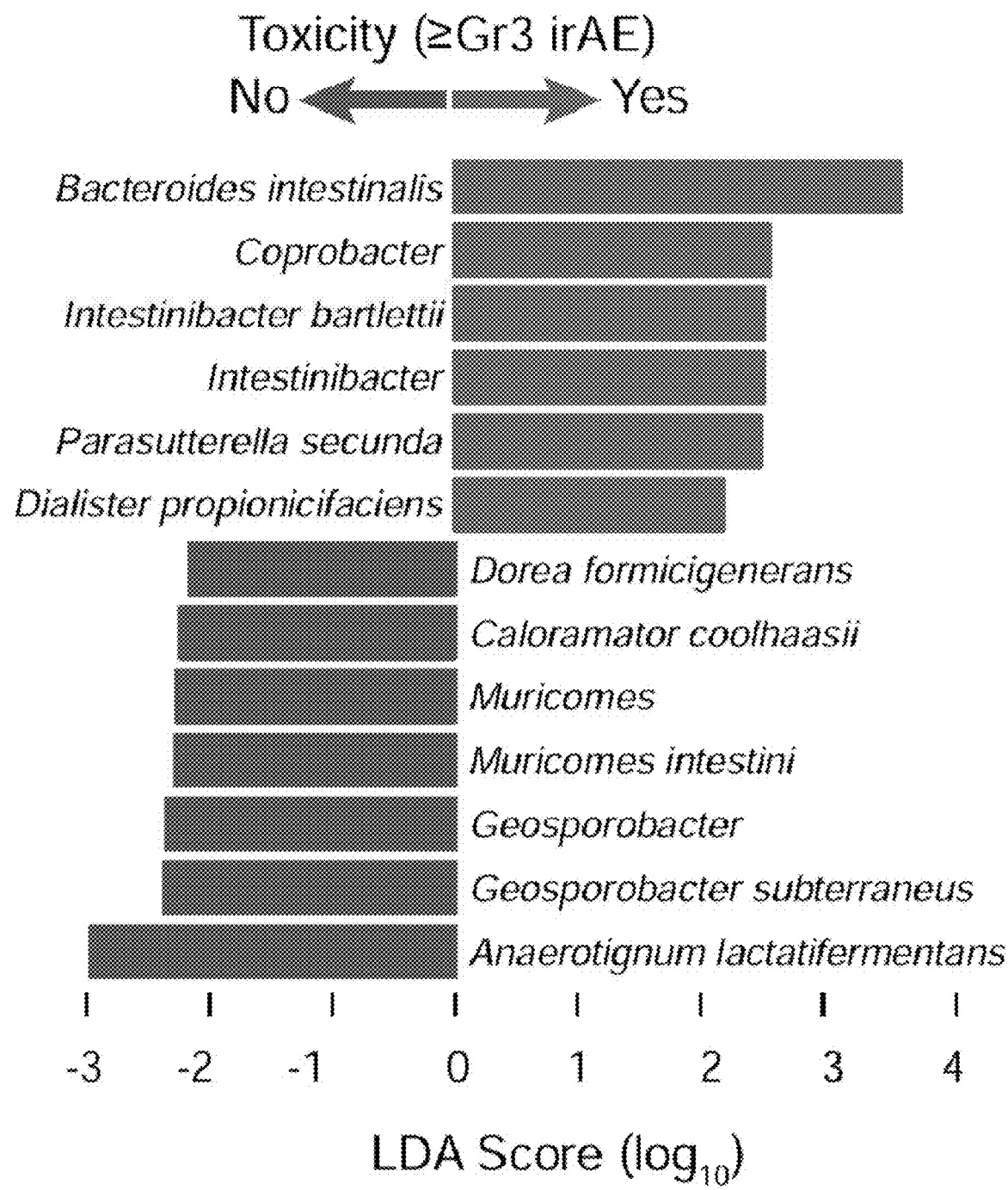
Figure 18B:
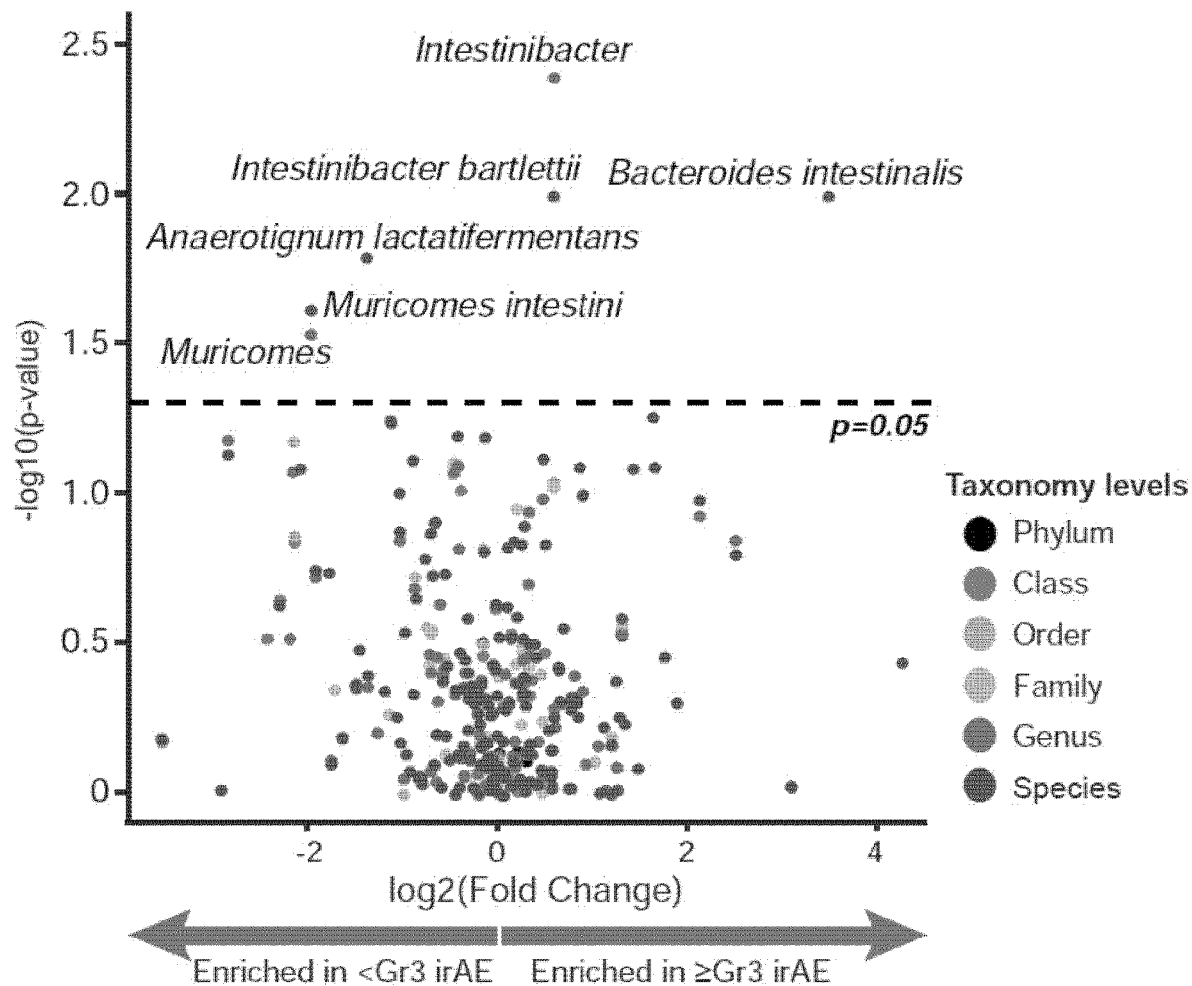
Figure 18C:
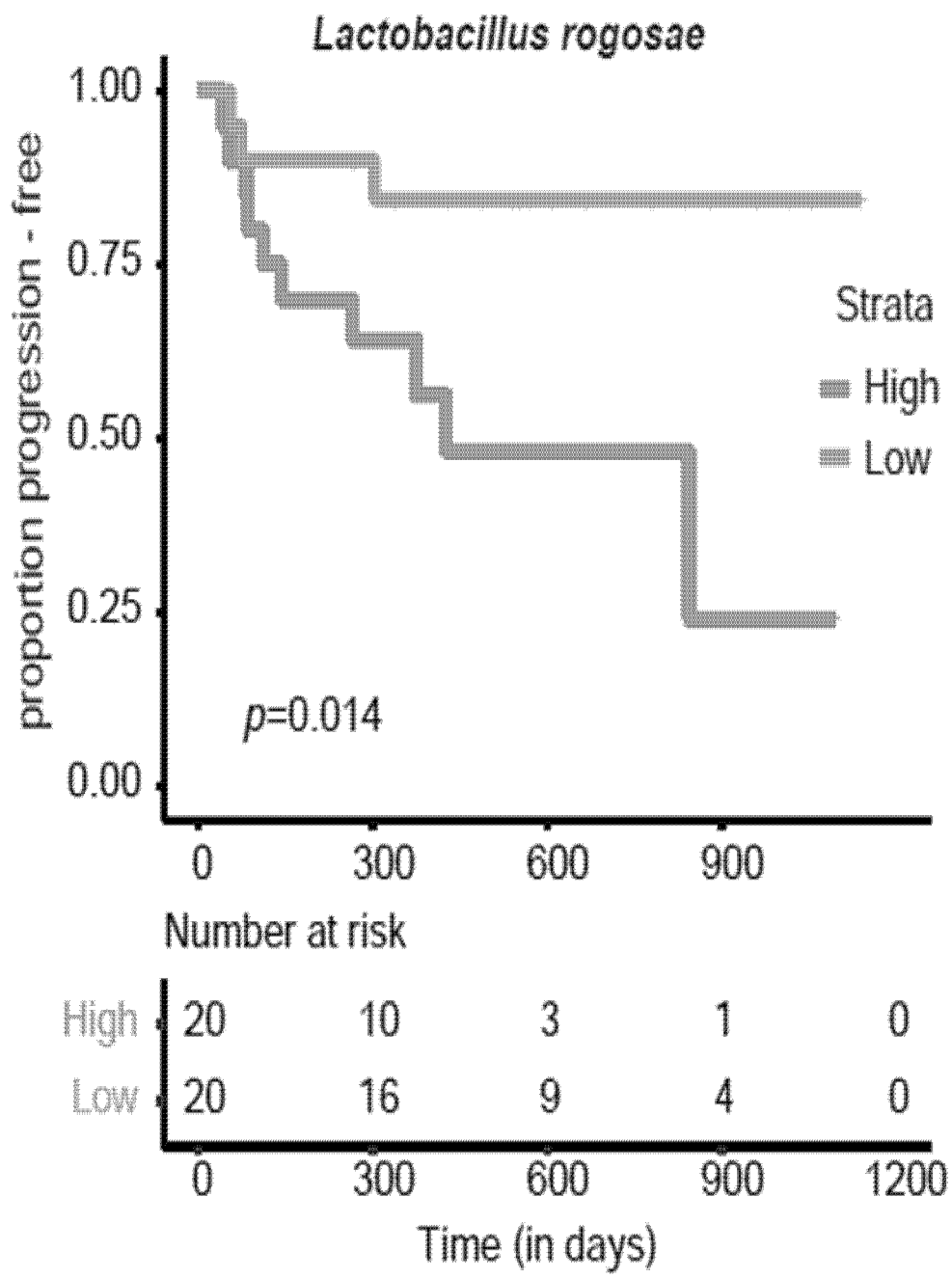
Figure 19A:
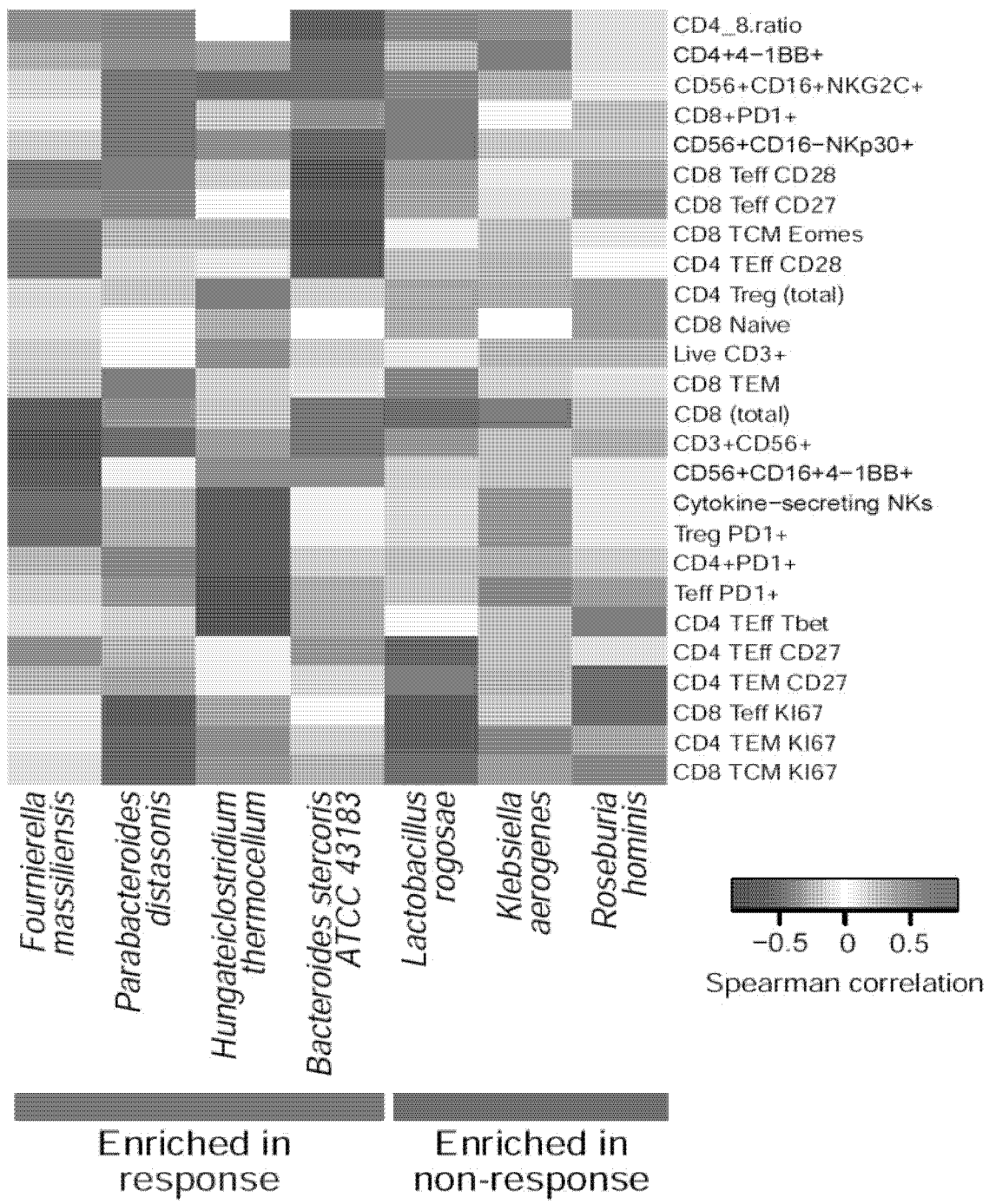
FIG. 19A-B: Association between circulating immune populations and most differentially enriched bacterial taxa by phenotype. A) Heatmap of correlations (Spearman's rho) between taxa associated with response or non-response and circulating immune cell populations at baseline (n=8), and B) Heatmap of correlation (Spearman's rho) between key toxicity-associated or non-toxicity-associated bacterial taxa and circulating immune subsets quantitated by multiparameter flow cytometry of baseline blood samples (n=8). TEff=T effector cells, TCM=T central memory, TEM=T effector memory, Treg=regulatory T cell.
Figure 19B:
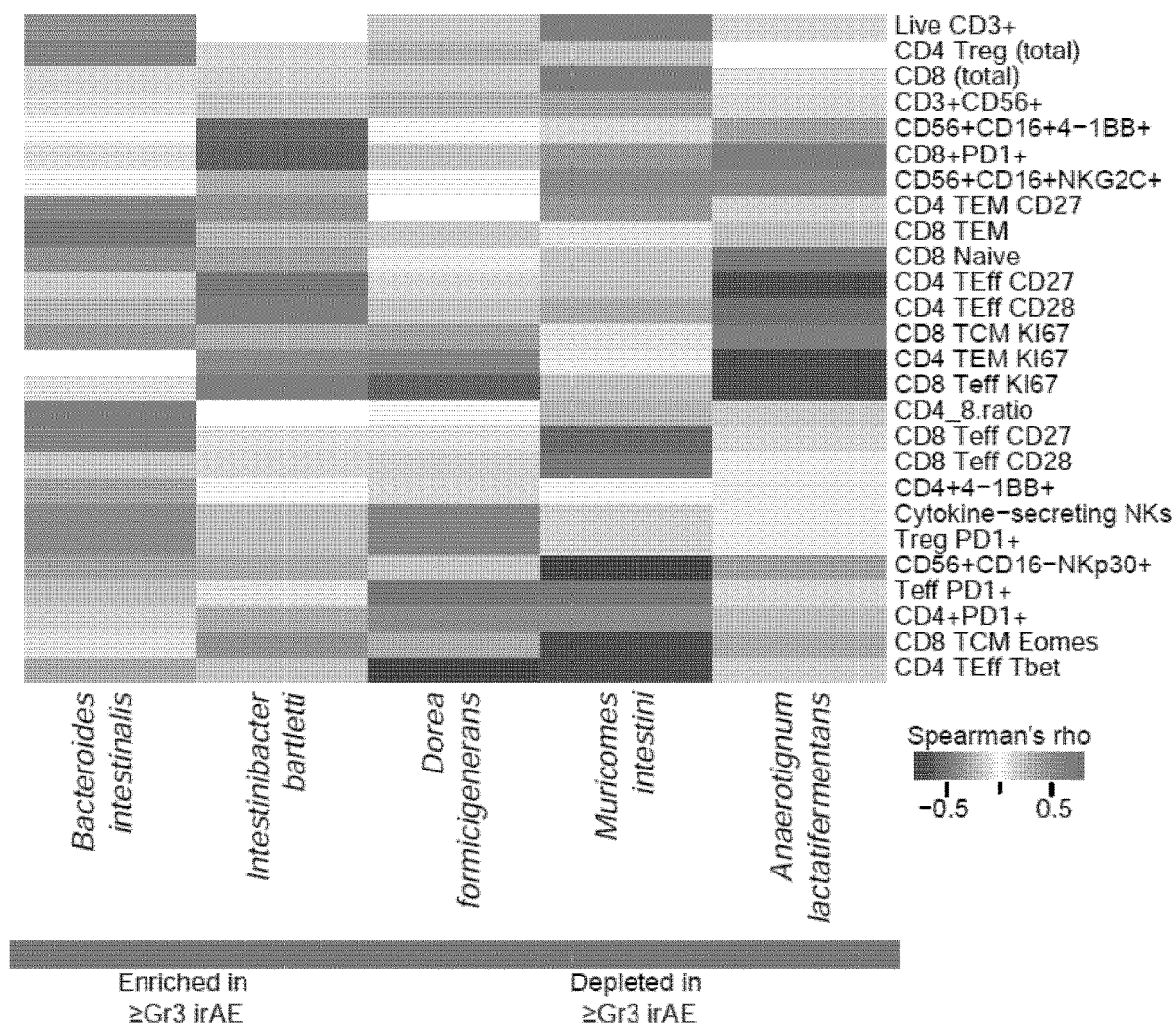

After assessing the potential impact of gut microbiota on response, the inventors next interrogated associations between the gut microbiota and toxicity to therapy in the patient cohort and in the murine models. In the patient cohort, several individual bacterial taxa were differentially enriched in baseline gut microbiome samples of patients who went on to develop ≥Grade 3 irAEs versus those who did not, including *Bacteroides intestinalis* and *Intestinibacter bartlettii* (p=0.009, p=0.009 by Mann-Whitney tests, respectively; FIG. 17B, 18B). Notably, taxa were also identified that were enriched in those who did not develop ≥Grade 3 irAEs, including *Anaerotignum lactatifermentans* and *Dorea formicigenerans* by LEfSe and pairwise comparison (p=0.016 and p=0.06 respectively, FIG. 17B, 18B).

Figure 21:
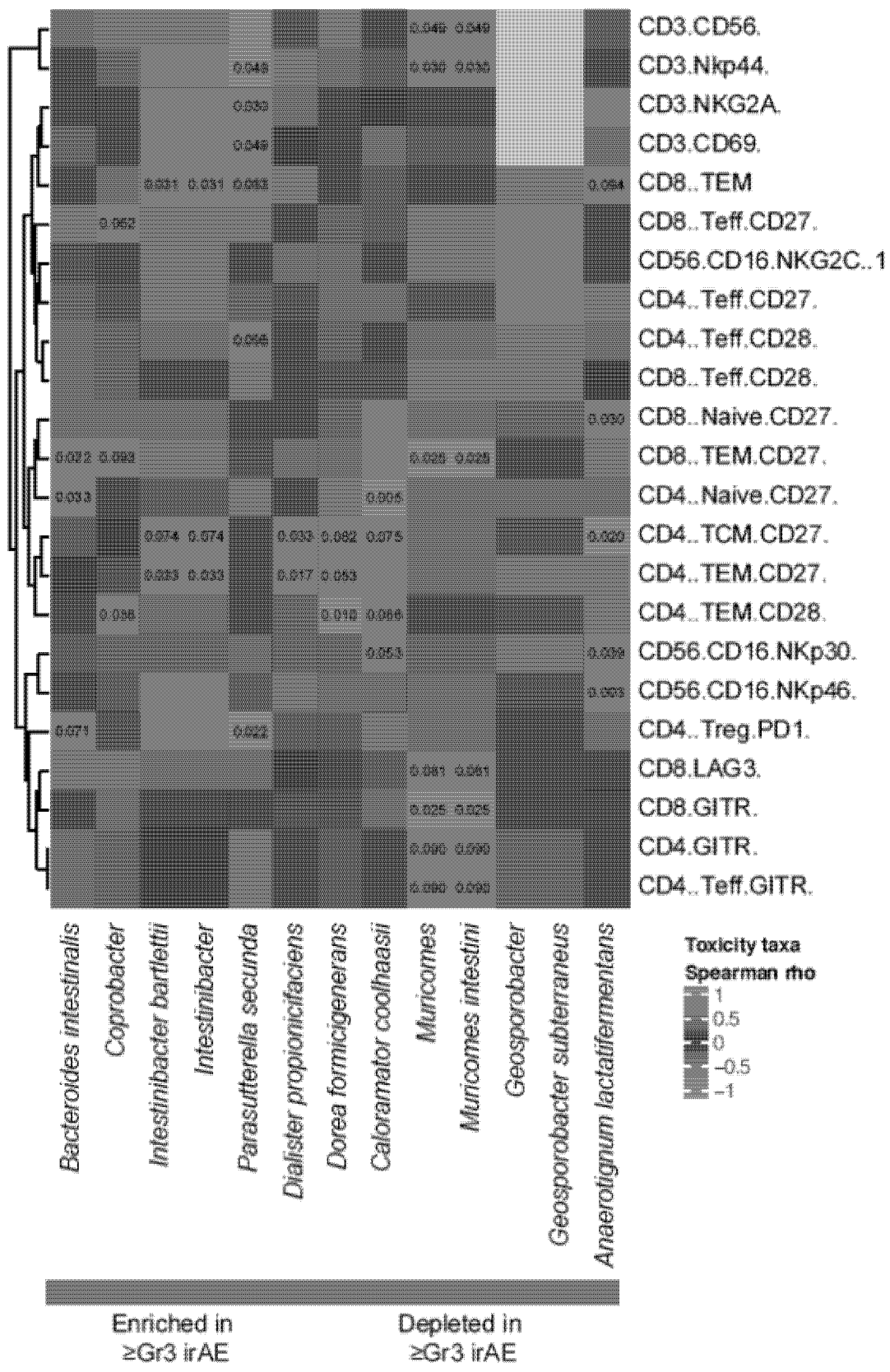
FIG. 21. Heatmap of correlation (Spearman's rho) between key toxicity-associated or non-toxicity-associated bacterial taxa and circulating immune subsets quantitated by multiparameter flow cytometry of baseline blood samples (n=8). TEff=T effector cells, TCM=T central memory, TEM=T effector memory, Treg=regulatory T cell.

In the human cohort, the inventors next assessed the relationship between candidate taxa in the gut and phenotype of the peripheral immune repertoire in patients with available matched baseline samples (n=13). Consistently positive correlations were observed between the abundance of *Bacteroides intestinalis* and PD-1+ T cell populations, consistent with the potential (re)activation of diverse immune specificities upon CICB initiation leading to toxicity (FIG. 21). Interestingly, taxa associated with freedom from ≥Grade 3 irAEs such as Doreaformicigenerans, *Muricomes intestini* and *Anaerotignum lactatifermentans* were inversely correlated with the abundance of previously implicated CD4+ and CD8+ T cells expressing CD27 and CD28, suggestive of a potential route for immunomodulation linking these taxa to the observed clinical outcome. In this cohort, the inventors did not detect any association between microbial alpha diversity and ≥Grade 3 irAEs (FIG. 16C).

Following assessment of gut microbiota and toxicity in the human cohort, the inventors next assessed the relationship between the gut microbiota and toxicity (colitis and ileitis) in the murine models. Though current models have limitations with regard to assessment of toxicity as murine models poorly exhibit overt colonic irAE, the inventors carefully assessed histologic abnormalities of the gut epithelium and lamina propria associated with sub-clinical toxicity (FIG. 28A-B) and compared this to candidate taxa in the gut.

The inventors first assessed for toxicity after administration of CICB with or without co-administration of broad-spectrum antibiotics (ATB). In these studies, treatment with CICB was associated with subclinical ileal toxicity that was highly mitigated by sterilization of the intestines with ATB (FIG. 22A). Notably, this ileitis was accompanied by a prompt and selective upregulation of transcription of the pro-inflammatory cytokine Il1b but not Tnf or Il6, and only in the presence of intact gut microflora (FIG. 22B-C). Intrigued by this finding, the inventors next interrogated human tissues of patients who developed colitis and observed a significant increase in IL1B expression in colitis samples versus healthy colon controls (data not shown).

As *Bacteroides intestinalis* was markedly associated with toxicity in the patient cohort (FIG. 17B), the relative abundance of *B. intestinalis* was assessed by qPCR in fecal samples collected from mice before and after CICB. CICB induced a significant increase in *B. intestinalis* (FIG. 22D), but not in other *Bacteroides* species such as *B. unformis* or *B. fragilis* (FIG. 28E). To elucidate the role of *B. intestinalis* during CICB in melanoma, the inventors gavaged mice with three different strains of *B. intestinalis* or allowed spontaneous recolonization of commensals following antibiotic treatment and found that *B. intestinalis* specifically induced ileal Il1b transcription (FIG. 22E) and rendered the ileum sensitive to CICB-induced damage (FIG. 22F). Similarly, FMT using healthy human donor feces harboring either low or high endogenous levels of *B. intestinalis* (FIG. 28F-G) into the RET melanoma murine model reproduced the findings of *B. intestinalis*-induced ileal sensitivity to CICB-induced damage (FIG. 22G) in association with elevated Il1b expression (FIG. 28H).

Taken together, these studies build on prior findings in immune checkpoint monotherapies to identify novel biomarkers of response and irAE in the context of CICB, to which unique features may apply. Many of the predictive factors for checkpoint blockade monotherapy are also predictive for CICB response and resistance (including TMB, CD8+ T cell density, and burden of copy number loss), however the cohort size was likely under-powered and additional studies are critically needed. Nonetheless interesting signals were observed regarding toxicity to therapy in this cohort, with patients demonstrating a more diverse TCR repertoire at baseline having a higher likelihood of developing high-grade irAE. This suggests that the population-level structure of the circulating lymphocyte pool could conceivably influence the relative likelihood of activating tumor-reactive (desirable) versus latent auto-reactive (undesirable) T cell clones, and might even be shaped by prior therapy as the data suggests, however this again needs to be validated in additional/larger cohorts. Furthermore, these studies yield intriguing insights into potentially modifiable determinants of response and toxicity within the gut microbiota, Together, insights from these studies could inform new strategies in biomarkers of response and toxicity to CICB, as well as new therapeutic targets to potentially abrogate toxicity.

a. Method Details
1. Clinical Assessments and Biospecimens.

Response assessments. Clinical response annotation was performed independently by at least two clinical investigators per patient (MCA, PAP, HT). Treatment responses were defined using the best overall response (BOR) according to RECIST 1.1 criteria (Eisenhauer, 2009 #29) comparing tumor burden on restaging imaging performed at standard disease re-assessment time points studies with baseline (pre-treatment) studies. Longitudinal restaging scans were evaluated throughout the period of treatment until the initiation of a subsequent line of therapy or last known follow-up date. Imaging modality was matched whenever possible, favoring contrast-enhanced CT of the chest, abdomen and pelvis, contrast-enhanced MRI or CT brain, and imaging of the neck or extremities as indicated by known sites of disease. Patients were classified as "responders" (R) if they achieved objective complete response (CR; 100% reduction in tumor burden) or partial response (PR; ≥30% reduction in tumor burden) attributable to CICB. Patients were classified as non-responders if they achieved a BOR of progressive disease (PD; ≥20% increase in disease burden) or stable disease (SD; not meeting criteria for CR/PR/PD) (Extended Data Table 2). Mice were defined as responders (R) if their tumors either regressed or were stable during treatment, or as non-responders (NR) when tumors increased in size over two consecutive measurements.

Toxicity assessments. Immune-related adverse events (irAE) was scored according to the NCI Common Terminology Criteria for Adverse Events (CTCAE) 4.0 criteria and immune-relatedness to CICB therapy ("possible", "probable", "definite" association) assigned by consensus opinion of at least two independent clinical investigators (MCA, HT, WSC). Binary toxicity classification was based on whether patients experienced any grade 3 or higher irAE versus less than grade 3 irAE (Extended Data Table 2).

Biospecimen collections. Available pre- and on-treatment tumor and peripheral blood samples were identified by querying institutional research biospecimen holdings and, when necessary, archival pathology holdings from diagnostic specimens. Tumor biopsies were obtained as punch, core needle, or excisional biopsies and preserved as snap-frozen (for RNA/DNA extraction) or formalin-fixed paraffin-embedded (FFPE; for immunohistochemistry or DNA extraction) specimens. Peripheral blood samples underwent density-gradient centrifugation to isolate peripheral blood mononuclear cells (PBMC) prior to cryopreservation until required for germline DNA extraction or flow cytometry. Biospecimens were retrieved, collected and analyzed under UT MD Anderson Cancer Center Institutional Review Board-approved protocols in accordance with the Declaration of Helsinki. Fecal samples were obtained on an outpatient basis using the OMNIgene-GUT Kit (DNA Genotek Inc, Ottawa, Canada) according to the manufacturer's recommendations after detailed explanation and instruction by treating clinicians. Stabilized fecal samples were returned in person or by mail within 30 days of collection. Patient-level sample utilization is as shown in Extended Data Table 3.

2. Genomic Analyses.

Whole exome sequencing analysis. Whole-exome sequencing (WES) was performed using the same protocol as previously described (Roh, 2017 #22). A total of 26 pre-treatment samples were included (19R, 7NR). DNA was extracted from tumor samples after pathological assessment and confirmation of tumor content. Matched peripheral blood leukocytes were collected as germline DNA control. The initial genomic DNA input into the shearing step was 750 ng. End repair, A-base addition, adapter ligation using forked Illumina paired-end adapters, and library enrichment polymerase chain reaction (PCR) was performed using the KAPA Hyper Prep Kit (#KK8504) followed by solid-phase reverse immobilization bead cleanup and cluster generation. Library construction was performed per the manufacturer's instructions. Target enrichment was performed using the Agilent SureSelectXT Target Enrichment (#5190-8646) protocol as per the manufacturer's instructions, using 650-750 ng of prepared libraries. Enriched libraries were normalized to equal concentrations using an Eppendorf Mastercycler EP Gradient instrument, pooled to equimolar amounts on the Agilent Bravo B platform and quantified using the KAPA LibraryQuantification Kit (#KK4824). Pooled libraries were adjusted to 2 nM, denatured with 0.2 M NaOH, diluted using Illumina hybridization buffer, and underwent cluster amplification using HiSeq v3 cluster chemistry and the Illumina Multiplexing Sequencing Primer Kit as per manufacturer's instructions. Pools were then sequenced on an Illumina HiSeq 2000/2500 v3 system using 76 bp paired-end reads, and analyzed using RTA v.1.13 or later. The mean coverage for exome data was 221× in tumors and 100× in germ line. Aligned BAM (hg19) files were then processed using Picard and GATK software to identify duplication, realignment and recalibration. Somatic point mutations were identified using MuTect (v1.1.4) and small insertions/deletions identified using Pindel (v0.2.4). Additional post-calling filters were then applied, including: (a) total read count in tumor sample >30, (b) total read count in matched normal sample >10, (c) VAF (Variant Allele Frequency) in tumor sample >0.05, (d) VAF in matched normal sample <0.01, and (e) SNVs reported in dbSNP129 and 1000 Genomes Project were removed.

Copy number alteration analysis. Copy number alteration analysis was performed as previously described (Roh, 2017 #22). Essentially, Sequenza (v2.1.2) algorithm was applied to the aligned BAM data to obtain the log 2 copy number ratio (tumor/normal) for each tumor sample. Using R package "CNTools" (v1.24.0), copy number gain (log 2 copy ratios >log 21.5) and loss (log 2 copy ratios <−log 21.5) at the gene level were identified. The burden of copy number gain or loss was defined as the total number of genes with copy number gain or loss per sample. To define recurrent CNA, R package "cghMCR" (v1.26.0) was applied to the calculated log 2 copy ratios (tumor/normal) to identify genomic regions of recurrent CNAs (minimum common regions, MCRs). To identify genes preferentially lost or gained in responders versus non-responders, Fisher's exact test was performed at each gene location, and statistical significance was defined by FDR adjusted p<0.05. Genes with CNA in less than 3 samples were excluded.

Neoantigen prediction. Non-synonymous exonic mutations (NSEM) from WES were reviewed and all possible 8- to 12-mer peptides encompassing NSEM were used for neoantigen prediction and compared with wild type peptides. HLA of each case was predicted using PHLAT (Bai, 2014 #38). Binding affinity was evaluated, taking into account patient HLA, by the NetMHCpan (v2.8) algorithm (Nielsen, 2007 #15; Hoof, 2009 #33). Candidate peptides with a predicted IC50<500 nM were considered HLA-binding.

3. Immune Analyses

Flow cytometry. Peripheral blood mononuclear cells (PBMCs) obtained from the study patients were analyzed by members of the MD Anderson Immunotherapy Platform. Pre-treatment and post-treatment blood samples were drawn for immunophenotypic analysis of PBMCs. PBMC samples were available from 20 patients, including 10 patients with ≥Grade 3 irAE, and 10 patients with <Grade 3 irAE. Multiparametric flow cytometry analysis of PBMCs was performed using fluorescently conjugated monoclonal antibodies across several panels: CD4 AF532 (SK3, eBioscience), CD3 PerCP-Cy5.5 (UCHT1, Biolegend) CD8 AF700 (RPA-T8, BD Biosciences), CD127 BV711 (HIL-7R-M21, BD Biosciences), ICOS PE-Cy7 (ISA-3, eBioscience), PD-1 BV650 (EH12.1 BD Biosciences) and FOXP3 PE-e610 (PCH101; eBioscience); CD3 PE-CF594, CD4 Pe-Cy5.5, CD8 AF532, CD45RA BV650 (HI100, Biolegend), CCR7 BV785 (G043H7, Biolegend) CD27 PeCy5 (0323, eBioscience), CD28 APC-e780 (CD28.2 eBioscience), PD-1 BV650 (EH12.1 BD Biosciences), EOMES e660 (WD1928, eBioscience), and TBET BV605 (4B10 Biolegend). Live/Dead fixable yellow stain was obtained from Thermo Fisher Scientific. Samples were run using an LSR Fortessa (BD Biosciences) and analyzed using the FlowJo software program. After appropriate forward/side scatter and live single cell gating, the inventors determined the frequency of total CD3+ T cells, CD8+ T cells (CD3+CD8+) and CD4+ T cells (CD3+CD4+). Among the CD4, CD4+ effector T cells (CD4+FOXP3−) and CD4+ regulatory T cells (CD4+FOXP3+CD127−/low). PD-1 and ICOS expression were evaluated on these populations. CD45RA and CCR7 expression on CD4 and CD8 T cells was used to define naïve, T central memory (TCM), T effector memory (TEM) and effector T (Teff) sub-populations. PD-1, CD28, CD27, EOMES and TBET expression was evaluated in each of these compartments.

Immunohistochemistry. A hematoxylin & eosin (H&E) stained slide from each FFPE tumor sample was obtained to confirm the presence of tumor. Heavily pigmented samples were pretreated with melanin bleaching by low concentration hydrogen peroxide. The selected antibody panel included programmed death-ligand 1 (PD-L1) clone E1L3N (1:100, Cell Signaling Technology), PD-1 clone EPR4877 (1:250, Epitomics), CD3 polyclonal (1:100, DAKO), CD4 clone 4B12 (1:80, Leica Biosystems), CD8 clone C8/144B (1:25, Thermo Scientific), FOXP3 clone 206D (1:50, BioLegend) and Granzyme B clone 11F1 (ready to use, Leica Microsystems). IHC staining of a limited antibody panel was performed using a Leica Bond Max automated stainer (Leica Biosystems, Buffalo Grove, IL). The IHC reaction was performed using Leica Bond Polymer Refine detection kit (Leica Biosystems) and diaminobenzidine (DAB) was used as chromogen. Counterstaining was with hematoxylin. All IHC slides were scanned using an Aperio AT Turbo (Leica Biosystems) prior to all downstream IHC analyses. Using the Aperio Image Toolbox analysis software (Leica Biosystems), average values for each marker from five randomly-selected 1 mm2 areas within the tumor region were selected for digital analysis as previously described (Chen, 2016 #27). PD-L1 expression was evaluated by H-score, which evaluates the percentage of positive cells (0 to 100) and the intensity of staining (0 to 3+), with a total score ranging from 0 to 300. The remaining markers were scored as density of cells.

TCR Sequencing. DNA was extracted from available FFPE tumor tissues (19R, 6NR) and PBMC (15 patients with ≥Grade 3 irAE, and 12 patients with <Grade 3 irAE) using the QIAamp DNA FFPE Tissue Kit (Qiagen). Next generation TCR sequencing of CDR3 variable regions was performed using the ImmunoSeq hsTCRB kit (Adaptive Biotechnologies) followed by sequencing on a MiSeq 150× (Illumina) and analysis using the ImmunoSeq™ Analyzer software v3.0 (Adaptive Biotechnologies), considering only samples for which a minimum of 1000 unique templates were detected. Clonality is an index inversely correlated with TCR diversity and was measured as 1−(entropy)/log 2(# of productive unique sequences). Preferential clonal expansion was defined as the number of T cell clones significantly expanded in post-treatment compared to pre-treatment blood samples.

4. Murine Models

Antibiotic treatments. Mice were treated with an antibiotic solution (ATB) containing ampicillin (1 mg/ml), streptomycin (5 mg/ml), and colistin (1 mg/ml) (Sigma-Aldrich), with or without the addition of vancomycin (0.25 mg/ml) via the drinking water. Solutions and bottles were replaced 3 times and once weekly, respectively. Antibiotic activity was confirmed by cultivating fecal pellets resuspended in BHI+15% glycerol at 0.1 g/ml on COS (Columbia Agar with 5% Sheep Blood) plates for 48 h at 37° C. in aerobic and anaerobic conditions. The duration of ATB treatments was slightly different based on the experimental settings. In brief, mice were treated for 2 weeks prior to tumor implantation and continuously throughout the experiment in MCA205 and RET experiments, whilst in experiments where RENCA was used, ATB treatment was administered for 3 days prior to fecal microbiota transfer.

Tumor challenge and treatment. Flanks of mice were subcutaneously (s.c.) injected with $0.8 \times 10^6$ MCA205 or $0.5 \times 10^6$ RET cells. Treatment commenced when tumors reached 20 to 30 mm2. Mice were injected intraperitoneally (i.p) every three days with anti-PD-1 mAb (250 g/mouse; clone RMP1-14, 6 injections in MCA205, 5 injections in RET) and/or anti-CTLA-4 mAb (100 g/mouse, clone 9D9, 5 injections in both MCA205 and RET) with or without anti-IL-1R (anakinra, 500 g/mouse, injected i.p. three times per week) or respective isotype controls as indicated in figures. All mAbs for in vivo use were obtained from BioXcell (West Lebanon, NH, USA), using the recommended isotype control mAbs except anakinra (Swedish Orphan Biovitrum, Sweden).

Fecal microbiota transfer experiments. After 3 days of ATB treatment, fecal microbiota transfer (FMT) was performed using samples from PD-1 inhibitor responder or non-responder patients. Frozen fecal samples were thawed and thoroughly vortexed. Large particulate material was allowed to settle by gravity. 200 µL of supernatant was administered in a single dose by oral gavage. An additional 100 µL was topically applied onto the fur of each animal. Two weeks after FMT, BALB/c mice were anesthetized with isofluorane, $1\times10^4$ RENCA tumor cells in 30 µL PBS were injected into the subcapsular space of the right kidney. The skin incision was then closed with surgical clips. Treatment began 5 days after tumor inoculation. Mice were treated with CICB with or without oral gavage of fecal samples from responding patients who did not experience toxicity. Tumor growth was monitored once weekly on an IVIS Imaging System 50 Series (Analytic Jenap).

Gut colonization with dedicated commensal species. *Bacteroides intestinalis* CSURP836 (provided by Institut hospitalo-universitaire Méditerranée Infection, Marseille, France; isolated from a human sample), *B. intestinalis* from everImmune (isolated from stools of a lung cancer patient prior to immunotherapy) and *B. intestinalis* (isolated from a mouse sample) were cultured on COS plates in anaerobic conditions using anaerobic generators (Biomerieux) at 37° C. for 24-72 hours. Suspensions of 109 CFU/mL were obtained using a spectrophotometer (Eppendorf) at an optical density of 1 measured at 600 nm. Oral gavages of 109 CFU in 100 µL were administered 24 hours prior to antibody treatment and with each antibody treatment. Bacteria were verified using a Matrix-Assisted Laser Desorption/Ionization Time of Flight (MALDI-TOF) mass spectrometer (Microflex LT analyser, Bruker Daltonics, Germany).

Cytokine quantification. Stool samples were collected and stored at −80° C. until further processing. Samples were thawed and re-suspended (at 100 mg/mL) in PBS containing 0.1% Tween 20. After a 20 min incubation with shaking at room temperature, samples were centrifuged for 10 min at 12,000 rpm and supernatants were harvested and stored at −20° C. until analysis. Lipocalin-2 levels were measured using the mouse Lipocalin-2/NGAL DuoSet ELISA kit (R&D Systems, Minneapolis, MN) following the manufacturer's instructions.

Immunohistochemistry. Gut tissue was preserved in either formalin fixed paraffin embedded (FFPE) or optimum cutting temperature compound (OCT). At mouse sacrifice the ileum and colon were removed, washed in PBS, cut longitudinally, rolled and fixed in 4% PFA overnight at 4° C. or, in some experiments for 2 hours at room temperature. Tissue was then either paraffin-embedded with a Tissue-Tek® VIP® 6 Vacuum Infiltration Processor (Sakura) or rehydrated in 15% sucrose for 1h followed by 30% sucrose overnight, OCT embedded (Sakura) and snap frozen. Longitudinal sections were counterstained with hematoxylin, eosin & safran stain (H&E).

Histological assessment of gut tissue for toxicity. A scoring system was developed with a pathologist (P.O.). Ileum: Inflammatory foci, appearance of the submucosa, length of villi, and the thickness of lamina propria were scored for each section. The score was defined as: 0=normal, 1=focal and minor lesions; 2=diffuse and minor lesions; 3=diffuse, minor and major lesions; 4=major lesions with areas containing only connective tissue. Colon: Inflammatory infiltrate, defined as either physiological (0), low (1), moderate (2) and high (3) levels were scored.

Gut immune gene expression by real-time quantitative PCR analysis. RNA was extracted using the RNeasy Mini Kit (Qiagen) and reverse transcribed into cDNA using SuperScript III Reverse Transcriptase and the RNaseOUT™ Recombinant Ribonuclease Inhibitor (Life Technologies) using random primers (Promega, Wisconsin, United States) and the Deoxynucleoside Triphosphate Set, PCR grade (Roche, Basel, Switzerland). Gene expression was analyzed by real-time quantitative PCR (RT-qPCR) using the TaqMan method with TaqMan® Gene Expression Assays and Taqman Universal Master Mix II (Invitrogen) according to the manufacturer's instructions on the 7500 Fast Real Time PCR system (Applied Biosystems). Expression was normalized to the expression of the housekeeping gene of β-2 microglobulin by means of the 2−ΔCt method. The following primers were used (all from TaqMan® Gene Expression Assay, ThermoFisher): B2m (Mm00437762_m1), Il1b (Mm00434228_m1), 116 (Mm00446190_m1), Tnf (Mm00443258_m1).

5. Microbiome Analyses

Patient fecal samples. Baseline stool samples were collected using the OMNIgene GUT kit (DNA Genotek, Ottawa, Canada). A total of 54 stool samples were subject to bacterial 16S rRNA gene sequencing, including a cutaneous/unknown primary cohort (29R, 11NR; 24 with ≥Gr3 irAE, 16 with <Gr3 irAE), and for toxicity analyses only, a mucosal cohort (3 with and 5 without ≥Gr3 irAE) and a uveal melanoma cohort (2 with and 4 without ≥Gr3 irAE. Within this cohort, a number of samples obtained early after initiation of CICB were included as surrogate baseline samples, as the parallel study on longitudinal samples collected from patients undergoing immune checkpoint blockade monotherapies showed no significant change in fecal microbiota early after treatment initiation (Gopalakrishnan, 2018 #19).

Human fecal DNA extraction and bacterial 16S rRNA gene sequencing. Preparation and sequencing of the human fecal samples was performed in collaboration with the Alkek Center for Metagenomics and Microbiome Research (CMMR), Baylor College of Medicine using methods adapted from the NIH-Human Microbiome Project (Human Microbiome Project, 2012 #34; Human Microbiome Project, 2012 #35). Extended details of the analytical pipeline have been reported previously (Gopalakrishnan, 2018 #19). Briefly, bacterial genomic DNA extracted using the MO BIO PowerSoil DNA Isolation Kit (MO BIO Laboratories, USA) underwent PCR amplification of the 16S rRNA gene V4 region and was sequenced using the MiSeq platform (Illumina, Inc, San Diego, CA). Quality filtered sequences with >97% identity were clustered into bins known as Operational Taxonomic Units (OTUs) by open-reference OTU picking and classified at species level by reference to the NCBI 16S ribosomal RNA sequence database (release date Feb. 11, 2017; ncbi-blast+ package 2.5.0). Phylogenetic information was obtained by mapping the representative OTU sequences against the NCBI taxonomy database (release date Feb. 16, 2017) using BLAST.

Mouse samples. At least two longitudinal stool samples were collected from mice (n=71) and stored at −80° C. until DNA extraction.

Mouse fecal DNA extraction and microbiota characterization. Preparation and sequencing of mouse fecal samples was performed at IHU Méditerranée Infection, Marseille, France. Briefly, DNA was extracted using two protocols. The first protocol consisted of physical and chemical lysis, using glass powder and proteinase K respectively, then processing using the Macherey-Nagel DNA Tissue extraction kit (Duren, Germany) (Dridi, 2009 #64). The second protocol was identical to the first protocol, with the addition of glycoprotein lysis and de-glycosylation steps (Angelakis, 2016 #65). The resulting DNA was sequenced, targeting the V3-V4 regions of the 16S rRNA gene as previously described (Million, 2016 #63). Raw FASTQ files were analyzed with Mothur pipeline v.1.39.5 for quality check and filtering (sequencing errors, chimerae) on a Workstation DELL T7910 (Round Rock, Texas, United States). Raw reads (15512959 in total, on average 125104 per sample) were filtered (6342281 in total, on average 51147 per sample) and clustered into Operational Taxonomic Units (OTUs), followed by elimination of low-populated OTUs (till 5 reads) and by de novo OTU picking at 97% pair-wise identity using standardized parameters and SILVA rDNA Database v.1.19 for alignment. In all, considering RET and MCA samples, 427 bacterial species were identified using a prevalence threshold of ≥20%. Sample coverage was computed with Mothur and resulted to be on average higher than 99% for all samples, thus meaning a suitable normalization procedure for subsequent analyses. Bioinformatic and statistical analyses on recognized OTUs were performed with Python v.2.7.11. The most representative and abundant read within each OTU (as evidenced in the previous step with Mothur v.1.39.5) underwent a nucleotide Blast using the National Center for Biotechnology Information (NCBI) Blast software (ncbi-blast-2.3.0) and the latest NCBI 16S Microbial Database accessed at the end of April 2019 (found online at ftp.ncbi.nlm.nih.gov/blast/db/). A matrix of bacterial relative abundances was built at each taxon level (phylum, class, order, family, genus, species) for subsequent multivariate statistical analyses.

Quantification of bacteria by qPCR. Genomic DNA was extracted from fecal samples using the QJAamp DNA Stool Mini Kit (Qiagen) following the manufacturer's instructions. Targeted qPCR systems were applied using either TaqMan technology (for systems targeting All Bacteria domain) or SYBR Green for different *Bacteroides* species. The following primers and probes were used:

standardization results in each normalized variable having a mean of zero and variance of one. These two steps of normalization followed by standardization ensure the proper comparison of variables with different dynamic ranges, such as bacterial relative abundances, tumor size, or colonic infiltrate score.

Measurements of a diversity (within sample diversity) such as observed_otus and Shannon index, were calculated at OTU level using the SciKit-learn package v.0.4.1. Exploratory analysis of β-diversity (between sample diversity) was calculated using the Bray-Curtis measure of dissimilarity calculated with Mothur and represented in Principal Coordinate Analyses (PCoA), while for Hierarchical Clustering Analysis (HCA) 'Bray-Curtis' metrics and 'complete linkage' methods were implemented using custom scripts (Python v.2.7.11). The inventors implemented Partial Least Square Discriminant Analysis (PLS-DA) and the subsequent Variable Importance Plot (VIP) as a supervised analysis in order to identify the most discriminant bacterial species among tumor-bearing and tumor-free mice, and among the different timepoints (T0, T2, T5). As depicted in 2D, bar thickness reports the fold ratio (FR) value of the mean relative abundances for each species among the two cohorts whilst not applicable (N/A) refers to comparisons with a group with zero relative abundance. An absent border indicates mean relative abundance of zero in the compared cohort(s). In order to compare the microbiota taxa with gene expression datasets or tumor size and colonic toxicity, a multivariate statistical Spearman (or Pearson for mouse data) correlation analysis (and related P values) was performed with custom Python scripts. Mann-Whitney U and Kruskal-Wallis tests were employed to assess significance for pair-wise or multiple comparisons, respectively, taking into account a p-value <0.05 as significant.

Pairwise comparisons of relative abundances between taxa identified within patient samples were performed using Mann-Whitney tests followed by bootstrapping with 1000

| Target | PCR system | Primers and probes | Oligo sequence | Ref |
|---|---|---|---|---|
| All bacteria | TaqMan | Forward | CGGTGAATACGTTCCCGG (SEQ ID NO: 1) | (Furet, 2009 #59; Suzuki, 2000 #60) |
| | | Reverse | TACGGCTACCTTGTTACGACTT (SEQ ID NO: 2) | |
| | | Probe | 6 FAM-CTTGTACACACCGCCCGTC (SEQ ID NO: 3)-MGB | |
| B. intestinalis | SYBR Green | Forward | AGCATGACCTAGCAATAGGTTG (SEQ ID NO: 4) | (Odamaki, 2008 #61) |
| | | Reverse | ACGCATCCCCATCGATTAT (SEQ ID NO: 5) | |
| B. uniformis | SYBR Green | Forward | TCTTCCGCATGGTAGAACTATTA (SEQ ID NO: 6) | (Tong, 2011 #62) |
| | | Reverse | ACCGTGTCTCAGTTCCAATGTG (SEQ ID NO: 7) | |
| B. fragilis | SYBR Green | Forward | TGATTCCGCATGGTTTCATT (SEQ ID NO: 8) | (Odamaki, 2008 #61) |
| | | Reverse | CGACCCATAGAGCCTTCATC (SEQ ID NO: 9) | |

Microbiota and OTU-level analyses. For mouse experiments, raw data were firstly normalized then standardized using QuantileTransformer and StandardScaler methods from Sci-Kit learn package v0.20.3. Normalization using the output_distribution='normal' option transforms each variable to a strictly Gaussian-shaped distribution, whilst the permutations. Only taxa that were present in at least 40% of all samples were considered. Rarefaction limits for the calculation of alpha diversity were set based on the least number of reads in all fecal samples. Taxonomic alpha-diversity of patient samples was estimated using the Inverse Simpson Index calculated as $D=1/\Sigma_{k=1}^{S} pi^2$ (pi is the proportion of the total species S that is comprised by the species i) (Morgan, 2012 #36), and additional diversity metrics as indicated in figures. Correlations between relative abundance of candidate taxa and peripheral immune markers were estimated using Spearman's rho. ANalysis Of SIMilarity (ANOSIM, which represents the difference of datasets' centroids) or, when indicated, Pearson correlation coefficient, were computed with Python 2.7.11.

Statistical assessment of microbial biomarkers using LEfSe. The LEfSe method was used to compare abundances of all bacterial clades according to response (i.e.: between R versus NR) and by occurrence of toxicity (i.e.: between patients with ≥Grade 3 irAE versus those with <Grade 3 irAE) using the Kruskal-Wallis test (statistical significance was defined as $p<0.05$) (Segata, 2011 #21). Bacterial taxa with differential abundance between study groups were used as input for the linear discriminant analysis (LDA) to calculate an effect size. LEfSe analysis for murine taxa was performed with Mothur v1.39.5.

B. Quantification and Statistical Analysis

1. Statistical Analyses

Data analyses and representations were performed either with the R software (available on the world wide web at R-project.org/), Microsoft Excel (Microsoft Co., 436 Redmont, WA, US) or Prism 5 (GraphPad, San Diego, CA, USA). Patient cohort survival curves were generated using the R package "survival" (Therneau, 2000 #37). Between-group comparisons of patient cohort genomic and immune parameters were performed using unpaired Mann-Whitney U tests or Fisher's exact test in the case of low-sample dichotomous variables, taking $p<0.05$ as statistically significant. All comparisons were two-sided unless a strong apriori hypothesis warranted a one-sided approach (indicated where appropriate). Permutation testing was performed by randomly permuting sample labels for a total of 1000 iterations. In murine studies, statistical analyses gathering more than two groups were performed using ANOVA followed with pairwise comparisons with Bonferroni adjustments. Otherwise, for two groups, statistical analyses were performed using the unpaired t-test. Outliers within a given distribution were tested using Grubbs' test (found online at graphpad.com/quickcalcs/Grubbsl.cfm) with a threshold at $p<0.05$. All tumor growth curves were analyzed using software developed in Professor Guido Kroemer's laboratory and information about statistical analyses can be found at this following link online (https): kroemerlab.shinyapps.io/TumGrowth/(Enot, 2018 #66). Briefly, for longitudinal analyses, original tumor measurements were log transformed before statistical testing. When complete regressions of tumors were observed, zeros were imputed by the minimum value divided by 2. An automatic outlier detection at $p<0.1$ was retained, both for the longitudinal analyses and the Kaplan Meier curves. Survival curves were estimated using the Cox regression and the multiple testing was taken account using the Bonferroni adjustment. p-values were two-sided with 95% confidence intervals and were considered significant when $p<0.05$. Symbol significance: *$p<0.05$, $p<0.01$, *$p<0.001$.

C. Tables

| EXTENDED DATA TABLE 1 Patient characteristics. | | | | |
|---|---|---|---|---|
| CHARACTERISTIC number (%) or median [range] | TOTAL COHORT n = 77 | CUTANEOUS n = 63 | MUCOSAL n = 8 | UVEAL n = 6 |
| Sex (number, %) | | | | |
| Male | 51 (66%) | 46 (73%) | 3 (37%) | 2 (33%) |
| Female | 26 (34%) | 17 (27%) | 5 (63%) | 4 (67%) |
| Age (median, range) | 59 [27-86] | 55 [27-86] | 63.5 [59-79] | 60.5 [30-74] |
| Melanoma type (number, %) | | | | |
| Cutaneous unspecified | 22 (29%) | 22 (35%) | — | — |
| Superficial spreading | 9 (12%) | 9 (14%) | — | — |
| Acral lentiginous | 1 (1%) | 1 (2%) | — | — |
| Lentigo maligna melanoma | 4 (5%) | 4 (6%) | — | — |
| Nodular | 10 (13%) | 10 (16%) | — | — |
| Spindle cell | 1 (1%) | 1 (2%) | — | — |
| In situ | 1 (1%) | 1 (2%) | — | — |
| Unknown primary | 15 (19%) | 15 (24%) | — | — |
| Mucosal | 8 (10%) | — | 8 (100%) | — |
| Uveal | 6 (8%) | — | — | 6 (100%) |
| Disease stage (AJCCv7) (number, %) | | | | |
| IIc | 1 (1%) | 0 | 1 (12%) | 0 |
| IIIa/b | 2 (3%) | 2 (3%) | 0 | 0 |
| IIIc | 9 (12%) | 8 (13%) | 1 (13%) | 0 |
| IVa | 6 (8%) | 2 (3%) | 1 (13%) | 3 (50%) |
| IVb | 16 (21%) | 12 (19%) | 2 (25%) | 2 (33%) |
| IVc | 43 (55%) | 39 (62%) | 3 (37%) | 1 (17%) |
| LDH at baseline (number, %) | | | | |
| Normal range | 51 (66%) | 41 (65%) | 7 (88%) | 3 (50%) |
| Elevated | 17 (22%) | 14 (22%) | 1 (12%) | 2 (33%) |
| NA | 9 (12%) | 8 (13%) | 0 | 1 (17%) |
| BRAF V600 status (number, %) | | | | |
| wt | 35 (45%) | 24 (38%) | 8 (100%) | 3 (50%) |
| V600E | 23 (30%) | 23 (36%) | 0 | 0 |
| V600K | 8 (10%) | 8 (13%) | 0 | 0 |
| V600R | 1 (1%) | 1 (2%) | 0 | 0 |

EXTENDED DATA TABLE 1
Patient characteristics.

| CHARACTERISTIC<br>number (%) or<br>median [range] | TOTAL<br>COHORT<br>n = 77 | CUTANEOUS<br>n = 63 | MUCOSAL<br>n = 8 | UVEAL<br>n = 6 |
|---|---|---|---|---|
| V600 mutated, unspecified | 3 (4%) | 3 (5%) | 0 | 0 |
| NA | 7 (9%) | 4 (6%) | 0 | 3 (50%) |
| Prior lines of systemic therapy for advanced disease (number, %) | 0 [0-7] | | | |
| 0 | 57 (74%) | 47 (75%) | 5 (63%) | 5 (83%) |
| 1 | 10 (13%) | 8 (13%) | 2 (25%) | 0 |
| 2 | 3 (4%) | 2 (2%) | 0 | 1 (17%) |
| ≥3 | 7 (9%) | 6 (10%) | 1 (12%) | 0 |
| Prior immunotherapies | | | | |
| Cytokine | 10 (13%) | 8 (13%) | 2 (25%) | 0 |
| Ipilimumab | 5 (6%) | 4 (6%) | 1 (13%) | 0 |
| Anti-PD-1/anti-PD-L1 | 9 (12%) | 8 (13%) | 1 (13%) | 0 |
| None | 61 (79%) | 50 (79%) | 5 (63%) | 6 (100%) |

EXTENDED DATA TABLE 2
Clinical outcomes.

| CHARACTERISTIC<br>number (%) or<br>median [range] | TOTAL<br>COHORT<br>n = 77 | CUTANEOUS<br>n = 63 | MUCOSAL<br>n = 8 | UVEAL<br>n = 6 | CICB RESPONSE* R<br>n = 47 | NR<br>n = 30 |
|---|---|---|---|---|---|---|
| Doses received | | | | | | |
| ipilimumab + anti-PD-1 | 3 [1-4] | 4 [1-4] | 2.5 [1-4] | 3 [2-4] | 4 [1-4] | 3 [1-4] |
| maintenance anti-PD-1 | 2 [0-58] | 3 [0-58] | 2 [0-12] | 0 [0-15] | 12 [0-58] | 0 [0-16] |
| Best overall response [RECIST 1.1] | | | | | | |
| CR | 15 (19%) | 15 (24%) | 0 | 0 | | |
| PR | 32 (42%) | 30 (48%) | 2 (25%) | 0 | | |
| SD | 9 (12%) | 6 (9%) | 1 (13%) | 2 (33%) | | |
| PD | 21 (27%) | 12 (19%) | 5 (62%) | 4 (67%) | | |
| Maximum grade AE | | | | | | |
| 0 | 5 (6%) | 4 (6%) | 1 (13%) | 0 | 1 (2%) | 4 (13%) |
| 1 | 14 (18%) | 10 (16%) | 1 (13%) | 3 (50%) | 8 (17%) | 6 (20%) |
| 2 | 20 (26%) | 16 (25%) | 3 (37%) | 1 (17%) | 10 (21%) | 10 (33%) |
| 3 | 33 (43%) | 28 (44%) | 3 (37%) | 2 (33%) | 23 (49%) | 10 (33%) |
| 4 | 5 (6%) | 5 (8%) | 0 | 0 | 5 (11%) | 0 |
| High-grade (≥Grade 3) irAE [CTCAE v4.0] | | | | | | |
| All types | 38 (49%) | 33 (52%) | 3 (38%) | 2 (33%) | 28 (60%) | 10 (33%) |
| Liver | 15 (19%) | 13 (21%) | 1 (13%) | 1 (17%) | 12 (26%) | 3 (10%) |
| Diarrhea/colitis | 11 (14%) | 9 (14%) | 1 (13%) | 1 (17%) | 8 (17%) | 3 (10%) |
| Skin | 6 (8%) | 5 (8%) | 1 (13%) | 0 | 5 (11%) | 1 (3%) |
| Lung | 5 (6%) | 5 (8%) | 0 | 0 | 4 (9%) | 1 (3%) |
| Thyroid | 1 (1%) | 1 (2%) | 0 | 0 | 1 (2%) | 0 |

Percentages are expressed relative to the number of patients within each indicated group. Ties in medians are indicated by non-integer values.
*R = best overall response of PR + CR, NR = best overall response of SD + PD.

EXTENDED DATA TABLE 3
Biospecimen use overview.

| Final ID | Group | Prior Immuno | Gr3+ irAE | BOR | WES | TCR Seq: Tumor Pre | TCR Seq: Tumor Post | TCR Seq: Blood Pre | TCR Seq: Blood On | TCR Seq: Blood Post | IHC: Tumor Pre | IHC: Tumor Post | Flow Cytometry: Blood Pre | Flow Cytometry: Blood Early | Flow Cytometry: Blood Late | Flow Cytometry: Blood Post | Feces Pre/Early |
|---|---|---|---|---|---|---|---|---|---|---|---|---|---|---|---|---|---|
| 1 | cutaneous | N | Y | PD | 0 | 1 | 1 | 0 | 1 | 0 | 0 | 1 | 1 | 1 | 1 | 1 | 0 |
| 2 | cutaneous | N | N | CR | 1 | 1 | 0 | 0 | 0 | 0 | 1 | 0 | 0 | 0 | 0 | 0 | 0 |
| 3 | cutaneous | N | N | CR | 1 | 1 | 0 | 1 | 0 | 0 | 1 | 0 | 1 | 0 | 0 | 0 | 0 |
| 4 | cutaneous | N | Y | CR | 1 | 1 | 0 | 1 | 0 | 1 | 1 | 0 | 1 | 1 | 1 | 1 | 0 |

-continued

EXTENDED DATA TABLE 3
Biospecimen use overview.

| Final ID | Group | Prior Immuno | Gr3+ irAE | BOR | WES | TCR Seq: Tumor | | TCR Seq: Blood | | | IHC: Tumor | | Flow Cytometry: Blood | | | | Feces |
| --- | --- | --- | --- | --- | --- | --- | --- | --- | --- | --- | --- | --- | --- | --- | --- | --- | --- |
| | | | | | | Pre | Post | Pre | On | Post | Pre | Post | Pre | Early | Late | Post | Pre/Early |
| 5 | cutaneous | N | Y | PR | 0 | 1 | 1 | 1 | 1 | 0 | 1 | 0 | 1 | 1 | 1 | 0 | 1 |
| 6 | cutaneous | Y | N | CR | 1 | 1 | 0 | 1 | 0 | 1 | 1 | 0 | 1 | 1 | 0 | 1 | 0 |
| 7 | cutaneous | Y | N | PR | 1 | 1 | 1 | 1 | 0 | 1 | 1 | 1 | 1 | 1 | 1 | 1 | 0 |
| 8 | cutaneous | N | N | PD | 1 | 0 | 1 | 1 | 0 | 1 | 1 | 0 | 1 | 1 | 1 | 1 | 1 |
| 9 | cutaneous | N | Y | CR | 1 | 1 | 0 | 1 | 0 | 0 | 1 | 0 | 1 | 1 | 0 | 1 | 1 |
| 10 | cutaneous | N | N | PD | 0 | 1 | 0 | 0 | 0 | 0 | 0 | 0 | 0 | 0 | 0 | 0 | 0 |
| 11 | cutaneous | N | N | CR | 1 | 1 | 0 | 1 | 1 | 1 | 1 | 0 | 0 | 0 | 0 | 1 | 1 |
| 12 | cutaneous | N | Y | CR | 1 | 1 | 0 | 0 | 0 | 0 | 1 | 0 | 0 | 0 | 0 | 0 | 0 |
| 13 | cutaneous | N | Y | PD | 0 | 0 | 1 | 0 | 0 | 1 | 0 | 1 | 0 | 0 | 0 | 0 | 0 |
| 14 | cutaneous | N | Y | PR | 1 | 1 | 0 | 1 | 0 | 0 | 1 | 0 | 1 | 1 | 0 | 1 | 0 |
| 15 | cutaneous | N | Y | PR | 0 | 0 | 1 | 1 | 0 | 1 | 0 | 0 | 1 | 1 | 1 | 1 | 1 |
| 16 | cutaneous | N | N | PR | 1 | 1 | 0 | 1 | 1 | 1 | 0 | 0 | 1 | 1 | 1 | 1 | 0 |
| 17 | cutaneous | N | Y | PR | 0 | 0 | 0 | 1 | 0 | 1 | 0 | 0 | 1 | 1 | 1 | 1 | 1 |
| 18 | cutaneous | N | Y | PR | 0 | 0 | 0 | 0 | 0 | 1 | 0 | 0 | 1 | 1 | 1 | 0 | 0 |
| 19 | cutaneous | Y | N | PR | 1 | 1 | 0 | 1 | 0 | 1 | 1 | 0 | 1 | 1 | 0 | 1 | 0 |
| 20 | cutaneous | Y | N | PD | 1 | 1 | 0 | 0 | 0 | 0 | 1 | 0 | 0 | 0 | 0 | 0 | 0 |
| 21 | cutaneous | N | Y | CR | 0 | 0 | 0 | 1 | 0 | 1 | 0 | 0 | 0 | 0 | 0 | 0 | 0 |
| 22 | cutaneous | N | Y | CR | 0 | 0 | 0 | 1 | 0 | 1 | 0 | 0 | 1 | 1 | 0 | 1 | 1 |
| 23 | cutaneous | N | Y | PR | 0 | 0 | 0 | 1 | 0 | 1 | 0 | 0 | 0 | 0 | 0 | 0 | 1 |
| 24 | cutaneous | N | Y | CR | 1 | 1 | 0 | 0 | 0 | 0 | 0 | 0 | 0 | 0 | 0 | 0 | 1 |
| 25 | cutaneous | N | N | PD | 1 | 1 | 0 | 0 | 0 | 0 | 1 | 0 | 1 | 1 | 0 | 0 | 0 |
| 26 | cutaneous | Y | N | PD | 1 | 1 | 1 | 0 | 0 | 0 | 1 | 1 | 0 | 0 | 1 | 0 | 1 |
| 27 | cutaneous | Y | N | PD | 1 | 1 | 0 | 0 | 0 | 0 | 1 | 0 | 0 | 0 | 0 | 0 | 0 |
| 28 | cutaneous | N | Y | PD | 1 | 0 | 0 | 0 | 0 | 0 | 1 | 0 | 0 | 0 | 0 | 0 | 1 |
| 29 | cutaneous | N | N | PR | 1 | 1 | 0 | 1 | 1 | 0 | 1 | 0 | 0 | 0 | 0 | 0 | 0 |
| 30 | cutaneous | Y | N | PR | 1 | 1 | 0 | 1 | 1 | 0 | 1 | 0 | 1 | 1 | 0 | 0 | 1 |
| 40 | cutaneous | N | Y | PR | 0 | 0 | 0 | 0 | 0 | 0 | 0 | 0 | 0 | 0 | 0 | 0 | 1 |
| 31 | cutaneous | Y | N | PR | 0 | 0 | 0 | 0 | 0 | 0 | 1 | 0 | 0 | 0 | 0 | 0 | 0 |
| 32 | cutaneous | N | Y | PR | 1 | 0 | 0 | 0 | 0 | 0 | 1 | 0 | 0 | 0 | 0 | 0 | 0 |
| 33 | cutaneous | Y | N | PR | 1 | 1 | 0 | 1 | 0 | 1 | 1 | 0 | 0 | 0 | 0 | 0 | 0 |
| 34 | cutaneous | N | N | PR | 1 | 1 | 0 | 1 | 0 | 0 | 1 | 0 | 0 | 0 | 0 | 0 | 0 |
| 35 | cutaneous | Y | Y | PR | 0 | 0 | 0 | 0 | 0 | 1 | 0 | 0 | 0 | 0 | 0 | 0 | 1 |
| 36 | cutaneous | N | Y | PR | 1 | 1 | 0 | 0 | 0 | 0 | 1 | 0 | 0 | 0 | 0 | 0 | 1 |
| 37 | cutaneous | N | Y | CR | 0 | 0 | 0 | 1 | 0 | 0 | 0 | 0 | 0 | 0 | 0 | 0 | 0 |
| 39 | cutaneous | N | N | PR | 1 | 0 | 0 | 1 | 0 | 0 | 0 | 0 | 0 | 0 | 0 | 0 | 1 |
| 38 | cutaneous | N | Y | CR | 1 | 1 | 0 | 1 | 0 | 0 | 1 | 0 | 1 | 1 | 1 | 0 | 1 |
| X1 | cutaneous | N | N | PR | 0 | 0 | 0 | 0 | 0 | 0 | 0 | 0 | 0 | 0 | 0 | 0 | 1 |
| X2 | cutaneous | Y | Y | PR | 0 | 0 | 0 | 0 | 0 | 0 | 0 | 0 | 0 | 0 | 0 | 0 | 1 |
| X3 | cutaneous | N | N | PR | 0 | 0 | 0 | 0 | 0 | 0 | 0 | 0 | 0 | 0 | 0 | 0 | 1 |
| X4 | cutaneous | N | Y | PR | 0 | 0 | 0 | 0 | 0 | 0 | 0 | 0 | 0 | 0 | 0 | 0 | 1 |
| X5 | cutaneous | N | N | PR | 0 | 0 | 0 | 0 | 0 | 0 | 0 | 0 | 0 | 0 | 0 | 0 | 1 |
| X6 | cutaneous | N | Y | PR | 0 | 0 | 0 | 0 | 0 | 0 | 0 | 0 | 0 | 0 | 0 | 0 | 1 |
| X7 | cutaneous | N | Y | PR | 0 | 0 | 0 | 0 | 0 | 0 | 0 | 0 | 0 | 0 | 0 | 0 | 1 |
| X8 | cutaneous | N | Y | PR | 0 | 0 | 0 | 0 | 0 | 0 | 0 | 0 | 0 | 0 | 0 | 0 | 1 |
| X9 | cutaneous | N | Y | PR | 0 | 0 | 0 | 0 | 0 | 0 | 0 | 0 | 0 | 0 | 0 | 0 | 1 |
| X10 | cutaneous | N | Y | PD | 0 | 0 | 0 | 0 | 0 | 0 | 0 | 0 | 0 | 0 | 0 | 0 | 1 |
| X11 | cutaneous | N | N | PD | 0 | 0 | 0 | 0 | 0 | 0 | 0 | 0 | 0 | 0 | 0 | 0 | 1 |
| X12 | cutaneous | N | N | PR | 0 | 0 | 0 | 0 | 0 | 0 | 0 | 0 | 0 | 0 | 0 | 0 | 1 |
| X13 | mucosal | N | N | PD | 0 | 0 | 0 | 0 | 0 | 0 | 0 | 0 | 0 | 0 | 0 | 0 | 1 |
| X14 | cutaneous | N | Y | CR | 0 | 0 | 0 | 0 | 0 | 0 | 0 | 0 | 0 | 0 | 0 | 0 | 1 |
| X15 | cutaneous | N | Y | SD | 0 | 0 | 0 | 0 | 0 | 0 | 0 | 0 | 0 | 0 | 0 | 0 | 1 |
| X16 | cutaneous | N | Y | PD | 0 | 0 | 0 | 0 | 0 | 0 | 0 | 0 | 0 | 0 | 0 | 0 | 1 |
| X17 | cutaneous | Y | Y | PD | 0 | 0 | 0 | 0 | 0 | 0 | 0 | 0 | 0 | 0 | 0 | 0 | 1 |
| X18 | cutaneous | N | Y | CR | 0 | 0 | 0 | 0 | 0 | 0 | 0 | 0 | 0 | 0 | 0 | 0 | 1 |
| X19 | cutaneous | N | Y | PR | 0 | 0 | 0 | 0 | 0 | 0 | 0 | 0 | 0 | 0 | 0 | 0 | 1 |
| X20 | cutaneous | Y | Y | PR | 0 | 0 | 0 | 0 | 0 | 0 | 0 | 0 | 0 | 0 | 0 | 0 | 1 |
| X21 | cutaneous | N | Y | PR | 0 | 0 | 0 | 0 | 0 | 0 | 0 | 0 | 0 | 0 | 0 | 0 | 1 |
| X22 | cutaneous | N | Y | SD | 0 | 0 | 0 | 0 | 0 | 0 | 0 | 0 | 0 | 0 | 0 | 0 | 1 |
| X23 | cutaneous | N | Y | SD | 0 | 0 | 0 | 0 | 0 | 0 | 0 | 0 | 0 | 0 | 0 | 0 | 1 |
| X24 | cutaneous | N | Y | SD | 0 | 0 | 0 | 0 | 0 | 0 | 0 | 0 | 0 | 0 | 0 | 0 | 1 |
| X25 | uveal | N | Y | SD | 0 | 0 | 0 | 0 | 0 | 0 | 0 | 0 | 0 | 0 | 0 | 0 | 1 |
| X26 | uveal | N | Y | SD | 0 | 0 | 0 | 0 | 0 | 0 | 0 | 0 | 0 | 0 | 0 | 0 | 1 |
| X27 | uveal | N | Y | PD | 0 | 0 | 0 | 0 | 0 | 0 | 0 | 0 | 0 | 0 | 0 | 0 | 1 |
| X28 | uveal | N | Y | PD | 0 | 0 | 0 | 0 | 0 | 0 | 0 | 0 | 0 | 0 | 0 | 0 | 1 |
| X29 | uveal | N | Y | PD | 0 | 0 | 0 | 0 | 0 | 0 | 0 | 0 | 0 | 0 | 0 | 0 | 1 |
| X30 | uveal | N | Y | PD | 0 | 0 | 0 | 0 | 0 | 0 | 0 | 0 | 0 | 0 | 0 | 0 | 1 |
| X31 | mucosal | Y | Y | PD | 0 | 0 | 0 | 0 | 0 | 0 | 0 | 0 | 0 | 0 | 0 | 0 | 1 |
| X32 | mucosal | Y | Y | PD | 0 | 0 | 0 | 0 | 0 | 0 | 0 | 0 | 0 | 0 | 0 | 0 | 1 |
| X33 | mucosal | N | Y | PD | 0 | 0 | 0 | 0 | 0 | 0 | 0 | 0 | 0 | 0 | 0 | 0 | 1 |
| X34 | mucosal | N | Y | PR | 0 | 0 | 0 | 0 | 0 | 0 | 0 | 0 | 0 | 0 | 0 | 0 | 1 |
| X35 | mucosal | N | Y | PR | 0 | 0 | 0 | 0 | 0 | 0 | 0 | 0 | 0 | 0 | 0 | 0 | 1 |

EXTENDED DATA TABLE 3
Biospecimen use overview.

| Final ID | Prior Group | Gr3+ Immuno | irAE | BOR | WES | TCR Seq: Tumor Pre | TCR Seq: Tumor Post | TCR Seq: Blood Pre | TCR Seq: Blood On | TCR Seq: Blood Post | IHC: Tumor Pre | IHC: Tumor Post | Flow Cytometry: Blood Pre | Flow Cytometry: Blood Early | Flow Cytometry: Blood Late | Flow Cytometry: Blood Post | Feces Pre/Early |
|---|---|---|---|---|---|---|---|---|---|---|---|---|---|---|---|---|---|
| X36 | mucosal | Y | Y | PD | 0 | 0 | 0 | 0 | 0 | 0 | 0 | 0 | 0 | 0 | 0 | 0 | 1 |
| X37 | mucosal | N | Y | SD | 0 | 0 | 0 | 0 | 0 | 0 | 0 | 0 | 0 | 0 | 0 | 0 | 1 |

0 = specimen unavailable, 1 = specimen utilized.

EXTENDED DATA TABLE 4
Microbial associations with tumor-free mice.

| Discovery cohort | | | Validation cohort | |
|---|---|---|---|---|
| RET | MCA205 | Both tumor models | MCA205 | Both tumor models |
| *Mucispirillum schaedleri* | *Aminipila butyrica* | *Christensenella timonensis* | *Robertkochia marina* | *Paraeggerthella hongkongensis* |
| *Ruminococcus albus* | *Clostridium clariflavum* | *Eubacterium dolichum* | *Desulfitobacterium metallireducens* | *Millionella massiliensis* |
| *Vampirovibrio chlorellavorus* | *Lactobacillus hominis* | *Rhabdanaerobium thermarum* | *Paraeggerthella hongkongensis* | *Faecalibaculum rodentium* |
| *Rhodospirillum rubrum* | *Enterorhabdus muris* | *Enterorhabdus muris* | *Faecalibaculum rodentium* | *Pseudoflavonifractor phocaeensis* |
| *Clostridium methylpentosum* | *Eubacterium ruminantium* | *Clostridium aldenense* | *Olsenella profusa* | *Alistipes putredinis* |
| *Desulfovibrio desulfuricans* | *Natranaerovirga pectinivora* | *Neglecta timonensis* | *Pseudoflavonifractor phocaeensis* | |
| *Turicibacter sanguinis* | *Lactobacillus caviae* | *Clostridium clariflavum* | *Alistipes putredinis* | |
| *Ihubacter massiliensis* | *Rhabdanaerobium thermarum* | *Anaerobacterium chartisolvens* | *Millionella massiliensis* | |
| *Phocea massiliensis* | *Bacteroides clarus* | *Prevotella shahii* | | |
| *Breznakia pachnodae* | *Prevotella paludivivens* | *Monoglobus pectinilyticus* | | |
| *Abyssivirga alkaniphila* | *Alkalibacter saccharofermentans* | *Falcatimonas natans* | | |
| *Bacteroides caecimuris* | *Prevotella bivia* | *Longibaculum muris* | | |
| *Anaerobacterium chartisolvens* | *Lactobacillus secaliphilus* | *Prevotella paludivivens* | | |
| *Achromobacter deleyi* | *Prevotellamassilia timonensis* | *Vallitalea pronyensis* | | |
| *Ruminococcus faecis* | *Erysipelatoclostridium ramosum* | *Acholeplasma vituli* | | |
| *Bacteroides acidifaciens* | *Lactobacillus taiwanensis* | *Ruminiclostridium thermocellum* | | |
| *Culturomica massiliensis* | *Breznakia pachnodae* | *Phocea massiliensis* | | |
| *Lactobacillus reuteri* | *Roseburia hominis* | *Ruminococcus gnavus* | | |
| *Clostridium cellulolyticum* | *Lactobacillus gasseri* | *Roseburia hominis* | | |
| *Breznakia blatticola* | *Clostridium cellulolyticum* | *Alkalibacter saccharofermentans* | | |
| *Parabacteroides distasonis* | *Ruminococcus gnavus* | *Aminipila butyrica* | | |
| *Bacteroides finegoldii* | | *Adlercreutzia equolifaciens* | | |
| *Duodenibacillus massiliensis* | | *Breznakia pachnodae* | | |
| *Butyrivibrio crossotus* | | *Gracilibacter thermotolerans* | | |
| *Clostridium papyrosolvens* | | *Erysipelatoclostridium ramosum* | | |
| *Prevotella bivia* | | *Asaccharobacter celatus* | | |
| *Alloprevotella rava* | | *Raoultibacter timonensis* | | |
| *Bacteroides clarus* | | *Desulfosporosinus orientis* | | |
| *Alistipes senegalensis* | | *Clostridium cellulolyticum* | | |

EXTENDED DATA TABLE 4
Microbial associations with tumor-free mice.

| Discovery cohort | | | Validation cohort | |
| --- | --- | --- | --- | --- |
| RET | MCA205 | Both tumor models | MCA205 | Both tumor models |
| *Adlercreutzia equolifaciens* *Gracilibacter thermotolerans* *Desulfosporosinus orientis* *Raoultibacter timonensis* *Acholeplasma vituli* | | | | |

EXTENDED DATA TABLE 5
Microbial associations with tumor-bearing mice.

| Discovery cohort | | | Validation cohort | |
| --- | --- | --- | --- | --- |
| RET | MCA205 | Both tumor models | MCA205 | Both tumor models |
| *Clostridium cocleatum* | *Adlercreutzia equolifaciens* *Lawsonia intracellularis* *Porphyromonas pogonae* *Gracilibacter thermotolerans* *Clostridium saudiense* *Tyzzerella nexilis* *Lactobacillus reuteri* *Raoultibacter timonensis* *Clostridium aldenense* *Ruminiclostridium thermocellum* *Lactobacillus johnsonii* *Anaerotruncus rubiinfantis* *Asaccharobacter celatus* *Falcatimonas natans* | *Clostridium methylpentosum* *Gordonibacter faecihominis* *Lactobacillus rogosae* *Prevotella stercorea* *Rhodospirillum rubrum* *Anaerotruncus rubiinfantis* | *Clostridium saudiense* *Tindallia californiensis* *Aminipila butyrica* *Anaerotaenia torta* *Enterorhabdus mucosicola* *Desulfovibrio desulfuricans* *Lactobacillus satsumensis* *Odoribacter splanchnicus* *Streptococcus danieliae* *Alistipes senegalensis* *Oscillibacter ruminantium* *Cellulosilyticum ruminicola* *Monoglobus pectinilyticus* *Oscillibacter valericigenes* *Allobaculum stercoricanis* *Bacteroides clarus* *Alistipes indistinctus* *Clostridium xylanolyticum* *Ruthenibacterium lactatiformans* *Lactobacillus rogosae* *Erysipelothrix larvae* *Clostridium senegalense* *Acetivibrio ethanolgignens* *Bacteroides xylanolyticus* *Adlercreutzia equolifaciens* *Lactobacillus intestinalis* *Desulfovibrio simplex* | *Lactobacillus rogosae* *Clostridium scindens* *Ihubacter massiliensis* *Coprobacter secundus* *Acholeplasma vituli* *Ruminococcus albus* *Desulfovibrio simplex* *Roseburia intestinalis* *Lactobacillus intestinalis* *Butyricicoccus pullicaecorum* *Lawsonia intracellularis* *Flintibacter butyricus* *Bacteroides caecimuris* *Oscillibacter valericigenes* *Alistipes senegalensis* *Butyrivibrio crossotus* *Bacteroides xylanolyticus* *Intestinimonas butyriciproducens* *Clostridium cocleatum* *Culturomica massiliensis* *Desulfovibrio desulfuricans* *Ruthenibacterium lactatiformans* *Flavonifractor plautii* *Breznakia blatticola* *Robertkochia marina* *Achromobacter* |

EXTENDED DATA TABLE 5
Microbial associations with tumor-bearing mice.

| Discovery cohort | | | Validation cohort | |
|---|---|---|---|---|
| RET | MCA205 | Both tumor models | MCA205 | Both tumor models |
| | | | | *deleyi* |
| | | | | *Clostridium xylanolyticum* |
| | | | | *Odoribacter splanchnicus* |
| | | | | *Barnesiella intestinihominis* |
| | | | | *Oscillibacter ruminantium* |

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Attia, P., Phan, G. Q., Maker, A. V., Robinson, M. R., Quezado, M. M., Yang, J. C., Sherry, R. M., Topalian, S. L., Kammula, U.S., Royal, R. E., et al. (2005). Autoimmunity correlates with tumor regression in patients with metastatic melanoma treated with anti-cytotoxic T-lymphocyte antigen-4. J Clin Oncol 23, 6043-6053.

Bai, Y., Ni, M., Cooper, B., Wei, Y., and Fury, W. (2014). Inference of high resolution HLA types using genome-wide RNA or DNA sequencing reads. BMC Genomics 15, 325.

Carlino, M. S., and Long, G. V. (2016). Ipilimumab Combined with Nivolumab: A Standard of Care for the Treatment of Advanced Melanoma?Clin Cancer Res 22, 3992-3998.

Chen, P. L., Roh, W., Reuben, A., Cooper, Z. A., Spencer, C. N., Prieto, P. A., Miller, J. P., Bassett, R. L., Gopalakrishnan, V., Wani, K., et al. (2016). Analysis of Immune Signatures in Longitudinal Tumor Samples Yields Insight into Biomarkers of Response and Mechanisms of Resistance to Immune Checkpoint Blockade. Cancer Discov 6, 827-837.

Daillere, R., Vetizou, M., Waldschmitt, N., Yamazaki, T., Isnard, C., Poirier-Colame, V., Duong, C. P. M., Flament, C., Lepage, P., *Roberti*, M. P., et al. (2016). *Enterococcus hirae* and *Barnesiella intestinihominis* Facilitate Cyclophosphamide-Induced Therapeutic Immunomodulatory Effects. Immunity 45, 931-943.

Dubin, K., Callahan, M. K., Ren, B., Khanin, R., Viale, A., Ling, L., No, D., Gobourne, A., Littmann, E., Huttenhower, C., et al. (2016). Intestinal microbiome analyses identify melanoma patients at risk for checkpoint-blockade-induced colitis. Nat Commun 7, 10391.

Eisenhauer, E. A., Therasse, P., Bogaerts, J., Schwartz, L. H., Sargent, D., Ford, R., Dancey, J., Arbuck, S., Gwyther, S., Mooney, M., et al. (2009). New response evaluation criteria in solid tumors: revised RECIST guideline (version 1.1). Eur J Cancer 45, 228-247.

Ekmekcioglu, S., Davies, M. A., Tanese, K., Roszik, J., Shin-Sim, M., Bassett, R. L., Jr., 5 Milton, D. R., Woodman, S. E., Prieto, V. G., Gershenwald, J. E., et al. (2016). Inflammatory Marker Testing Identifies CD74 Expression in Melanoma Tumor Cells, and Its Expression Associates with Favorable Survival for Stage III Melanoma. Clin Cancer Res 22, 3016-3024.

Frankel, A. E., Coughlin, L. A., Kim, J., Froehlich, T. W., Xie, Y., Frenkel, E. P., and Koh, A. Y. (2017). Metagenomic Shotgun Sequencing and Unbiased Metabolomic Profiling Identify Specific Human Gut Microbiota and Metabolites Associated with Immune Checkpoint Therapy Efficacy in Melanoma Patients. Neoplasia 19, 848-855.

Gopalakrishnan, V., Spencer, C. N., Nezi, L., Reuben, A., Andrews, M. C., Karpinets, T. V., Prieto, P. A., Vicente, D., Hoffman, K., Wei, S. C., et al. (2018). Gut microbiome modulates response to anti-PD-1 immunotherapy in melanoma patients. Science 359, 97-10$^3$.

Hammers, H. J., Plimack, E. R., Infante, J. R., Rini, B. I., McDermott, D. F., Lewis, L. D., Voss, M. H., Sharma, P., Pal, S. K., Razak, A. R. A., et al. (2017). Safety and Efficacy of Nivolumab in Combination With Ipilimumab in Metastatic Renal Cell Carcinoma: The CheckMate 016 Study. J Clin Oncol 35, 3851-3858.

Hellmann, M. D., Ciuleanu, T. E., Pluzanski, A., Lee, J. S., Otterson, G. A., Audigier-Valette, C., Minenza, E., Linardou, H., Burgers, S., Salman, P., et al. (2018). Nivolumab plus Ipilimumab in Lung Cancer with a High Tumor Mutational Burden. N Engl J Med 378, 2093-2104.

Hoof, I., Peters, B., Sidney, J., Pedersen, L. E., Sette, A., Lund, O., Buus, S., and Nielsen, M. (2009). NetMHCpan, a method for MHC class I binding prediction beyond humans. Immunogenetics 61, 1-13.

Hugo, W., Zaretsky, J. M., Sun, L., Song, C., Moreno, B. H., Hu-Lieskovan, S., Berent-Maoz, B., Pang, J., Chmielowski, B., Cherry, G., et al. (2016). Genomic and Transcriptomic Features of Response to Anti-PD-1 Therapy in Metastatic Melanoma. Cell 165, 35-44.

Human Microbiome Project, C. (2012a). A framework for human microbiome research. Nature 486, 215-221.

Human Microbiome Project, C. (2012b). Structure, function and diversity of the healthy human microbiome. Nature 486, 207-214.

Larkin, J., Chiarion-Sileni, V., Gonzalez, R., Grob, J. J., Cowey, C. L., Lao, C. D., Schadendorf, D., Dummer, R., Smylie, M., Rutkowski, P., et al. (2015). Combined Nivolumab and Ipilimumab or Monotherapy in Untreated Melanoma. N Engl J Med 373, 23-34.

Matson, V., Fessler, J., Bao, R., Chongsuwat, T., Zha, Y., Alegre, M. L., Luke, J. J., and Gajewski, T. F. (2018). The commensal microbiome is associated with anti-PD-1 efficacy in metastatic melanoma patients. Science 359, 104-108.

Nielsen, M., Lundegaard, C., Blicher, T., Lamberth, K., Harndahl, M., Justesen, S., Roder, G., Peters, B., Sette, A., Lund, O., et al. (2007). NetMHCpan, a method for quantitative predictions of peptide binding to any HLA-A and -B locus protein of known sequence. PLoS One 2, e796.

Oh, D. Y., Cham, J., Zhang, L., Fong, G., Kwek, S. S., Klinger, M., Faham, M., and Fong, L. (2017). Immune Toxicities Elicted by CTLA-4 Blockade in Cancer Patients Are Associated with Early Diversification of the T-cell Repertoire. Cancer Res 77, 1322-1330.

Peng, W., Chen, J. Q., Liu, C., Malu, S., Creasy, C., Tetzlaff, M. T., Xu, C., McKenzie, J. A., Zhang, C., Liang, X., et al. (2016). Loss of PTEN Promotes Resistance to T Cell-Mediated Immunotherapy. Cancer Discov 6, 202-216.

Robert, C., Long, G. V., Brady, B., Dutriaux, C., Maio, M., Mortier, L., Hassel, J. C., Rutkowski, P., McNeil, C., Kalinka-Warzocha, E., et al. (2015a). Nivolumab in previously untreated melanoma without BRAF mutation. N Engl J Med 372, 320-330.

Robert, C., Schachter, J., Long, G. V., Arance, A., Grob, J. J., Mortier, L., Daud, A., Carlino, M. S., McNeil, C., Lotem, M., et al. (2015b). Pembrolizumab versus Ipilimumab in Advanced Melanoma. N Engl J Med 372, 2521-2532.

Roh, W., Chen, P. L., Reuben, A., Spencer, C. N., Prieto, P. A., Miller, J. P., Gopalakrishnan, V., Wang, F., Cooper, Z. A., Reddy, S. M., et al. (2017). Integrated molecular analysis of tumor biopsies on sequential CTLA-4 and PD-1 blockade reveals markers of response and resistance. Sci Transl Med 9.

Routy, B., Le Chatelier, E., Derosa, L., Duong, C. P. M., Alou, M. T., Daillere, R., Fluckiger, A., Messaoudene, M., Rauber, C., *Roberti*, M. P., et al. (2018). Gut microbiome influences efficacy of PD-1-based immunotherapy against epithelial tumors. Science 359, 91-97.

Segata, N., Izard, J., Waldron, L., Gevers, D., Miropolsky, L., Garrett, W. S., and Huttenhower, C. (2011). Metagenomic biomarker discovery and explanation. Genome Biol 12, R60.

Snyder, A., Makarov, V., Merghoub, T., Yuan, J., Zaretsky, J. M., Desrichard, A., Walsh, L. A., Postow, M. A., Wong, P., Ho, T. S., et al. (2014). Genetic basis for clinical response to CTLA-4 blockade in melanoma. N Engl J Med 371, 2189-2199.

Subudhi, S. K., Aparicio, A., Gao, J., Zurita, A. J., Araujo, J. C., Logothetis, C. J., Tahir, 5 S. A., Korivi, B. R., Slack, R. S., Vence, L., et al. (2016). Clonal expansion of CD8 T cells in the systemic circulation precedes development of ipilimumab-induced toxicities. Proc Natl Acad Sci USA 113, 11919-11924.

Sznol, M., Ferrucci, P. F., Hogg, D., Atkins, M. B., Wolter, P., Guidoboni, M., Lebbe, C., Kirkwood, J. M., Schachter, J., Daniels, G. A., et al. (2017). Pooled Analysis Safety Profile of Nivolumab and Ipilimumab Combination Therapy in Patients With Advanced Melanoma. J Clin Oncol 35, 3815-3822.

Tanese, K., Hashimoto, Y., Berkova, Z., Wang, Y., Samaniego, F., Lee, J. E., Ekmekcioglu, S., and Grimm, E. A. (2015). Cell Surface CD74-MIF Interactions Drive Melanoma Survival in Response to Interferon-gamma. J Invest Dermatol 135, 2775-2784.

Taube, J. M., Klein, A., Brahmer, J. R., Xu, H., Pan, X., Kim, J. H., Chen, L., Pardoll, D. M., Topalian, S. L., and Anders, R. A. (2014). Association of PD-1, PD-1 ligands, and other features of the tumor immune microenvironment with response to anti-PD-1 therapy. Clin Cancer Res 20, 5064-5074.

Therneau, T. M., and Grambsch, P. M. (2000). Modeling Survival Data: Extending the Cox Model. (New York: Springer).

Topalian, S. L., Hodi, F. S., Brahmer, J. R., Gettinger, S. N., Smith, D. C., McDermott, D. F., Powderly, J. D., Carvajal, R. D., Sosman, J. A., Atkins, M. B., et al. (2012). Safety, activity, and immune correlates of anti-PD-1 antibody in cancer. N Engl J Med 366, 2443-2454.

Van Allen, E. M., Miao, D., Schilling, B., Shukla, S. A., Blank, C., Zimmer, L., Sucker, A., Hillen, U., Foppen, M. H. G., Goldinger, S. M., et al. (2015). Genomic correlates of response to CTLA-4 blockade in metastatic melanoma. Science 350, 207-211.

Wolchok, J. D., Kluger, H., Callahan, M. K., Postow, M. A., Rizvi, N. A., Lesokhin, A. M., Segal, N. H., Ariyan, C. E., Gordon, R. A., Reed, K., et al. (2013). Nivolumab plus ipilimumab in advanced melanoma. N Engl J Med 369, 122-133.

Zaretsky, J. M., Garcia-Diaz, A., Shin, D. S., Escuin-Ordinas, H., Hugo, W., Hu-Lieskovan, S., Torrejon, D. Y., Abril-Rodriguez, G., Sandoval, S., Barthly, L., et al. (2016). Mutations Associated with Acquired Resistance to PD-1 Blockade in Melanoma. N Engl J Med 375, 819-829.

Zitvogel, L., Ma, Y., Raoult, D., Kroemer, G., and Gajewski, T. F. (2018). The microbiome in cancer immunotherapy: Diagnostic tools and therapeutic strategies. Science 359, 1366-1370.

The invention claimed is:

1. A method of treating melanoma in a subject comprising: administering to a subject determined to have a microbial profile comprising *Bacteroides fragilis*, *Vampirovibrio*, and *Tyzzerella* in the gut microbiome, a combination of (i) a PD-1, PD-L1, or PD-L2 inhibitor and (ii) a CTLA-4, B7-1, or B7-2 inhibitor.

2. The method of claim 1, wherein the melanoma is metastatic melanoma, Lentigo Maligna, Superficial Spreading Melanoma, Nodular Melanoma, Acral Lentiginous Melanoma, Cutaneous Melanoma, or Desmoplastic Melanoma.

3. The method of claim 2, wherein the melanoma comprises Cutaneous Melanoma.

4. The method of claim 1, wherein the method further comprises administering at least one additional anticancer treatment and wherein the at least one additional anticancer treatment is surgical therapy, chemotherapy, radiation therapy, hormonal therapy, immunotherapy, small molecule therapy, receptor kinase inhibitor therapy, anti-angiogenic therapy, cytokine therapy, cryotherapy or a biological therapy.

5. The method of claim 1, wherein the inhibitor of (i) is an anti-PD-1 monoclonal antibody and (ii) is an anti-CTLA-4 monoclonal antibody.

6. The method of claim 5, wherein (i) comprises nivolumab, pembrolizumab, or pidilizumab and/or wherein (ii) comprises ipilimumab or tremelimumab.

7. The method of claim 1, wherein the cancer comprises stage III or IV cancer.

8. The method of claim 1, wherein the subject is a human subject.

9. The method of claim 1, wherein the microbial profile for the subject was determined by analyzing the microbiome in a sample from the subject.

10. The method of claim 9, wherein the sample is a fecal sample.

11. The method of claim 9, wherein analyzing comprises performing 16S ribosomal sequencing and/or metagenomics whole genome sequencing.

12. The method of claim 1, wherein the subject has previously been treated for melanoma.

13. The method of claim 1, wherein the melanoma is recurrent.

* * * * *

SEQUENCE LISTING

<160> NUMBER OF SEQ ID NOS: 9

<210> SEQ ID NO 1
<211> LENGTH: 18
<212> TYPE: DNA
<213> ORGANISM: Artificial Sequence

```
<220> FEATURE:
<223> OTHER INFORMATION: Description of Artificial Sequence: Synthetic
      primer

<400> SEQUENCE: 1
cggtgaatac gttcccgg                                                   18

<210> SEQ ID NO 2
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
tacggctacc ttgttacgac tt                                              22

<210> SEQ ID NO 3
<211> LENGTH: 19
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 3
cttgtacaca ccgcccgtc                                                  19

<210> SEQ ID NO 4
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
agcatgacct agcaataggt tg                                              22

<210> SEQ ID NO 5
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
acgcatcccc atcgattat                                                  19

<210> SEQ ID NO 6
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
tcttccgcat ggtagaacta tta                                             23

<210> SEQ ID NO 7
<211> LENGTH: 22
<212> TYPE: DNA
<213> ORGANISM: Artificial Sequence
<220> FEATURE:
```

```
<223> OTHER INFORMATION: Description of Artificial Sequence: Synthetic
      primer

<400> SEQUENCE: 7
accgtgtctc agttccaatg tg                                            22

<210> SEQ ID NO 8
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
tgattccgca tggtttcatt                                               20

<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
cgacccatag agccttcatc                                               20
```